US012664583B2

(12) United States Patent
Sliwka et al.

(10) Patent No.: US 12,664,583 B2
(45) Date of Patent: Jun. 23, 2026

(54) SMART CONTRACT-MANAGED DECENTRALIZED LENDING PROCESSES USING COLLATERAL TOKENS THAT INCLUDES A CONDITIONAL COLLATERAL SALE STAGE

(71) Applicant: VERONA HOLDINGS SEZC, George Town (KY)

(72) Inventors: Lukasz Jakub Sliwka, Las Vegas, NV (US); Jonathan Yantis, Grants Pass, OR (US); William Edward Quigley, Pacific Palisades, CA (US)

(73) Assignee: VERONA HOLDINGS SEZC, George Town (KY)

( * ) Notice: Subject to any disclaimer, the term of this patent is extended or adjusted under 35 U.S.C. 154(b) by 0 days.

(21) Appl. No.: 17/869,241

(22) Filed: Jul. 20, 2022

(65) Prior Publication Data

US 2022/0358578 A1      Nov. 10, 2022

Related U.S. Application Data

(63) Continuation of application No. 17/703,507, filed on Mar. 24, 2022, now abandoned, which is a continuation of application No. PCT/US2020/052728, filed on Sep. 25, 2020.

(60) Provisional application No. 62/906,211, filed on Sep. 26, 2019.

(51) Int. Cl.
*G06Q 40/03*          (2023.01)
*G06Q 20/38*          (2012.01)

(52) U.S. Cl.
CPC ......... *G06Q 40/03* (2023.01); *G06Q 20/3825* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 4,722,053 A | 1/1988 | Dubno et al. | |
| 5,930,775 A * | 7/1999 | McCauley | G06Q 40/06 705/36 R |
| 6,970,812 B2 | 11/2005 | Kamachi et al. | |

(Continued)

FOREIGN PATENT DOCUMENTS

| | | | | |
|---|---|---|---|---|
| AU | 2007242962 B2 * | 11/2011 | ............. | G06Q 40/00 |
| CA | 3055829 A1 * | 9/2018 | ......... | G06F 16/1805 |

(Continued)

OTHER PUBLICATIONS

Song, I., "Collateral in Loan Classification and Provisioning," IMF Working Paper, Jul. 2002, 25 pages.

(Continued)

*Primary Examiner* — Ayal I. Sharon
(74) *Attorney, Agent, or Firm* — RMCK Law Group, PLC

(57)          ABSTRACT

A loan process smart contract manages a collateralized loan process for a loan against a collateralized item, the collateralized loan process including tokenizing and locking a collateral token that tokenizes the collateral item, managing a conditional collateral item offering to a digital marketplace the result of which triggers a loan negotiation stage, monitoring terms of the loan, and detecting an unlocking event of the loan for unlocking the collateral token.

20 Claims, 30 Drawing Sheets

(56) References Cited

U.S. PATENT DOCUMENTS

| | | |
|---|---|---|
| 7,389,269 B1 | 6/2008 | Robinson et al. |
| 7,711,647 B2 | 5/2010 | Gunaseelan et al. |
| 7,747,519 B2 | 6/2010 | Kemper et al. |
| 7,904,381 B1 | 3/2011 | Tatang et al. |
| 8,037,193 B2 | 10/2011 | Hay et al. |
| 8,156,019 B2 | 4/2012 | Wilson et al. |
| 8,360,867 B2 | 1/2013 | Luchene |
| 8,549,416 B2 | 10/2013 | Ganz et al. |
| 8,589,255 B2 | 11/2013 | Glazer et al. |
| 8,606,673 B1 | 12/2013 | Grim et al. |
| 8,712,920 B2* | 4/2014 | Walker .................. G06Q 20/24 |
| | | 705/40 |
| 9,129,339 B2 | 9/2015 | Liu |
| 9,229,987 B2 | 1/2016 | Mattsson et al. |
| 9,373,139 B2 | 6/2016 | Kressler |
| 9,396,486 B2 | 7/2016 | Stivoric et al. |
| 9,535,902 B1 | 1/2017 | Michalak et al. |
| 9,536,065 B2 | 1/2017 | Bouse et al. |
| 9,608,829 B2 | 3/2017 | Spanos et al. |
| 9,679,125 B2 | 6/2017 | Bailor et al. |
| 9,737,819 B2 | 8/2017 | DeSanti et al. |
| 9,794,797 B2 | 10/2017 | Hoffberg |
| 9,996,983 B2 | 6/2018 | Mullins |
| 10,043,174 B1 | 8/2018 | Chikkanna |
| 10,103,953 B1 | 10/2018 | Chang et al. |
| 10,116,830 B2 | 10/2018 | Eagleton et al. |
| 10,121,143 B1 | 11/2018 | Madisetti et al. |
| 10,192,073 B2 | 1/2019 | Marin |
| 10,192,198 B2 | 1/2019 | Nazzari et al. |
| 10,210,453 B2 | 2/2019 | Krishnamurthy et al. |
| 10,210,527 B2 | 2/2019 | Radocchia et al. |
| 10,243,743 B1 | 3/2019 | Madisetti et al. |
| 10,373,158 B1 | 8/2019 | James et al. |
| 10,482,533 B2 | 11/2019 | Leonard et al. |
| 10,489,768 B2 | 11/2019 | Szeto et al. |
| 10,505,726 B1 | 12/2019 | Andon et al. |
| 10,506,070 B2 | 12/2019 | Ford et al. |
| 10,540,654 B1 | 1/2020 | James et al. |
| 10,600,009 B1 | 3/2020 | Augustine et al. |
| 10,621,368 B2 | 4/2020 | Ravizza et al. |
| 10,657,595 B2 | 5/2020 | Jong et al. |
| 10,755,263 B1 | 8/2020 | Ramanathan |
| 10,832,338 B1 | 11/2020 | Floyd et al. |
| 10,839,379 B2 | 11/2020 | Pierce et al. |
| 10,896,412 B2 | 1/2021 | Robertson et al. |
| 10,946,283 B1 | 3/2021 | Meilich et al. |
| 10,963,958 B1 | 3/2021 | Best et al. |
| 11,049,082 B2 | 6/2021 | Rice |
| 11,055,279 B2 | 7/2021 | Yan |
| 11,068,978 B1* | 7/2021 | Ferreira ................ H04L 9/3239 |
| 11,075,891 B1 | 7/2021 | Long et al. |
| 11,139,955 B1 | 10/2021 | So et al. |
| 11,176,620 B1 | 11/2021 | Lubczynski et al. |
| 11,200,569 B1 | 12/2021 | James et al. |
| 11,210,596 B1 | 12/2021 | Baker |
| 11,222,298 B2 | 1/2022 | Abelow |
| 11,250,111 B2 | 2/2022 | Goldston et al. |
| 11,256,788 B2 | 2/2022 | Goldston et al. |
| 11,288,736 B1 | 3/2022 | Jette et al. |
| 11,308,487 B1 | 4/2022 | Foster et al. |
| 11,321,308 B2 | 5/2022 | Yan |
| 11,334,875 B2 | 5/2022 | Yantis et al. |
| 11,334,876 B2 | 5/2022 | Yantis et al. |
| 11,334,883 B1* | 5/2022 | Auerbach ............ G06Q 20/223 |
| 11,386,507 B2 | 7/2022 | Horesh et al. |
| 11,431,691 B2 | 8/2022 | Hill et al. |
| 11,488,059 B2 | 11/2022 | Cella |
| 11,500,972 B2 | 11/2022 | Goldston et al. |
| 11,522,700 B1* | 12/2022 | Auerbach ............. H04L 9/3213 |
| 11,538,002 B2 | 12/2022 | Wang et al. |
| 11,552,799 B1 | 1/2023 | Parikh |
| 11,556,620 B2 | 1/2023 | Goldston et al. |
| 11,557,174 B2 | 1/2023 | Simons |
| 11,562,442 B2 | 1/2023 | Smith et al. |
| 11,720,888 B2 | 8/2023 | Norton et al. |
| 11,720,913 B2 | 8/2023 | Augustine et al. |
| 11,853,404 B2 | 12/2023 | Goldston et al. |
| 12,093,942 B1* | 9/2024 | Auerbach .......... G06Q 20/3829 |
| 12,106,360 B2 | 10/2024 | Cardenas Gasca et al. |
| 12,130,803 B2 | 10/2024 | Shin |
| 12,265,953 B1 | 4/2025 | Harrison et al. |
| 2001/0049606 A1 | 12/2001 | Lucarelli |
| 2002/0073015 A1 | 6/2002 | Chan et al. |
| 2002/0194209 A1 | 12/2002 | Bolosky et al. |
| 2003/0055754 A1 | 3/2003 | Sullivan |
| 2003/0065624 A1 | 4/2003 | James et al. |
| 2003/0220885 A1 | 11/2003 | Lucarelli et al. |
| 2005/0065871 A1 | 3/2005 | Gerhart et al. |
| 2005/0246193 A1 | 11/2005 | Roever et al. |
| 2006/0085314 A1 | 4/2006 | Grim et al. |
| 2006/0195392 A1* | 8/2006 | Buerger ................ G06Q 40/00 |
| | | 705/38 |
| 2006/0224480 A1 | 10/2006 | Bent et al. |
| 2007/0061248 A1 | 3/2007 | Shavit et al. |
| 2007/0094721 A1 | 4/2007 | Nguyen et al. |
| 2007/0129124 A1 | 6/2007 | Luchene |
| 2007/0203852 A1 | 8/2007 | Cameron et al. |
| 2007/0282723 A1 | 12/2007 | Cohen et al. |
| 2008/0004969 A1 | 1/2008 | Shniberg et al. |
| 2008/0027786 A1 | 1/2008 | Davis et al. |
| 2008/0120240 A1 | 5/2008 | Ginter et al. |
| 2008/0243719 A1* | 10/2008 | Shavit ................... G06Q 40/00 |
| | | 705/36 R |
| 2009/0063295 A1 | 3/2009 | Smith |
| 2009/0063343 A1 | 3/2009 | Mertz et al. |
| 2009/0164362 A1* | 6/2009 | Moore ................... G06Q 40/03 |
| | | 705/38 |
| 2009/0192891 A1 | 7/2009 | Titus et al. |
| 2009/0198586 A1 | 8/2009 | Owen |
| 2009/0234755 A1 | 9/2009 | Sidoruk |
| 2009/0265270 A1 | 10/2009 | Gangaraju |
| 2009/0283589 A1 | 11/2009 | Moore et al. |
| 2010/0005007 A1 | 1/2010 | Cox et al. |
| 2011/0099099 A1 | 4/2011 | Rivest et al. |
| 2011/0238530 A1 | 9/2011 | Shniberg et al. |
| 2012/0005043 A1 | 1/2012 | Bushinsky |
| 2012/0046779 A1 | 2/2012 | Pax et al. |
| 2012/0290467 A1 | 11/2012 | Shenkar et al. |
| 2012/0330798 A1 | 12/2012 | Fox |
| 2013/0013471 A1 | 1/2013 | Fishman |
| 2013/0132230 A1 | 5/2013 | Gibson et al. |
| 2013/0325547 A1 | 12/2013 | Clark |
| 2014/0244361 A1 | 8/2014 | Zhang et al. |
| 2014/0289386 A1 | 9/2014 | Vatto et al. |
| 2014/0337189 A1 | 11/2014 | Barsade et al. |
| 2014/0351105 A1 | 11/2014 | Hamm |
| 2015/0026072 A1 | 1/2015 | Zhou et al. |
| 2015/0039444 A1 | 2/2015 | Hardin et al. |
| 2015/0074018 A1 | 3/2015 | Gill et al. |
| 2015/0088753 A1 | 3/2015 | Schueren |
| 2015/0142603 A1 | 5/2015 | Haberman |
| 2015/0170112 A1 | 6/2015 | DeCastro |
| 2015/0310195 A1 | 10/2015 | Bailor et al. |
| 2015/0324764 A1 | 11/2015 | Van Rooyen et al. |
| 2015/0332224 A1 | 11/2015 | Melika et al. |
| 2015/0332256 A1 | 11/2015 | Minor |
| 2015/0363769 A1 | 12/2015 | Ronca et al. |
| 2015/0363777 A1 | 12/2015 | Ronca et al. |
| 2015/0379510 A1 | 12/2015 | Smith |
| 2016/0063429 A1 | 3/2016 | Varley et al. |
| 2016/0071206 A1 | 3/2016 | Danieli |
| 2016/0092988 A1 | 3/2016 | Letourneau |
| 2016/0098723 A1 | 4/2016 | Feeney |
| 2016/0217436 A1 | 7/2016 | Brama |
| 2016/0253651 A1 | 9/2016 | Park et al. |
| 2016/0300234 A1 | 10/2016 | Moss-Pultz et al. |
| 2016/0328705 A1 | 11/2016 | Sebag et al. |
| 2016/0335609 A1 | 11/2016 | Jenkins |
| 2016/0358161 A1 | 12/2016 | Cobban et al. |
| 2016/0358184 A1 | 12/2016 | Radocchia et al. |
| 2017/0005804 A1 | 1/2017 | Zinder |
| 2017/0011460 A1 | 1/2017 | Molinari et al. |
| 2017/0024817 A1 | 1/2017 | Wager et al. |
| 2017/0024818 A1 | 1/2017 | Wager et al. |

(56) References Cited

U.S. PATENT DOCUMENTS

| | | |
|---|---|---|
| 2017/0057170 A1 | 3/2017 | Gupta et al. |
| 2017/0076366 A1 | 3/2017 | Wadley et al. |
| 2017/0083907 A1 | 3/2017 | McDonough et al. |
| 2017/0085545 A1 | 3/2017 | Lohe et al. |
| 2017/0085555 A1 | 3/2017 | Bisikalo et al. |
| 2017/0091756 A1 | 3/2017 | Stern et al. |
| 2017/0103385 A1 | 4/2017 | Wilson, Jr. et al. |
| 2017/0103468 A1 | 4/2017 | Orsini et al. |
| 2017/0109735 A1 | 4/2017 | Sheng et al. |
| 2017/0109744 A1* | 4/2017 | Wilkins ................... H04L 9/14 |
| 2017/0116693 A1 | 4/2017 | Rae et al. |
| 2017/0132619 A1 | 5/2017 | Miller et al. |
| 2017/0132633 A1 | 5/2017 | Whitehouse |
| 2017/0169800 A1 | 6/2017 | Greco et al. |
| 2017/0178245 A1 | 6/2017 | Rodkey et al. |
| 2017/0206522 A1 | 7/2017 | Schiatti et al. |
| 2017/0210525 A1 | 7/2017 | Mayer et al. |
| 2017/0213265 A1 | 7/2017 | Masherah et al. |
| 2017/0214522 A1 | 7/2017 | Code et al. |
| 2017/0221029 A1 | 8/2017 | Lund et al. |
| 2017/0221052 A1 | 8/2017 | Sheng et al. |
| 2017/0232300 A1 | 8/2017 | Tran et al. |
| 2017/0236143 A1 | 8/2017 | Code et al. |
| 2017/0249622 A1 | 8/2017 | Ortiz et al. |
| 2017/0345019 A1 | 11/2017 | Radocchia et al. |
| 2017/0351678 A1 | 12/2017 | Selekman et al. |
| 2018/0025442 A1 | 1/2018 | Isaacson et al. |
| 2018/0047111 A1 | 2/2018 | Meira et al. |
| 2018/0048735 A1 | 2/2018 | Drouin et al. |
| 2018/0068359 A1 | 3/2018 | Preston et al. |
| 2018/0075421 A1 | 3/2018 | Serrano et al. |
| 2018/0075527 A1 | 3/2018 | Nagla et al. |
| 2018/0078843 A1 | 3/2018 | Tran et al. |
| 2018/0089758 A1 | 3/2018 | Stradling et al. |
| 2018/0091316 A1 | 3/2018 | Stradling et al. |
| 2018/0094953 A1 | 4/2018 | Colson et al. |
| 2018/0096175 A1 | 4/2018 | Schmeling et al. |
| 2018/0114198 A1 | 4/2018 | Ghotbi et al. |
| 2018/0143995 A1 | 5/2018 | Bailey et al. |
| 2018/0144156 A1 | 5/2018 | Marin |
| 2018/0159838 A1 | 6/2018 | Dintenfass |
| 2018/0165612 A1 | 6/2018 | Saxena et al. |
| 2018/0178962 A1 | 6/2018 | Marr et al. |
| 2018/0191503 A1 | 7/2018 | Alwar et al. |
| 2018/0198617 A1 | 7/2018 | Drouin et al. |
| 2018/0204190 A1 | 7/2018 | Moy et al. |
| 2018/0211313 A1 | 7/2018 | Narahari |
| 2018/0218176 A1 | 8/2018 | Voorhees et al. |
| 2018/0218469 A1 | 8/2018 | Lert, Jr. et al. |
| 2018/0322597 A1 | 11/2018 | Sher |
| 2018/0330212 A1 | 11/2018 | Kumar |
| 2018/0343128 A1 | 11/2018 | Uhr et al. |
| 2018/0349485 A1 | 12/2018 | Carlisle et al. |
| 2018/0349893 A1 | 12/2018 | Tsai |
| 2018/0349938 A1 | 12/2018 | Ericson |
| 2018/0365764 A1 | 12/2018 | Nelson |
| 2019/0012660 A1 | 1/2019 | Masters |
| 2019/0019144 A1 | 1/2019 | Gillen |
| 2019/0026711 A1 | 1/2019 | Pinski et al. |
| 2019/0028276 A1 | 1/2019 | Pierce et al. |
| 2019/0043138 A1 | 2/2019 | Blake et al. |
| 2019/0044917 A1 | 2/2019 | Mork et al. |
| 2019/0080392 A1 | 3/2019 | Youb et al. |
| 2019/0080398 A1 | 3/2019 | Jain |
| 2019/0080402 A1 | 3/2019 | Molinari et al. |
| 2019/0081789 A1 | 3/2019 | Madisetti et al. |
| 2019/0087893 A1 | 3/2019 | Pellew |
| 2019/0114609 A1 | 4/2019 | Burton et al. |
| 2019/0114706 A1 | 4/2019 | Bell et al. |
| 2019/0114707 A1 | 4/2019 | McSheehan et al. |
| 2019/0130387 A1 | 5/2019 | Arora et al. |
| 2019/0130399 A1 | 5/2019 | Wright et al. |
| 2019/0130483 A1 | 5/2019 | Jong |
| 2019/0130484 A1 | 5/2019 | Jong |
| 2019/0130506 A1 | 5/2019 | Walsh |
| 2019/0130701 A1 | 5/2019 | Simons |
| 2019/0156301 A1 | 5/2019 | Bentov et al. |
| 2019/0156938 A1 | 5/2019 | Brunner |
| 2019/0158289 A1 | 5/2019 | Drouin et al. |
| 2019/0164151 A1 | 5/2019 | Doney et al. |
| 2019/0164221 A1 | 5/2019 | Hill et al. |
| 2019/0172026 A1 | 6/2019 | Vessenes et al. |
| 2019/0173854 A1 | 6/2019 | Beck |
| 2019/0188653 A1 | 6/2019 | Khaund |
| 2019/0213564 A1 | 7/2019 | Chan et al. |
| 2019/0220813 A1 | 7/2019 | Madisetti et al. |
| 2019/0220836 A1 | 7/2019 | Caldwell |
| 2019/0222418 A1 | 7/2019 | O'Brien et al. |
| 2019/0228409 A1 | 7/2019 | Madisetti et al. |
| 2019/0228461 A1 | 7/2019 | Domokos et al. |
| 2019/0236594 A1 | 8/2019 | Ehrlich-Quinn |
| 2019/0251078 A1 | 8/2019 | Yan |
| 2019/0266661 A1 | 8/2019 | Moura et al. |
| 2019/0272591 A1 | 9/2019 | Leonard et al. |
| 2019/0278852 A1 | 9/2019 | Jayachandran et al. |
| 2019/0279172 A1 | 9/2019 | Duffield et al. |
| 2019/0279204 A1 | 9/2019 | Norton et al. |
| 2019/0279215 A1 | 9/2019 | Kuchar et al. |
| 2019/0287100 A1 | 9/2019 | Song et al. |
| 2019/0287175 A1 | 9/2019 | Hill et al. |
| 2019/0299105 A1 | 10/2019 | Knight et al. |
| 2019/0303892 A1 | 10/2019 | Yantis et al. |
| 2019/0303926 A1 | 10/2019 | Yantis et al. |
| 2019/0318425 A1 | 10/2019 | Tilley et al. |
| 2019/0333030 A1 | 10/2019 | Ramasamy et al. |
| 2019/0333142 A1 | 10/2019 | Thomas |
| 2019/0340252 A1 | 11/2019 | Huyghe et al. |
| 2019/0340609 A1* | 11/2019 | Mayadas ............... H04L 63/123 |
| 2019/0370792 A1 | 12/2019 | Lam |
| 2019/0385156 A1 | 12/2019 | Liu |
| 2019/0385229 A1 | 12/2019 | Leonard et al. |
| 2019/0392511 A1 | 12/2019 | Mahajan et al. |
| 2019/0392536 A1 | 12/2019 | Rice |
| 2020/0005284 A1 | 1/2020 | Vijayan |
| 2020/0013053 A1* | 1/2020 | Amin ................... G06Q 20/223 |
| 2020/0034457 A1 | 1/2020 | Brody et al. |
| 2020/0038761 A1 | 2/2020 | Packin et al. |
| 2020/0042989 A1 | 2/2020 | Ramadoss et al. |
| 2020/0065802 A1 | 2/2020 | Mathieson et al. |
| 2020/0065847 A1 | 2/2020 | Harrison et al. |
| 2020/0065896 A1 | 2/2020 | Sukumaran et al. |
| 2020/0065899 A1 | 2/2020 | Fritsch et al. |
| 2020/0074429 A1 | 3/2020 | Derosa-Grund |
| 2020/0097950 A1 | 3/2020 | Thompson |
| 2020/0111078 A1 | 4/2020 | Roennow et al. |
| 2020/0119905 A1 | 4/2020 | Revankar et al. |
| 2020/0133944 A1 | 4/2020 | Yan |
| 2020/0134139 A1 | 4/2020 | Vaish et al. |
| 2020/0167769 A1 | 5/2020 | Green |
| 2020/0184041 A1 | 6/2020 | Andon et al. |
| 2020/0184547 A1 | 6/2020 | Andon et al. |
| 2020/0219150 A1 | 7/2020 | Johnston |
| 2020/0242105 A1 | 7/2020 | Rich et al. |
| 2020/0250590 A1 | 8/2020 | Augustine et al. |
| 2020/0250657 A1 | 8/2020 | Senter et al. |
| 2020/0250752 A1 | 8/2020 | Sugarman |
| 2020/0252205 A1 | 8/2020 | Padmanabhan |
| 2020/0258150 A1 | 8/2020 | Cononico |
| 2020/0265511 A1 | 8/2020 | Silveira et al. |
| 2020/0273048 A1 | 8/2020 | Andon et al. |
| 2020/0279249 A1 | 9/2020 | Ta |
| 2020/0294011 A1 | 9/2020 | Robertson et al. |
| 2020/0320518 A1 | 10/2020 | Simas et al. |
| 2020/0327623 A1 | 10/2020 | Lee |
| 2020/0334668 A1 | 10/2020 | Nicli et al. |
| 2020/0349536 A1* | 11/2020 | Hertel .................. G06Q 20/384 |
| 2020/0356991 A1* | 11/2020 | Saraniecki ......... G06Q 20/3674 |
| 2020/0380090 A1 | 12/2020 | Marion |
| 2020/0380476 A1 | 12/2020 | Trudeau et al. |
| 2020/0394652 A1 | 12/2020 | Youb et al. |
| 2020/0394671 A1 | 12/2020 | Kurtas et al. |
| 2020/0402025 A1 | 12/2020 | Wang et al. |
| 2021/0065293 A1* | 3/2021 | Sigler ................... G06Q 20/24 |
| 2021/0082044 A1* | 3/2021 | Sliwka .................. H04L 9/3255 |

(56) References Cited

U.S. PATENT DOCUMENTS

| | | |
|---|---|---|
| 2021/0097508 A1 | 4/2021 | Papanikolas |
| 2021/0103984 A1 | 4/2021 | Leonard et al. |
| 2021/0110469 A1 | 4/2021 | Ross et al. |
| 2021/0126794 A1 | 4/2021 | Forrester et al. |
| 2021/0133700 A1 | 5/2021 | Williams et al. |
| 2021/0133708 A1 | 5/2021 | Robertson et al. |
| 2021/0133713 A1 | 5/2021 | Wang et al. |
| 2021/0192473 A1 | 6/2021 | Meehan |
| 2021/0201336 A1 | 7/2021 | Mallett et al. |
| 2021/0201625 A1 | 7/2021 | Simons |
| 2021/0248214 A1 | 8/2021 | Goldston et al. |
| 2021/0248594 A1 | 8/2021 | Yantis et al. |
| 2021/0248653 A1 | 8/2021 | McKenzie et al. |
| 2021/0256070 A1 | 8/2021 | Tran et al. |
| 2021/0266167 A1 | 8/2021 | Lohe et al. |
| 2021/0279305 A1 | 9/2021 | Goldston et al. |
| 2021/0279695 A1 | 9/2021 | Rice |
| 2021/0281410 A1 | 9/2021 | Hain |
| 2021/0312545 A1 | 10/2021 | Ferreira |
| 2021/0319430 A1 | 10/2021 | Yantis et al. |
| 2021/0326848 A1 | 10/2021 | Yantis et al. |
| 2021/0326849 A1 | 10/2021 | Yantis et al. |
| 2021/0326850 A1 | 10/2021 | Yantis et al. |
| 2021/0326852 A1 | 10/2021 | Yantis et al. |
| 2021/0342836 A1 | 11/2021 | Cella et al. |
| 2021/0365909 A1 | 11/2021 | Shiina |
| 2021/0382966 A1 | 12/2021 | Shii et al. |
| 2021/0383379 A1 | 12/2021 | Choi |
| 2021/0390196 A1 | 12/2021 | Lavine et al. |
| 2022/0005023 A1 | 1/2022 | Angelos et al. |
| 2022/0027992 A1 | 1/2022 | Blevins |
| 2022/0058625 A1 | 2/2022 | Yantis et al. |
| 2022/0058632 A1 | 2/2022 | Yantis et al. |
| 2022/0067705 A1 | 3/2022 | Yantis et al. |
| 2022/0067706 A1 | 3/2022 | Yantis et al. |
| 2022/0067707 A1 | 3/2022 | Yantis et al. |
| 2022/0067708 A1 | 3/2022 | Yantis et al. |
| 2022/0084368 A1 | 3/2022 | Merati |
| 2022/0122050 A1 | 4/2022 | Pacella et al. |
| 2022/0122062 A1 | 4/2022 | Mayblum et al. |
| 2022/0172201 A1 | 6/2022 | Amin |
| 2022/0172284 A1 | 6/2022 | Tarmann et al. |
| 2022/0173893 A1 | 6/2022 | Basu et al. |
| 2022/0180430 A1* | 6/2022 | Bethune ................. G06Q 40/03 |
| 2022/0210061 A1 | 6/2022 | Simu et al. |
| 2022/0215075 A1 | 7/2022 | Goldston et al. |
| 2022/0215076 A1 | 7/2022 | Goldston et al. |
| 2022/0215469 A1 | 7/2022 | Jette et al. |
| 2022/0222364 A1 | 7/2022 | Roberts et al. |
| 2022/0230240 A1 | 7/2022 | Sliwka et al. |
| 2022/0233959 A1 | 7/2022 | Tsuda et al. |
| 2022/0245608 A1 | 8/2022 | Burchetta |
| 2022/0253834 A1 | 8/2022 | Vijayan |
| 2022/0261882 A1 | 8/2022 | Youb et al. |
| 2022/0277275 A1 | 9/2022 | Housser et al. |
| 2022/0300926 A1 | 9/2022 | Marusyk |
| 2022/0327529 A1 | 10/2022 | Williams et al. |
| 2022/0366494 A1 | 11/2022 | Cella et al. |
| 2022/0374888 A1 | 11/2022 | Lackey |
| 2022/0383303 A1 | 12/2022 | Mullen et al. |
| 2023/0036730 A1 | 2/2023 | Casa |
| 2023/0043702 A1 | 2/2023 | Sells et al. |
| 2023/0054446 A1 | 2/2023 | LaFever et al. |
| 2023/0069649 A1 | 3/2023 | Goldston et al. |
| 2023/0080927 A1* | 3/2023 | Padmanabhan ...... G06Q 20/381 705/64 |
| 2023/0111106 A1 | 4/2023 | Zaarour et al. |
| 2023/0117430 A1 | 4/2023 | Quigley et al. |
| 2023/0117725 A1 | 4/2023 | Quigley et al. |
| 2023/0117801 A1 | 4/2023 | Quigley et al. |
| 2023/0118213 A1 | 4/2023 | Quigley et al. |
| 2023/0118717 A1 | 4/2023 | Quigley et al. |
| 2023/0119584 A1 | 4/2023 | Quigley et al. |
| 2023/0120636 A1 | 4/2023 | Toohey et al. |
| 2023/0120637 A1 | 4/2023 | Hain |
| 2023/0123346 A1 | 4/2023 | Quigley et al. |
| 2023/0123865 A1 | 4/2023 | Quigley et al. |
| 2023/0124608 A1 | 4/2023 | Quigley et al. |
| 2023/0129494 A1 | 4/2023 | Quigley et al. |
| 2023/0130594 A1 | 4/2023 | Quigley et al. |
| 2023/0131603 A1 | 4/2023 | Quigley et al. |
| 2023/0153799 A1 | 5/2023 | Wilson, Jr. et al. |
| 2023/0169578 A1 | 6/2023 | Krishna et al. |
| 2023/0179421 A1 | 6/2023 | Rojas |
| 2023/0196341 A1 | 6/2023 | Quigley et al. |
| 2023/0206261 A1 | 6/2023 | Cella et al. |
| 2023/0206329 A1 | 6/2023 | Cella et al. |
| 2023/0214819 A1 | 7/2023 | Tham et al. |
| 2023/0245101 A1 | 8/2023 | Quigley et al. |
| 2023/0259982 A1 | 8/2023 | Landers |
| 2023/0273980 A1 | 8/2023 | Goldston et al. |
| 2023/0274244 A1 | 8/2023 | Quigley et al. |
| 2023/0281937 A1 | 9/2023 | Liu |
| 2023/0316075 A1 | 10/2023 | Cella et al. |
| 2023/0325829 A1 | 10/2023 | Cella et al. |
| 2023/0351393 A1 | 11/2023 | Cella et al. |
| 2023/0367766 A1* | 11/2023 | Padmanabhan ...... G06Q 20/389 |
| 2023/0368189 A1 | 11/2023 | Ambrose |
| 2023/0376572 A1 | 11/2023 | Barba et al. |
| 2024/0005409 A1 | 1/2024 | Doney |
| 2024/0037668 A1 | 2/2024 | Leise et al. |
| 2024/0152893 A1 | 5/2024 | Northrop |
| 2024/0261692 A1 | 8/2024 | Sliwka et al. |
| 2025/0156828 A1 | 5/2025 | Sliwka et al. |

FOREIGN PATENT DOCUMENTS

| | | | |
|---|---|---|---|
| CA | 3118593 A1 | 5/2020 | |
| CA | 3038090 A1 * | 9/2020 | ........ G06Q 20/0658 |
| CA | 3113389 C * | 12/2023 | ............ G06F 16/27 |
| CN | 106682983 A | 5/2017 | |
| CN | 107292735 A | 10/2017 | |
| CN | 108062671 A | 5/2018 | |
| CN | 108335206 A | 7/2018 | |
| CN | 108711040 A | 10/2018 | |
| CN | 108768666 A | 11/2018 | |
| CN | 110060145 A | 7/2019 | |
| CN | 110860090 A | 3/2020 | |
| CN | 110135819 A | 6/2021 | |
| CN | 114616582 A | 6/2022 | |
| EP | 3540662 A1 | 9/2019 | |
| EP | 3564884 A1 | 11/2019 | |
| GB | 2572339 A | 10/2019 | |
| GB | 2597409 A | 1/2022 | |
| JP | 2018173692 A | 11/2018 | |
| JP | 2019004463 A | 1/2019 | |
| JP | 2019083013 A | 5/2019 | |
| JP | 2019160312 A | 9/2019 | |
| JP | 2023167674 A | 11/2023 | |
| JP | 3245291 U | 1/2024 | |
| KR | 20180108566 A | 10/2018 | |
| KR | 20190101625 A | 9/2019 | |
| KR | 102100457 B1 | 4/2020 | |
| WO | 2005048159 A1 | 5/2005 | |
| WO | 2007017874 A2 | 2/2007 | |
| WO | 2012150491 A1 | 11/2012 | |
| WO | 2012166790 A1 | 12/2012 | |
| WO | 2015150749 A1 | 10/2015 | |
| WO | WO-2017011601 A1 * | 1/2017 | ............... G09C 1/00 |
| WO | 2017178956 A1 | 10/2017 | |
| WO | 2018009973 A1 | 1/2018 | |
| WO | 2018019364 A1 | 2/2018 | |
| WO | 2018020389 A2 | 2/2018 | |
| WO | 2018154489 A1 | 8/2018 | |
| WO | 2018165472 A1 | 9/2018 | |
| WO | 2018189658 A1 | 10/2018 | |
| WO | 2018209148 A1 | 11/2018 | |
| WO | 2019104250 A1 | 5/2019 | |
| WO | 2019144234 A1 | 8/2019 | |
| WO | 2019169374 A1 | 9/2019 | |
| WO | 2019191687 A1 | 10/2019 | |
| WO | 2020092900 A2 | 5/2020 | |
| WO | 2020123464 A1 | 6/2020 | |
| WO | 2020198409 A1 | 10/2020 | |

(56)　　　　　References Cited

FOREIGN PATENT DOCUMENTS

| WO | 2020226800 A1 | 11/2020 |
| WO | 2020232012 A1 | 11/2020 |
| WO | 2021046494 A1 | 3/2021 |
| WO | 2021054989 A1 | 3/2021 |
| WO | 2022159519 A1 | 7/2022 |
| WO | 2022204041 A1 | 9/2022 |
| WO | 2022224585 A1 | 10/2022 |

OTHER PUBLICATIONS

The Sandbox Whitepaper [retrieved from the internet on May 24, 2022], , published on Oct. 29, 2020 as per Wayback Machine, 43 pages.

Thirdweb, "Build web3 apps, easily," The Wayback Machine, Nov. 2021, https://web.archive.org/web/20211127040049/https://thirdweb.com/, 6 pages.

Truffle, "Smart Contracts Made Sweeter," The Wayback Machine, Dec. 2020, https://web.archive.org/web/20201201085449/https://www.trufflesuite.com/truffle, 2 pages.

Tsagkarakis, G., "The Six Dragons Reveal Mind-Blowing Crafting on The Blockchain," egamers.io, https://egamers.io/the-six-dragons-reveal-mind-blowing-crafting-on-the-blockchain/, Nov. 2019, 5 pages.

Virk, R., "The One Thing Missing from the ERC 721 Standard for Digital Collectibles on the Blockchain," Sep. 2, 2018, https://medium.com/hackernoon/the-one-thing-missing-from-erc-721-standard-for-digital-collectibles-on-the-blockchain-9ee26e4a918c, 7 pages.

Westerkamp, M. et al., "Blockchain-Based Supply Chain Traceability: Token Recipes Model Manufacturing Processes," Aug. 2018, Retrieved online Sep. 5, 2021 https://www.researchgate.net/publication/326901585_Blockchain-Based_Supply_Chain_Traceability_Token_Recipes_Model_Manufacturing_Processes, 9 pages.

Zimmerman, B., "How The World of NFTs Could be The Next Big Thing for Advertising," Forbes Business Council, May 7, 2021, https://www.forbes.com/sites/forbesbusinesscouncil/2021/05/07/how-the-world-of-nfts-could-be-the-next-big-thing-for-advertising/?sh=4b264a044912, 5 pages.

Banon, J. et al., "Boson Protocol White Paper Decentralized Autonomous Commerce," WhitePaper Version 1.1, Nov. 2020, 50 pages.

Binance Academy, "What are NFT Games and How Do They Work," The Wayback Machine, Sep. 2021, https://web.archive.org/web/20211010111916/https://academy.binance.com/en/articles/what-are-nft-games-and-how-do-they-work, 9 pages.

Blocknative, "Lessons from a Pioneer in the NFT Game Ecosystem: A Brave New World for Indie Dapp Devs," blocknative, https://www.blocknative.com/blog/gu-cards, Oct. 2019, 5 pages.

Brenn, "Noobs Guide to Understanding ERC-20 vs ERC-721 Tokens," Mar. 25, 2018, https://brennhill.medium.com/noobs-guide-to-understanding-erc-20-vs-erc-721-tokens-d7f5657a4ee7, 4 pages.

Builtin.com, "What is Blockchain?", Aug. 7, 2018, Retrieved online Sep. 5, 2021, https://builtin.com/blockchain, 53 pages.

Buleen, C., "Is iOS AirDrop Marketing a Creepy Tactic or a Unique Opportunity?" Jun. 20, 2018, https://resources.clearvoice.com/blog/is-ios-airdrop-marketing-a-creepy-tactic-or-a-unique-opportunity, 14 pages.

Chevet, S., "Blockchain Technology and Non-Fungible Tokens: Reshaping Value Chains in Creative Industries," May 10, 2018, https://ssrn.com/abstract=3212662 or http://dx.doi.org/10.2139/ssrn.3212662, 73 pages.

Christidis, K. et al., "Blockchains and Smart Contracts for the Internet of Things," IEEE Access, vol. 4, May 2016, pp. 2292-2303.

Crowdfunding Writing with NFTs [retrieved from internet on Jul. 8, 2022] published on Apr. 19, 2021 as per Wayback Machine, 10 pages.

Dhar, S. et al., "Smarter banking: Blockchain technology in the Indian Banking System," Asian Management Insights, vol. 3, No. 2, Nov. 2016, pp. 46-53.

Di Stasi, G. et al., "Routing Payments on the Lightning Network," 2018 IEEE Confs on Internet of Things, Green Computing Communications, Cyber, Physical and Social Computing, Smart Data, Blockchain, Computer and Information Technology, Congress on Cybermatics, Jul. 2018, pp. 1161-1170.

Entriken, W. et al., "EIP-721: ERC-721 Non-Fungible Token Standard," Ethereum Improvement Proposals, No. 721, Jan. 2018, https://eips.ethereum.org/EIPS/eip-721, 11 pages.

Entriken, W. et al., "EIP-721: Non-Fungible Token Standard," Jan. 24, 2018, retrieved online Sep. 5, 2021 https://eips.ethereum.org/EIPS/eip-721, 14 pages.

Extended European Search Report dated Dec. 6, 2021 for European Patent Application No. 19775523.4, 10 pages.

Extended European Search Report dated Dec. 8, 2021 for European Patent Application No. 19776576.1, 10 pages.

Extended European Search Report dated Jul. 12, 2022 for EP Application No. 19887239.2, 6 pages.

Extended European Search Report dated Jun. 27, 2023 for EP Application No. 20867151.1, 10 pages.

Extended European Search Report dated Jun. 28, 2022 for EP Application No. 19879849.8, 6 pages.

Flynn, B., "Crafting New Value with Existing Tokens," medium.com, https://medium.com/@brianubiquik/crafting-new-value-with-existing-tokens-de95fe838fea, Jun. 6, 2018, 10 pages.

Frankenfield, J., "Cryptocurrency Airdrop," WayBack Machine, Jun. 24, 2021, https://web.archive.org/web/20210730071512/https://www.investopedia.com/terms/a/airdrop-cryptocurrency.asp, 6 pages.

Hackernoon, "NFT Renting: For When You Want to Give Your NFTs DeFi Powers," The Wayback Machine, Jan. 7, 2022, https://web.archive.org/web/20220107140320/https://hackernoon.com/nft-renting-for-when-you-want-to-give-your-nfts-defi-powers, 6 pages.

Hong, S. et al., "FabAsset: Unique Digital Asset Management System for Hyperledger Fabric," 2020 IEEE 40th International Conference on Distributed Computing Systems (ICDCS), IEEE, 2020, pp. 1269-1274.

Hoogendoorn, R., "The Six Dragons NFT Extends to Crafting Simulator—Play to Earn," Published: Jan. 11, 2021, https://www.playtoearn.online/2021/01/11/the-six-dragons-nft-extends-to-crafting-simulator/, 3 pages.

Khan, M. et al., "A Tamper-Resistant Digital Token-Based Rights Management System," IEEE, 2017 International Carnahan Conference on Security Technology (ICCST), 2017, 6 pages.

Klems, M. et al., "Trustless Intermediation in Blockchain-Based Decentralized Service Marketplaces," ICSOC 2017, LNCS 10601, Oct. 2017, pp. 731-739, https://doi.org/10.1007/978-3-319-69035-3_53.

Li, H. et al., "How People Select Their Payment Methods in Online Auctions? An Exploration of eBay Transactions," Proceedings of the 37th Hawaii International Conference on System Sciences, 2004, pp. 1-10.

LuxFi Official, "Real-World Asset-Backed NFTs—What Does it Mean?" Sep. 28, 2021, https://luxfiofficial.medium.com/real-world-asset-backed-nfts-what-does-it-mean-5c95e41d88d3, 14 pages.

Mai, J. et al., "Customized production based on distributed 3D printing services in cloud manufacturing," Int J Adv Manuf Technol, 2016, vol. 84, pp. 71-83.

Menezes, A.J. et al., "Handbook of Applied Cryptography," CRC Press, Dec. 1996, 30 pages.

Ogiela, M.R. et al., "Security of Distributed Ledger Solutions Based on Blockchain Technologies," 2018 IEEE 32nd International Conference on Advanced Information Networking and Applications, 2018, pp. 1089-1095.

PCT International Search Report and Written Opinion dated Aug. 21, 2020 for International Application No. PCT/US2019/059389, 20 pages.

PCT International Search Report and Written Opinion dated Feb. 5, 2020 for International Application No. PCT/US2019/062673, 10 pages.

PCT International Search Report and Written Opinion dated Jan. 8, 2021 for International Application No. PCT/US2020/052728, 11 pages.

PCT International Search Report and Written Opinion dated Jul. 1, 2022 for International Application No. PCT/US2022/016749, 17 pages.

(56)  References Cited

OTHER PUBLICATIONS

PCT International Search Report and Written Opinion dated Jun. 21, 2022 for International Application No. PCT/US2022/021745, 20 pages.

PCT International Search Report and Written Opinion dated Jun. 26, 2019 for PCT International Application No. PCT/US2019/025003, 7 pages.

PCT International Search Report and Written Opinion dated Jun. 28, 2019 for PCT International Application No. PCT/US2019/025002, 6 pages.

PCT International Search Report and Written Opinion dated Jun. 30, 2023 for International Application No. PCT/US2023/014961, 16 pages.

PCT International Search Report and Written Opinion mailed Apr. 18, 2023 for International Application No. PCT/US2022/047396, 25 pages.

Pink.gg, "Atomic Assets 1.0—Launching the AtomicHub," https://pinkgg.medium.com/atomicassets-1-0-launching-the-atomichub-493c9242c1ff, Jun. 2020, 9 pages.

Radomski, W. et al., "EIP-1155: ERC-1155 Multi Token Standard," Ethereum Improvement Proposals, No. 1155, Jun. 2018, https://eips.ethereum.org/EIPS/eip-1155, 18 pages.

Rajendran, B. et al., "Secure and Privacy Preserving Digital Payment," IEEE SmartWorld, Ubiquitous Intelligence & Computing, Advanced & Trusted Computed, Scalable Computing & Communications, Cloud & Big Data Computing, Internet of People and Smart City Innovation, 2017, 5 pages.

Ray, J., "A Next-Generation Smart Contract and Decentralized Application Platform," Ethereum Whitepaper, The Wayback Machine—https://web.archive.org/web/20180919085323/https://github.com/ethereum/wiki/wiki/White-Paper#messages-and-transactions, 2018, 40 pages.

Regner, F. et al., "NFTs in Practice—Non-Fungible Tokens as Core Component of a Blockchain-based Event Ticketing Application," Fortieth International Conference on Information Systems, Munich, 2019, 17 pages.

Salt Technology Ltd., "SALT: Blockchain-Backed Loans," CrushCrypto, Sep. 8, 2017, https://crushcrypto.com/wp-content/uploads/2017/08/SALT-abstract.pdf, 18 pages.

Schneier, B., "Applied Cryptography, Second Edition—Protocols, Algorithms, and Source Code in C," 20th Anniversary Edition, John Wiley & Sons, Inc., 1996, 31 pages.

Sedlak, K. et al., "Oxcert Protocol Whitepaper 0.4 (draft)," Jul. 5, 2018, 59 pages.

Shrier, D. et al., "Blockchain & Transactions, Markets and Marketplaces," Massachusetts Institute of Technology, May 2016, https://www.getsmarter.com/blog/wp-content/uploads/2017/07/mit_blockchain_transactions_reports.pdf, 18 pages.

Singapore Search Report and Written Opinion dated Apr. 17, 2023 for SG Application No. 11202104293R, 11 pages.

Singapore Search Report and Written Opinion dated Apr. 20, 2023 for SG Application No. 11202105350Q, 9 pages.

Bruschi, F. et al., "A Decentralized System for Fair Token Distribution and Seamless Users Onboarding," IEEE, 2020, 6 pages.

Chan, A., "UTXO in Digital Currencies: Account-based or Token-based? Or Both?," arXiv, Sep. 2021, pp. 1-21.

Fukumitsu, M. et al., "A Method for a Practical Smart Contract by using Blockchain and Centralized Server," IPSJ SIG Technical Report, 2018, 9 pages.

Swannack, R.A., "Using Blockchain for Digital Card Game," EWU Digital Commons, 2020, 77 pages.

Atkinson, J., "What are NFT events and how do they work?" Dec. 2023, 6 pages, https://jeffreyatkinson209.medium.com/what-are-nft-events-and-how-do-they-work-fbf67b786db9#:~: text=NFT%20events%20serve%20as%20a,their%20digital%20creations%20through%20NFTs.

Binance Blog: What is NFT Ticketing and How Does it Work? Jun. 2022, https://www.binance.com/en/blog/nft/what-is-nft-ticketing-and-how-does-it-work-421499824684904022, 3 pages.

Gigco Ltd., Web3 Live Music Revolution, https://gigco-global.ams3.cdn.digitaloceanspaces.com/docs/GIGCO_LITEPAPER%20.pdf, 2024, 26 pages.

Jerseyloco Whitepaper NFT's, Aug. 2023, https://jerseyloco.com/wp-content/uploads/2020/02/Whitepaper-NFT-08.pdf, 33 pages.

Kryvoborodov, Y., "Why NFT Ticketing is a New Normal for Event Management," Jan. 2023, https://unicsoft.com/blog/why-nft-ticketing-is-a-new-normal-for-event-managment/, 13 pages.

Mihuandayani, et al., "Text Mining Based on Tax Comments as Big Data Analysis Using SVM and Feature Selection," 2018 International Conference on Information and Communications Technology (ICOIACT), 2018, pp. 537-542.

NFTs for Events: Should You Embrace Them? https://www.proglobalevents.com/blog/nft-events/ 2024, 11 pages.

Sankrit, K., "What are NFT Tickets? How NFT ticketing could disrupt entertainment," Jan. 2024, https://www.moonpay.com/learn/nft/nft-ticketing, 13 pages.

Yang, J. et al., "A calculation model for the serviceable evaluation of user online comment," 2015 IEEE International Conference on Smart City/SocialCom/SustainCom together with DataCom 2015 and SC2 2015, 2015, pp. 1117-1121.

Your Events Guy: The Top 5 Event Technology Trends That Will Transform Events in 2022, Jun. 2022, https://youreventsguy.wordpress.com, 72 pages.

U.S. Appl. No. 17/975,216, filed Oct. 27, 2022, Quigley et al.
U.S. Appl. No. 17/363,237, filed Jun. 30, 2021, Yantis et al.
U.S. Appl. No. 17/363,661, filed Jun. 30, 2021, Yantis et al.
U.S. Appl. No. 17/358,412, filed Jun. 25, 2021, Yantis et al.
U.S. Appl. No. 17/358,453, filed Jun. 25, 2021, Yantis et al.
U.S. Appl. No. 17/360,396, filed Jun. 28, 2021, Yantis et al.
U.S. Appl. No. 17/867,981, filed Jul. 19, 2022, Quigley et al.
U.S. Appl. No. 17/518,989, filed Nov. 4, 2021, Yantis et al.
U.S. Appl. No. 17/519,052, filed Nov. 4, 2021, Yantis et al.
U.S. Appl. No. 17/519,152, filed Nov. 4, 2021, Yantis et al.
U.S. Appl. No. 17/519,204, filed Nov. 4, 2021, Yantis et al.
U.S. Appl. No. 17/520,329, filed Nov. 5, 2021, Yantis et al.
U.S. Appl. No. 17/520,355, filed Nov. 5, 2021, Yantis et al.
U.S. Appl. No. 17/869,128, filed Jul. 20, 2022, Sliwka et al.
U.S. Appl. No. 17/520,886, filed Nov. 8, 2021, Yantis et al.
U.S. Appl. No. 17/520,917, filed Nov. 8, 2021, Yantis et al.
U.S. Appl. No. 17/521,007, filed Nov. 8, 2021, Yantis et al.
U.S. Appl. No. 17/521,082, filed Nov. 8, 2021, Yantis et al.
U.S. Appl. No. 17/523,020, filed Nov. 10, 2021, Yantis et al.
U.S. Appl. No. 17/523,042, filed Nov. 10, 2021, Yantis et al.
U.S. Appl. No. 17/523,057, filed Nov. 10, 2021, Yantis et al.
U.S. Appl. No. 17/523,069, filed Nov. 10, 2021, Yantis et al.
U.S. Appl. No. 17/523,098, filed Nov. 10, 2021, Yantis et al.
U.S. Appl. No. 17/743,684, filed May 13, 2022, Yantis et al.
U.S. Appl. No. 17/743,867, filed May 13, 2022, Yantis et al.
U.S. Appl. No. 17/868,366, filed Jul. 19, 2022, Sliwka et al.
U.S. Appl. No. 17/868,439, filed Jul. 19, 2022, Sliwka et al.
U.S. Appl. No. 17/245,662, filed Apr. 30, 2021, Yantis et al.
U.S. Appl. No. 17/865,866, filed Jul. 15, 2022, Quigley et al.
U.S. Appl. No. 17/867,921, filed Jul. 19, 2022, Quigley et al.
U.S. Appl. No. 17/974,109, filed Oct. 26, 2022, Quigley et al.
U.S. Appl. No. 17/974,656, filed Oct. 27, 2022, Quigley et al.
U.S. Appl. No. 17/974,730, filed Oct. 27, 2022, Quigley et al.
U.S. Appl. No. 17/974,778, filed Oct. 27, 2022, Quigley et al.
U.S. Appl. No. 17/974,809, filed Oct. 27, 2022, Quigley et al.
U.S. Appl. No. 17/974,839, filed Oct. 27, 2022, Quigley et al.
U.S. Appl. No. 17/974,877, filed Oct. 27, 2022, Quigley et al.
U.S. Appl. No. 17/974,903, filed Oct. 27, 2022, Quigley et al.
U.S. Appl. No. 17/975,053, filed Oct. 27, 2022, Quigley et al.
U.S. Appl. No. 17/975,103, filed Oct. 27, 2022, Quigley et al.
U.S. Appl. No. 17/975,145, filed Oct. 27, 2022, Quigley et al.
U.S. Appl. No. 17/975,171, filed Oct. 27, 2022, Quigley et al.
U.S. Appl. No. 17/520,380, filed Nov. 5, 2021, Yantis et al.
U.S. Appl. No. 17/975,256, filed Oct. 27, 2022, Quigley et al.
U.S. Appl. No. 17/975,295, filed Oct. 27, 2022, Quigley et al.
U.S. Appl. No. 17/975,324, filed Oct. 27, 2022, Quigley et al.
U.S. Appl. No. 18/640,186, filed Apr. 19, 2024, Quigley et al.
U.S. Appl. No. 18/640,204, filed Apr. 19, 2024, Quigley et al.
U.S. Appl. No. 18/640,223, filed Apr. 19, 2024, Quigley et al.

(56) References Cited

OTHER PUBLICATIONS

Bachmann, S. et al., "Design and Prototypical Implementation of Blockchain Ticketing," University of Zurich, Jan. 25, 2021, 133 pgs, https://www.csq.uzh.ch/publications/details.php?id=1423.

Extended European Search Report dated Jan. 3, 2025 for EP Application No. 22776654.0, 4 pages.

Lauslahti, K. et al., "Smart Contracts—How will Blockchain Technology Affect Contractual Practices?" ETLA Reports, No. 68, Jan. 2017, 32 pages.

Singapore Search Report dated Feb. 24, 2025 for Singapore Patent Application No. 11202203114T, 3 pages.

Singapore Written Opinion dated Mar. 4, 2025 for Singapore Patent Application No. 11202203114T, 7 pages.

Archontakis, K., "The Six Dragons Reveal Mind-Blowing Crafting on The Blockchain," The Wayback Machine, https://web.archive.org/web/20201026183409/https://egamers.io/the-six-dragons-reveal-mind-blowing-crafting-on-the-blockchain, Nov. 2019, 3 pages.

Casale-Brunet, S. et al., "Networks of Ethereum Non-Fungible Tokens: A graph-based analysis of the ERC-721 ecosystem," arXiv [cs.SI], Oct. 2021, https://arxiv.org/abs/2110.12545, 9 pages.

Extended European Search Report dated Jun. 27, 2025 for EP Application No. 22884516, 7 pages.

Extended European Search Report dated May 12, 2025 for EP Application No. 22756906.8, 7 pages.

Victor, F. et al., "A Taxonomy for Distributed Ledger Analytics," in Computer, vol. 54, No. 2, Feb. 2021, pp. 30-38.

Wu, S.X. et al., "Community Detection in Blockchain Social Networks," arXiv:2101.06406v1 [cs.SI], Jan. 2021, 11 pages.

* cited by examiner

900

Obtaining Item Information                              902

Generating digital tokens                              904

Coupling the digital token to the item information     906

1000

1300

| | |
|---|---|
| Receiving item conversion request | 1302 |

| | |
|---|---|
| Receiving item information | 1304 |

| | |
|---|---|
| Generating virtual representation | 1306 |

| | |
|---|---|
| Generating digital token | 1308 |

| | |
|---|---|
| Assigning ownership of the digital token | 1310 |

| | |
|---|---|
| Memorializing agreement backed by the item | 1312 |

1400

| | |
|---|---|
| Receiving tokenization request | <u>1402</u> |

| | |
|---|---|
| Receiving item information | <u>1404</u> |

| | |
|---|---|
| Generating virtual representation | <u>1406</u> |

| | |
|---|---|
| Determining authenticity | <u>1408</u> |

1500

1502

Maintaining data

1504

Rendering an environment

1506

Transacting the item

1600

| 1602 |
| Maintaining a ledger |

| 1604 |
| Receiving transaction request |

| 1606 |
| Transacting the item |

1800

1802
Receiving request to create a mystery box

1804
Receiving a set of tokens

1806
Generating the mystery box

1808
Generating an instance of a smart contract

1810
Deploying the instance of the smart contract

1900

| | 1902 |
|---|---|
| Maintaining inventory of available tokens | |

| | 1904 |
|---|---|
| Receiving a token request | |

| | 1906 |
|---|---|
| Selecting the digital token | |

| | 1908 |
|---|---|
| Providing an indicator of the token | |

| | 1910 |
|---|---|
| Receiving a transaction request | |

| | 1912 |
|---|---|
| Updating the ledger | |

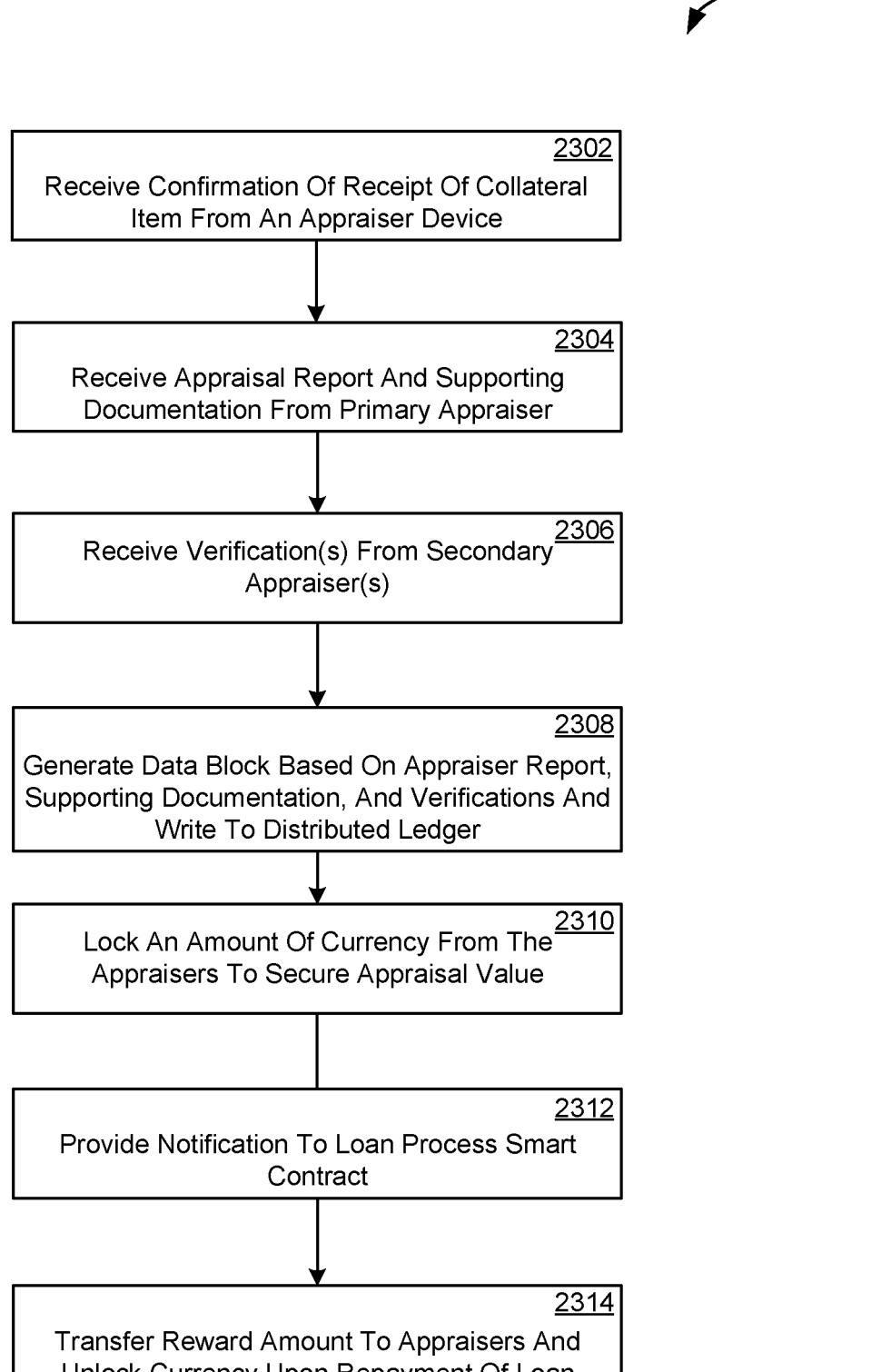

2300

2302
Receive Confirmation Of Receipt Of Collateral Item From An Appraiser Device

2304
Receive Appraisal Report And Supporting Documentation From Primary Appraiser

2306
Receive Verification(s) From Secondary Appraiser(s)

2308
Generate Data Block Based On Appraiser Report, Supporting Documentation, And Verifications And Write To Distributed Ledger

2310
Lock An Amount Of Currency From The Appraisers To Secure Appraisal Value

2312
Provide Notification To Loan Process Smart Contract

2314
Transfer Reward Amount To Appraisers And Unlock Currency Upon Repayment Of Loan

FIG. 23

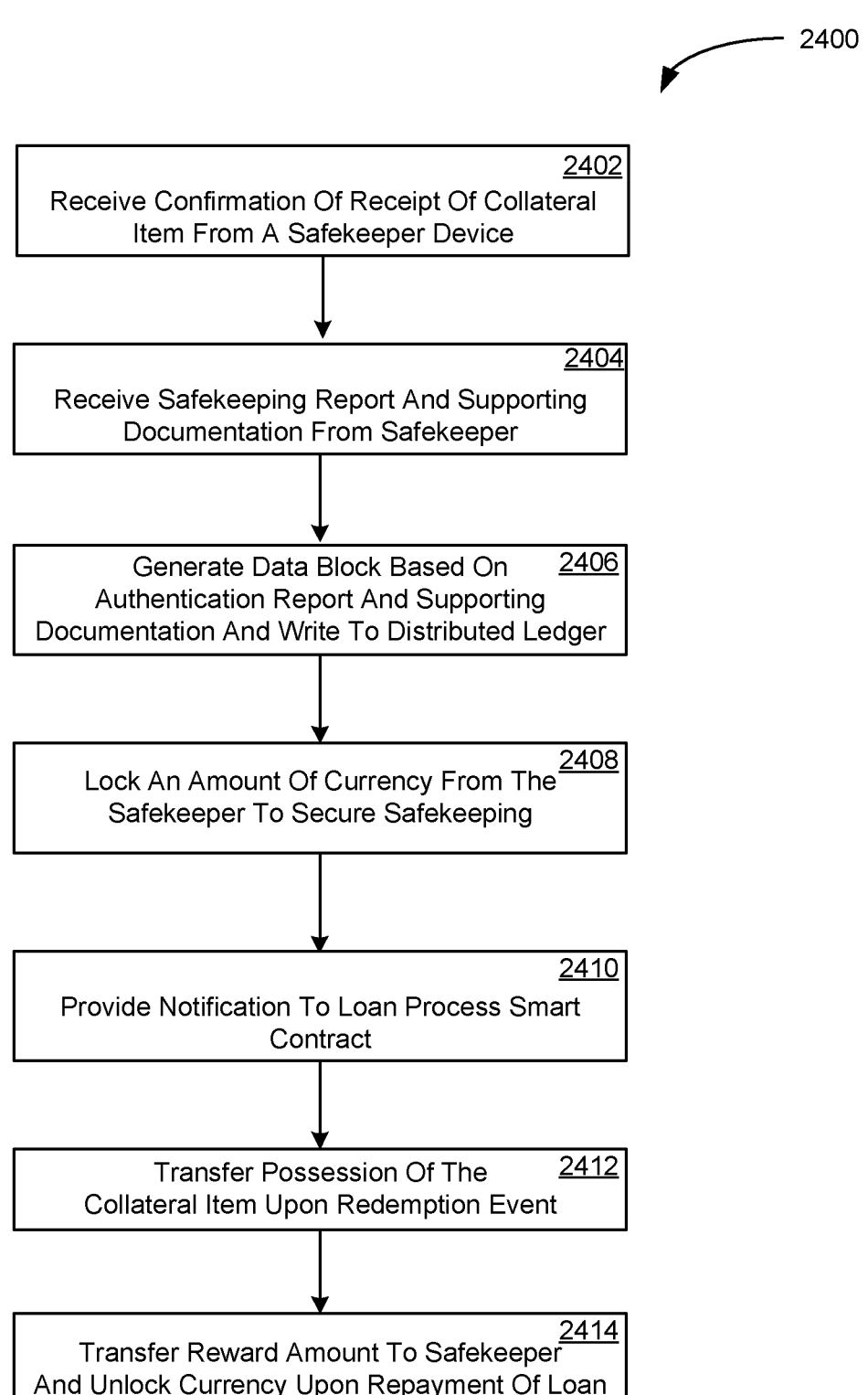

2400

2402
Receive Confirmation Of Receipt Of Collateral
Item From A Safekeeper Device

2404
Receive Safekeeping Report And Supporting
Documentation From Safekeeper Generate Data Block Based On        2406
Authentication Report And Supporting
Documentation And Write To Distributed Ledger

2408
Lock An Amount Of Currency From The
Safekeeper To Secure Safekeeping

2410
Provide Notification To Loan Process Smart
Contract

Transfer Possession Of The        2412
Collateral Item Upon Redemption Event

2414
Transfer Reward Amount To Safekeeper
And Unlock Currency Upon Repayment Of Loan

FIG. 24

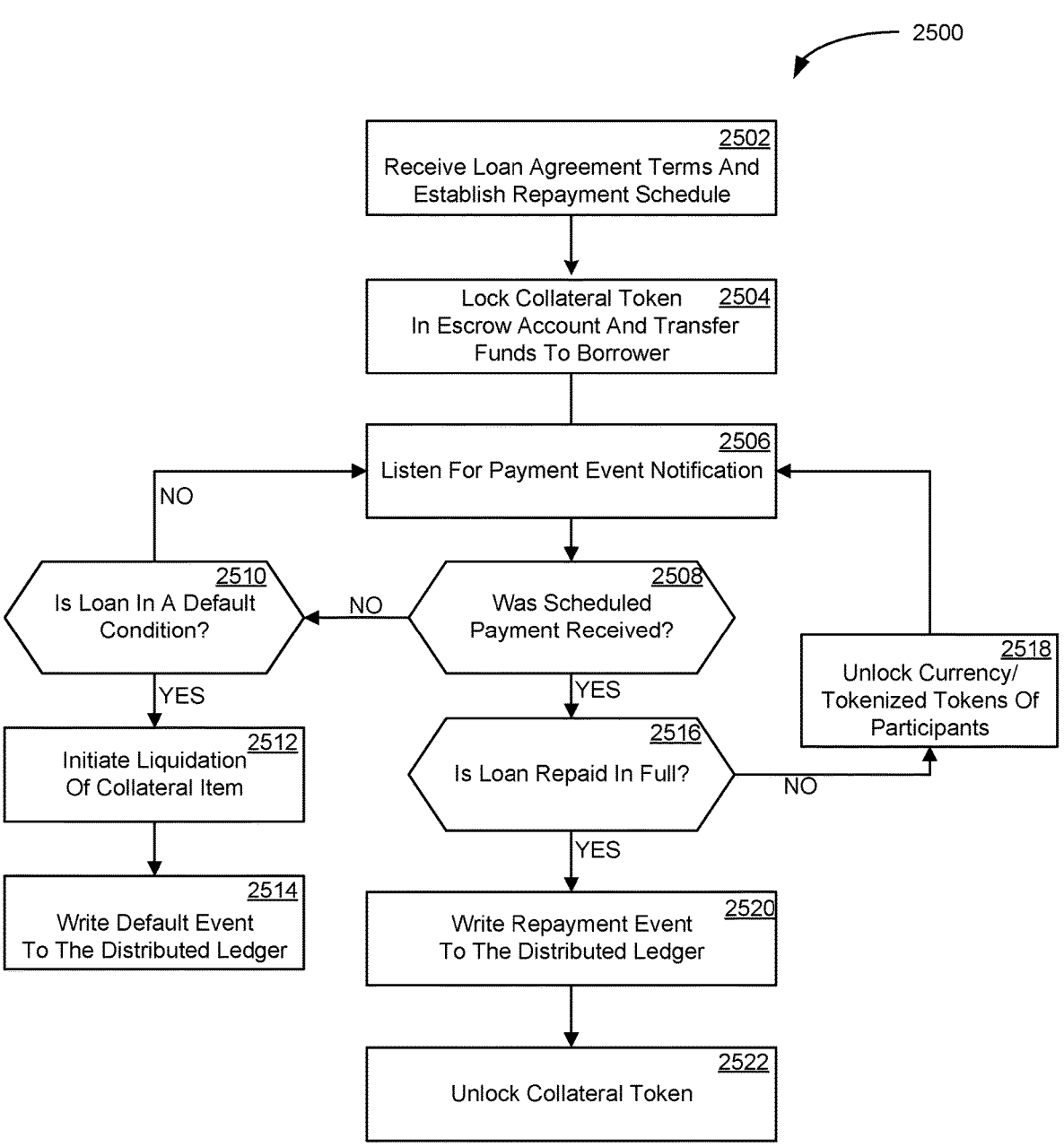

2500

2502
Receive Loan Agreement Terms And Establish Repayment Schedule

Lock Collateral Token 2504
In Escrow Account And Transfer Funds To Borrower

2506
Listen For Payment Event Notification

NO

2510
Is Loan In A Default Condition?

NO

2508
Was Scheduled Payment Received?

2518
Unlock Currency/ Tokenized Tokens Of Participants

YES

Initiate Liquidation 2512
Of Collateral Item

YES

2516
Is Loan Repaid In Full?

NO

2514
Write Default Event To The Distributed Ledger

YES

Write Repayment Event 2520
To The Distributed Ledger

2522
Unlock Collateral Token

Figure 28:
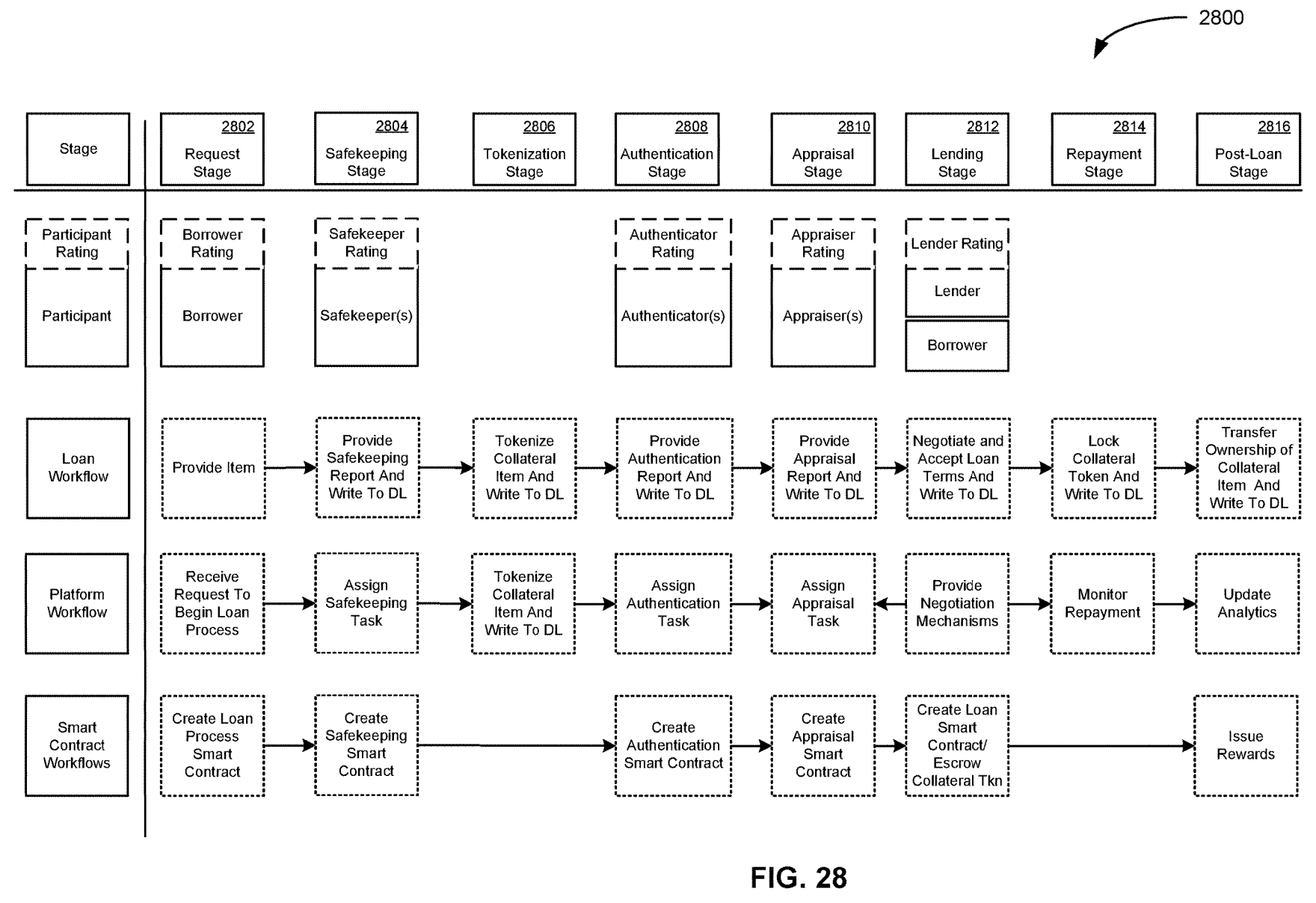

| Stage | | 2802 Request Stage | 2804 Safekeeping Stage | 2806 Tokenization Stage | 2808 Authentication Stage | 2810 Appraisal Stage | 2812 Lending Stage | 2814 Repayment Stage | 2816 Post-Loan Stage |
|---|---|---|---|---|---|---|---|---|---|
| Participant Rating | Participant | Borrower Rating / Borrower | Safekeeper Rating / Safekeeper(s) | | Authenticator Rating / Authenticator(s) | Appraiser Rating / Appraiser(s) | Lender Rating / Lender / Borrower | | |
| Loan Workflow | | Provide Item | Provide Safekeeping Report And Write To DL | Tokenize Collateral Item And Write To DL | Provide Authentication Report And Write To DL | Provide Appraisal Report And Write To DL | Negotiate and Accept Loan Terms And Write To DL | Lock Collateral Token And Write To DL | Transfer Ownership of Collateral Item And Write To DL |
| Platform Workflow | | Receive Request To Begin Loan Process | Assign Safekeeping Task | Tokenize Collateral Item And Write To DL | Assign Authentication Task | Assign Appraisal Task | Provide Negotiation Mechanisms | Monitor Repayment | Update Analytics |
| Smart Contract Workflows | | Create Loan Process Smart Contract | Create Safekeeping Smart Contract | | Create Authentication Smart Contract | Create Appraisal Smart Contract | Create Loan Smart Contract/ Escrow Collateral Tkn | | Issue Rewards |

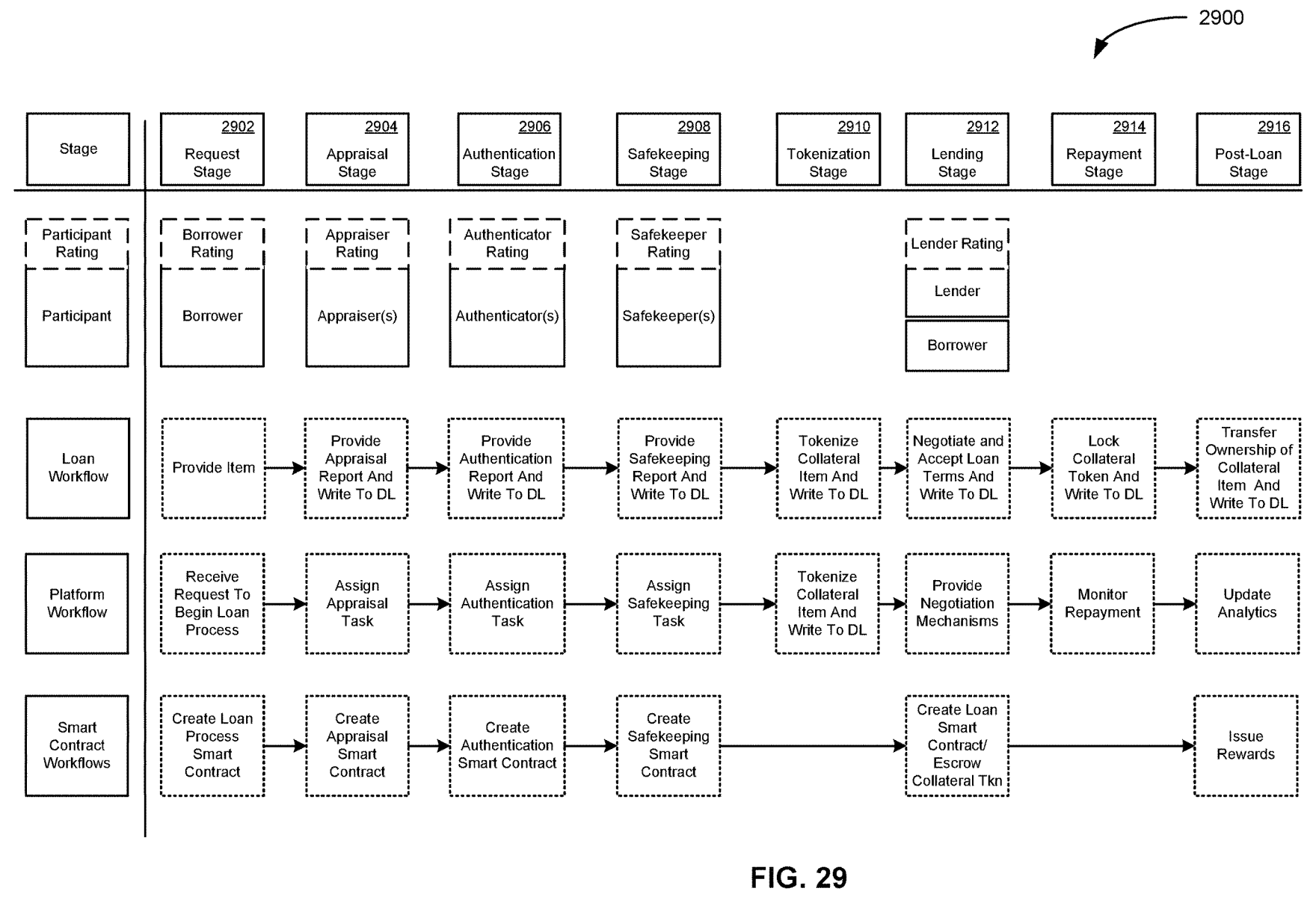

| Stage | 2902 Request Stage | 2904 Appraisal Stage | 2906 Authentication Stage | 2908 Safekeeping Stage | 2910 Tokenization Stage | 2912 Lending Stage | 2914 Repayment Stage | 2916 Post-Loan Stage |
|---|---|---|---|---|---|---|---|---|
| Participant Rating / Participant | Borrower Rating / Borrower | Appraiser Rating / Appraiser(s) | Authenticator Rating / Authenticator(s) | Safekeeper Rating / Safekeeper(s) | | Lender Rating / Lender / Borrower | | |
| Loan Workflow | Provide Item | Provide Appraisal Report And Write To DL | Provide Authentication Report And Write To DL | Provide Safekeeping Report And Write To DL | Tokenize Collateral Item And Write To DL | Negotiate and Accept Loan Terms And Write To DL | Lock Collateral Token And Write To DL | Transfer Ownership of Collateral Item And Write To DL |
| Platform Workflow | Receive Request To Begin Loan Process | Assign Appraisal Task | Assign Authentication Task | Assign Safekeeping Task | Tokenize Collateral Item And Write To DL | Provide Negotiation Mechanisms | Monitor Repayment | Update Analytics |
| Smart Contract Workflows | Create Loan Process Smart Contract | Create Appraisal Smart Contract | Create Authentication Smart Contract | Create Safekeeping Smart Contract | | Create Loan Smart Contract/ Escrow Collateral Tkn | | Issue Rewards |

FIG. 29

SMART CONTRACT-MANAGED DECENTRALIZED LENDING PROCESSES USING COLLATERAL TOKENS THAT INCLUDES A CONDITIONAL COLLATERAL SALE STAGE

CROSS-REFERENCE TO RELATED APPLICATIONS

This application is a continuation of U.S. application Ser. No. 17/703,507, filed Mar. 24, 2022, which is a bypass continuation of PCT International Application No. PCT/US2020/052728, filed Sep. 25, 2020, which claims priority to U.S. Provisional Application No. 62/906,211, filed on Sep. 26, 2019. The entire disclosure of each of the above applications is incorporated herein by reference.

FIELD

The present disclosure relates to decentralized lending systems and methods that leverage smart contracts and distributed ledgers, such as blockchains, to provide a trustless or substantially trustless collateralized lending ecosystem.

BACKGROUND

Conventional e-Commerce processes involve unnecessary friction. These processes were typically designed around use cases in which a purchaser places an order knowing exactly what they want, how they are going to pay for it, where it is going to go, who it is for, and that they want it as soon as possible. Conventional e-commerce does not allow for much flexibility in these buying decisions. For example, a user wishing to purchase a gift for someone typically makes a purchase via a website or mobile application, enters the intended recipient's known address (regardless of whether the recipient typically receives packages at the known address), and pays for the gift. The gift is then immediately sent to the recipient, regardless of whether the recipient is available to receive the package. Accordingly, there is a need in the art for an e-commerce platform with greater flexibility around all facets of a transaction including, but not limited to, purchase selection, payment, transfer of possession, and location and timing of delivery.

Meanwhile, virtual items have become increasingly popular, such as in video games, where skins, weapons, tools, and many other items are purchased and traded among players. Virtual items, like other digital items, can be possessed, used and transferred without the same constraints on transportation, delivery and storage that are involved for physical items. However, the value of a virtual item can be ephemeral, as creators can potentially create an unlimited number of copies, rendering initially rare items much less valuable. A need exists for a platform with methods and systems that provide both the flexibility and convenience of virtual item transactions and the reliability and value of physical item transactions.

In most loan scenarios, a borrower may wish to obtain a loan from a lender. Typically, a lender may require collateral to secure the loan before agreeing to the terms. Traditionally, a borrower could go to a physical pawn shop, where a pawn shop owner/agent is responsible for authenticating the item, appraising the item, storing the item safely, and loaning the funds and in exchange, the borrower provides the item as collateral. In this arrangement, both the lender and the borrower are simultaneously put in disadvantaged positions.

The lender must trust that the pawnshop owner/agent gives a fair appraised value to a collateral item and will store the collateral item in good faith, while the pawnshop agent must trust that the item is authentic and that the pawnshop will be able to liquidate the collateral item should the borrower default on the loan. These dilemmas result in the borrower being given a much lower appraised value on a collateral item and the pawn shop agent taking on an increased amount of risk, the combination of which results in lower loan amounts and higher interest rates/loan costs. As such, pawn shops are viewed as last resort loan sources and borrowers are often taken advantage of by opportunistic loan sharks masquerading as pawn shops. As such, there is a need for decentralized lending systems that provide a trustless or substantially trustless lending ecosystems.

SUMMARY

Provided herein are systems and methods for facilitating decentralized loan processes with a smart contract architecture. In embodiments, the decentralized loan process is executed in a series of stages, including an authentication stage where a collateral item is authenticated, an appraisal stage where the collateral item is appraised, and a safekeeping stage where the item is physically secured in a safekeeping facility. In embodiments, the collateral item is "tokenized," such that the collateral item can remain in safekeeping but the ownership rights can be transferred using a digital collateral token that represents the physical collateral item. In embodiments, a set of smart contracts manage the loan process, including one or more of the loan process stages.

According to some embodiments of the present disclosure, a method is disclosed. The method includes receiving, by one or more processing devices, a request to initiate a loan process from a borrower device, the request indicating a collateral item, wherein the collateral item is a tangible item. The method also includes generating, by the one or more processing devices, a virtual representation of the collateral item, wherein the virtual representation includes at least one of a description of the collateral item and one or more media contents that respectively depict at least a portion of the collateral item. The method further includes generating, by the one or more processing devices, a collateral token corresponding to the collateral item based on the virtual representation of the collateral item, wherein the collateral token is a digital token that is stored on a distributed ledger that is distributed across a set of node devices. The method further includes instantiating, by the one or more processing devices, a loan process smart contract instance that includes computer-readable instructions that are configured to manage a loan process in accordance with a loan process workflow, wherein the loan process smart contract instance is executed by the set of node devices that store the distributed ledger. The loan process smart contract instance is configured to instantiate a loan smart contract that includes computer-readable instructions that are configured to receive a loan agreement notification indicating one or more loan term parameters of a loan that was agreed to by a lender and the borrower and to manage repayment of a loan based on the one or more loan term parameters. The collateral token is locked in an escrow account stored on the distributed ledger until the loan smart contract instance determines that the loan has been fully repaid or the loan is in a default state.

In embodiments, the computer-readable instructions of the loan process smart contract instance are further configured to instantiate an authentication smart contract instance that includes computer readable instructions that are configured to manage an authentication task that is performed by an authenticator to authenticate the collateral item and to issue an authentication notification upon confirming that the appraisal task has been completed. In some of these embodiments, the loan process smart contract instance instantiates the authentication smart contract instance in accordance with the loan process workflow. In some of these embodiments, the loan process workflow is defined in a system-level governance document that is stored on the distributed ledger, wherein the system-level governance defines a condition to initiate the authentication task. In some embodiments, the loan process smart contract instance instantiates the authentication smart contract instance in response to receiving a request notification indicating that the borrower has requested to initiate the loan process. In some embodiments, the computer-readable instructions of the loan process smart contract instance are further configured to: receive an authentication report from an authenticator device of the authenticator, wherein the authentication report includes an authentication opinion of the authenticator that indicates an authentication state, including whether the authenticator has deemed the collateral item authentic or not authentic. In some of these embodiments, the authentication report further includes supporting documentation provided by the authenticator in support of the authentication opinion. In some of these embodiments, the authentication report further includes one or more verifications issued by one or more respective secondary authenticators, wherein each verification indicates that a respective secondary authenticator confirmed the authentication opinion. In some of these embodiments, the authentication report is generated from a form template that is defined in accordance with an authentication stage-level governance that defines a set of rules and regulations associated with performance of the authentication task. In some of these embodiments, the authentication stage-level governance defines an authentication task workflow, wherein the authentication task workflow includes one or more conditions that must be met to complete the authentication task and trigger a next stage in the loan process workflow to which the loan process adheres. In some of these embodiments, the authentication stage-level governance is at least partially defined by an authentication guild to which the authenticator is a guild member. In some of these embodiments, the authentication guild includes a plurality of different specialized authentication guilds, wherein each specialized authentication guild specializes in authenticating a respective type of collateral item. In some of these embodiments, the plurality of different specialized authentication guilds includes at least a subset of the group comprising: a watch authentication guild that specializes in authenticating watches, a shoe authentication guild that specializes in authenticating shoes, a handbag authentication guild that specializes in authenticating handbags, an art authentication guild that specializes in authenticating works of art, a sports memorabilia authentication guild that specializes in authenticating sports memorabilia, a toy authentication guild that specializes in authenticating collectible toys, a jewelry authentication guild that specializes in authenticating jewelry, a clothing authentication guild that specializes in authenticating designer clothing, an instrument authentication guild that specializes in expertise authenticating musical instruments, a record authentication guild that specializes in authenticating rare or collectible records, a wine authentication guild that specializes in expertise authenticating units (e.g., barrels or bottles) of wine, a whiskey authentication guild that specializes in authenticating units (e.g., barrels or bottles) of whiskey, and an automobile authentication guild that specializes in authenticating limited edition automobiles. In some of these embodiments, the authenticator belongs to a specialized authentication guild of the different specialized authentication guilds. In some of these embodiments, the authenticator is assigned the authentication task based on the specialized authentication guild to which the authenticator belongs and an item type of the collateral item. In some embodiments, the authentication stage-level governance defines an authentication smart contract from which the authentication smart contract instance was instantiated. In some embodiments, the authentication smart contract instance initiates an escrowing of an amount of currency tokens and/or tokenized tokens from an account of the authenticator to the escrow account in response to the authentication report indicating that the authenticator deemed the collateral item to be authentic. In some embodiments, at least a portion of the escrowed amount is held in escrow until the loan process is complete. In some embodiments, the authentication smart contract instance outputs the authentication notification to the loan process smart contract in response to receiving the authentication report from the authenticator device, wherein the authentication notification causes the loan process smart contract instance to initiate an appraisal stage of the loan process. In some embodiments, the authentication smart contract instance is further configured to: generate a data block containing the authentication report and a cryptographic hash value that is generated based at least in part on the authentication report; and write the data block to the distributed ledger. In some embodiments, a rating of the authenticator is updated based on an outcome associated with the authentication task.

In embodiments, the computer-readable instructions of the loan process smart contract instance are further configured to instantiate an appraisal smart contract instance that includes computer-readable instructions that are configured to manage an appraisal task that is performed by an appraiser to determine an appraisal value of the collateral item and to issue an appraisal notification upon confirming that the appraisal task has been completed. In some of these embodiments, the loan process smart contract instantiates the appraisal smart contract instance in accordance with the loan process workflow. In some of these embodiments, the loan process workflow is defined in a system-level governance document that is stored on the distributed ledger, wherein the system-level governance defines a condition to initiate the appraisal task. In some embodiments, the loan process smart contract instantiates the appraisal smart contract instance in response to receiving an authentication notification indicating that an authenticator has authenticated the collateral item and deemed the collateral item as authentic. In some embodiments, the computer-readable instructions of the loan process smart contract instance are further configured to receive an appraisal report from an appraiser device of the appraiser, wherein the appraisal report includes a valuation of the collateral item including at least one of an appraised value of the collateral item and a liquidation value of the collateral item. In some of these embodiments, the appraisal report further includes one or more of a physical condition of the item, a new or used condition of the collateral item, a working condition of the collateral item, prices of previous sales of similar items, and a bluebook valuation of similar items. In some embodiments, the appraisal report further includes one or more verifications issued by one or more respective secondary appraisers, wherein each verification indicates that a respective secondary appraiser confirmed the appraisal value. In some embodiments, the appraisal report is generated from a form template that is defined in accordance with an appraisal stage-level governance that defines a set of rules and regulations associated with performance of the appraisal task. In some embodiments, the appraisal stage-level governance defines an appraisal task workflow, wherein the appraisal task workflow includes one or more conditions that must be met to complete the appraisal task and trigger a next stage in the loan process workflow. In some of these embodiments, the appraisal stage-level governance is at least partially defined by an appraisal guild to which the appraiser is a guild member. In some of these embodiments, the appraisal guild includes a plurality of different specialized appraisal guilds, wherein each specialized appraisal guild specializes in appraising a respective type of collateral item. In some embodiments, the plurality of different specialized appraisal guilds includes at least a subset of the group comprising: a watch appraisal guild that specializes in appraising watches, a shoe appraisal guild that specializes in appraising shoes, a handbag appraisal guild that specializes in appraising handbags, an art appraisal guild that specializes in appraising works of art, a sports memorabilia appraisal guild that specializes in appraising sports memorabilia, a toy appraisal guild that specializes in appraising collectible toys, a jewelry appraisal guild that specializes in appraising jewelry, a clothing appraisal guild that specializes in appraising designer clothing, an instrument appraisal guild that specializes in expertise appraising musical instruments, a record appraisal guild that specializes in appraising rare or collectible records, a wine appraisal guild that specializes in expertise appraising units (e.g., barrels or bottles) of wine, a whiskey appraisal guild that specializes in appraising units (e.g., barrels or bottles) of whiskey, and an automobile appraisal guild that specializes in appraising limited edition automobiles. In some of these embodiments, the appraiser belongs to a specialized appraisal guild of the different specialized appraisal guilds. In some embodiments, the appraiser is assigned the appraisal task based on the specialized appraisal guild to which the appraiser belongs and an item type of the collateral item. In some embodiments, the appraisal stage-level governance defines an appraisal smart contract from which the appraisal smart contract instance was instantiated. In some embodiments, the appraisal smart contract instance initiates an escrowing of a monetary amount of currency tokens and/or tokenized tokens from an account of the appraiser to the escrow account in response to receiving the appraisal report, wherein the monetary amount of currency tokens and/or tokenized tokens is equal to or less than the appraisal value. In some embodiments, at least a portion of the escrowed amount is locked in the escrow account until the loan process is complete. In some embodiments, the appraisal smart contract instance outputs the appraisal notification to the loan process smart contract in response to receiving the appraisal report from the appraiser device, wherein the appraisal notification causes the loan process smart contract instance to initiate a safekeeping stage of the loan process. In some embodiments, the appraisal smart contract instance is further configured to generate a data block containing the appraisal report and a cryptographic hash value that is generated based at least in part on the appraisal report; and write the data block to the distributed ledger. In some embodiments, a rating of the appraiser is updated based on an outcome associated with the appraisal task.

In embodiments, the computer-readable instructions of the loan process smart contract instance are further configured to instantiate a safekeeping smart contract instance that includes computer-readable instructs that are configured to manage a safekeeping task performed by a safekeeper to securely store the collateral item during at least a portion of the loan process and issue a safekeeping notification upon confirming that the safekeeping task has been completed. In some embodiments, the loan process smart contract instantiates the safekeeping smart contract instance in accordance with the loan process workflow. In some of these embodiments, the loan process workflow is defined in a system-level governance document that is stored on the distributed ledger, wherein the system-level governance defines a condition to initiate the safekeeping task. In some embodiments, the loan process smart contract instance instantiates the safekeeping smart contract instance in response to receiving an appraisal notification indicating that an appraiser has appraised the collateral item. In some embodiments, the computer-readable instructions of the loan process smart contract instance are further configured to: receive a safekeeping report from a safekeeper device of the safekeeper, wherein the safekeeping report includes a verification that the item is stored in a facility associated with the safekeeper and includes indication of any visible damage observed by the safekeeper when the collateral item was received. In some embodiments, the safekeeping report further includes supporting documentation provided by the safekeeping as proof of completion of the safekeeping task. In some embodiments, the safekeeping report further includes photo documentation of the visible damage observed by the safekeeper when the collateral item was received by the safekeeper. In some embodiments, wherein the safekeeping report is generated from a safekeeping form template that is defined in accordance with a safekeeping stage-level governance that defines a set of rules and regulations associated with performance of the safekeeping task. In some embodiments, wherein the safekeeping stage-level governance defines a safekeeping task workflow, wherein the safekeeping task workflow includes one or more conditions that must be met to complete the safekeeping task and trigger a next stage in the loan process workflow. In some embodiments, the safekeeping stage-level governance is at least partially defined by a safekeepers guild to which the safekeeper is a guild member. In some embodiments, the safekeeping stage-level governance defines a safekeeping smart contract from which the safekeeping smart contract instance was instantiated. In some embodiments, the safekeeping smart contract instance initiates an escrowing of a monetary amount of currency tokens and/or tokenized tokens from an account of the safekeeping to the escrow account in response to receiving the safekeeping report, wherein the monetary amount of currency tokens and/or tokenized tokens is equal to or less than an appraisal value determined by an appraiser of the collateral item. In some embodiments, at least a portion of the escrowed amount is locked in the escrow account until the loan process is complete. In some embodiments, the safekeeping smart contract instance outputs the safekeeping notification to the loan process smart contract in response to receiving the safekeeping report from the safekeeper device, wherein the safekeeping notification causes the loan process smart contract instance to initiate the generation of the collateral token. In some embodiments, the safekeeping smart contract instance is further configured to generate a data block containing the safekeeping report and a cryptographic hash value that is generated based at least in part on the safekeeping report and write the data block to the distributed ledger. In some embodiments, a rating of the safekeeping is updated based on an outcome associated with the safekeeping task. In some embodiments, the safekeeper device provides one or more images of the collateral item that are used to generate the virtual representation of the collateral item. In some embodiments, the safekeeping smart contract instance is configured to execute a redemption workflow after the collateral token is unlocked from the escrow account. In some of these embodiments, the redemption workflow results in a redeemer of the collateral token taking possession of the collateral item from the safekeeper.

In embodiments, the method further includes the loan smart contract instance is configured to initiate a liquidation process in response to determining that the loan is in a default state. In some embodiments, the collateral token is transferred to a buyer that purchases the collateral token during the liquidation event, such that the buyer redeems the collateral token to take possession of the collateral item from a safekeeper that holds the collateral item for safekeeping.

In embodiments, the loan smart contract instance configured to initiate a transfer of the collateral token from the escrow account to an account of the borrower upon determining that the loan has been fully repaid. In some of these embodiments, the collateral token is transferred to the account of the borrower from the escrow account by updating ownership data that defines a current owner of the collateral token such that the ownership data includes an address of the account of the borrower on the distributed ledger.

In embodiments, the loan term parameters include a loan length and a loan amount. In some embodiments, the loan smart contract is configured to determine a loan repayment schedule based on the loan length and the loan amount, and wherein the loan is considered to be in a default stage when a pre-defined amount of payments are not paid in accordance with the payment schedule.

In embodiments, the loan process workflow including an authentication stage that defines an authentication task that is performed by an authenticator, an appraisal stage that defines an appraisal task that is performed by an appraiser, and a safekeeping stage that defines a safekeeping task that is performed by a safekeeper. In some embodiments, the authentication stage, the appraisal stage, and the safekeeping stage are executed before the collateral token is generated. In some embodiments, the loan instance smart contract instance facilitates assigning rewards to the authenticator, the appraiser, and the safekeeper in response to the loan process completing.

In embodiments, the change of the state of the loan that triggers the unlocking of the collateral token is at least one of: the loan entering a fully repaid state, the loan entering a default state and the collateral item being successfully liquidated, and a state of repayment upon which collateral is no longer required as defined in the loan agreement.

In embodiments, the collateral token wraps the virtual representation of the collateral item.

In embodiments, the loan smart contract is configured to determine a loan repayment schedule based on a loan length and a loan amount of the loan as defined in the loan term parameters, and wherein the loan is considered to be in a default stage when a pre-defined amount of payments are not paid in accordance with the payment schedule.

In embodiments, the loan process workflow includes an authentication stage that defines an authentication task that is performed by an authenticator, an appraisal stage that defines an appraisal task that is performed by an appraiser, and a safekeeping stage that defines a safekeeping task that is performed by a safekeeper, wherein the authentication stage, the appraisal stage, and the safekeeping stage are executed before the collateral token is generated. In some of these embodiments, the loan instance smart contract instance facilitates assigning rewards to the authenticator, the appraiser, and the safekeeper in response to the loan process completing.

In embodiments, the collateral item is a tangible item. In embodiments, the change of the state of the loan is at least one of: the loan entering a fully repaid state, the loan entering a default state and the collateral item being successfully liquidated, and a state of repayment upon which collateral is no longer required as defined in the loan agreement.

In embodiments, the distributed ledger is a blockchain.

A more complete understanding of the disclosure will be appreciated from the description and accompanying drawings and the claims, which follow.

BRIEF DESCRIPTION OF THE DRAWINGS

The accompanying drawings, which are included to provide a better understanding of the disclosure, illustrate embodiment(s) of the disclosure and together with the description serve to explain the principle of the disclosure. In the drawings:

FIG. 23 is a flow chart illustrating an example set of operations of a method for performing an appraisal workflow according to some embodiments of the present disclosure.

FIG. 24 is a flow chart illustrating an example set of operations of a method for performing a safekeeping workflow according to some embodiments of the present disclosure.

FIG. 25 is a flow chart illustrating an example set of operations of a method for performing a loan workflow according to some embodiments of the present disclosure.

FIG. 28 is a diagram illustrating a set of stages of a loan process workflow according to some embodiments of the present disclosure.

FIG. 29 is a diagram illustrating a set of stages of a loan process workflow according to some embodiments of the present disclosure.

DETAILED DESCRIPTION

Figure 1:
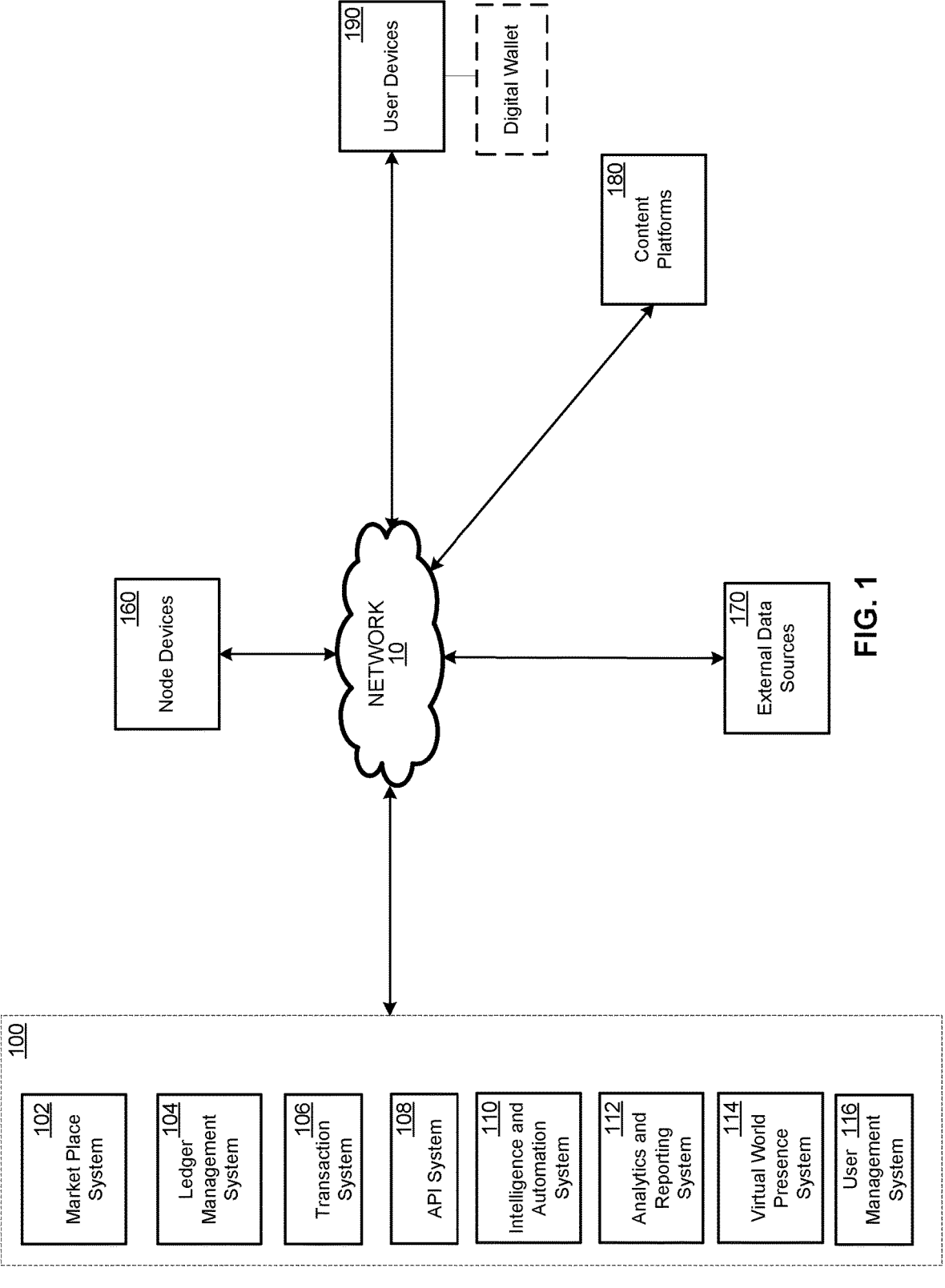
FIG. 1 is a schematic illustrating an example environment of a tokenization platform according to some embodiments of the present disclosure.

The combination of blockchain technology and smart contracts has been proposed for use in systems and methods for implementing a variety of transactions in a way that automates much of the transaction while preserving and respecting the legal constraints on such automation. One of the limitations on automation of such systems is the existence of jurisdiction specific rules and processes for (i)

creating legally binding contracts between parties, and (ii) exchanging property in a way that transfers ownership interests, security interests, or other similar interests in a legally binding manner.

Some of the proposed systems depend on the future implementation of blockchain technology for the legal systems of record for such transfers, including real property records, Uniform Commercial Code filing systems, and other similar systems. This transition is dependent on governmental bodies creating and adopting blockchain-based record-keeping systems. For example, real property records in the United States are typically maintained at the county-level by an elected official, and documents are subject to specific rules regarding format and methods of submission to the record. Each such official utilizes their own systems to accept and record documents. Adoption of a blockchain-based record-keeping system would thus require each jurisdiction to select and implement such a system. This process can take years even once the technology for such systems is developed and available for implementation. The willingness of jurisdictions to adopt new technologies also may vary widely, and so it is impossible to determine when all jurisdictions will migrate to a blockchain-based system, if ever.

Since the benefits of blockchain technologies should not wait until governmental record keepers decide to begin to implement systems based on the technology, hybrid systems that provide the benefits of blockchain technology but also interface with existing record-keeping and other legal systems are necessary to bridge the gap. Systems like those disclosed herein provide the benefits of blockchain to users of the system, interface with existing legal systems and methods, and will be easier to migrate to a full block-chain based system if they become available.

The distributed ledger transaction systems and methods described herein utilize distributed ledger technology (e.g., blockchain technology) in combination with smart contracts to allow users to negotiate, document, and/or execute a variety of different transactions. According to some embodiments, the different transactions include securitized decentralized loan transactions. These loan transactions include loan transactions that are secured by traditional types of collateral and/or by digital assets.

In general distributed ledger technology forms the basis for cryptocurrencies that are rapidly expanding in application and adoption. Such cryptocurrencies augment or replace existing payment methodologies such as cash, but also provide a decentralized system for processing transfers of the cryptocurrency. The basis for the distributed ledger/ blockchain technology is a linked list of data blocks. Each block contains a link to the prior block in the chain and encrypted data. In some implementations of a distributed ledger, the encrypted data may include transaction data documenting the exchange of a digital currency, software such as an executable digital contract, and data associated with the use of a digital contract by specific parties, although it may also include other types of data as described in further detail below. The data in each block in the distributed ledger includes a hash of the previous block in the chain as a means of identifying and preventing attempts to modify prior blocks in the distributed ledger.

In many implementations of distributed ledger technology, the management and extension of the distributed ledger is decentralized and distributed over computer systems operated by numerous unaffiliated entities who contribute their computing power to the system. These distributed contributors provide the infrastructure of the distributed ledger system by storing copies of the distributed ledger, and performing the algorithms necessary to process transactions, deploy them into new blocks on the distributed ledger, and distribute those blocks to other parts of the system. In some distributed ledger implementations the contributors are compensated for this service by receiving a fee denominated in a cryptocurrency in return for the processing of a new block in the distributed ledger. An important aspect of distributed ledger security is that it is difficult to modify blocks after they have been added to a distributed ledger and accepted into the main branch, although distributed ledgers do have temporary competing branches.

The distributed ledger technology has been enhanced by the concept of "smart contracts". Smart contracts are executable computer programs that are compiled into the data in a block in a distributed ledger by the developers of the smart contract. Once a smart contract has been deployed into a distributed ledger, other users of the distributed ledger may execute the smart contract with confidence that it has not been modified by a malicious third party. These executable computer programs are referred to as "smart contracts" because they may be used to represent and implement agreements between various parties regarding the transfer of digital currency and other types of assets, however, they do not have to represent contractual arrangements. A software developer develops the smart contract by writing program code using a scripting language such as JavaScript, Solidity, or other scripting languages, or an object coding language, such as Java, or a machine coding language such as C or C++. When a "smart contract" is deployed into a distributed ledger, the program code is processed into a block by one of the contributors to the system just as any other transaction on the distributed ledger, and typically a fee is paid to the node contributor who compiles the contract/program. The process of deploying the smart contract may include compiling the program code into bytecode, object code, binary code, or some other executable form. When the smart contract is successfully deployed into the block chain it is assigned an address just as any other distributed ledger transaction. This address is used to access the smart contract and execute the functionality provided in it. Typically, an Application Binary Interface (ABI) information, similar to an application programming interface, is provided to a user of the contract, or the software that interfaces with the contract (such as a wallet application) so that the user can interact with the various functions of the smart contract. The ABI describes the various functions and methods provided as part of the smart contract so that they can be accessed by the user or the user's software.

A contract/program that has been deployed into the distributed ledger may then be used by anyone who has the address of the contract on the distributed ledger. Executing the contract, or a portion of it, does not necessarily incur fees unless updates to the distributed ledger are required as part of that step in the contract. If the contract/program is properly implemented many different users may utilize the contract/program simultaneously to govern their own specific agreements or transactions.

In embodiments, a smart contract/program may have multiple steps that are executed or completed by different parties to the contract. For example, a contract/program may be invoked by a first party to make an offer to a second party or a group of potential contracting parties by instantiating a copy of a certain contract. The second party (or one of the group) may respond by "signing" that instance of the contract. The process of "signing" the contract may comprise invoking a programmatic method defined as part of the contract. Some contracts may provide for multiple parties, such as buyer, seller, lender, borrower, escrow agent, authenticator, appraiser, and/or the like, all of whom may independently interact with a particular instance of a smart contract to sign it, or to take other actions associated with a specific type of smart contract.

Smart contracts are well suited to contracts that involve digital assets or that may be completely executed via programmatic interactions between the contracting parties, the distributed ledger, digital assets, and resources on the internet or otherwise connected digitally to the contract. For example, smart contracts may be able to automatically transfer control and ownership of digital assets or transfer money between PayPal or bank accounts via ACH or other electronic payment systems. Application programming interfaces provided by the external systems provide methods for a digital contract to execute actual transfers of assets or funds between parties without non-programmatic processes.

Smart contracts are not so readily able to fully implement agreements that involve tangible assets, such as real estate, personal property, and other types of assets that are subject to the control of governmental or private registration systems. These registration systems are often paper-based or, if electronic, are not designed for programmatic interaction by third parties. Examples of such systems include real estate ownership records, personal property records for assets that are titled, Uniform Commercial Code records, patent and trademark registration databases, and others. Many of these systems may be partially digital but are lacking in a programmatic interface for a smart contract to interact with the system in a completely automated manner or are highly proprietary in nature. Other systems may be fractured into many jurisdictions with their own separate filing systems, so that a single smart contract would not be functional across all relevant systems. For example, Uniform Commercial Code filings are typically handled by differing systems across different state jurisdictions, and a smart contract would need to implement varying interfaces to be able to handle transactions outside of a single jurisdiction and depending on whether such interfaces were available for a given jurisdiction.

One type of contract that has not been able to be fully executed via the programmatic functions of a smart contract/program is a secured lending transaction. While many parts of such transactions may be completed via interactions between parties and the smart contract, the transfer of title and possession, and the creation of security interests for the benefit of lenders, among other aspects of the transaction, are not readily adapted to completion via the smart contract. According to embodiments of the present disclosure, a decentralized lending system that incorporates a set of distributed ledgers and a set of smart contracts that facilitates is created to support one or more types of smart contracts. In various embodiments of the system, the set of distributed ledgers may host a variety of types of smart contracts, such as guild governance smart contracts, authenticator smart contracts, appraisal smart contracts, loan smart contracts, and/or other smart contracts are implemented to support securitized decentralized loan processes. The programmatic smart contracts are compiled into distributed ledger(s) and reside at certain addresses within a respective block in the distributed ledger(s). Users may utilize these smart contracts by invoking the address and methods or functions associated with the smart contract. For example, an example loan contract may have methods for a loan request, loan approval, collateral assignment, payment authorization, and/or other similar functions necessary to the formation and execution of a loan, the provision of collateral as security, and repayment of the loan according to its terms.

Continuing the loan contract example, when a user utilizes a smart contract and invokes a method or function of that contract, the user may submit parameters and other information to the smart contract that are specified by a particular method or function. The smart contract may them programmatically execute a selected method or function in accordance with those parameters. In the case of a loan request function, a loan smart contract may take the parameters received from a user who desires to take out a loan and incorporate that request information into a new block in the blockchain so that potential lenders can view the request. In some embodiments the loan request might not be incorporated into the distributed ledger but might be stored in a database that is programmatically available to potential lenders such as via a web service.

The present disclosure relates to a tokenization platform that enables the creation of virtual representations of items (also referred to as "VIRLs"), such as goods, services, and/or experiences. As used herein the term "item" may refer to a digital asset (e.g., gift card, digital music file, digital video file, software, digital photograph, etc.), physical good, digital service (e.g., video streaming subscription), physical service (e.g., chauffer service, maid service, dry cleaning service), and/or purchased experience (e.g., hotel package, concert ticket, airlines ticket, etc.), or any combination thereof. It is noted that an item may refer to goods that already exist or that can be produced at a later time. For example, an item may be an unmade pizza or article of clothing. A purchaser of such an item may purchase the item, and the item may be produced at a time after the purchase. The term virtual item may refer to a virtual representation of a merchandised item. In creating a virtual representation to an item, many of the purchase-time decisions required for traditional ecommerce transactions can be postponed and bifurcated from the transaction itself, thereby creating additional value for the purchaser. For example, a purchaser may wish to order a pair of shoes but is not yet sure when the shoes will be needed or where the delivery location should be. The purchaser may purchase the virtual representation of the shoes. The virtual representation may be redeemed at a later time, such that the redeemer (e.g., the purchaser or a recipient of a gift) may specify the delivery time and delivery location when the redeemer so chooses. By creating virtual items, new value is created for purchasers or any recipients, as a series of choices that can be put on hold until redemption time.

Furthermore, in conventional ecommerce platforms, there are no recordation mechanisms of an item being transferred between unknown parties that can be checked and trusted. Additionally, there is also no way of storing sensitive financial information without a centralized entity. Thus in embodiments, the tokenization platform may be configured to issue electronic tokens (or "tokens") that are configured to be stored on a cryptographically secure ledger to provide a process by which virtual representations allow the transfer of the item between unknown parties, while also allowing anyone to check the status of the token at any time and trust that it is correct. As used herein, unless otherwise indicated by context, "cryptographically" indicates use of a cryptographic algorithm, such as a hashing algorithm.

The ecommerce platform may be configured to support additional or alternative ecosystems. In embodiments, the tokenization platform is configured to support a token-based lending system, whereby lenders may create virtual items corresponding to collateral (e.g., jewelry, collectible items, artwork, and the like). The ecommerce platform may tokenize the virtual item and may store the token on a distributed ledger. In this way, the loan may be sold and only the token needs to be transferred between lenders. In some embodiments, a smart contract may be used to manage the loan, possession of the token, and other transactions corresponding to the loan.

In some embodiments, the tokenization platform is configured to authenticate real world items. In some of these embodiments, the tokenization platform may enlist subject matter experts to authenticate items using a virtual representation of the items. A subject matter expert may provide an authentication report that includes notes for the expert's underlying opinion. The authentication report may be used to deny or allow an item to be used for collateral or sold on the platform. Additionally, in some embodiments, the authentication reports can be used to train machine learned models, such that the platform may use machine vision, machine learning, sensors (e.g., scales), and/or other suitable techniques to authenticate items.

In embodiments, the tokenization platform is configured to support a "mystery box" game. The mystery box game is a game of change, where users can win tokens from the mystery box, such that the tokens represent items and the tokens can be redeemed, traded, sold, gifted, and the like. In some of these embodiments, the tokenization platform supports casino-style gaming, whereby the mystery box game may be played at casinos and other brick and mortar locations.

In embodiments, the tokenization platform is configured to support in-video game streaming. In some of these embodiments, the tokenization platform may provide indicators of tokens to instances of video games, whereby the video game makers can use the tokens in a number of different ways. For example, tokens may appear in a video game to allow a food delivery service to sell deliverable food in game. In another example, a token may represent a digital item that can be used in the game, but then later can be redeemed to obtain a real-world item corresponding to the digital item.

In embodiments, the tokenization platform may provide a rewards-based user acquisition program, whereby users can enlist for referral codes. When the user successfully refers a user to the tokenization platform, the user is rewarded with a token. The token can represent monetary compensation or an item (e.g., a gift card, a pair of shoes, a music album, a DVD, or the like).

FIG. 1 illustrates an example ecosystem of a tokenization platform 100 (or the "platform") according to some embodiments of the present disclosure. The environment includes the platform 100, node computing devices 160, external data sources 170, content platforms 180, and user devices 190. The platform 100, the node computing devices 160, the external data sources 170, the content platforms 180, and the user devices 190 may communicate via a communication network 10 (e.g., the Internet and/or a cellular network).

In embodiments, the tokenization platform 100 manages one or more cryptographic ledgers (or "distributed ledgers") and provides flexible functionality of virtual representations of items such as goods, services, and/or experiences with the fulfillment and satisfaction of said items. In embodiments, the platform 100 provides a marketplace for the 3rd party sellers to transact for items using tokens, whereby a token is a digital marker that defines an ownership right in a particular item. Additionally, or alternatively, the provider of the platform 100 may sell, lease, give away, or otherwise transact items offered by the provider. As used herein, the term "transaction" may refer to the sale/purchase, the leasing, the gifting, collateralization, or any other action that affects an ownership of a token. As will be discussed, in some embodiments a token may be redeemed by an owner of the token, such that the owner of the token may take possession of the item upon redemption of the token.

In some embodiments, the seller of an item (or any other suitable user) may access the platform 100 to define a virtual representation of the item that the seller is offering for transaction. The virtual representation of the item may include information that identifies the item (e.g., a serial number corresponding to the item, a model number of the item, and the like), information relating to the item (e.g., a classification of the item, textual descriptions, images, audio, video, virtual reality data, augmented reality data, and the like), and/or code that may be used to facilitate or verify transactions involving the item (e.g., smart contracts). In some embodiments, the platform may "tokenize" an item on behalf of a seller of the item by generating a set of tokens based on the virtual representation of the item and storing the tokens and associated metadata in a cryptographically secure distributed ledger, thereby making the tokens (and the virtual representation) verifiable, transferable, and trackable.

In embodiments, the platform 100 may receive data from one or more external data sources 170. An external data source 170 may refer to any system or device that can provide data to the platform. In embodiments, data sources may include merchant, manufacturer, or service provider systems and/or databases that provide the platform 100 with data related to an available item. External data sources may also include user devices 190, such that the user devices 190 may provide relevant data (e.g., contacts, cookies, and the like). Examples of external data sources 170 may include e-Commerce websites, organizational websites, software applications, and contact lists (e.g., phone contacts, email contacts, messenger client contacts, and the like). The platform 100 may access an external data source 170 via a network 10 (e.g., the Internet) in any suitable manner (e.g., crawlers, user permission/API, and the like).

In embodiments, the platform 100 interacts with content publishing platforms 180. A content publishing platform 190 may refer to any system that publishes content on behalf of individuals and/or organizations. Content publishing platforms may include social networking platforms, blogging platforms, news sites, and the like. In embodiments, a consumer may output content corresponding to an item via a content publishing platform 190. For example, the consumer may post content related to a purchased item to a social networking platform or may embed the content into a blog post. The content may include links to the item (e.g., a link to a webpage or application state corresponding to the item).

In embodiments, the platform 100 interfaces with various user devices 190. User devices 190 can refer to any computing device with which a user (e.g., consumer, merchant, manufacturer, provider and the like) can access the platform. Examples of user devices include, but are not limited to, smartphones, tablet computer devices, laptop computing devices, personal computing devices, smart televisions, gaming consoles, and the like. A user device may access the platform 100 via a website, a web application, a native application, or the like. In embodiments, the platform 100 may provide a first graphical user interface to user devices 190 associated with a seller and a second graphical user interface to a user device 190 associated with an end user. The first graphical user interface may allow a user associated with a seller to offer items for sale and to create new virtual representations corresponding to the items for sale. The second user interface may allow users to purchase tokens corresponding to items for sale, to transfer tokens, and/or redeem tokens. In some embodiments, the platform 100 may support a digital wallet that stores the tokens of a user. The digital wallet may be a client application that is provided and/or supported by the platform 100. In embodiments, the digital wallet stores any tokens that are owned by the user associated with the digital wallet and provides an interface that allows the user to redeem, transfer, sell, exchange, or otherwise participate in transactions involving the token.

In embodiments, the tokenization of items provides a framework for securely transacting with respect to an item represented by the token. For example, a token provides a mechanism by which an item may be traded, rented, purchased, sold, exchanged, gifted, swapped, or transferred in transactions involving trusted or untrusted parties. In some embodiments, a token represents a single unit to be transacted (e.g., sold, traded, leased, gifted, or the like). For example, if a merchant is selling ten widgets, the platform 100 may generate ten tokens, where each token corresponds to a different widget. In this scenario, all ten widgets may correspond to the same virtual representation of the widget, and the ten tokens may represent instances of the virtual representation (also referred to as a "virtual asset"). In embodiments, a token may be a digitally signed instance of the virtual representation of an item, whereby the digital signature may be used to verify the validity of the token.

In embodiments, each virtual representation of an item may include or be associated with a smart contract that, for example, provides a set of verifiable conditions that must be satisfied in order to self-execute a transaction (e.g., transfer of ownership or expiration) relating to an item represented by the virtual representation. In embodiments, each token corresponding to a virtual representation may be associated with the smart contract that corresponds to the virtual representation. In embodiments, a smart contract corresponding to a virtual representation may define the conditions that must be verified to generate new tokens, conditions that must be verified in order to transfer ownership of tokens, conditions that must be verified to redeem a token, and/or conditions that must be met to destroy a token. A smart contract may also contain code that defines actions to be taken when certain conditions are met. When implicated, the smart contract may determine whether the conditions defined therein are satisfied, and if so, to self-execute the actions corresponding to the conditions. In embodiments, each smart contract may be stored on and accessed on the distributed ledger. In some embodiments, tokens that do not have a smart contract associated therewith may be referred to as placeholder tokens, such that a placeholder token may not be involved in a transaction. In embodiments, tokens can be gifted. In embodiments, recipients of a gifted token may redeem the token, customize the virtual asset represented by the token before redemption, exchange it for another token, obtain the cash value equivalent, and the like.

Once the platform 100 generates a token, the platform may update the distributed ledger to indicate the existence of a new token. As used herein, a distributed ledger may refer to an electronic ledger that records transactions. A distributed ledger may be public or private. In embodiments where the distributed ledger is private, the platform 100 may maintain and store the entire distributed ledger on computing device nodes 160 associated with the platform. In embodiments where the distributed ledger is public, one or more 3rd party computing node devices 160 (or "computing nodes") that are not associated with the platform 100 may collectively store the distributed leger. In some of these embodiments, the platform 100 may also locally store the distributed leger and/or a portion thereof. In embodiments, the distributed ledger is a blockchain (e.g., an Ethereum blockchain). Alternatively, the distributed ledger may comport to other suitable protocols (e.g., hashgraph, Byteball, Nano-Block Lattice, and IOTA). By storing tokens on a distributed ledger, the status of that token can be verified at any time by querying the ledger and trust that it is correct. By using the token approach to implementation, tokens cannot be copied and redeemed without permission.

In some embodiments, the platform 100 is configured to shard the distributed ledger, such that there are side chains that fork from a main chain of a distributed ledger. In some of these embodiments, a side chain may store virtual representations of items having a particular category or class. In embodiments, a side chain corresponding to a particular class of items may store tokens corresponding to items belonging to the particular class and ownership records that indicate the current and previous ownerships of those tokens. Each time ownership of a token changes, the side chain containing the implicated token may be amended to indicate the new owner of the token. In embodiments, side chains may store media contents that are associated with virtual representations. For example, a side chain may store videos, photographs, audio clips, and other suitable media contents that are referenced by respective virtual representations.

In addition to item data (e.g., virtual representations), tokens, and transaction data relating to the tokens, the distributed ledger may further store account information. For example, in embodiments the distributed ledger may store the public addresses of each valid account. In embodiments, a valid account may belong to an entity that is verified and authorized by the platform to participate in a transaction. Thus, in embodiments, a party may only sell, purchase, gift, receive, or otherwise transfer a token if the party has a known account. Each account may be assigned a public key and a private key that may be used to transact on the platform 100. In embodiments, the address of an account may be based on the public key of the account (e.g., the address may be a hash value of the public key). These addresses may be stored in the distributed ledger, such that addresses involved in a transaction may be verified as corresponding to valid accounts using the distributed ledger.

In operation, a seller may instruct the platform 100 to generate virtual representations of one or more respective items, such that each virtual representation represents a respective item that is available for a transaction. It is noted that while many of the examples of transactions in the disclosure relate to purchases of goods, services, and/or experiences, transactions may also include leases, rentals, loans, gifts, trades, rewards, or giveaways. In embodiments, the seller may provide item attributes relating to a set of one or more items, such as a number of items available for transaction, pricing information of an item, delivery restrictions for the item, expires relating to the item (e.g., how long is the transaction valid), an item description, a serial number (e.g., of physical items), media relating to the item (e.g., photographs, videos, and/or audio content), and the like. In response to the seller providing the item information, the platform 100 generates a set of tokens corresponding to the number of items available for transaction. For example, if the seller indicates that there are 100 Model X widgets available for sale, the platform 100 may generate a virtual representation of the Model X widget and may generate 100 non-fungible tokens corresponding to the virtual representation, whereby each token corresponds to a respective instance of the virtual representation. The virtual representation may include a description of the widgets, a description of the widgets, a price of the widget, shipping restrictions relating to the widgets, photographs of the widgets, videos of the widget, virtual reality data relating to the widget, and the like. The platform 100 may then store the virtual representation and the corresponding tokens on the distributed ledger. For each token, the distributed ledger may store the token, ownership data relating to the token, media content corresponding to the token (or the virtual representation to which the token corresponds), and/or other suitable data relating to the token on the distributed ledger. Initially, the ownership of the token may be assigned to the seller. As such, the distributed ledger may indicate the existence of the token and that the seller owns the token. Once tokenized, end users (e.g., buyers) may participate in transactions for the item using the corresponding token. For example, the user may purchase a token corresponding to the item from the seller via a web interface or application that is provided or supported by the provider of the platform 100. In response to the transaction, the platform 100 may update the distributed ledger to indicate an assignment of the token to the user (e.g., to a wallet associated with an account of the user). In embodiments, a copy of the token may be stored in a digital wallet corresponding to the new owner of the token (e.g., the buyer).

A token may be transmitted amongst users in any suitable manner. For example, a token may be transmitted via email, instant message, text message, digital transfer, social media platforms, and the like. In some of these embodiments, the token may be transmitted directly from the sender's user device 190 (e.g., from the user's digital wallet) to a user device 190 (e.g., smartphone) or account (e.g., email account or messaging application) associated with the intended recipient. Upon initiating the transmission, the digital wallet may transmit a transfer request to the platform 100 and may transmit a copy of the token to the recipient's user device 190 or specified account. In some embodiments, the transmitted token may be embedded in a media content, such as an image, emoji, or video, such that the recipient receives the media content and may opt to accept the token. In this example, the token may be accompanied by a link and/or software instructions that cause the user device 190 that receives the token to add the token to the recipient's account upon the recipient accepting the token. Upon electing to accept the token, the user device 190 of the recipient may transmit a request to the platform to add the token to an account of the recipient. The platform 100 may receive the request and may update the ownership record of the token in the distributed ledger to indicate the transfer of ownership.

In embodiments, an owner of a token may redeem a token. In embodiments, a user may select a token to redeem from a digital wallet of the user. In response to the selection, the digital wallet may transmit a redeem request to the platform 100. The redeem request may include the token (or an identifier thereof) and a public address of the user (or any other suitable identifier of the user). The platform 100 receives the redeem request and verifies the validity of the token and/or the ownership of the token. Once verified, the user is granted permission to redeem the token. In some scenarios, the user may be redeeming a token corresponding to a digital item (e.g., a gift card, an mp3, a movie, a digital photograph). In these scenarios, the platform 100 may determine a workflow for satisfying the digital item. For example, the platform 100 may request an email address from the user or may look up an email address of the user from the distributed ledger. In this example, the platform 100 may email a link to download the digital item to the user's email account or may attach a copy of the digital item in an email that is sent to the user's email account. In another scenario, the user may be redeeming a token corresponding to a physical good (e.g., clothing, food, electronics, etc.) or a physical service (e.g., maid service). In the case of a physical good, the platform 100 may determine a workflow for satisfying the physical item. For example, the platform 100 may request shipping information from the user or may look up the shipping information of the user from the distributed ledger. The platform 100 may then initiate shipment of the physical good. For example, the platform 100 may transmit a shipping request to a warehouse that handles shipments of the good indicating the shipping information. The foregoing are examples of how a token may be redeemed. The platform 100 may execute additional or alternative workflows to handle redemption of a token.

In embodiments, the token may be printed in physical media, such that the token may be redeemed at a brick and mortar location. For example, the token (e.g., an alphanumerical string) may be encoded into a QR-code or barcode. In these embodiments, the public key of the party that was used to digitally sign the token (e.g., a public key associated with the platform 100) may also be provided in the physical media. In this way, the token may be verified by scanning the QR-code or barcode using a client application associated with the platform 100. The client application may provide the token and the public key to the platform 100, which may verify the validity of the token based on the token and the public key. If the token and ownership are verified, the platform 100 may transmit a confirmation of the verification to the client application. A clerk may then allow the user to complete the transaction (e.g., take possession of the item).

In some embodiments, tokens may be perishable, in that they lose all value at a predetermined time or upon the occurrence of a predetermined event. In these embodiments, the seller may provide an expiry in the virtual representation that indicates a date and time that the virtual representation is no longer valid, such that when the expiry is reached, the token may be deemed invalid.

Tokens may be fungible tokens or non-fungible tokens. Fungible tokens may refer to tokens that are interchangeable. For example, fungible tokens may all have the same identifier. Non-fungible tokens are unique tokens. Non-fungible tokens are transferrable but not interchangeable.

In embodiments, the platform 100 may execute one or more of: a marketplace system 102, a ledger management system 104, a transaction system 106, an API system 108, an intelligence and automation system 110, an analytics and reporting system 112, and/or virtual world presence system 114, all of which are discussed in greater detail throughout this disclosure.

In embodiments, the platform 100 provides a marketplace system 102 that allows virtual representations of items to be defined, generated, viewed, and/or redeemed. In embodiments, the marketplace system 102 may include graphical user interfaces that: allow sellers to define virtual representations, allow consumers to view virtual representations of items and to transact for tokens corresponding to the items, and allow token owners to redeem tokens, thereby completing transactions for items indicated by the redeemed tokens. The marketplace system 102 may further include backend functionality for supporting these operations.

In embodiments, the platform 100 provides a ledger management system 104 that generates tokens and manages one or more distributed ledgers, including managing the ownership rights of the generated tokens. In embodiments, the ledger management system 104 may also interface with one or more smart contracts that implicate the distributed ledgers.

In embodiments, the platform 100 includes an API system 106 that manages one or more application programming interfaces (APIs) of the platform, so as to expose the APIs to one or more related applications (e.g., native and/or web applications provided by the platform 100 provider), third party systems that are supported by or otherwise interact with the platform 100, and smart contracts that are configured to interface with the platform 100. The API system 106 may expose one or more APIs, such that the API system 106 may receive API calls from requesting devices or systems and/or may push data to subscribing devices or systems. The API system 106 may implement any suitable types of APIs, including REST, SOAP, and the like. In embodiments, the API system 106 may include a smart contract API that allows smart contracts to interface with the platform, a utility API, a merchant API that allows merchants to create tokens corresponding to virtual representations of items, and any other suitable APIs. In embodiments, the platform 100 may implement a micro services architecture such that services may be accessed by clients, such as by APIs and/or software development kits (SDKs). The services abstract away the complexities of blockchain creation, object handling, ownership transfers, data integration, identity management, and the like, so that platform users can easily build, deliver and/or consume platform capabilities. In embodiments, SDK types include, but are not limited to: an Android SDK, an iOS SDK, a Windows SDK, a JavaScript SDK, a PHP SDK, a Python SDK, a Swift SDK, a Ruby SDK, and the like.

In embodiments, the platform 100 includes a transaction system 108 that supports any suitable transactions relating to the platform, including the buying, selling, trading, renting, leasing, exchanging, swapping, transferring, and/or redeeming of tokens that represent corresponding items.

In embodiments, the platform 100 includes an intelligence and automation system 110 that performs machine learning and artificial intelligence tasks. For example, the intelligence and automation system 110 may train machine learned models, make classifications and predictions based on the machine learned models, recommend products to users, identify advertisements to target to specific users, match service providers to service seekers, and/or automate notifications to users.

In embodiments, the analytics and reporting system 112 performs analytics-related tasks relating to various aspects of the tokenization platform 100 and may report the resultant analytics to interested parties (e.g., employees of the platform provider 100 and/or sellers on the platform 100).

In embodiments, the platform includes or supports a virtual world presence system 114 that provides presents virtual representations of items in virtual world environments. For example, the virtual world presence system 114 may present a virtual reality store to a user, whereby virtual representations of items are presented in the store and users can "shop" for the virtual items in the virtual world environment. In these embodiments, the virtual world presence system 114 may render a virtual world environment, which may be displayed at a client application. The virtual world environment may be associated with a seller or a group of sellers, whereby items that are sold by the seller or sellers are made available in the virtual world environment. In these embodiments, the virtual world presence system 114 may further render 3D representations of items that are available from the seller or sellers based on the virtual representations of the items. The 3D representations may then be presented in the virtual world environments, such that users can examine the 3D representations of the items (e.g., look at the representations from different angles). In the event a user wishes to purchase an item, the user may initiate a transaction (e.g., selecting a "buy" button in the virtual representation). Upon the user initiating the transaction, the virtual world presence system 114 may notify the transaction system 106 of the user's selection, and the transaction may precede in the manner described above.

In embodiments, the platform 100 includes a user management system 116. In embodiments, the user management system 116 may create new user accounts, assess risk associated with users, provide conditions for users based on respective risk associated with the users when participating in a transaction, and the like.

In some embodiments, the user management system 116 creates new accounts for users. In these embodiments, a new user may access the platform 100 and may request a new account. In embodiments, the platform 100 may allow a user to link their account to an account of an external system (e.g., Google®, Facebook®, Twitter®, etc.). Additionally, or alternatively, a user can provide an email address and login. In embodiments, the user management system 116 may request a user to provide additional authenticating information, such as a home address or business address, a passport number (and/or image of the passport), driver's license number (and/or an image thereof), state ID card (and/or an image thereof). The user management system 116 may further provide a mechanism for a user to link any financial information to the platform, including entering credit card numbers, banking information, cryptocurrency wallets (e.g., Coinbase® account), and the like. Upon receiving the requested information, the user management system 116 creates a new account for the user, including creating a new public address of the account corresponding to the user. Once the account is created, the user may begin participating in transactions on the platform 100.

In embodiments, the user management system 116 determines a risk score of a user each time the user attempts to participate in a transaction using the platform 100. A risk score of a user may indicate a degree of risk associated with facilitating a particular transaction involving the user. Examples of risks may include a risk that a seller will not deliver an item purchased by another user, a risk that the seller will deliver a fake or substandard item to another user, a risk that a user will default on a loan, a risk that the user will engage in fraud, and the like. Factors that may be relevant to a user's risk score may include, but are not limited to, whether the user has provided secondary authentication information (e.g., passport or driver's license), whether the user has provided banking information, how many purchases or sales the user has made on the platform 100, the size of those transactions, how many issues the user has had with previous transactions (e.g., how many non-payments or non-deliveries, complaints, etc.), whether the user has defaulted on a loan facilitated by the platform, and the like.

In some embodiments, the user management system 116 may determine the risk score using a risk scoring model trained to assess risks associated with the user given a transaction. Upon a user attempting to engage in a transaction, the user management system 116 may determine the features of the transaction (e.g., type of transaction, the size of the transaction, etc.) and the features of the user (the outcomes of the user's previous transactions, the types of those transactions, whether the user has provided secondary authentication information, whether the user has provided banking information, whether the user has had issues in the past, etc.). For example, when a user requests to sell an item, requests a collateralized loan, or the like, the user management system 116 may determine a risk score. The user management system 116 may provide the features to the intelligence and automation system 110, which may input the features into the risk scoring model. The risk scoring model may output a risk score based on the features, where the risk score indicates a probability that the transaction will be successful given the transaction features and user features. In embodiments, the risk scoring model may be trained by the intelligence and automation system 110 (e.g., the machine learning system 502 of FIG. 5), as is discussed below.

In embodiments, the user management system 116 may impose a set of conditions on a user requesting to participate in a transaction based on the risk associated with the user. Examples of conditions may include requiring a user to place funds in escrow equal to the sale price of an item to be sold on the platform (e.g., an amount to be refunded if a seller does not provide an item or provides a fake item), requiring a user to provide collateral in excess of a loan amount if there is significant risk that the user defaults on a loan, requiring a user to provide secondary authentication information if the user is requesting a loan and has not provided such information, and the like, For example, if the user is requesting to sell an item on the platform 100, but the user does not have a history of selling items, the risk score associated with the potential transaction may indicate that there is a risk that the seller will not successfully deliver an item or that the item may be fake or in an unsatisfactory condition transaction. In this example, the platform 100 may require that the user deposit (or have in his or her account) an amount of funds that are equal to or greater than sale price of the item or items that the user wishes to sell. In this way, the platform 100 may issue a refund to a buyer if the user (i.e., seller) does not successfully complete the transaction. In embodiments, the user management system 116 may implement a set of rules to determine the conditions, if any, to place on a user with respect to a particular transaction if the user wishes to engage in the transaction. In embodiments, a rule may define one or more conditions that correspond to particular types of transactions (e.g., selling, trading, borrowing, etc.) and may define risk score thresholds that trigger the one or more conditions.

The platform 100 may execute additional or alternative systems as well. For example, in embodiments, the platform 100 may include a gamification system (not shown) that gamifies aspects of the platform 100 and/or a rewards system (not shown) that rewards users for participating in certain activities. For example, the gamification system may provide an environment where users are challenged to compete for the most shared virtual items on social media platforms. In this example, the rewards system may reward users with tokens to redeem items when the users are deemed to have shared the most virtual items on the social media platforms. In another example, the rewards system may issue rewards (e.g., tokens to certain items) to a user when the user purchases a certain value or amount of virtual items.

In embodiments, the platform 100 can include a logistics system (not shown) that enables the physical delivery of an item, such as a good or food. The logistics system may be configured to manage the logistics from the source location of the item (e.g., a warehouse or restaurant) to the redeemer of the token (e.g., the house or current location of the redeemer). In embodiments, the logistics system may include a geolocation system (not shown) for determining delivery location. For example, if an owner of a token corresponding to a pizza with one topping from a pizza delivery chain redeems the token, the geolocation system may determine the recipient's current location for delivery. Geolocation information may be acquired by a smart phone, web browser (e.g., IP address), or the like. In this example, the logistics system may generate an electronic notification based on the user's geolocation (or a selected delivery location) and the user's order (e.g., the user's selected topping) and may transmit the electronic notification to a location of the pizza delivery chain that is closest to the intended delivery location.

Figure 2:
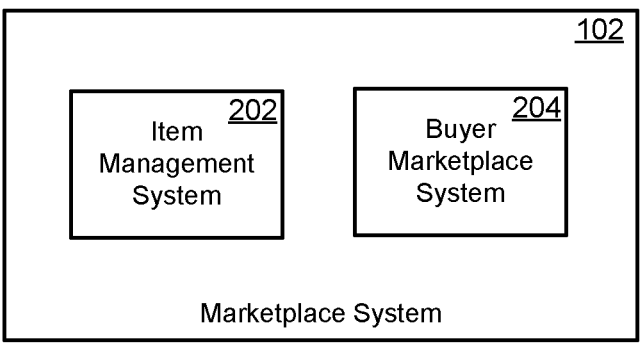
FIG. 2 is a schematic illustrating an example marketplace system according to some embodiments of the present disclosure.

FIG. 2 illustrates an example of a marketplace system 102 according to some embodiments of the present disclosure. In embodiments, marketplace system 102 may include an item management system 202, a buyer marketplace system 204, and a redemption system 206.

The item management system 202 allows a seller of an item to define a virtual representation of an item. In embodiments, the item management system 202 presents a GUI to a user device 190 of the seller that allows the seller to define the attributes of the item. In the case that the item has never been sold on the platform 100, the seller can select an option to add a new item. In response to doing so, the seller may provide an item classification that indicates the type of item (e.g., "shoes," "pizza," "photograph," "movie," "concert tickets," "gift card," and the like) and a name of the item. The seller may then define one or more additional attributes of the item. For example, in embodiments, the seller may provide an item description, media contents associated with the item (e.g., photographs, videos, audio clips, and the like), relevant links (e.g., a link to a website of the seller), a price of the item, restrictions relating to the item (e.g., "US shipping only" or "seller store hours are 10-6"), redemption instructions (e.g., whether in store redemption is allowed, permitted, or mandatory, whether digital assets are downloaded or emailed, whether the items are transferrable, and the like), a number of the item that are available for transaction (e.g., how many units are available), and/or any other suitable attributes. In response to the seller providing the item attributes, the item management system 202 may generate a virtual representation of the item. In embodiments, the virtual representation may be a data record that includes the attributes of the item. In the scenario where the virtual representation was previously defined, the seller may select the previously defined item and may update one or more attributes. For example, the seller may provide additional media contents, may alter the price, and/or may update the number of items that are available. Whether an updated virtual representation or a newly defined virtual representation, the item management system 202 may output the virtual representation to the ledger management system 104, where the ledger management system 104 may tokenize instances of the virtual representation to obtain a set of tokens.

In some embodiments, the item management system 202 may allow the seller to provide seller attributes as well. The seller may provide information such as a physical location where physical items may be shipped from, a digital location where digital items may be retrieved from, physical locations of the seller's brick and mortar stores, hours of operation of the seller, and the like. These attributes may be included in the virtual representation or may be stored in an alternate date record.

In embodiments, the item management system 202 may include an asset type manager for creating and defining new types of items to enable the platform 100 to support the sale and trade of the new type of asset. In these embodiments, the asset type manager may provide a GUI that allows a user to define a new type of asset. In these embodiments, an asset type attributes field allows users to add information specific to new asset types as they are being defined. Attribute information can be understood as information material to purchasers in making a buying decision and must be information specific to an asset type and information capable of being displayed on the platform. Asset type attribute fields include, but are not limited to, an asset type name, an asset type image, an asset redemption URL, an asset descriptor (e.g., physical or digital), and the like.

In embodiments, the item management system 202 may include an item type definition manager for defining new types of items so that they can be listed on the platform. In embodiments, the item type definition manager may provide a GUI that allows a user to define attributes of a new item. To define a new item type, a user may be prompted to select an appropriate asset type from the dropdown menu. The GUI may then allow a user to define the item attributes in item attribute fields. Item attribute fields may include, but are not limited to, an item name, an item description, item notes, an item image, item pricing data (e.g., suggested price, suggested floor price), an instant sell flag, an item URL that links to a webpage for purchasing the item, a quantity of items, and the like. When a user provides the requisite item attributes, the item management system 202 may create a new virtual representation defining the new item.

In some embodiments, the item management system 202 may require sellers without adequate history to escrow an amount of funds equal to the value of the goods being sold on the tokenization platform 100. The seller may sell a token representing an item, and when the token is redeemed by the token owner (e.g., the buyer or downstream recipient), the funds are removed from escrow and returned to an account of the seller. In these embodiments, the seller does not need to escrow the physical item, which requires at least one additional shipment to be made to a warehouse or other storage facility.

In embodiments, the buyer marketplace system 204 allows a consumer to browse or search for items, view virtual representations of items, and engage in transactions for the items. In embodiments, the buyer marketplace system 204 presents a GUI that includes a search bar that allows users to enter a search query comprised of one or more search terms. In response to receiving the search query, the buyer marketplace system 204 may query one or more indexes that index virtual representations using one or more of the search terms. The buyer marketplace system 204 may process the search query and perform the subsequent search using any suitable search techniques. In response to performing the search, the buyer marketplace system 204 may retrieve the virtual representations implicated by the search and may present the virtual representations in a visual manner. For example, the GUI may display a search engine results page (SERP) that displays one or more search results, where each search result corresponds to a different virtual representation and links to a respective page where the user can view the attributes of the item as defined in the virtual representation of the item, including any media contents associated with the item and the price of the item, and can elect to purchase a token corresponding to the item.

In embodiments, the buyer marketplace system 204 may allow users to browse virtual items offered on the platform.

For example, the buyer marketplace system 204 may present a GUI that allows a consumer to filter items by category or by other attributes. The GUI may allow a user to select a link corresponding to an item, which directs the user to a page where the user can view the attributes of the item as defined in the virtual representation of the item, including any media contents associated with the item and the price of the item, and can elect to purchase a token corresponding to the item.

In embodiments, when the consumer elects to purchase an item, the buyer marketplace system 204 may notify the ledger management system 104 regarding the purchase. The buyer marketplace system 204 may provide the ledger management system 104 with the public address of the user and an identifier of the virtual representation of the selected item. The ledger management system 104 may effectuate the transaction by assigning a token from the set of tokens corresponding to the virtual representation to the account associated with the public address of the user and updating the distributed ledger to indicate the change of ownership of the assigned token to the public address of the user. For example, the buyer marketplace system 204 (or the transaction system 106) may identify a token that is currently owned by the seller and may transfer ownership of the token to an account of the buyer. Once this occurs, a copy of the token may be deposited into an account of the user. For example, the token may be deposited in a digital wallet of the user.

In embodiments, the buyer marketplace system 205 may depict items as individual thumbnail images. In some of these embodiments, a simple box style user interface element can be added to the Item detail pages to display the attributes of an item, including an item description attribute, item notes attributes, and a seller URL attribute. An item description field on the GUI can support clickable URLs that can redirect platform users to pages with more information about the product or other relevant pages. The item description textbox can be displayed and support links to third-party domains.

In embodiments, the buyer marketplace system 204 may allow users to purchase made-to-order items. For example, a user may order a customized pizza, piece of furniture, flower arrangement, or the like. Users can digitally build items consisting of multiple items from multiple merchants and have the item 3D printed at a 3D printing station.

Figure 3:
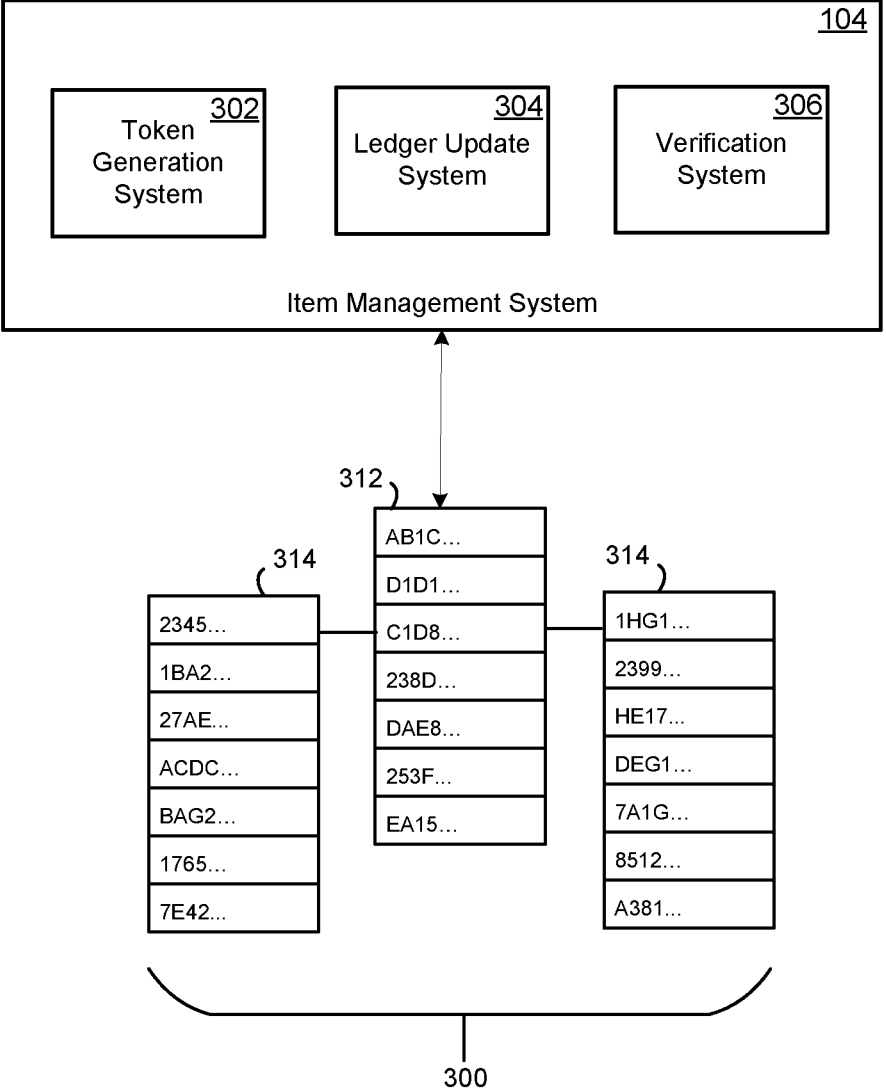
FIG. 3 is a schematic illustrating an example ledger management system according to some embodiments of the present disclosure.

FIG. 3 illustrates an example of a ledger management system 104 of the tokenization platform 100 that manages one or more distributed ledgers 210 in accordance with some implementations of the present disclosure. In embodiments, the ledger management system 104 includes a token generation system 302, a ledger update system 304, and a verification system 306. The token generation system 302 may be configured to generate tokens that correspond to items made available for transaction and that are based on respective virtual representations of the items. The ledger update system 304 receives requests to update the distributed ledger 310 and updates the distributed ledger accordingly 310. The verification system 306 receives requests to verify a token, an account, or the like and attempts to verify the token or account based on the distributed ledger.

In embodiments, the distributed ledger 310 may be a public ledger, such that N node computing devices 160 store N respective copies of the ledger 310, where each copy includes at least a portion of the distributed ledger 310. In other embodiments, the distributed ledger 310 is a private ledger, where the ledger is distributed amongst nodes under control of the platform 100. In embodiments, the distributed ledger 310 is a blockchain (e.g., an Ethereum blockchain comporting to the ETC protocol). Alternatively, the distributed ledger 310 may comport to other suitable protocols (e.g., Hashgraph, Byteball, Nano-Block Lattice, or IOTA). By storing tokens on a distributed ledger 310, the status of that token can be verified at any time by querying the ledger and trust that it is correct. By using the token approach to implementation, tokens cannot be copied and redeemed without permission.

The distributed ledger 310 may store any suitable data relating to an item, a user, a seller, and the like. In embodiments, the distributed ledger 310 may store item-related data. Item-related data may include, but is not limited to, item identifiers, expiration dates of items, conditions or restrictions placed on the items, item descriptions, media content related to items (e.g., photographs, logos, videos, and the like), documentation of the item, customization options, available sizes, available colors, available materials, functionality options, ingredients, prices, special offers or discounts relating to the item, location information (e.g., where an item can be delivered/provided), hours available, owner/custodian data, reviews, item type, and the like. In embodiments, the distributed ledger 310 may store user data. User data may include, but is not limited to, identifying information (e.g., user ID, email address, name, and the like), public address, financial information (e.g., credit card information), transaction history, location data (e.g., a region of the user or country of the user), preferences, a wish list, subscriptions of the user, items belonging to the user, user connections or contacts, media content relating to the user (e.g., photos or videos of the user), an avatar of the user, and the like. In embodiments, the distributed ledger 310 may store merchant-related data. Merchant-related data may include, but is not limited to, identifying information (e.g., a name of the merchant, a merchant ID, and/or the like), contact information of the merchant, experience data, location data, hours available, reviews, media content (photographs, videos, and the like), and/or any other suitable merchant-related data. A distributed ledger 310 may store additional and/or alternative data.

In embodiments, the distributed ledger 310 includes side chains 314. A side chain 314 may refer to a shard of the distributed ledger 310 that extends from a segment (e.g., a block) of a main chain 312 of the ledger 310. In embodiments, the main chain 312 may store data that is related to merchants and users with accounts (e.g., public addresses). Additionally, or alternatively, the main chain 312 may store item classification data, such as descriptions of item classifications. In embodiments, a side chain 314 may pertain to a particular classification of item. In some of these embodiments, side chains 314 may store virtual representations of items belonging to a respective genus or class of items and data relating to those items. For example, a first side chain 314-1 may store virtual representations of shoes that are available on the platform 100 and any token-related data relating to those virtual representations. In embodiments, side chains 314 may store media contents that are used in connection with items available for transaction on the platform. For example, a second side chain 314-2 may store photographs depicting shoes represented in the first side chain 314-1, video clips depicting shoes represented in the first side chain 314-1, audio clips relating to shoes represented in the first side chain 314-1, virtual reality content depicting shoes represented in the first side chain 314-1, augmented reality content depicting shoes represented in the first side chain 314-1, and the like. The foregoing is one manner to shard a distributed ledger. The distributed ledger 310 may be sharded in any other suitable manner.

In embodiments, the token generation system 302 receives a virtual representation and generates one or more tokens corresponding to the virtual representation. In embodiments, the virtual representation includes attributes of an item, including a number (if bounded) of available items (i.e., the number of items available for transaction). In embodiments, the number of available items indicates the number of tokens that the token generation system 302 generates for a particular virtual representation. The attributes may also include other restrictions relating to the item, such as an expiry of a token (e.g., how long a token may be valid). The token generation system 302 may also receive initial ownership data. The initial ownership data defines the initial owner of a token. As a default, the entity offering the item represented by the virtual representation (e.g., the merchant of the item) is the initial owner of the token. The initial ownership may, however, be assigned to a different entity.

In embodiments, the token is a wrapper that wraps an instance of a virtual representation. In some of these embodiments, the token generation system 302 may generate a token identifier that identifies the token. In scenarios where the tokens are non-fungible tokens, the token generation system 302 may generate a unique identifier for each respective token corresponding to the virtual representation. The token generation system 302 may generate the token identifier using any suitable technique. For example, the token generation system 302 may implement random number genesis, case genesis, simple genesis, and/or token bridge genesis to generate a value that identifies the token. In embodiments, the token generation system 302 may digitally sign the value using a private key/public key pair. The token generation system 302 may utilize a private key/public key pair associated with the platform 100 or the merchant to digitally sign the value that identifies the token. The token generation system 302 may implement any suitable digital signature algorithm to digitally sign the value that identifies the token, such as the Digital Signature Algorithm (DSA), developed by the National Institute of Standards and Technology. In embodiments, the resultant digital signature may be used as the token identifier. For each token, the token generation system 302 may generate a token wrapper that includes the token identifier and the virtual representation of the item. In embodiments, the token generation system 302 may embed or otherwise encode the public key used to digitally sign the token in the token. Alternatively, the token generation system 302 may store the public key apart from the token, such that the public key is communicated to an account of the token owner each time the token is transferred to a new owner. Upon generating a non-fungible token, the token generation system 302 may output the non-fungible token to the ledger update system 304. The wrapper may wrap a plurality of tokens, including fungible tokens and non-fungible tokens.

In some embodiments, the token generation system 302 may generate fungible tokens. In these embodiments, the token generation system 302 may generate identical tokens, where each token has the same token identifier. In these embodiments, the token generation system 302 may generate a single token identifier, in the manner described above, and may generate N fungible tokens using that token identifier, where N is the number of total tokens. Upon generating the N fungible tokens, the token generation system 302 may output the N fungible tokens to the ledger update system 304.

In embodiments, the ledger update system 304 is configured to update and maintain one or more distributed ledgers

310. As used herein, updating and maintaining a distributed ledger 310 may refer to the writing of data to the distributed ledger 310. In embodiments, the ledger update system 304 may generate a block in accordance with the protocol to which the distributed ledger comports, where the block contains the data to be written to the distributed ledger 310. In embodiments, the ledger update system 304 may update the distributed ledger 310 by broadcasting the generated block to the computing nodes 160 that store the distributed ledger 310. The manner by which a computing node 160 determines whether to amend the received block to its local copy of the distributed ledger 310 may be defined by the protocol to which the distributed ledger comports.

In embodiments, the ledger update system 304 receives tokens and updates the distributed ledgers 310 based thereon. In some of these embodiments, the ledger update system 304 receives a token and ownership data (e.g., a public address of the entity to which the token is to be assigned) and updates the distributed ledger 310 based thereon. For example, the ledger update system 304 may generate a block having the token embedded therein. The generated block or a subsequently generated block may include the ownership data pertaining to the token. The ledger update system 304 may then write generated block(s) to the distributed ledger 310. For example, the ledger update system 304 may amend the block(s) to a copy of the distributed ledger 310 maintained at the platform 100 and/or may broadcast the block(s) to the computing nodes 160 that store copies of the distributed ledger 310, which in turn amend the respective copies of the distributed ledger with the broadcast block(s). In embodiments where the distributed ledger 310 is sharded, the ledger update system 304 may designate a side chain 314 (e.g., an item classification) to which the token corresponds. In these embodiments, the generated blocks are amended to the designated side chain 314 to indicate the existence of the token and the current ownership of the token.

In embodiments, the ledger update system 304 receives an ownership change request requesting to change ownership of a token to another account. For example, the ledger update system 304 may receive an ownership change request in response to a purchase of a token, a gifting of a token, a resale of the token, a trade of a token, and the like. In some embodiments, the ownership change request may define a token to be transferred and a public address of the transferee of the token (e.g., a recipient of the token). In some embodiments, the ownership change request may further include a public address of the current owner of the token (assuming the token has a current owner). The ledger update system 304 may receive the ownership change request and may generate a block to indicate the new owner of the implicated token. The ledger update system 304 may then write generated block(s) to the distributed ledger 310. For example, the ledger update system 304 may amend the block(s) to the distributed ledger 310 and/or may broadcast the block(s) to the computing nodes 160 that store the distributed ledger 310. In embodiments where the distributed ledger 310 is sharded, the ledger update system 304 may designate a side chain 314 (e.g., an item classification) to which the token corresponds. In these embodiments, the generated blocks are amended to the designated side chain 314 to indicate the new owner of the token.

In embodiments, the ledger update system 304 receives a new or altered virtual representation and updates the distributed ledger 310 to reflect the new or altered virtual representation. For example, the ledger update system 304 may receive a new visual representation when a seller defines a new item that is available for transaction. The ledger update system 304 may receive an altered virtual representation in response to a seller altering one or more attributes of a previously defined virtual representation. In embodiments, the ledger update system 304 receives a new or altered virtual representation and generates one or more blocks based on the received virtual representation. The ledger update system 304 may then write the generated block(s) to the distributed ledger 310 based on the generated block(s). For example, the ledger update system 304 may amend the block(s) to the distributed ledger and/or may broadcast the block(s) to the computing nodes 160 that store the distributed ledger. In embodiments where the distributed ledger 310 is sharded, media content pertaining to a virtual representation may be stored in a separate side chain 314. In some of these embodiments, the media contents may be stored in separate blocks from the virtual representation, where the block containing the virtual representation may include references to the blocks containing the corresponding media contents. The ledger update system 304 may designate a side chain 314 (e.g., an item classification) to which the virtual representation corresponds and a side chain 314 to which the media content block(s) should be corresponds. In these embodiments, the generated blocks are amended to the respective designated side chains 314 to indicate the new or amended virtual representation. The ledger update system 304 may then write generated block(s) to the distributed ledger 310. For example, the ledger update system 304 may amend the block(s) to the distributed ledger 310 and/or may broadcast the block(s) to the computing nodes 160 that store the distributed ledger 310. In embodiments where the distributed ledger 310 is sharded, the ledger update system 304 may designate a side chain 314 (e.g., an item classification) to which the burned token corresponds. In these embodiments, the generated blocks are amended to the designated side chain 314 to indicate the new and/or amended virtual representation(s).

In embodiments, the ledger update system 304 is further configured to "burn" tokens. Burning tokens may refer to the mechanism by which a token is deemed no longer redeemable. A token may be burned when the token expires or when the token is redeemed. In embodiments, the ledger update system 304 may update the ownership of the token to indicate that the token is not currently owned (e.g., owner=NULL) and/or may update the token state to indicate that the token is no longer valid. In some of these embodiments, the ledger update system 304 may generate a block indicating that the token is not currently owned or that the state of the token is not valid. The ledger update system 304 may then write generated block(s) to the distributed ledger 310. For example, the ledger update system 304 may amend the block(s) to the distributed ledger 310 and/or may broadcast the block(s) to the computing nodes 160 that store the distributed ledger 310. In some embodiments, the distributed ledger 310 is sharded. In these embodiments, the ledger update system 304 may designate a side chain 314 (e.g., an item classification) to which the token corresponds. In these embodiments, the generated blocks are amended to the designated side chain 314 to indicate the burned token.

The ledger update system 304 may update the distributed ledger 310 to indicate other data as well. In embodiments, the leger update system 304 may maintain and update merchant data and/or user data on the distributed ledger 310. For example, the ledger update system 304 may maintain a public address list of valid accounts. The ledger update system 304 may update the cryptographic ledger to reflect new accounts that are added to the platform 310 with the public addresses of those accounts. The ledger update system 304 may store additional or alternative merchant and user data on the distributed ledger as well.

In embodiments, the verification system 306 verifies data stored on the distributed ledger 310. In embodiments, the verification system 306 may verify the validity of tokens and/or may verify the ownership of a token. The verification system 306 may be configured to validate other types of data stored on the distributed ledger 310 as well.

In embodiments, the verification system 306 receives a token verification request. The token verification request may include a token to be verified or a token identifier thereof. In these embodiments, the verification system 306 may determine whether the token identifier of the token to be verified is stored on the distributed ledger 310. If it is not stored on the distributed ledger 310, the verification system 306 may deem the token to be invalid. In some embodiments, the token verification request may further include a public key to be used to verify the token. In these embodiments, the verification module 306 may use the received public key to determine whether the public key corresponds to a token that is stored in the distributed ledger 310. In some of these embodiments, the verification system 306 use the received public key and the private key used to encode the digital signature to determine whether the received public key is the public key used to sign the token. For example, in embodiments, the verification system 306 may attempt to decrypt the digital signature using the private key and the received public key. If the private key and the received public key enable decryption of the digital signature to obtain the value used to generate the token, then the verification system 306 may deem the token valid and may notify the requesting system of the verification.

In embodiments, the verification system 306 may be configured to verify the ownership of a token. In these embodiments, the verification system 306 may receive a public address to be verified and a token (or an identifier thereof). In some embodiments, the verification system 306 may verify that the public address corresponds to an account on the platform 100. For example, the verification system 306 may determine whether the public address is stored in the public address list on the distributed ledger 310. If so, the verification system 306 may determine whether the ownership data relating to the token is currently owned by the account indicated by the received public address. If so, the verification system 306 may verify the ownership of the token and may output the verification to the requesting system.

Figure 4:
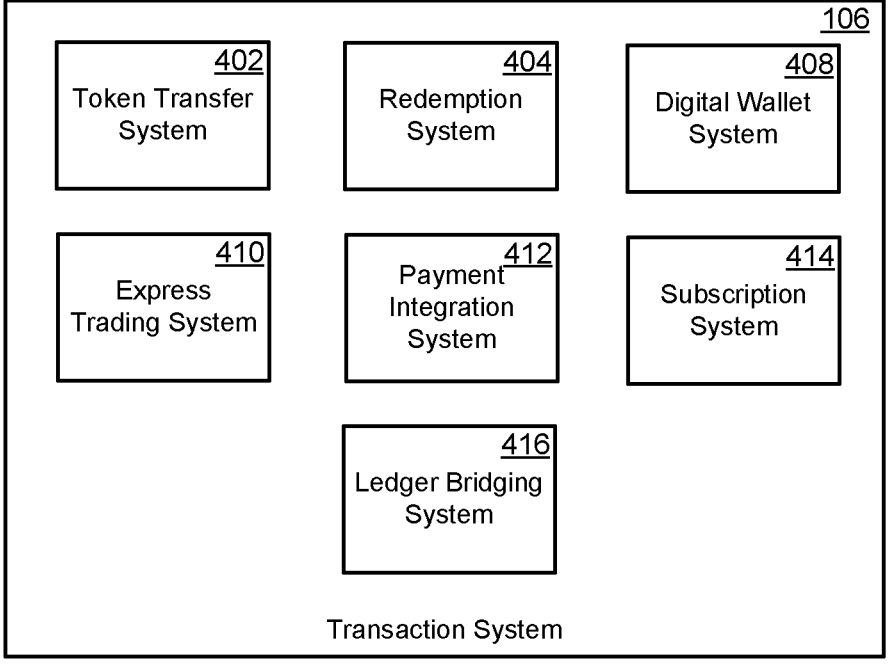
FIG. 4 is a schematic illustrating an example transactions system according to some embodiments of the present disclosure.

FIG. 4 illustrates an example of a transaction system 106 of the tokenization platform 100, according to some embodiments of the present disclosure. In some embodiments, the transaction system 106 include a token transfer system 402 and a redemption system 404. The transaction system 106 may include additional or alternative systems without departing from the scope of the disclosure. For example, the transaction system 106 may include a digital wallet system 408, an express trading system 410, a payment integration system 412, a subscription system 414, and/or a token bridging system 416.

In embodiments, the token transfer system 402 facilitates the transfer of tokens from an account of an owner of the token an account of a different user. In embodiments, token transfer system 402 may include smart contracts that define the conditions under which a token may be transferred. In some of these embodiments, smart contracts may reside in tokens, such that the smart contract may execute at a node computing device and/or from a digital wallet. In some of these embodiments, a smart contract may interface with the token transfer system 402 via a smart contract API that is exposed by the API system 108.

In embodiments, the token transfer system 402 receives a transfer request that requests a transfer of a token to an account. A transfer request may be received from an account of the token holder or from the account of the intended recipient of the token. In embodiments, the transfer request may include a public address of the account to which the token is to be transferred and may further include or indicate the token to be transferred. For example, the transfer request may include a copy of the token or a value (e.g., an alphanumeric string) that uniquely identifies the token. In some embodiments, the transfer request includes a public key of the entity that digitally signed the token. In some embodiments, the transfer request may include a public address of the token owner that is requesting to transfer the token.

The token holder may initiate the transfer of a token from the digital wallet of the token holder. In some embodiments, transfers of tokens may be performed via the platform 100. In these embodiments, the token owner may initiate a transfer of the token by instructing the digital wallet to send a transfer request to the token transfer system 402 (e.g., via a GUI of the digital wallet). In these embodiments, the token transfer system 402 may receive the transfer request and may determine whether the token is a valid token, and whether the public address of the owner and/or the recipient are valid. If the token is valid and the public addresses of the owner and/or the recipient are valid, the token transfer system 402 may transmit a copy of the token to a user device and/or account associated with the intended recipient. Once accepted by the recipient, the token transfer system 402 may instruct the ledger management system 104 to update the distributed ledger to indicate the change of ownership of the token, such that the distributed ledger indicates that the recipient is the current owner of the token.

Figure 7:
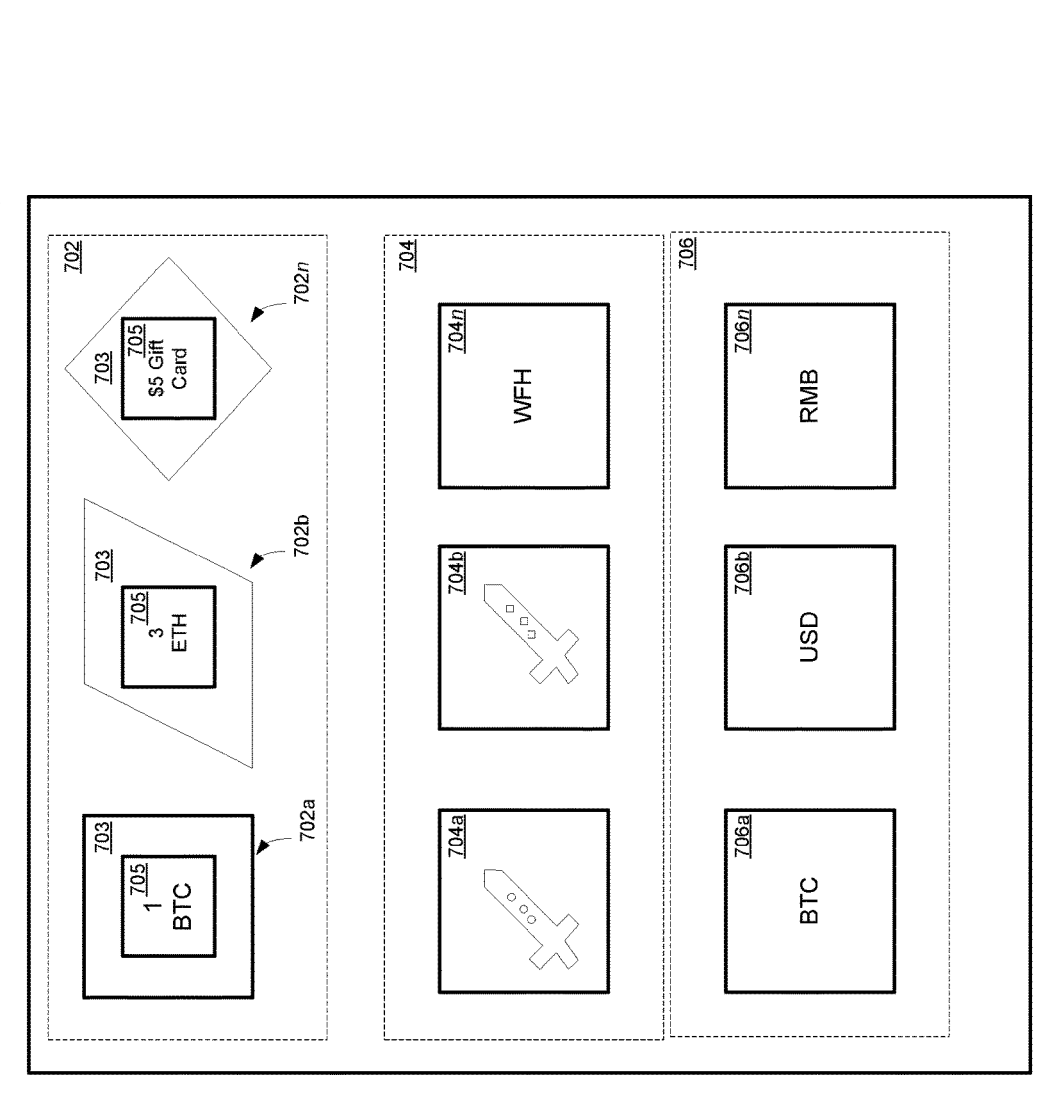
FIG. 7 is a user interface displaying tokens within a wallet, according to some embodiments of the present disclosure.

Referring now to FIG. 7A, an illustration of a wallet 700 display is shown. The display of the wallet 700 includes a plurality of tokens, such as tokenized tokens 702a-702n (generally 702), non-fungible tokens 704a-704n (generally 704), and fungible tokens 706a-706n (generally 706). As can be seen, in embodiments, the tokens are grouped by token type. The tokenized tokens 702 may include displayed indicia 703 communicating the type and, in embodiments, the amount of particular contents 705 contained within the respective tokenized token 702. For example, the user's Bitcoin within the platform 100 may split among a fungible token 706a balance and one or more tokenized tokens 702a. Moreover, the fungible Bitcoin 706a may be a consolidated balance of the user's fungible bitcoin 706a, or may be separate balances (e.g., balance equal to amount of bitcoin transferred into the platform 100 in a single transaction).

The non-fungible tokens 704 may include display indicia to communicate pertinent information related to the token. For example, a plurality of purchasable skins 704a, 704b and work-for-hire 704 may be grouped together, and each may display indicia such as an image of the good. The fungible tokens 706a-706n are tokens corresponding with fungible goods. For example, the fungible tokens 706a-706n may include currencies, cryptocurrencies, commodities, etc.

In embodiments, the digital wallet is configured to transmit the token directly to a user device 190 or account (e.g., an email account, an account on a 3rd party messaging app), whereby the recipient of the token may accept the token. In some of these embodiments, the digital wallet of the recipient may transmit a transfer request to the token transfer system 402 indicating a request to transfer the token to the recipient, in addition to sending a copy of the token to the intended recipient. In these embodiments, the token transfer system 402 may determine whether the token is a valid token and whether the public address of the owner and/or the recipient are valid. If the token is valid and the public addresses of the owner and/or the recipient are valid, the token transfer system 402 may allow the recipient to accept the token into a respective digital wallet of the recipient. Once accepted by the recipient, the token transfer system 402 may instruct the ledger management system 104 to update the distributed ledger to indicate the change of ownership of the token, such that the distributed ledger 310 indicates that the recipient is the current owner of the token.

Alternatively, in some embodiments, the digital wallet of the token owner does not transmit a transfer request to the token transfer system 402. In these embodiments, the user device 190 of the recipient of a token may present a mechanism by which the token owner may accept the token. For example, the user device 190 may present a link to accept the token. Upon the intended recipient accepting the token, the user device 190 (e.g., via an instance of the digital wallet of the recipient) may transmit the transfer request to the token transfer system 402. In this scenario, the token transfer system 402 may determine whether the token is a valid token and whether the public address of the owner and/or the recipient are valid. If the token is valid and the public address of the owner and/or the recipient are valid, the token transfer system 402 may instruct the ledger management system 104 to update the distributed ledger to indicate the change of ownership of the token, such that the distributed ledger indicates that the recipient is the current owner of the token.

As discussed, in response to a transfer request, the token transfer system 402 may determine whether the token is a valid token and whether the public address of the owner and/or the recipient are valid. In embodiments, a token may be validated using a public key associated with the token. For example, the token transfer system 402 may provide the token (or an indicator thereof) and a public key indicated in the transfer request to the ledger management system 104. The ledger management system 104 may determine whether the token identifier is stored on the distributed ledger, and if so, may verify that the public key provided with the transfer request is the public key that was used to digitally sign the token. In embodiments, the token transfer system 402 may validate the identities of the recipient and/or the token owner wishing to transfer the token using the public addresses thereof. In some of these embodiments, the token transfer system 402 may provide the public address of the recipient and/or the public address of the token owner to the ledger management system 104, which may in turn look up the respective public address to verify that the public address is stored on the distributed ledger. In response to determining that the token is valid and the public addresses of the token owner and/or the recipient are valid, the token transfer system 402 may allow the transfer of the token and may instruct the ledger management system 104 to update the distributed ledger to indicate the change of ownership of the token, such that the distributed ledger indicates that the recipient is the current owner of the token.

In embodiments, the redemption system 404 allows an owner of a token to redeem the token. The redemption system 404 may receive a request to redeem (or "redemption request") the token. The redemption request may include the token or an identifier of the token (e.g., an alphanumeric string) and may include a public address of the user attempting to redeem the token. In embodiments, the redemption request may further include the public key used to digitally sign the token. In response to receiving the redemption request, the redemption system 404 may provide the token, the public address of the user attempting to redeem the token, and the public key used to digitally sign the token to the ledger management system 104. The ledger management system 104 may then either verify or deny the token/public address combination. The ledger management system 104 may deny the combination if the token is not a valid token and/or the user is not the listed owner of the token. The ledger management system 104 may verify the token/public address combination if the token is deemed valid and the requesting user is deemed to be the owner of the token.

In response to verifying the token/public address combination, the redemption system 206 may execute a workflow corresponding to the virtual representation to which the redeemed token corresponds. For example, in some scenarios, the user may be redeeming a token corresponding to a digital item (e.g., a gift card, an mp3, a movie, a digital photograph). In these scenarios, the redemption system 404 may determine a workflow for satisfying the digital item. For example, the redemption system 404 may request an email address from the user or may look up an email address of the user from the distributed ledger. In this example, the redemption system 404 may email a link to download the digital item to the user's email account or may attach a copy of the digital item in an email that is sent to the user's email account. In another scenario, the user may be redeeming a token corresponding to a physical good (e.g., clothing, food, electronics, etc.) or a physical service (e.g., maid service). In the case of a physical good, the redemption system 404 may determine a workflow for satisfying the physical item. For example, the redemption system 404 may present a GUI to the user that allows the user to enter shipping information of the user. Alternatively, the redemption system 404 may look up the shipping information of the user from, for example, the distributed ledger or a user database. The redemption system 404 may then initiate shipment of the physical good. For example, the redemption system 404 (or a logistics system) may transmit a shipping request to a warehouse that handles shipments of the good indicating the shipping information. The foregoing are examples of how a token may be redeemed.

The redemption system 404 may execute additional or alternative workflows to handle redemption of a token. For example, in some scenarios the initial purchaser of the token may not have specified certain parameters of an item that are needed to satisfy the transaction. For example, if the item is clothing, the initial purchaser may not have specified the size and/or color of the item. In another example, if the item is a food item, the initial purchaser may not have specified side orders, toppings, drink choices, or the like. If the item is an experience such as plane tickets or a hotel reservation, the initial purchaser may not have specified dates of travel. In these scenarios, the redemption system 404 may present a GUI that allows the redeemer of the token to specify the needed parameters, so that the transaction may be specified. In response to receiving the parameters, the redemption system 404 may ascribe these parameters to the instance of the virtual representation or to any other suitable data structure corresponding to the satisfaction of the transaction (e.g., a delivery order, a purchase order, etc.), such that the transaction may be satisfied.

In embodiments, the transaction system 106 includes a digital wallet system 408 that supports digital wallets. A digital wallet may be tokens that are owned by an owner of the account associated with the digital wallet and may provide a graphical user interface that allows the user to view, redeem, trade, transfer, gift, deposit, withdraw, or otherwise transact with their tokens. In embodiments, the digital wallet system 408 provides an instant sell capability, where users can agree to sell tokens corresponding to items. For example, the instant sell capability may allow a user to sell items at the rate of 90% of the floor price. In some embodiments, other users may view some or all of the virtual representation instances owned by the account owner, in accordance with the user's privacy settings. Users may opt to hide or make private individual virtual representations or all virtual representations.

In some embodiments, the platform 100 and/or digital wallet of a user may provide visual indicia that may be associated with the token when being transferred to another person. For example, the visual indicia that may be associated with a token may include emojis, images, gifs, videos, and the like. These visual indicia may be used by the user when transmitting a token to another user. For example, if the token corresponds to a bouquet of flowers and the visual indicia is an emoji of a flower, the user may send the token in a message using the flower emoji. In this example, the user may access the token in the digital wallet (e.g., via a native application on a user device 190) and may select an option to send the token to a recipient. The user may identify the recipient (e.g., selecting from a list of contacts) and may be provided an opportunity to type a message. The client application (e.g., the digital wallet) may present a keyboard that includes the flower emoji, whereby the flower emoji represents the token. In response to the user selection of the flower emoji and subsequent "sending" of the token, the digital wallet application may initiate transmission of the message that includes the token/flower emoji. In this example, the digital wallet may also transmit a transfer request to the token transfer system 402 indicating that the transferring user has requested to transfer the token. The transfer request may include a copy of the token and a public address of the transferring user. In embodiments, the transfer request may further include a public address or other indicator (e.g., an email address, a phone number, a user id, or the like) of the intended recipient of the token.

In embodiments, the transaction system 106 includes an express trading system 410 in which users may trade one or more assets without exchanging money. In these embodiments, the express trading system 410 provides a mechanism by which users can safely trade tokens, where each token represents a different item. In an example operation, a first user may make a trade offer in a smart contract to a second user to exchange one or more tokens for one or more tokens in return. The second user may accept by transferring the requested virtual asset. The smart contract then marks the transaction as completed. In embodiments, the express trade system 410 may provide a GUI that allows a user to view an inventory of tokens, create offers, accept offers, and/or cancel offers.

In embodiments, the transaction system 106 includes a payment integration system 412. The payment integration system 412 allows a user to purchase a token corresponding to an item. The payment integration system 412 may accept credit cards, different forms of currency, and/or cryptocurrency.

In some embodiments, the transaction system 106 includes a subscription system 414. In these embodiments, users can subscribe to a service to receive items that they consume regularly via the subscription system 414.

In embodiments, the transaction system 106 includes a ledger bridging system 416. The ledger bridging system 416 provides a framework to secure or lock down an original virtual asset in a first decentralized ledger system (or any holder of currency, including traditional banks) and creating a tradeable duplicate in a second decentralized ledger system. In this way, users may fund their accounts on the tokenization platform 100 with different currencies and different transfer vehicles, and may then engage in transactions (e.g., trade, gift, or redeem) using the different currencies. In some embodiments, the decentralized ledger bridging system 416 provides an escrow function across decentralized ledger systems (e.g., ledger systems that are separate and apart from the distributed ledgers 310 of the platform 100). In embodiments, the ledger bridging system 416 or a digital wallet may provide a token deposit GUI and/or a token withdrawal GUI.

In embodiments, the ledger bridging system 416 allows a user to fund their account with one or more external currencies. For example, a user may fund an account with Bitcoin, Ethereum coins, other suitable cryptocurrencies, and/or traditional currencies (e.g., U.S. Dollars, British Pounds, Euros, Chinese Yuan, Japanese Yen, and/or the like). In the case of cryptocurrencies, a user may facilitate a transfer of cryptocurrency from an external account, for example, using a non-affiliated digital wallet that stores the user's cryptocurrency. In the case of traditional currencies, a user may transfer funds into his or her account using, for example, a credit card, a direct money transfer, an ACH transfer, or the like. In some embodiments, when the user transfers funds (cryptocurrency or traditional currency) into an account with the tokenization platform 110 (which may be referred to as a "funding transaction"), the ledger bridging system 416 may generate a record corresponding to the funding transaction and may provide the record to the ledger management system 104, which may update the distributed ledger to reflect the funding transaction. The record may indicate the account to which the funds were transferred, the account from which the funds were transferred, an amount that was transferred, a date and time of the transfer, and/or any other suitable data.

Once an account is funded, a user can then use the transferred funds to participate in any transaction on the tokenization platform 100. In some embodiments, at least a subset of the transferred funds is tokenized in a manner that comports with the protocol supported by the tokenization platform 100 and/or the distributed ledger 312 corresponding thereto. In embodiments, the ledger bridging system 416 may tokenize one or more crypto coins (e.g., a bitcoin), any fraction of crypto coins, or any amount of currency in response to a request corresponding to the user. The request to tokenize funds may be an explicit request or an implicit request. An explicit request may refer to when the user specifically requests the tokenization of a certain amount of currency. An implicit request may refer to when the user engages in a transaction on the tokenization platform 100 that implicates the transferred funds in the user's account, such that at least a portion of those funds need to be tokenized to facilitate the transaction (e.g., the user purchases an item and elects to pay for the item using some of the transferred funds in the user's account. Regardless of whether the request is implicit or explicit, the ledger bridging system 416 may tokenize the certain amount of currency.

In some of these embodiments, the ledger bridging system 416 tokenizes a specified amount of currency by minting a tokenized token that "wraps" the certain amount of currency. A tokenized token may refer to a non-fungible token that has attributes that define the type of currency and an amount of currency represented by the coin (e.g., an amount of bitcoin, Ethereum, dollars, pounds, or the like). In some of these embodiments, a tokenized token may refer to a non-fungible token that has a set of attributes defining characteristics of such token in addition to having a set of fungible and/or non-fungible tokens representing digital currency balance(s) enclosed within a tokenized token and/or other digital item (s). In addition, tokenized token can contain business rules governing redemption, transfer and other tokenized token lifecycle mechanisms. In some embodiments, the ledger bridging system 416 mints the new token by requesting the generation of a new token by the token generation system 302. The ledger bridging system 416 may provide the type of currency, the amount of currency, and ownership data (e.g., the account to which the new tokenized token will belong) to the token generation system 302. In response, the token generation system 302 generates a tokenized token, for example, in the manner described above. In this way, the token generation system 302 treats the currency as an "item." In this way, a tokenized token may be exchanged (e.g., for other tokenized tokens or tokenized items), gifted, and/or redeemed. In some embodiments, the types of transactions that a tokenized token may participate in may be restricted. For example, tokenized tokens representing unstable currencies may be restricted from being exchanged but may be redeemed or gifted.

In embodiments, the ledger bridging system 416 further generates a visual indicium corresponding to the tokenized token as part of the minting process. In some embodiments, the visual indicia is a digital sticker (or "sticker"). For example, in some embodiments, the sticker may depict an amount and a symbol representing the currency (e.g., a sticker representing a tokenization of five dollars may depict "$5", or a sticker representing a tokenization of a tenth of a bitcoin may depict "5"). In this way, the sticker may be displayed in a wallet of an owner of the tokenized token. As discussed, the visual indicia may be used to convey to a user the tokenized tokens that the user owns. Additionally, in some embodiments, the visual indicia may be used to transfer tokenized tokens to other parties (e.g., via text message, messaging applications, email, and the like), as is described elsewhere in the disclosure.

In some embodiments, the ledger bridging system 416 may instantiate (or request the instantiation of) a smart contract corresponding to the tokenized token as part of the minting process. In these embodiments, the smart contract may define one or more base functionalities that govern the tokenized token lifecycle mechanisms such as ownership transfer and/or redemption logic. The base functionalities may include the ability to change ownership of the tokenized token, the types of transactions in which the tokenized token may be used (e.g., to make purchases, to gift, to exchange, to redeem for cash, etc.), and the like. Upon a new tokenized token being minted, the ledger bridging system 416 may instantiate an instance of the smart contract corresponding to the newly minted tokenized token. The instance of the smart contract may execute each time the tokenized token is involved in a transfer (e.g., exchanged, gifted, or redeemed). For example, each time an owner of the tokenized token requests to transfer the tokenized token, the instance of the smart contract may be implicated by the request and the instance of the smart contract can either disallow or facilitate the transfer depending on the contents of the request and the smart contract.

Once a tokenized token is minted, the funds represented by the tokenized token may be "escrowed" by the ledger bridging system 416. In this way, the user is prevented from removing funds from his or her account until the tokenized token is redeemed. In some embodiments, the ledger bridging system 416 may transfer the funds corresponding to the tokenized token from the account of the user to a designated escrow account. Alternatively, the ledger bridging system 416 may freeze the funds corresponding to the tokenized token, such that the funds may not be transferred by the user until the tokenized token is redeemed. Once a tokenized token is redeemed, the funds represented by the tokenized token may be released from escrow, deposited into the account of the redeeming user, and the tokenized token may be destroyed (also referred to as being "invalidated").

In embodiments, the ledger bridging system 416 updates, or initiates the update of, the distributed ledger. The distributed ledger may be updated upon a number of different occurrences. As discussed, in embodiments, the distributed ledger may be updated when a user initially funds an account. In embodiments, the ledger bridging system 416 updates (or initiate the update of) the distributed ledger upon a new tokenized token being minted. In these embodiments, the distributed ledger is updated to reflect the existence of the new tokenized token and the ownership of the token. In embodiments, the ledger bridging system 416 updates (or initiate the update of) the distribute ledger with the instance of the smart contract corresponding to the tokenized token. In embodiments, the ledger bridging system 416 may update (or initiate the update of) the distributed ledger each time a tokenized token is transferred. In these embodiments, the distributed ledger may be updated to reflect the new owner of the tokenized token. In embodiments, the ledger bridging system 416 may update (or initiate the update of) the distributed ledger when a tokenized token when the token is redeemed and subsequently destroyed. In these embodiments, the distributed ledger may be updated to reflect that the tokenized token is no longer valid, the account that redeemed the token, and/or when the token was redeemed.

Figure 5:
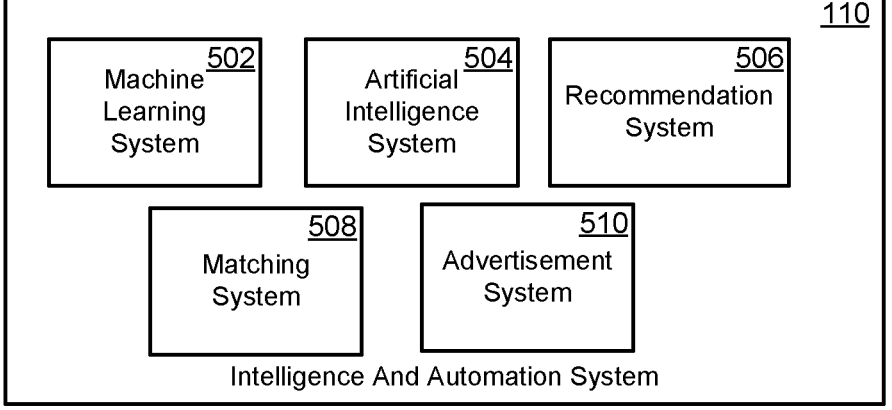
FIG. 5 is a schematic illustrating an example intelligence and automation system according to some embodiments of the present disclosure.

FIG. 5 illustrates the intelligence and automation system 110 according to some embodiments of the present disclosure. In embodiments, the platform includes an intelligence and automation system 110. The intelligence and automation system 110 may include a machine learning system 502, an artificial intelligence system 504, a recommendation engine 506, a service matching engine 508, an advertising system 508, and/or a notification system 510.

In embodiments, the machine learning system 502 may train machine-learning models based on training data. Examples of machine learned may include various types of neural networks, regression-based models, hidden Markov models, scoring models, and the like. The machine learning system 502 may train models in a supervised, semi-supervised, or unsupervised manner. Training can be done using training data, which may be collected or generated for training purposes. The machine learned models may be stored in a model datastore.

In an example, the machine learning system 502 may be configured to train a gift prediction model. A gift prediction model (or prediction model) may be a model that receives recipient attributes (e.g., a profile relating to an intended recipient) and/or item attributes of one or more items that may be provided as a gift and that outputs one or more predictions regarding sending a gift token to that particular consumer. Examples of predictions may be whether to send a gift to that user, gifts the user would value, and the like. In embodiments, the machine learning system 502 trains a model based on training data. In embodiments, the machine learning system 502 may receive vectors containing user data (e.g., transaction history, preferences, wish list virtual assets, and the like), virtual asset data (e.g., price, color, fabric, and the like), and outcomes (e.g., redemption, exchanges, and the like). Each vector may correspond to a respective outcome and the attributes of the respective user and respective item. The machine learning system 502 takes in the vectors and generates predictive model based thereon.

In embodiments, the machine learning system 502 trains risk scoring models using training data sets that indicate the features of users participating in a transaction, features of the transaction (e.g., the type of transaction (e.g., purchase, loan, sale, etc.), the size of the transaction (e.g., a dollar amount), and the like), and an outcome of the transaction indicating whether the transaction was successful or unsuccessful (e.g., did the buyer pay for the item after purchase, did the borrower pay the loan off or default on the loan, was the purchased item delivered and in sufficient condition, etc.). The training data sets may be based on transactions facilitated by the platform and/or generated by an expert.

In embodiments, the machine learning system 502 may store the predictive models in a model datastore. In embodiments, the machine learning system 502 may be further configured to update a model based on captured outcomes, which is also referred to as "reinforcement learning." In embodiments, the machine learning system may receive a set of circumstances that led to a prediction (e.g., item attributes and user attributes) and an outcome related to the treatment (e.g., redemption of item, exchange of item, refund of an item), and may update the model according to the feedback. As used herein, the machine learning techniques that may be leveraged by the machine learning system include, but are not limited to, decision trees, K-nearest neighbor, linear regression, K-means clustering, deep learning neural networks, random forest, logistic regression, Naïve Bayes, learning vector quantization, support vector machines, linear discriminant analysis, boosting, principal component analysis, and hybrid approaches.

In embodiments, the artificial intelligence (AI) system 504 leverages the machine-learned models to make predictions or classifications regarding purchasing, gifting, or other e-commerce outcomes with respect to user data and asset data. Examples of predictions include whether a user will purchase an item, whether a user will exchange a gifted item, redemption options such as delivery timing and delivery location, and the like. For example, the AI system 504 may leverage a gift prediction model to make predictions as to whether a recipient of a particular item will like a gift, return a gift, or exchange a gift.

In embodiments, the recommendation system 506 may be configured to provide recommendations to users regarding items. The recommendation system 506 may request a recommendation from the AI system 504 based on attributes of a user. The AI system 504 may output a set of recommendations and the recommendation system 506 may provide the recommendations to the user or another party. For example, the recommendation system 506 may provide users with recommendations of items to purchase based on a purchase history of the user.

In embodiments, an advertising system 508 is configured to determine advertisements to display to a user, where the advertisements relate to items that are offered for transaction on the platform. In embodiments, the advertising system 508 may present users with discounts, promotions, and the like.

In embodiments, a services-matching system 510 is configured to match consumers to service providers for user-selected services. In these embodiments, a user may be seeking service, and the service matching system 510 may identify service providers that are best suited to provide the service. For example, the services matching system 510 may match service seekers and service providers based on pricing, availability, location, and the like.

Figure 6:
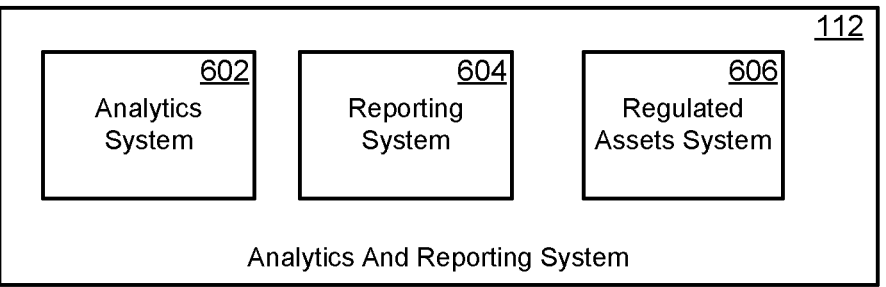
FIG. 6 is a schematic illustrating an example analytics and reporting system according to some embodiments of the present disclosure.

FIG. 6 illustrates the intelligence and automation system 110 according to some embodiments of the present disclosure. In embodiments, the analytics and reporting system 112 is configured to capture and report analytics relating to various aspects of the e-commerce platform 100. In embodiments, the analytics and reporting system 112 may include an analytics system 602, a reporting system 604, and/or a regulated asset system 606. In embodiments, the analytics and reporting system 112 may provide an analytics interface that allows a user to access the analytics and reporting system 112.

In embodiments, the analytics system 602 may track and analyze data relating to, but not limited to, consumer data, item data, merchant, manufacturer, or provider data; user behavior (e.g., purchase behavior, telemetric, and the like), and transaction events (e.g., when items are purchased, how items are purchased, how items are transferred, and the like).

In embodiments, the reporting system 604 reports analytics gained by the analytics system 602 to one or more parties. Interested parties may access the reporting system 604 and/or may subscribe to receive analytics reports. The reporting system 604 may be configured to generate reports based on the gathered analytics and to provide the reports to interested parties. In embodiments, a regulatory GUI may then allow regulators to access the platform 100. For example, a regulator may access the platform to track and monitor a regulated item, such as 3D printed firearms.

In embodiments, the analytics and reporting system 112 includes a regulated asset system 606. In embodiments, the regulated asset system 606 is configured to manage regulated items. For example, the regulated asset system 606 may manage access to weapons or firearms, pharmaceuticals, alcohol, tobacco products, food products, event/venue entry, airline tickets, and the like. In embodiments, the regulated asset system 606 may track and monitor transactions regarding regulated items and may notify certain regulatory agencies based on the transactions and a corresponding workflow. In a non-limiting example, a token could be used to track a 3D printed firearm, where the item that is purchased would be the model used to print the firearm.

Referring back to FIG. 1, in embodiments, the platform 100 includes a virtual world presence system 114 for representing tokenized physical world items within virtual world environments. In some embodiments, the virtual world environments may depict virtual world avatars. Virtual world avatars may represent a user (e.g., a potential buyer) and may interact with virtual items in a virtual world environment. Users may "shop" by controlling a virtual world avatar in a virtual world store. For example, a virtual world avatar may try on a virtual representation of a tokenized physical world hat in a virtual world dressing room. In some embodiments, the virtual world presence system may include a virtual reality system that provides a framework for displaying the virtual world environment. In embodiments, the virtual world presence system may also include a virtual asset display system that displays items related to a user, including but not limited to: items that are owned by the user, in the custody of the user, desired by the user, and the like. These items can be displayed publicly to other users or hidden from other users, individually or collectively. In some embodiments, the virtual asset display system may determine the set of tokens owned by a user to determine the items that are owned or possessed by a user.

In embodiments, the virtual world presence system 114 may include a content sharing system that allows sharing of content related to virtual assets to content platforms. The content sharing system enables users to share content related to virtual assets owned by a user or in custody of user or desired by user. Users may obtain additional information about a virtual asset or request to purchase, rent, borrow, trade, or the like. The shared content may include data from the virtual world presence system. For example, a user may share a video of the user's associated virtual world avatar eating a virtual pizza in a virtual pizza parlor.

Figure 8:
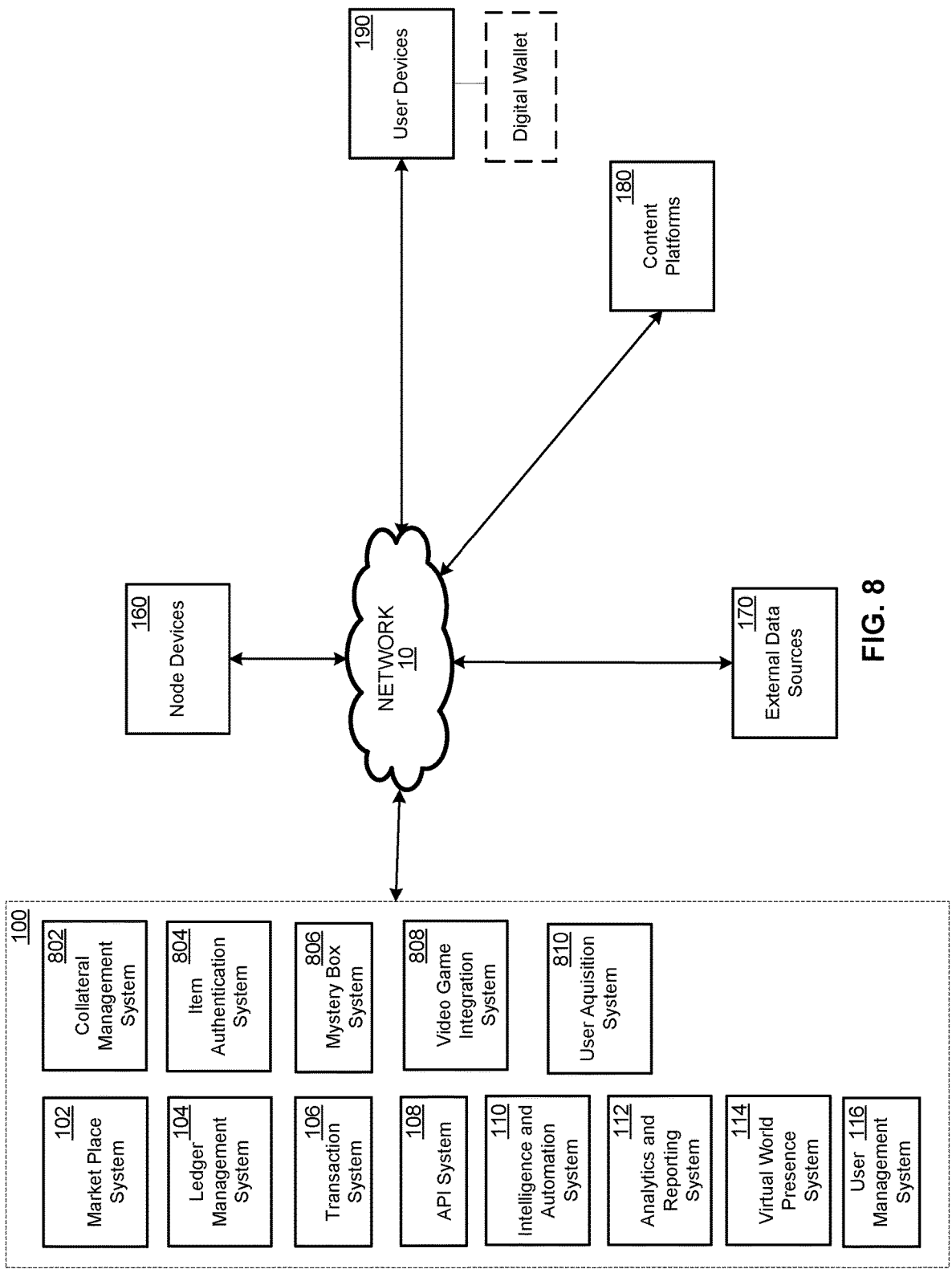
FIG. 8 is a schematic illustrating an example set of components of a tokenization platform according to some embodiments of the present disclosure.

Referring now to FIG. 8, the tokenization platform 100 may support a number of different applications and/or provide a number of different services. For example, the platform 100 may support collateralized lending applications, authentication services, "mystery box" applications, casino-gaming services, and video game streaming services.

In embodiments, the platform 100 includes a collateral management system 802. In embodiments, the collateral management system 802 allows a borrower to provide collateral and request a loan. In some of these embodiments, a user wishing to borrow money can take a collateral item (e.g., a collectible item, jewelry, a firearm, a precious metal, or the like) to a facility affiliated or otherwise supported by the platform 100. At the facility, an employee at the facility may inventory the collateral item using an interface provided by the collateral management system 802. Inventorying the collateral item may include requesting an item identifier for the collateral item, associating the item identifier collateral item with an account of the user (i.e., the owner of the collateral item), taking high resolution photographs of the collateral item, weighting the collateral item using a scale, entering a description of the collateral item, an appraisal of the collateral item, and the like. Once inventoried, the collateral management system 802 can create a virtual item representing the collateral item, and then may generate a non-fungible token corresponding to the virtual item (which may be referred to as a "collateral token"). For example, the collateral management system 802 may request the generation of the virtual item and the collateral token from the ledger management system 104. Upon the collateral token being generated, the ledger management system 104 may update the distributed ledger to reflect the new collateral token and the ownership of the collateral token by the borrower. The collateral token may then appear in a digital wallet of the borrower. In some embodiments, the collateral token may be represented by a visual indicium in the digital wallet. The collateral item corresponding to the collateral token may be stored at the facility until the collateral token is redeemed. Once redeemed, the redeeming user (the borrower or a transferee of the collateral token) may pick up the collateral item from the facility or the collateral item may be shipped to thereto.

In embodiments, the collateral management system 802 may allow a borrower to seek a loan using the collateral token. In embodiments, the collateral management system 802 may provide a marketplace (e.g., that is accessible via a graphical user interface) where the borrower can request a loan amount and offer the collateral token as collateral. Lenders (who have accounts with the tokenization platform 100) may then make loan offers to the borrower via the marketplace. In example embodiments, the loan offers may specify a loan amount, an interest rate, and a loan length. The loan offers may include additional conditions as well. For example, a loan offer may indicate whether the loan can be sold to another lender, and if so, a payoff amount to be paid to the original lender. The borrower may shop through the loan offers and may ultimately decide on a loan offer to accept.

Once the borrower accepts an offer, the collateral management system 802 may instantiate an instance of a loan smart contract that memorializes the term of the loan and may escrow the collateral token (e.g., no one can redeem the collateral token or transfer the collateral token without complying with the smart contract). In escrowing a collateral token, the collateral management system 802 (or the loan smart contract) may deposit the collateral token into an escrow account, such that no party in the transaction has ownership rights to the collateral token while it is in the escrow account. Such an action will lock the collateral token until the loan is paid off or the underlying item is liquidated. In embodiments, the loan smart contract may indicate the lender, the borrower, the locked collateral token (and an address thereof), the loan amount, a payment schedule, whether the loan is transferrable, when the loan is considered to be in default, ownership rights of the collateral token upon default, and the like. The ledger management system 104 may update the distributed ledger to reflect the loan smart contract.

Once the instance of the smart contract is instantiated, the borrower must commence repayment of the loan according to the loan schedule. It is appreciated that the loan schedule may require a single lump sum payment by a given time or may require multiple payments that are to be made at predetermined intervals. In embodiments, the borrower may make payments to the lender via his or her digital wallet. In these embodiments, the borrower may transfer funds from a bank, credit card, a digital wallet holding other currencies, or the like. The borrower may then transfer those funds to the lender via the digital wallet. In some embodiments, the ledger bridging system 416 facilitates the transfer of funds from the account of the borrower to an account of the lender.

In embodiments, the collateral management system 802 may deploy a listening thread corresponding to an instance of a smart contract governing a loan. A listening thread may listen for payments by the borrower defined in the instance of the smart contract. When a payment is made, the listening thread may notify the ledger management system 104, which updates the distributed ledger to reflect the payment. During this update, the instance of the smart contract governing the loan is provided a notification indicating the payment event, which may cause the smart contract to determine whether the loan is fully repaid. If the loan is fully repaid, the smart contract releases the collateral token to the borrower, bringing the smart contract to a close. If the loan amount is not repaid, the terms of the smart contract (e.g., the loan amount and the next repayment) may be updated based on the payment. If the listening thread does not detect a receipt of a payment before the payment due date, the listening thread may notify the ledger management system 104 of the missed payment. In response to the notification, the ledger management system 104 may update the distributed ledger to reflect the non-payment, which may cause the smart contract to determine whether the loan is in default according to the terms of the contract. If the loan is determined to be in default, then the smart contract transfers ownership of the collateral token to the party specified by the smart contract (e.g., the lender). Once this occurs, the lender may redeem the collateral token, sell the collateral token, gift the collateral token, or exchange the collateral token, as the lender is now the owner of the collateral token.

In embodiments, the collateral management system 802 may provide a marketplace for loans that may be bought or transferred. The marketplace may present the amount due on a loan, the value of the loan (e.g., the amount that is to be collected when fully paid off), the payment history of the loan (e.g., whether the borrower is making or missing payments), the collateral item that secures the loan, the price to purchase the loan, and the like. In some embodiments, potential lenders may opt to purchase the loan from the current lender. In these embodiments, the purchase of the loan causes the collateral management system 802 to terminate the current smart contract and to instantiate a new smart contract to reflect the new owner or to adjust the smart contract, such that payments will be directed to an account of the new lender and to designate the new lender as the destination of the collateral token should the borrower default. Additionally, or alternatively, the borrower may seek better terms on a loan using the marketplace. Assuming a loan is transferrable, the borrower may list the loan on the marketplace whereby potential lenders can view the borrower's payment history, the remaining balance on the loan, the loan payoff amount, and the collateral item. Potential lenders may then make loan offers to the borrower with each loan offer having its terms. The borrower can accept a loan offer. In response to the borrower accepting the loan offer, the new lender must transfer the loan payoff amount to the previous lender, which causes the collateral management system 802 to terminate the current smart contract and to instantiate a new instance of a smart contract in accordance with the newly accepted terms of the loan offer.

In embodiments, the platform 100 includes an authentication system 804. The authentication system 804 may provide authentication and/or appraisal support services on behalf of the platform 100. In some embodiments, the authentication system 804 may be used to authenticate an item that is offered for sale or provided for collateral. Additionally, or alternatively, the authentication system 804 may be used to obtain an appraisal of an item that is offered for sale or provided for collateral.

In some embodiments, the authentication system 804 presents a portal that allows a user (e.g., a seller or an employee of a facility that holds items) to upload a virtual representation of an item. The user may provide an item classification (e.g., a baseball card, vintage clothing, jewelry, artwork, or the like), and one or more high resolution photographs of the virtual item; a 3D representation of the item; dimensions of the item; a weight of the item; and/or the like. The authentication system 804 may allow domain-specific experts to sign up as authenticators/appraisers, such that a domain-specific expert can authenticate and/or appraise items classified in the area of their expertise. For example, sports memorabilia experts may be allowed to authenticate baseball cards and memorabilia, but not jewelry or artwork. In some embodiments, authenticators may be rated within their area of expertise and for sub-domains within their area of expertise (e.g., within the general category of sports memorabilia, an expert can be rated with respect to their knowledge on baseball memorabilia, basketball memorabilia, football memorabilia, and the like). When a new item is entered into the portal, the domain-specific experts can bid on the appraisal/authentication job, whereby the bid indicates the terms (e.g., price) under which the expert will perform the appraisal/authentication job. A user may then select the one or more of the experts based on their respective bids and/or their ratings. Alternatively, the authentication system 804 may select the one or more of the experts based on their respective bids and/or their ratings. Once an expert wins a bid, the expert performs the authentication and/or appraisal based on the information uploaded by the user (e.g., one or more high resolution photographs of the virtual item, a 3D representation of the item, dimensions of the item, a weight of the item, and/or the like). The expert may provide an appraisal value and/or a determination indicating the authenticity of the item. The authentication system 804 may include the expert's appraisal and/or authenticity determination in the virtual representation of the virtual item and, in some embodiments, the authentication system 804 may update the distributed ledger with the expert's appraisal and/or authenticity determination. As can be appreciated, the appraisal and/or the authenticity determination may result in an item being kept on or removed from the platform or may impact the ability to collateralize a loan using the item.

In some embodiments, the authentication system 804 requires an expert to provide appraisal/authentication notes that indicate the reasons for the expert's determination. In providing an appraisal and/or providing a determination of authenticity, the expert provides one or more reasons for his or her findings. For example, in opining that a particular shoe is a knockoff, an expert may indicate in the notes that the stitching of the shoe is indicative of a knockoff. The authentication system 804 may include the expert's appraisal/authenticity notes in the virtual representation of the virtual item and, in some embodiments, the authentication system 804 may update the distributed ledger with the expert's appraisal/authenticity notes.

In embodiments, the expert authentication determinations, as well as authentication notes may be used by the machine learning system 502 (FIG. 5) to train one or more models that can determine whether an item is likely a fake. In these embodiments, the models can be trained on images, weights, dimensions, and/or other features of items that were deemed to be fake. The authentication system 804 may leverage these models (via the artificial intelligence system 804) to determine whether a new item is likely fake. If the model classifies the item as being likely fake, the authentication system 804 may include the determination in the virtual representation of the virtual item and, in some embodiments, the authentication system 804 may update the distributed ledger with the determination that the item is likely fake. If the model is unable to classify the item as likely being fake, the authentication system 804 may list the item on the portal, such that experts may assess the item's authenticity. It is noted that in embodiments, a model can classify an item as likely being fake, but only an expert may authenticate the item, as counterfeiters may adapt and improve the quality of the counterfeit items to trick the models into issuing false authentications.

In some embodiments, the collateral management system 802, the authentication system 804, and the ledger management system 104 may be configured to support a securitized decentralized loan process. Example implementations of the securitized decentralized loan process are described throughout the disclosure, including with reference to FIGS. XXX.

In embodiments, the tokenization platform 100 includes a mystery box system 806 that supports a mystery box game. In embodiments, a "mystery box" may refer to a set of tokens that potentially can be won by a player, where each token represents a different item that can be redeemed using a token. In embodiments, each token may have a different probability of being selected. In some embodiments, each token may be assigned a range of numbers, where the range of numbers for each token reflects the probability of being won by a player. For example, if there are three tokens, where the first token has a 10% chance of being won, the second token has a 20% chance of being won, and the third token has a 30% chance of being won, and there is a 40% chance of no token being won, the first token may be assigned 1-10, the second token may be assigned 11-30, and the third token may be assigned 31-60. In this example, the range of values that may be selected would be 1-100. A player may pay for a chance to win an item in the mystery box. In some embodiments, the odds of winning each token, and the item represented by the token, are depicted in relation to the mystery box. In this way, players are informed on their chances of winning the various items.

In response to the receiving payment from the player, the mystery box system 806 may generate a random number that is bound by the overall range of values for the box (e.g. 1-100). The mystery box system 806 may then determine which token, if any, was won by the player based on the random number. For example, a mystery box may be jewelry-themed, whereby the mystery box includes a first token representing a diamond ring, a second token representing a cubic zirconium ring, and eight tokens, each representing a $25 gift card that can be spent at a specific jewelry shop (e.g., the jewelry shop that provided the rings). In this example, the first token may have a 0.1% chance of being won, the second token may have a 4.9% chance of being won, and the gift cards may each have a 10% chance of being won, whereby there is a 15% chance that the player will not win a prize. In this example, the range of numbers may be 1-1000, where the first token corresponds to the number 1, the second token corresponds to the range of 2-50, and the third through eighth tokens have a collective range from 51-850. In this example, the price to play may be set by the jewelry shop, such that the gift cards may be considered a mechanism to drive traffic to the jewelry shop. It is noted that in the foregoing example, the range of tokens are sequential, however the ranges do not need to be sequential and can be slotted in any suitable manner.

In embodiments, the mystery box system 806, in response to a player winning a prize from the mystery box, may transfer the token to an account of the winning player. In these embodiments, the won token may appear in the digital wallet of the player. Alternatively, the mystery box system 806 may deliver the won token to the user via an electronic message (e.g., a text message, a messaging app message, an email, or the like). As will be discussed below, in some embodiments, the mystery box system 806 provides service to brick-and-mortar casinos, such that the mystery box game is implemented in a physical device. In these embodiments, the mystery box system 806 may print out a ticket that has a token identifier of the won ticket (e.g., a QR code).

In embodiments, the mystery box system 806 may allow players to select a mystery box to play from a plurality of available mystery boxes, where each mystery box may have a respective theme. For example, a first mystery box may be art themed such that the mystery box contains tokens corresponding to art-related items (e.g., arts of work, art related products, services relating to art (e.g., a commissioned painting by an artist), and the like); a second box may be entertainment themed, where the second box may contain tokens corresponding to a movie and television-related items (e.g., memorabilia items from popular movies and/or TV shows, DVDs or download codes for movies and/or TV shows, gift certificates to movie theaters, and the like); a third box may be sports themed, where the third box may contain tokens corresponding to sports-related items that correspond to a particular team (e.g., game worn apparel, tickets to games, replica apparel, team apparel, and the like); a fourth box may be gaming themed, where the fourth box may contain tokens corresponding to gaming-related items (e.g., video game systems, video games, gift certificates, upgrades for characters of a particular game, and the like); a fifth box may be music-themed, where the box may contain tokens relating to items that correspond to a particular band or artist (e.g., a signed show poster, memorabilia from the band or artist, tickets to a show, download codes for an album or song, and the like); and so forth. In this way, players may select to play for prizes that are enticing to them.

In embodiments, a mystery box may contain tokens corresponding to replenishable items and/or non-replenishable items. Replenishable items are items that can be replenished in the mystery box when a player wins a token representing the item. For example, gift certificates, movie tickets, sports game tickets, DVDs, electronics, video games, replica jerseys, and most clothing items are replenishable, while items such as watches, high-end jewelry, game-worn sports apparel, signed memorabilia, limited edition shoes, original artwork, are examples of non-replenishable items. In some embodiments, the party offering the mystery box may designate replacement items of similar value for the non-replenishable items in a mystery box, such that when a non-replenishable item is won from the mystery box, it may be replaced by one of the designated replacement items. In some of these embodiments, a mystery box may be arranged according to a "recipe." A recipe designates two or more tiers of items in the mystery box, and for each tier the odds for winning an item from the tier. In these embodiments, the provider of the mystery box may provide a list of items that belong to each tier. For example, the highest tier (e.g., the tier with the lowest odds) may include the high-value non-replenishable items, while the lower tiers may include various levels of replenishable items. Each item in the recipe may be tokenized, such that the tokens are reserved for use in the mystery box. Each time an item from a tier is won by a player, the mystery box system 806 may replace the token representing the item with another token from the same tier as the won token. In this way, the price to play the mystery box and the odds associated with each item in the mystery box do not change when a non-replenishable item is won from the mystery box.

In embodiments, each mystery box is governed by a smart contract. The smart contract may define the different items or tiers of items, and for each respective item or tier of items, odds for winning the respective item. When a new mystery box is created, the mystery box system 806 may instantiate a new smart contract corresponding to the new mystery box. The instance of the smart contract may define the items or tiers of items of the new mystery box, the odds for each item (or tier of items), the token identifiers of each of items in the mystery box (or replacement items that can be included in the mystery box), and a price to play the mystery box. In embodiments where items are not replaced in a mystery box, the smart contract may further define the manner by which the odds of items or the price of the game may be adjusted when certain items are exhausted. For example, if the highest value item in the mystery box is won, the price to play the game may be lowered and/or the odds of winning the remaining items may be adjusted.

The mystery box system 806 may serve the mystery box game in a variety of different manners. In embodiments, the mystery box system 806 may serve the mystery box game via the tokenization platform 100, whereby users of the tokenization platform 100 may play the mystery box game on a website or application provided by the tokenization platform 100. Additionally, or alternatively, the mystery box system 806 may serve the mystery box game to users via a third-party website or application. In these embodiments, the third-party website or application may access the mystery box system 806 via the API system 108 of the tokenization platform 100.

In some embodiments, the mystery box system 806 may support casino-style machines, whereby players can play the mystery box game on a physical machine located at, for example, a casino or any other suitable brick-and-mortar location. In these embodiments, the items may be located at the brick-and-mortar location where the physical device is located, such that when a player wins an item from the mystery box, the player may redeem the token at the brick-and-mortar location. In these embodiments, the tokenization platform 100 includes the mystery box system 806 that supports mystery box games that are played at the brick-and-mortar locations. In these embodiments, the mystery box system 806 may provide an API that allows network-connected physical gaming devices to communicate with the tokenization platform 100. The mystery box system 806 may serve the mystery box game to the physical gaming devices via the API system 108. In embodiments, the mystery box system 806 may provide token identifiers of won tickets, such that the physical gaming devices may print a ticket that indicates the won token. In some embodiments, the ticket may include a QR-code that indicates the won token.

In embodiments, the player may redeem a ticket indicating a won token at the brick-and-mortar location. In these embodiments, the brick-and-mortar location may include scanning devices that scan the tickets and communicates the token identifier of the won token to the casino gaming system. In response to receiving the token identifier of the won token, the mystery box system 806 may redeem the won token on behalf of the player and may communicate a verification of the redemption of the won token to the scanning device. An employee using the scanning device may then provide the item won by the player to the player. Alternatively, the player may add the won token to a user account of the player. In these embodiments, the player may scan the ticket (e.g., the QR-code). In response to the player scanning the ticket, the mystery box system 806 may facilitate the transfer of the token to an account of the player, whereby the ticket may appear in the player's digital wallet. Once this occurs, the player may redeem, sell, gift, collateralize, or otherwise transact with the token.

In embodiments, the tokenization platform 100 includes a video game integration system 808. The video game integration system 808 allows video game makers to place tokens in video games, such that games playing a video game may be able to find, buy, trade, or otherwise interact with tokens in the video game. In embodiments, a video game maker may access an API of the tokenization platform 100 via the API system 108, such that instances of a video game may request certain tokens or types of tokens from the tokenization platform 100. In response to the request, the video game integration system 808 may serve a token to the instance of the video game. The tokens may be fungible or non-fungible. In the latter case, a token may be obtained, purchased, or otherwise transacted for by multiple video games. In the case of a non-fungible token, the first user to transact for the token is the owner of the token. In response to a user transacting for a token, the video game integration system 808 may update the distributed ledger to reflect the new ownership of the token.

In some example embodiments, a video game maker may allow third-parties to advertise items for sale in a video game, whereby a user may purchase an item by selecting an icon (or other visual indicia) displayed in the video game that represents a token corresponding to the item. For example, an advertiser representing a pizza delivery chain may wish to offer pizza delivery to gamers in a specific location. In this example, instances of the video game may request food-related tokens from the video game integration system 808, whereby each request indicates a location of the device executing the respective instance of the video game. The video game integration system 808 may identify tokens corresponding to food items that can be delivered to a location where a respective instance of the video game is being executed. For example, the video game integration system 808 may identify tokens having associated metadata that indicates a delivery radius that includes a location indicated in the request. In response to the request, the video game integration system 808 serves the identified token to the requesting instance of the video game. A visual indicium representing the token may then be displayed by the instance of the video game, whereby a user (i.e., video game player) may opt to transact for the token. Upon a user transacting for ownership of the token, the video game integration system 808 updates the ownership data of the token to reflect that it is owned by the user. In scenarios where delivery information or other logistical information are needed, the instance of the video game and/or the user can provide those details at the time of transaction or the user can provide the required information to complete the transaction. For example, if the user elects to buy a pizza token from a pizza delivery chain, the instance of the video game and/or the user may provide the address to where the pizza will be delivered. The user, via the instance of the video game, may also provide details such as toppings for the pizza.

In some example embodiments, the video game maker may allow an item represented by a token to be both used in the digital environment of the video game and to be redeemed in "real-life." In these embodiments, the video game maker may include specific fungible or non-fungible tokens in the video game, whereby users can find, buy, trade for, or otherwise transact for the tokens appearing in the video game. Once a token appearing in a video game is transacted for, the video game integration system 808 may update the ownership data of the transacted for the token to reflect that the user is the owner of the token. A visual indicium of the token may appear in a video game instance corresponding to the user and/or in a digital wallet of the user. Once owned by the user, the user may use the token in the video game and may subsequently redeem the token to receive the physical item represented by the token. For example, in a role-playing game a token may represent a pair of earrings that give the player of the video game a special power (e.g., invisibility). The user may use the earrings in the game to enjoy the special power or may redeem the earrings. In the latter scenario, the earrings may be shipped to the user, such that the earrings may be physically worn by the user but are no longer able to be used in the video game. In some of these embodiments, the video game maker may allow the user to transact the tokens. For example, the owner of a token may trade or sell the token for a token corresponding to another item. Each time the ownership is changed, the video game integration system 808 may update the distributed ledger to reflect the change in ownership. Once a user no longer owns a token, the user cannot use or redeem the item indicated by the token. In some embodiments, the video game may allow the user to return the item to a verified location (e.g., storage warehouse), whereby once the item is authenticated the user may then use the digital representation of the item in the video game once again.

The video game integration system 808 may allow video game makers to integrate tokens into their video games in additional or alternative manners. For example, video game makers may use tokens as "Easter eggs" or prizes that may be won by players as they uncover the tokens. In another example, a video game maker may integrate one or more mystery boxes in a video game. In another example, users may create digital items within the construct of a video game, such that the digital items may be tokenized and transacted for (e.g., traded, gifted, sold, etc.).

In embodiments, the tokenization platform 100 includes a user acquisition system 810. In embodiments, the user acquisition system 810 provides mechanisms that facilitate the promotion of the tokenization platform, and particularly, the enlisting of new users. In some embodiments, the user acquisition system 810 provides each existing user with a unique referral code that each respective user can share with his or her friends, social media followers, contacts, or the like. In addition, the user acquisition system 810 may provide an incentive to each existing user, whereby the incentive indicates a reward for each new user or number of users (e.g., three users) that sign up for an account. The incentive may be any form of payment, including currency (e.g., traditional currency or cryptocurrency), gift cards, physical items, digital items, and the like. In some embodiments, the reward is provided as a tokenized token, whereby the tokenized token represents a set amount of currency. In embodiments, the user acquisition system 810 may provide different incentives to different users. In some embodiments, the incentive may be determined based on the potential reach of each respective user. For example, users that have significant reach (e.g., social media influencers, celebrities, etc.) may be given greater incentive than users with relatively little reach. In some embodiments, the incentive may be determined based on the interests of each respective user. For example, a first user that is interested in golf may be incentivized with golf-related items or gift certificates, while a second user that is interested in art may be incentivized with art-related items or gift certificates. In some embodiments, the user acquisition system 810 codifies the incentive for each user in a respective instance of a smart contract. In some of these embodiments, the smart contract instance governs the incentives/rewards of a user is associated with the referral code of the user and/or the public address of the user. When the referral code of the user is successfully used to enlist a new account, the smart contract may facilitate the transfer of a token representing the reward to an account of the referring user.

Each time a new user enlists for an account using a referral code, the user acquisition system 810 determines whether the new user is legitimate (e.g., not a bot, not a fraudulent account, etc.). Assuming the new user is granted an account (e.g., there is not detected fraud), the user acquisition system 810 determines the user account associated with the referral code. In some embodiments, the user acquisition system 810 determines a smart contract associated with the user account and/or the referral code. The user acquisition system 810 may provide a notification to the smart contract associated with the user account and/or the referral code of a new account. The smart contract may then initiate the transfer of the token representing the reward to an account of the user.

In embodiments, the user acquisition system 810 may perform these services for third-party customers. In these embodiments, a third-party customer may provide rewards (e.g., cash, cryptocurrency, gift cards, physical items, etc.) to a trusted third-party holder (e.g., the tokenization platform or another trusted holder). The rewards may then be tokenized and held in escrow. The third-party may further define the parameters governing the rewards (e.g., how much incentive to award, who may be a promoter, etc.). The user acquisition system 810 may generate a smart contract on behalf of the third-party customer. When a user requests a referral code, the user acquisition system 810 may generate an instance of the smart contract on behalf of the customer and may associate the instance of the smart contract with the account of the user. When the user successfully refers a buyer to the customer using a referral code, the user acquisition system 810 (and/or the instance of the smart contract) may transfer a token representing the reward to an account of the referring user.

To further describe some embodiments in greater detail, reference is next made to examples of techniques which may be performed by or in connection with ecommerce systems, for example, platform 100. The techniques include technique 900 of FIG. 9, 1000 of FIG. 10, 1100 of FIG. 11, 1200 of FIG. 12, 1300 of FIG. 13, 1400 of FIG. 14, 1500 of FIG. 15, 1600 of FIG. 16, 1700 of FIG. 17, 1800 of FIG. 18, and 1900 of FIG. 19. Technique 900, technique 1000, technique 1100, technique 1200, technique 1300, technique 1400, technique 1500, technique 1600, technique 1700, technique 1800, and technique 1900 can be executed using computing devices, such as the systems, hardware, and software described herein. Technique 900, technique 1000, technique 1100, technique 1200, technique 1300, technique 1400, technique 1500, technique 1600, technique 1700, technique 1800, and technique 1900 can be performed, for example, by executing a machine-readable program or other computer-executable instructions, such as routines, instructions, programs, or other code. The steps, or operations, of technique 900, technique 1000, technique 1100, technique 1200, technique 1300, technique 1400, technique 1500, technique 1600, technique 1700, technique 1800, and technique 1900 or another technique, method, process, or algorithm described in connection with the embodiments disclosed herein, can be implemented directly in hardware, firmware, software executed by hardware, circuitry, or a combination thereof. For simplicity of explanation, 900, technique 1000, technique 1100, technique 1200, technique 1300, technique 1400, technique 1500, technique 1600, technique 1700, technique 1800, and/or technique 1900 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Figure 9:
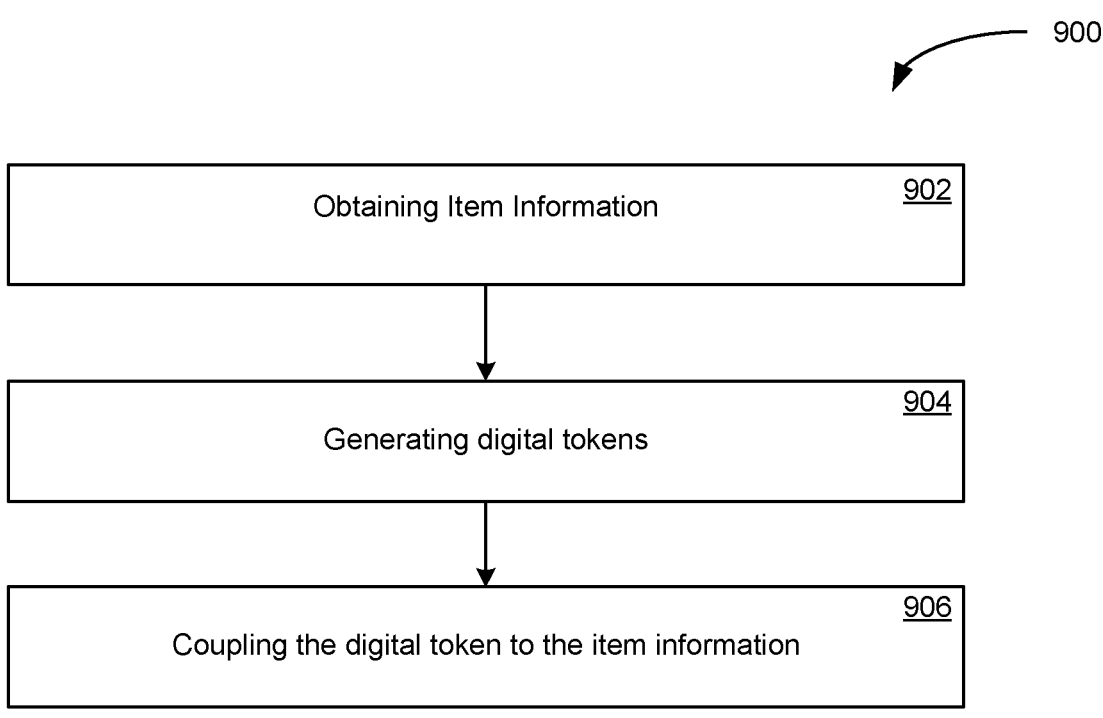
FIG. 9 is a flowchart showing a technique for tokenizing items according to some embodiments of the present disclosure.

FIG. 9 depicts a flowchart showing a technique 900 for tokenizing items according to some embodiments of the present disclosure. At 9002, item information is obtained. The item information may include a unique identifier for a unique unit of the item and a set of item attributes. In embodiments, a processing system of a tokenization platform obtains the information.

At 904, one or more digital tokens are generated. In embodiments, the digital tokens are unique digital tokens. Each unique digital token may include a set of digital attributes that correspond to the set of item attributes. In embodiments, N digital tokens are generated and linked to an item or virtual representation thereof. In embodiments, a token generation system generates the one or more digital tokens.

At 906, the digital token is coupled to the item information. In embodiments, a cryptographic link couples the digital token to the item information such that the digital token provides a representation of the item. For example, the digital token and the item may be unique such that the unique digital token and the unique identifier for the unique unit of the item are cryptographically linked to provide a unique digital representation of the unique unit of the item. In embodiments, a linking system, such as a module of the token generation system 302, couples the digital token to the item information.

In embodiments, tokens may be tokenized (e.g., when generating a token representing an amount of funds). For example, the item information may be funds within the platform 100 or from third-party sources. The tokenized token can be generated in response to validation of receipt of the funds, and the funds may be held from transaction by the user. In some embodiments, the funds remain publicly attributed to the user and the ledger is updated with a hold or lien recorded against the funds to prevent user transaction of the tokenized funds without approval by the platform 100. In some embodiments, the ledger is updated to reflect a transfer of the funds from the user to the platform 100. Beneficially, transferred funds may be tradeable by the platform 100 (e.g., for depositing or investment with third parties), and the tokenized tokens are redeemable for an equivalent amount of the original funds even if the redeemed funds are not the originally tokenized funds such that the tokenized token may be used by transactions within the platform 100 while the deposited funds may participate in economic transactions between the platform 100 and third parties.

Figure 10:
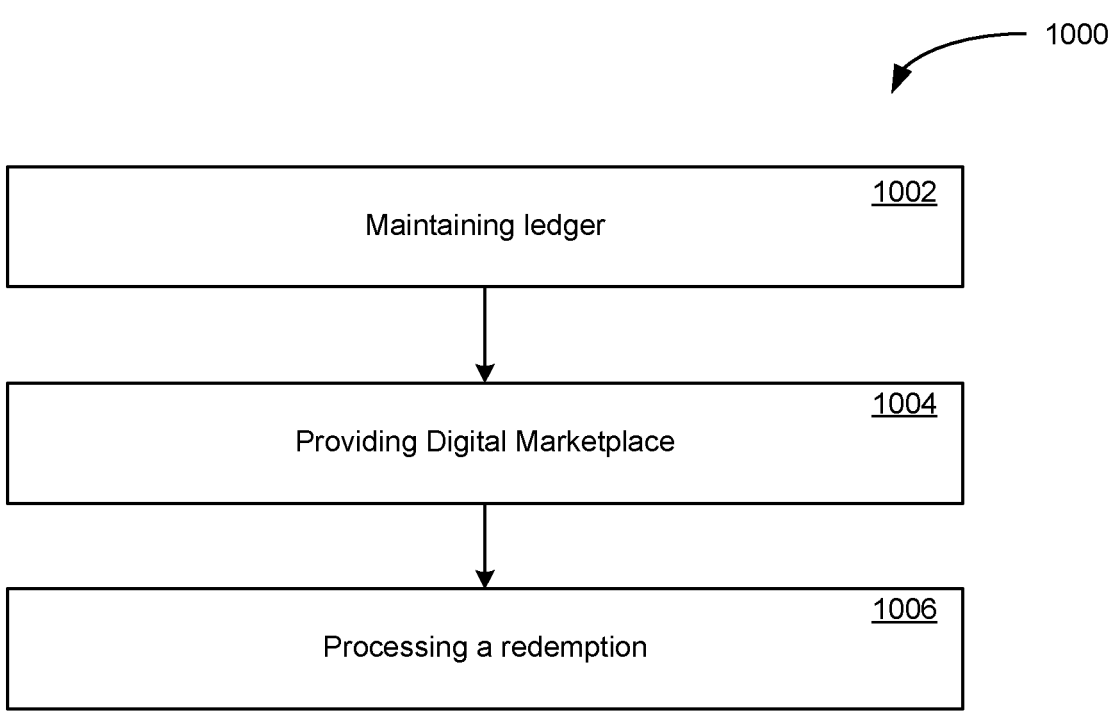
FIG. 10 is a flowchart showing a technique for transferring tokens using a digital marketplace according to some embodiments of the present disclosure.

FIG. 10 depicts a flowchart showing a technique 1000 for transferring tokens using a digital marketplace according to some embodiments of the present disclosure. At 1002, a ledger is maintained. The ledger stores a plurality of public addresses, a plurality of virtual representations of a plurality of respective items, and, for each virtual representation, a set of tokens, and ownership data of each respective token. The set of tokens respectively correspond to a respective instance of the item represented by the virtual representation. Further, each respective public address corresponds to a respective account of a respective user of the tokenization platform.

At 1004, a digital marketplace is provided. In embodiments, the digital marketplace provides a graphical user interface that allows consumers to view visualizations of virtual representations of items including the virtual representation of the item and transact for an instance of the item by purchasing a digital token of the N digital tokens. Upon a user purchasing a token, the ledger may be updated to reflect a change in ownership of the token from the seller of the token to the user. Once a user owns a token, the user may be allowed to transfer the token to another user, sell the token, use the token as collateral, and/or redeem the token.

At 1006, a redemption is processed in response to a user requesting redemption of the token. In embodiments, the redemption may begin by associating a specific token that corresponds to the virtual representation with an account of the transacting user. The association may be made in response to verifying the request to participate in the transaction. A transfer request is received requesting transfer of the specific token to a transferee. The transfer request includes a digital-token identifier that identifies the specific token and a public address of the different user. Further, the specific token is validated. The validation can be based on the digital-token identifier and the ledger. In the process, the account of the transferee on the platform 100 may be verified and/or validated based on the public address of the user and the ledger. Additionally, the ledger is updated with a block that includes ownership data and indicates that a specific token corresponding to the virtual representation is owned by the transacting user. In embodiments, the updating occurs in response to both validating the specific token and veri- fying the transferee. Yet further, a redemption request is received to redeem the digital token from a user device of the transferee, and a workflow is executed to satisfy the transaction for instance of the item corresponding to the token. The workflow may be initiated in response to receiv- ing the redemption request.

Figure 11:
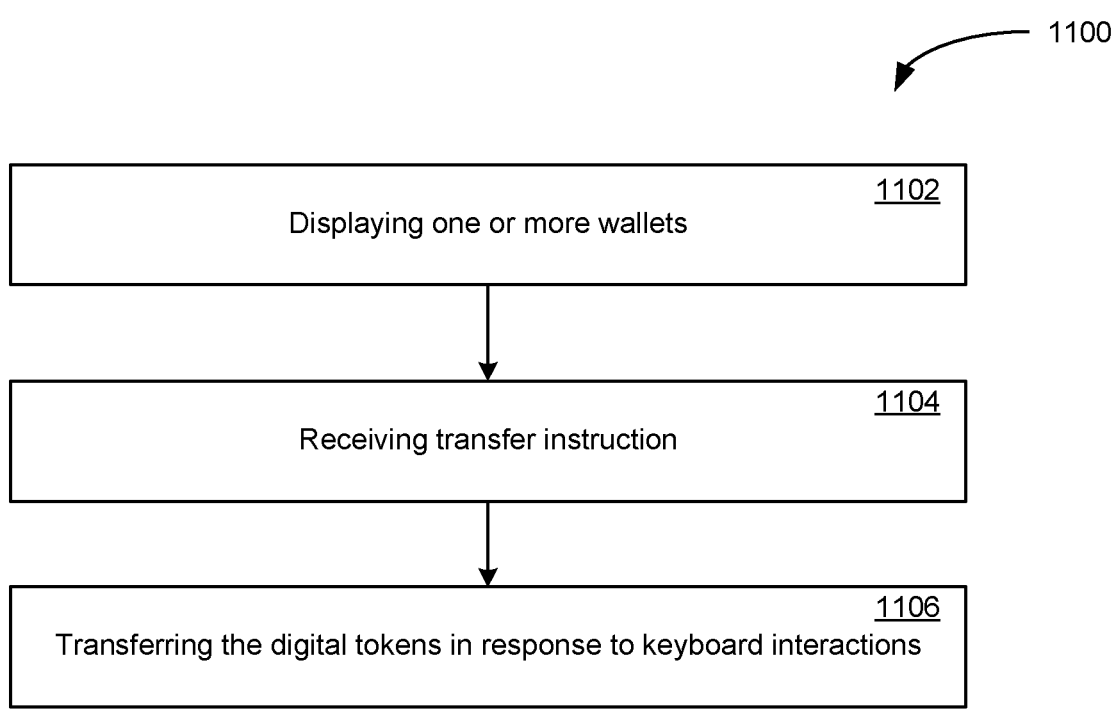
FIG. 11 is a flowchart showing a technique for transferring tokens between wallets via a keyboard interaction according to some embodiments of the present disclosure.

FIG. 11 depicts a flowchart showing a technique 1100 for transferring tokens between wallets via a keyboard interac- tion according to some embodiments of the present disclo- sure. At 1102, one or more wallets are displayed. The display of the one or more wallets may include, for example, displaying a digital wallet graphical user interface via a user device of a user associated with the digital wallet. Addition- ally, an inventory of tokens that are owned by the user may be displayed by the digital wallet graphical user interface. In embodiments, each token corresponds to a respective item and may be redeemable by a user to satisfy a transaction for an instance of the respective item.

At 1104, transfer instructions are received. The transfer instruction may include indication of one or more digital tokens from the inventory of tokens and a recipient of the digital token. The transfer instructions can be received by the digital wallet graphical user interface.

At 1106, the digital tokens are transferred in response to keyboard interactions. In embodiments, a digital keyboard is displayed by the digital wallet graphical user interface. The digital keyboard includes a selectable media content that is representative of the item corresponding to the digital token within the transfer request. User input producing a text- based message including a selection of the selectable media content by the digital keyboard is received. For example, the user may type a message surrounding the transfer (e.g., "Please enjoy this gift from me") and may then select the selectable media content representing the token (e.g., an image of the item represented by the token) to create a message having the token embedded therein. The selectable media content includes the digital token/an identifier of the digital token (e.g., a hash value that uniquely identifies the digital token). The digital token (e.g., an identifier thereof) is embedded within the text-based message by the digital keyboard, and the digital wallet transmits the text-based message to a message account of the recipient. Upon receipt, the digital token is accepted into a respective digital wallet of the recipient in response to the recipient selecting the selectable media content.

Figure 12:
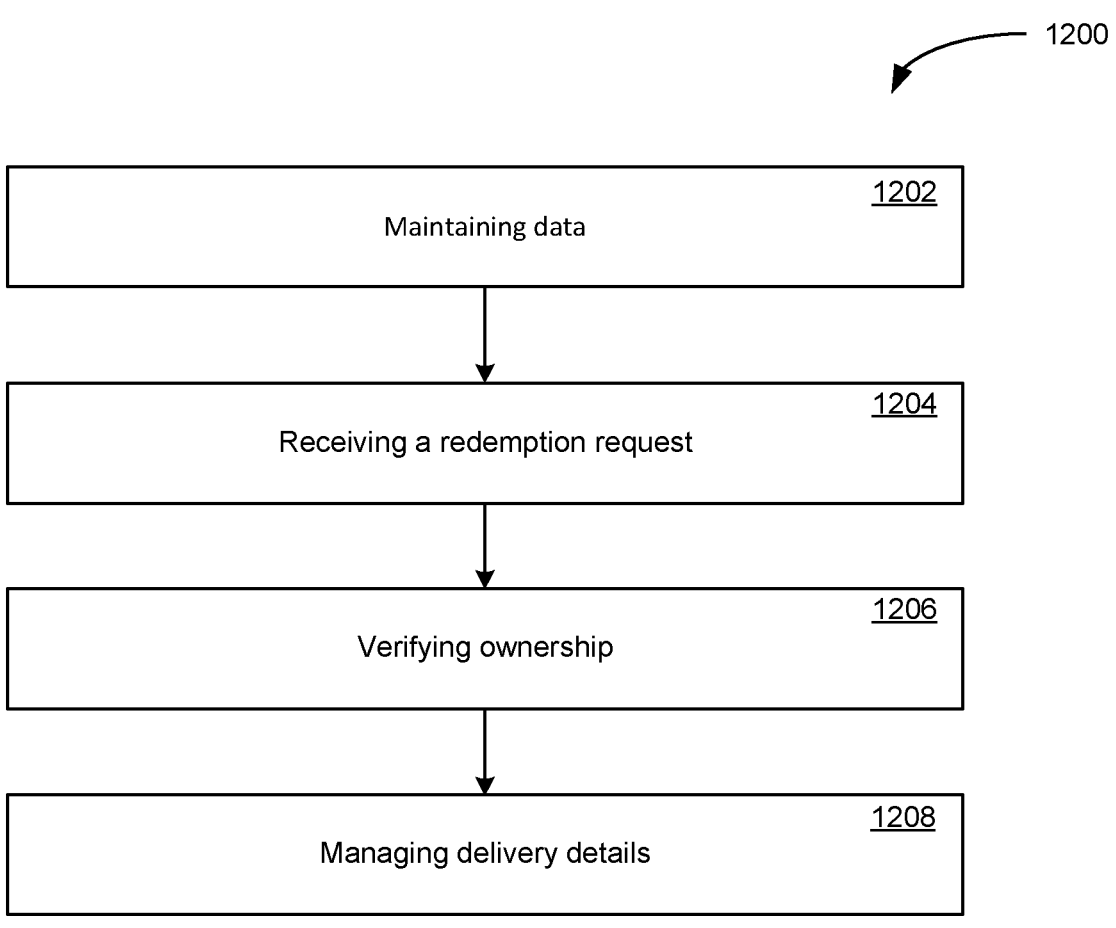
FIG. 12 is a flowchart showing a technique for redeeming tokens according to some embodiments of the present disclosure.

FIG. 12 depicts a flowchart showing a technique 1200 for redeeming tokens according to some embodiments of the present disclosure. At 1202, ledger data is maintained. The ledger data can include a plurality of public addresses, a plurality of virtual representations, a set of tokens for each of the plurality of virtual representations, and ownership data for each of the set of tokens. Each respective public address corresponds to a respective account of a respective user of the tokenization platform. The virtual representations correspond to respective items, and the set of tokens respec- tively correspond to a respective instance of the respective item for each virtual representation.

At 1204, a redemption request is received. The redemp- tion request seeks to redeem a digital token from a user device of a user, and the digital token corresponds to an instance of the item to be redeemed. At 1206, ownership of the digital token by the user is verified. The verification can be made based on the plurality of public addresses, the sets of digital tokens, and the redemption request. For example, the redemption request may include a user id of a user wishing to redeem a token indicated by a token identifier. The platform 100 may validate the ownership of the token by checking that the ledger data links the token identifier indicated in the redemption request to the public address of the user indicated in the redemption request. If so, the ownership of the digital token is verified.

At 1208, details for fulfilment and/or delivery are man- aged by the platform 100. In some embodiments, the plat- form 100 may prompt the user to provide delivery details (e.g., via a graphical user interface). In response, the plat- form 100 may receive the delivery details from the user via the user device. The delivery details may then be output to a delivery system, which initiates delivery of the redeemed token. For example, the user may provide a physical address and any other relevant delivery data (e.g., best time of day for delivery or phone number). In this case, the delivery system may use the provided address to initiate a delivery of the item represented by the redeemed token. In another example, the token may represent a digital item. In such cases, the user may provide an email address or other account data to which the digital item (or a link thereto) may be delivered. In some embodiments, the platform 100 may request fulfilment details in response to verifying that the user is the owner of the token. The fulfilment details include information needed to satisfy the transaction for the item that were not provided at a time when the token was transacted for. For example, the fulfilment details may include item constituent materials, sizing, color, combina- tions thereof, and the like. The fulfilment details may be received from the user device of the user and outputted to a fulfilment system. The fulfillment system may initiate deliv- ery of an item that satisfies the fulfillment details.

Figure 13:
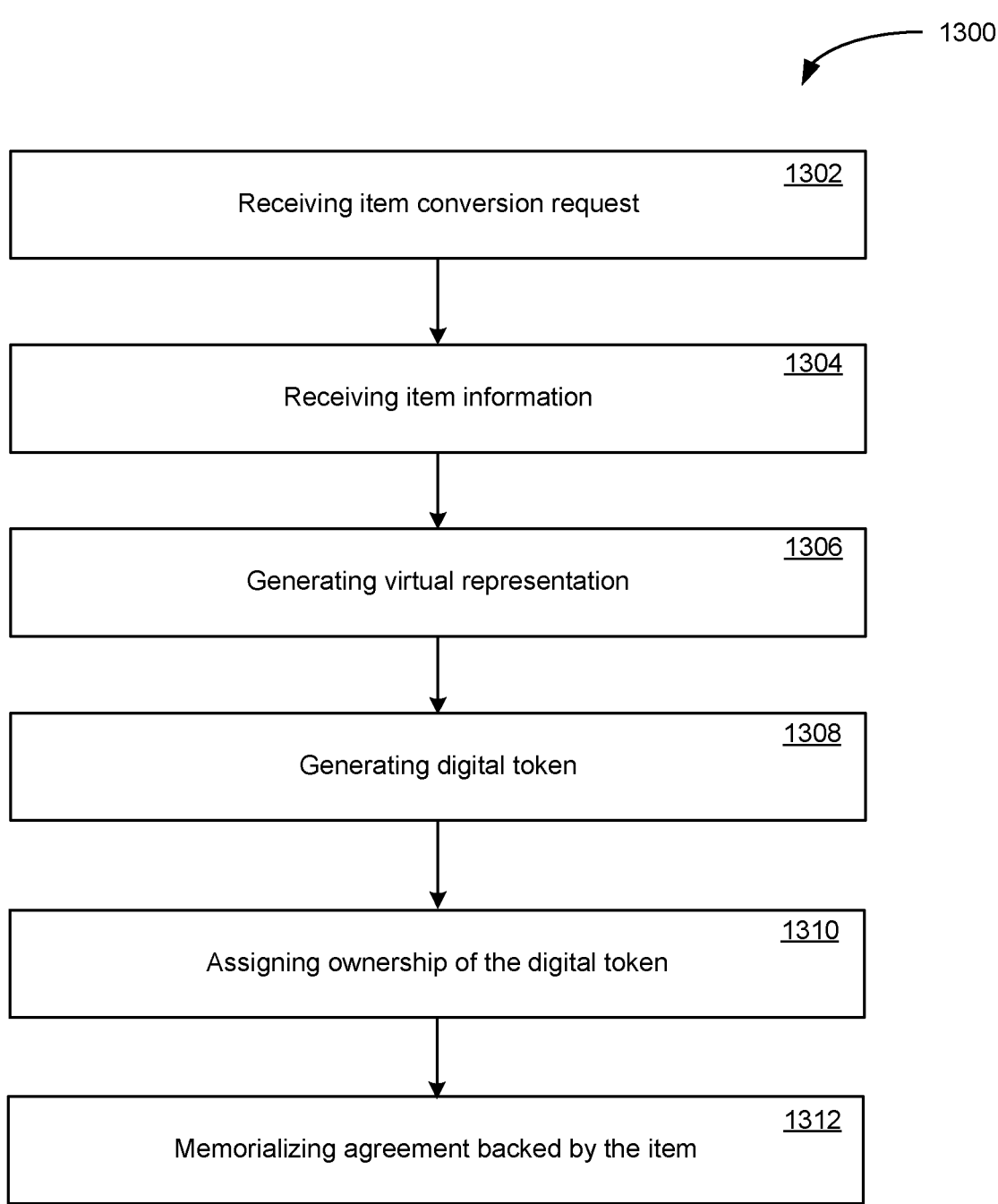
FIG. 13 is a flowchart showing a technique for collateralization and/or securitization according to some embodiments of the present disclosure.

FIG. 13 illustrates a flowchart showing a technique 1300 for collateralization and/or securitization according to some embodiments of the present disclosure. At 1302, an item conversion request is received. In embodiments, the item is a tangible item. In other embodiments, the item is other forms of collateral. At 1304, item information is received. The item information may include information that is required or helpful in determining valuation of the item. For example, the item information may include one or more photographs of the item, a description of the item, an appraisal value of the item, and/or a holding location of the item.

At 1306, a virtual representation of the collateral item is generated based on the item information. At 1308, one or more tokens are generated based on the virtual representa- tion. At 1310, ownership of the digital token is assigned. Initially, the ownership of the digital token is assigned to the owner of the collateralized item represented by the digital token. At 1312, an agreement that is backed by the item is memorialized. In embodiments, the item is an asset that is used as collateral to an agreement to provide a service for the user by a provider. In embodiments, an instance of a smart contract that governs the service is generated. The smart contract indicates an amount to be provided by the user to the provider and one or more conditions that cause owner- ship of the digital token to be transferred to the provider. The instance of the smart contract may then be deployed by the processing system. In embodiments, the item is a collateralizable item that is used as loan security. The agreement to loan a defined amount of funds to the user by a lender is received by the processing system. An instance of a smart contract governing the loan is generated by the processing system. The instance of the smart contract indicates an amount to be paid back by the user to the lender, as well as one or more conditions that cause ownership of the token to be transferred to the lender (e.g., default conditions). The instance of the smart contract is then deployed by the processing system. In some embodiments, the token may be placed in escrow, such that the lendee cannot redeem or transfer the token until the loan is paid. In these embodiments, the smart contract may define conditions that result in the token being transferred back to the lendee (e.g., when payment is complete).

Figure 14:
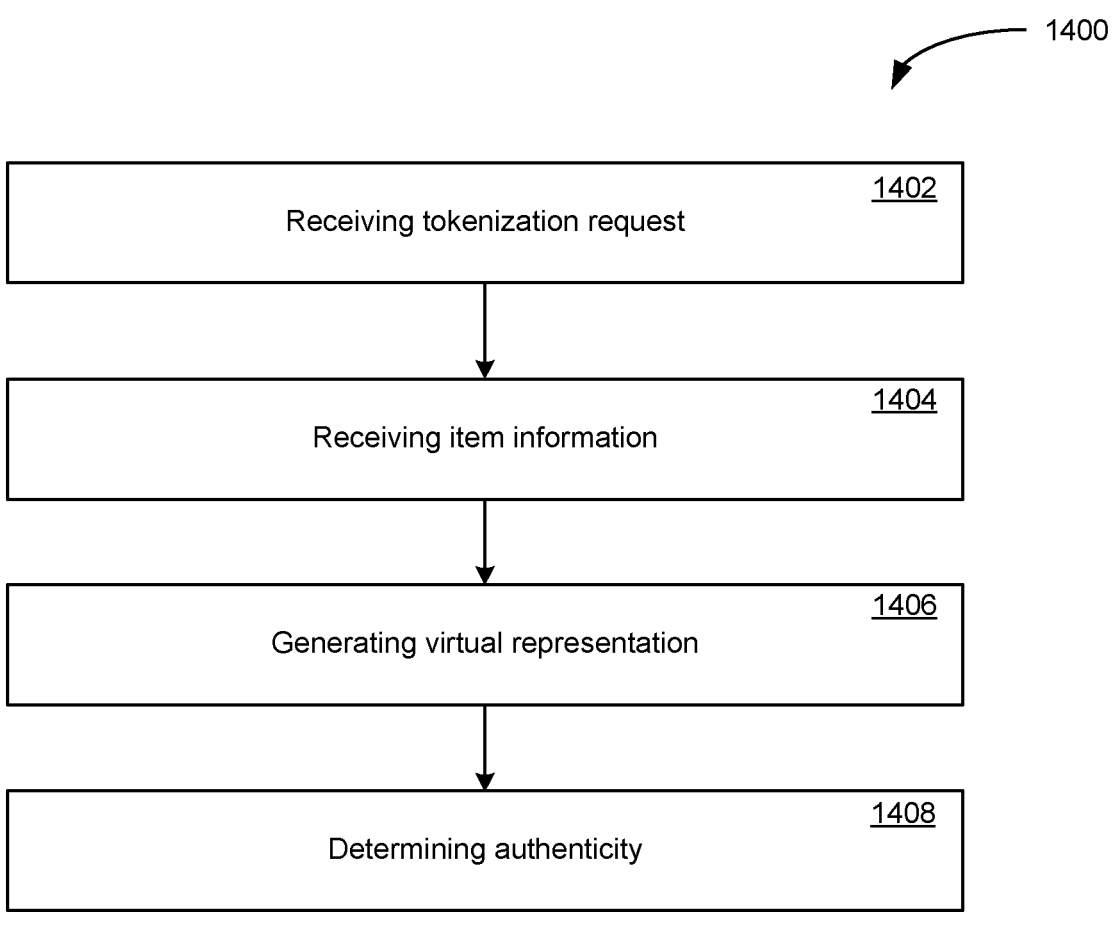
FIG. 14 is a flowchart showing a technique for item authentication according to some embodiments of the present disclosure.

FIG. 14 illustrates a flowchart showing a technique 1400 for item authentication according to some embodiments of the present disclosure. At 1402, a tokenization request is received from a user device. At 1404, item information is received. In some embodiments, the item information may be provided by a user or via an automated process. At 1406, a virtual representation of the item is generated.

At 1408, the authenticity of the item is determined through suitable authentication processes. In embodiments, an authentication of the item may be requested via a portal that is accessible by subject-matter authentication experts. In these embodiments, the portal may further display the virtual representation of the item. For example, the subject-matter expert may be presented with an image of the item, a description of the item (e.g., weight, dimensions, etc.), a video of the item, and/or the like. An authentication report may then be received by the processing system. The authentication report may be provided by a subject-matter authentication expert, which may include an opinion indicating whether the subject-matter authentication expert deemed the item authentic or not-authentic and one or more reasons for the opinion. In some embodiments, the platform may generate a digital token in response to an opinion indicating that the item is deemed authentic, and ownership of the digital token assigned to an owner of the item. The digital token may be based on a virtual representation of the item.

Figure 15:
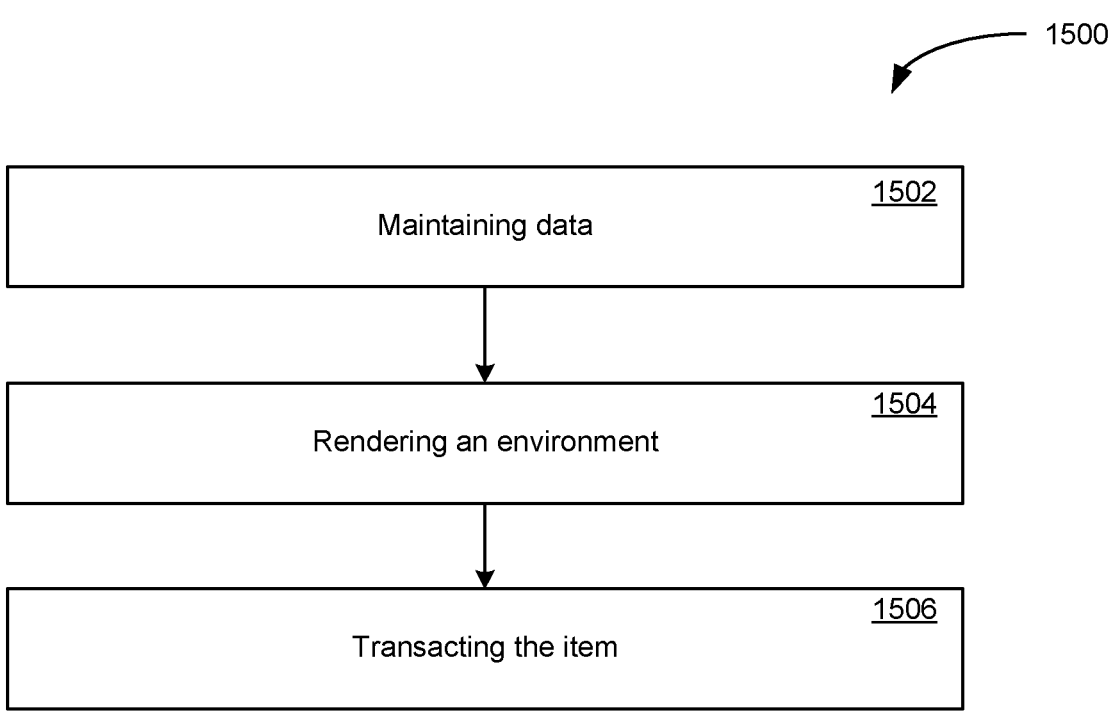
FIG. 15 is a flowchart showing a technique for rendering VR environments according to some embodiments of the present disclosure.

FIG. 15 depicts a flowchart showing a technique 1500 for rendering VR environments. Leger data is maintained at 1502 using suitable processes such as those discussed above. At 1504, an environment is rendered. In embodiments, a virtual reality store environment is rendered, which provides an interface that allows users to view virtual reality visualizations of available items and to transact for instances of the available items. The available items are items which are available for transaction. Further, a virtual reality visualization of an item represented by a virtual representation may also be included within the virtual reality store environment. At 1506, the item within the virtual environment is transacted through suitable processes. For example, a request to participate in a transaction for an instance of the item is received by the platform 100 from a user device of a transacting user. In embodiments, the request to participate in the transaction is received in response to the transacting user viewing the virtual reality representation of the item in the virtual reality store environment. Information associated with the request may be verified, and the specific token corresponding to the virtual representation is associated with an account of the transacting user in response to verifying the request to participate in the transaction.

Figure 16:
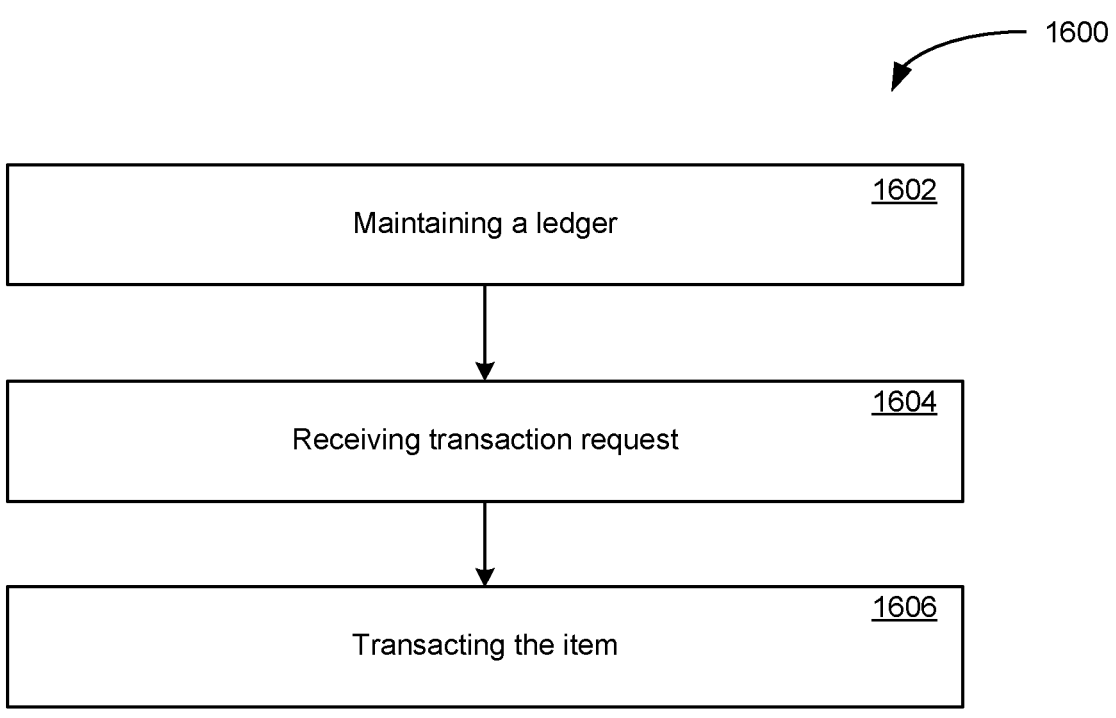
FIG. 16 is a flowchart showing a technique for facilitating transactions using a distributed ledger with a side chain of blocks according to some embodiments of the present disclosure.

FIG. 16 illustrates a flowchart showing a technique 1600 for facilitating transactions using a distributed ledger with a side chain of blocks according to some embodiments of the present disclosure.

At 1602, a ledger is maintained. The ledger includes a main chain of blocks and a side chain of blocks. In embodiments, blocks of the main chain collectively store information relating to a plurality of users, which include both item providers and item consumers. The information relating to the plurality of users includes a plurality of public addresses, and each respective public address corresponds to a respective account of a respective user of the tokenization platform. Blocks of the side chain collectively store a plurality of virtual representations of a plurality of respective items, a set of tokens for each virtual representation, and ownership data of each respective token. Each virtual representation includes virtual reality content to render a virtual reality visualization of the respective item, and each set of tokens respectively corresponds to a respective instance of the item represented by the virtual representation.

At 1604, a transaction request is received through a suitable process, such as those described above. At 1606, transaction of the item occurs. In embodiments, ownership data of a specific token corresponding to the virtual representation in the first side chain of blocks is updated to indicate that the transacting user owns the specific token. In embodiments, the transaction of the item includes validating the specific token based on the digital-token identifier and the first chain of blocks, verifying that the different user has a valid account on the tokenization platform based on the public address of the user and the main chain of blocks, and, in response to validating the specific token and verifying the different user, updating the second chain of blocks with a new block. The new block includes ownership data that indicates that the specific token corresponding to the virtual representation is owned by the different user.

Figure 17:
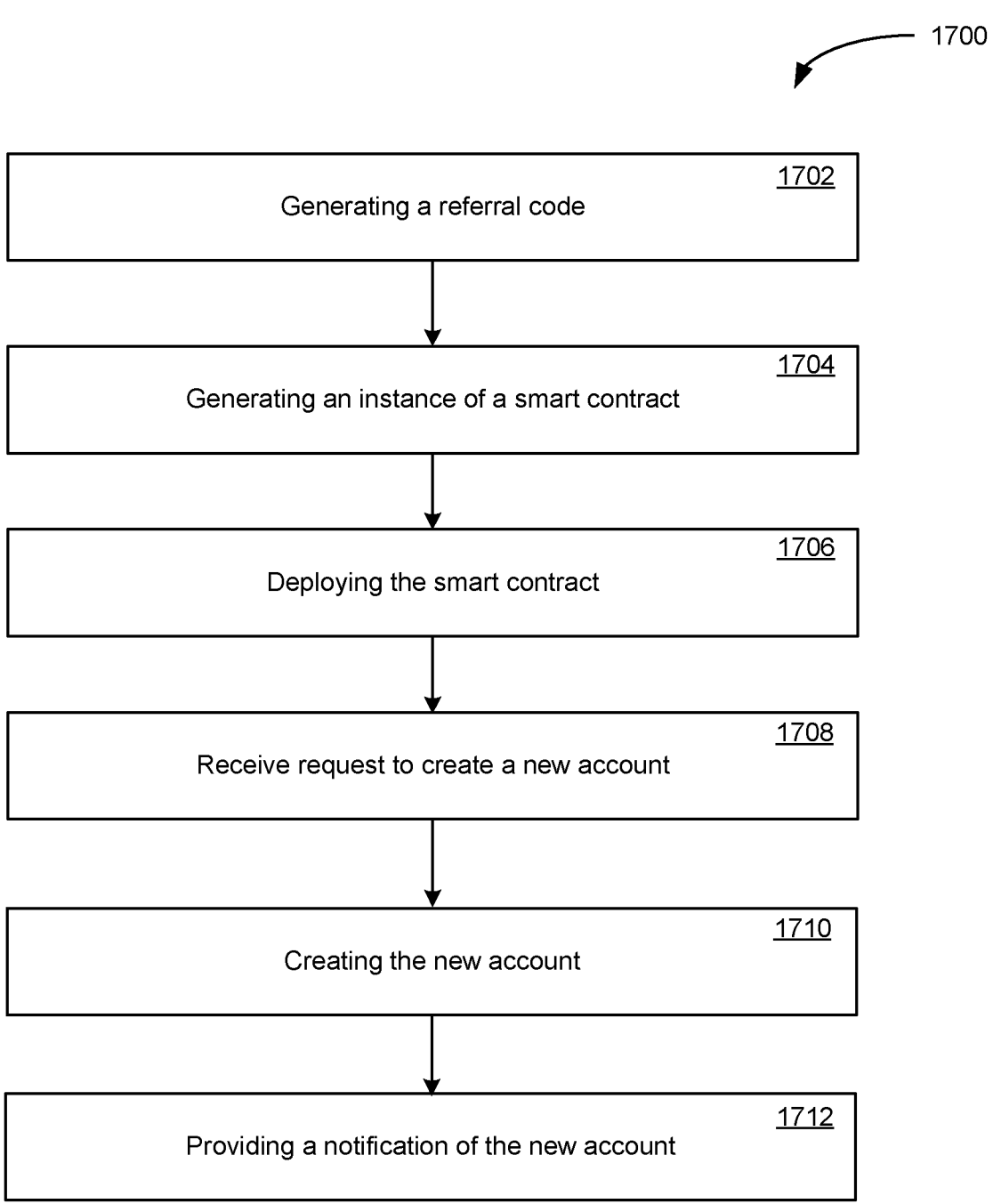
FIG. 17 is a flowchart showing a technique for facilitating user acquisition according to some embodiments of the present disclosure.

FIG. 17 depicts a flowchart showing a technique 1700 for facilitating user acquisition according to some embodiments of the present disclosure. At 1702, a referral code is generated, which corresponds to a user of the tokenization platform. The referral code may be generated by a processing system of the tokenization platform. At 1704, an instance of a smart contract is generated that corresponds to the user of the tokenization platform. The instance of the smart contract may be generated by the tokenization platform. The instance of the smart contract indicates an incentive to be provided to the user when the user successfully refers the tokenization platform. At 1706, the instance of the smart contract is deployed by the processing system. At 1708, a request to create a new account is received from a new user by the processing system. The request includes the referral code of the user. At 1710, the new account is created for the new user by the processing system. At 1712, the processing system provides a notification of the new account to the instance of the smart contract corresponding to the user. The smart contract then facilitates the transfer of a token representing the incentive in response to the notification.

Figure 18:
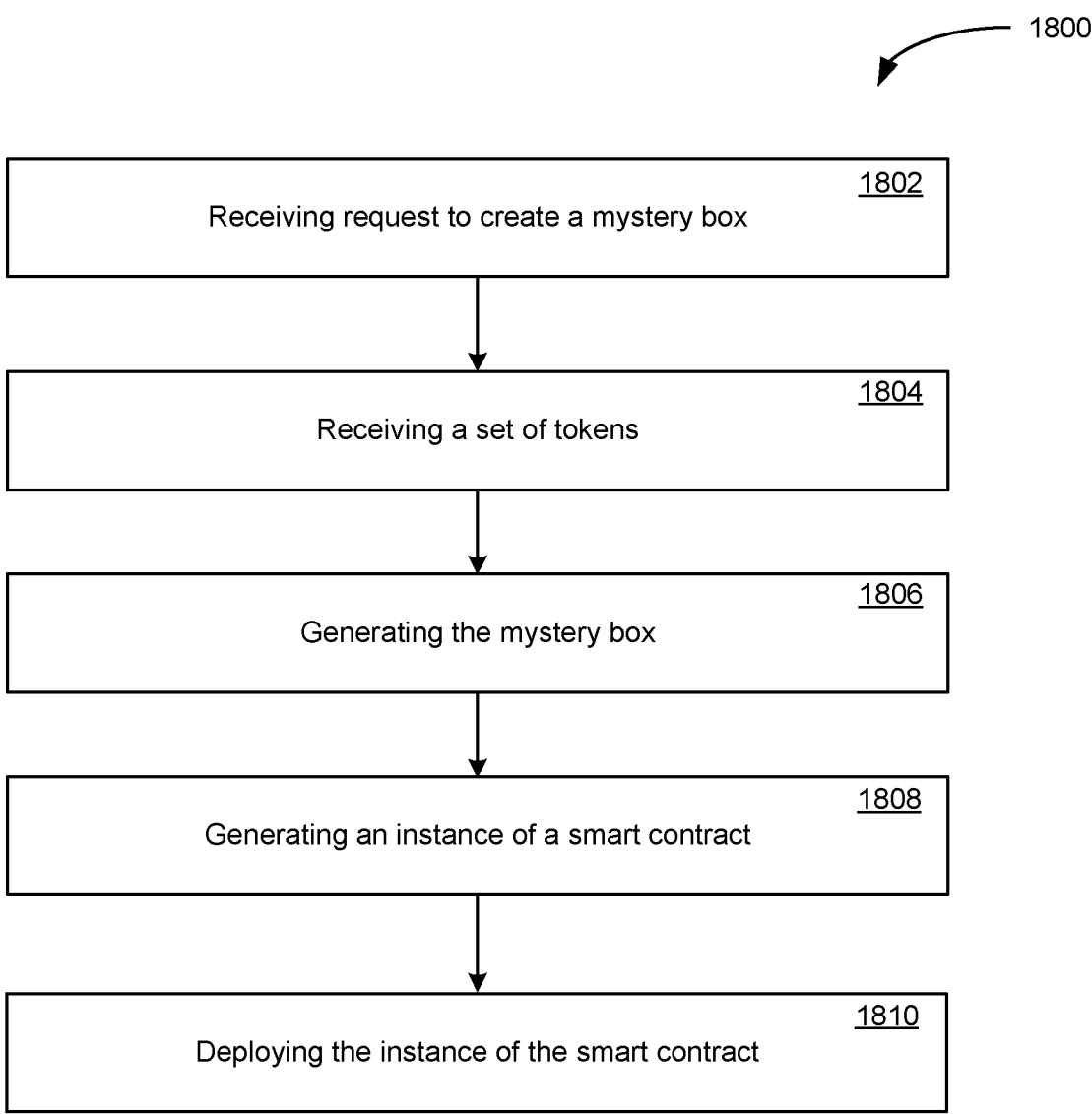
FIG. 18 is a flowchart showing a technique for managing mystery boxes according to some embodiments of the present disclosure.

FIG. 18 depicts a flowchart showing a technique 1800 for managing mystery boxes according to some embodiments of the present disclosure. At 1802, a request to create a mystery box is received by the processing system. At 1804, a set of tokens to be included in the mystery box is received by the processing system. Each token in the set of tokens represents a respective item and has a probability assigned thereto. The probability indicates a probability of winning the respective item.

At 1806, the mystery box is generated by the processing system based on the set of tokens and the probabilities assigned thereto. Each token in the set of tokens is assigned a range of values within an interval of values such that the range of values with respect to the interval of values is proportionate to the probability assigned to the token.

At 1808, an instance of a smart contract is generated by the processing system. The smart contract is associated with the mystery box and governs the transfer of tokens from the set of tokens in support of the mystery box. At 1810, the instance of the smart contract is deployed by the processing system.

Figure 19:
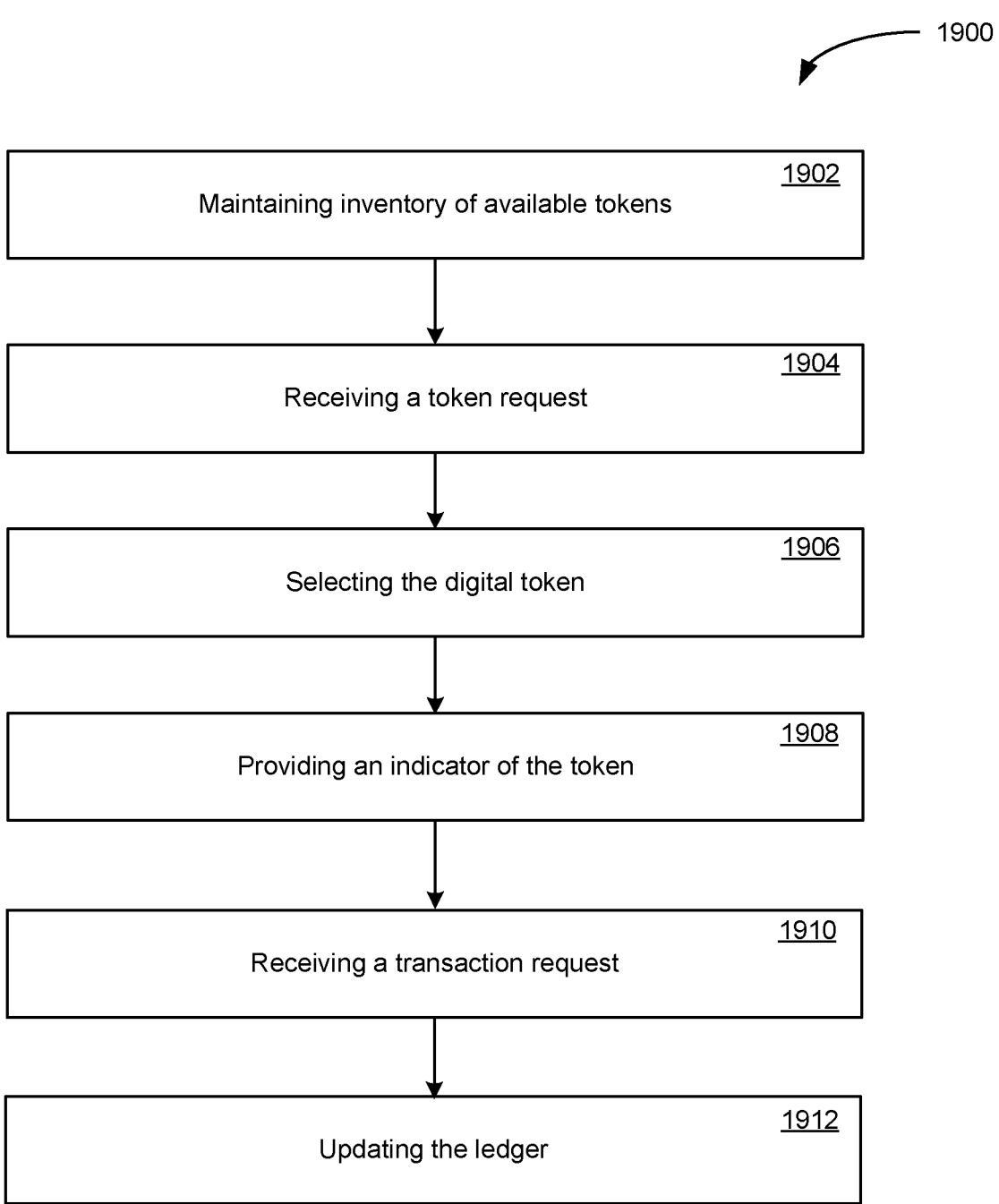
FIG. 19 is a flowchart showing a technique for video-game integration according to some embodiments of the present disclosure.

FIG. 19 depicts a flowchart showing a technique 1900 for video-game integration according to some embodiments of the present disclosure. At 1902, an inventory of available tokens is maintained. The available tokens are available for integration in a video game. Each token in the inventory of tokens represents a respective item. At 1904, a token request for a digital token is received by the processing system. The digital token is from an instance of the video game via an API. At 1906, the processing system selects the digital token from the inventory of available tokens based on the token request. At 1908, an indicator of the token is provided to the instance of the video game by the processing system. At 1910, the processing system receives a transaction request from the instance of the video game. The transaction request is configured to request a transfer of the token provided to the instance of the video game to an account of a user of the instance of the video game. At 1912, the ledger is updated to reflect that the user is the owner of the token.

Figure 20:
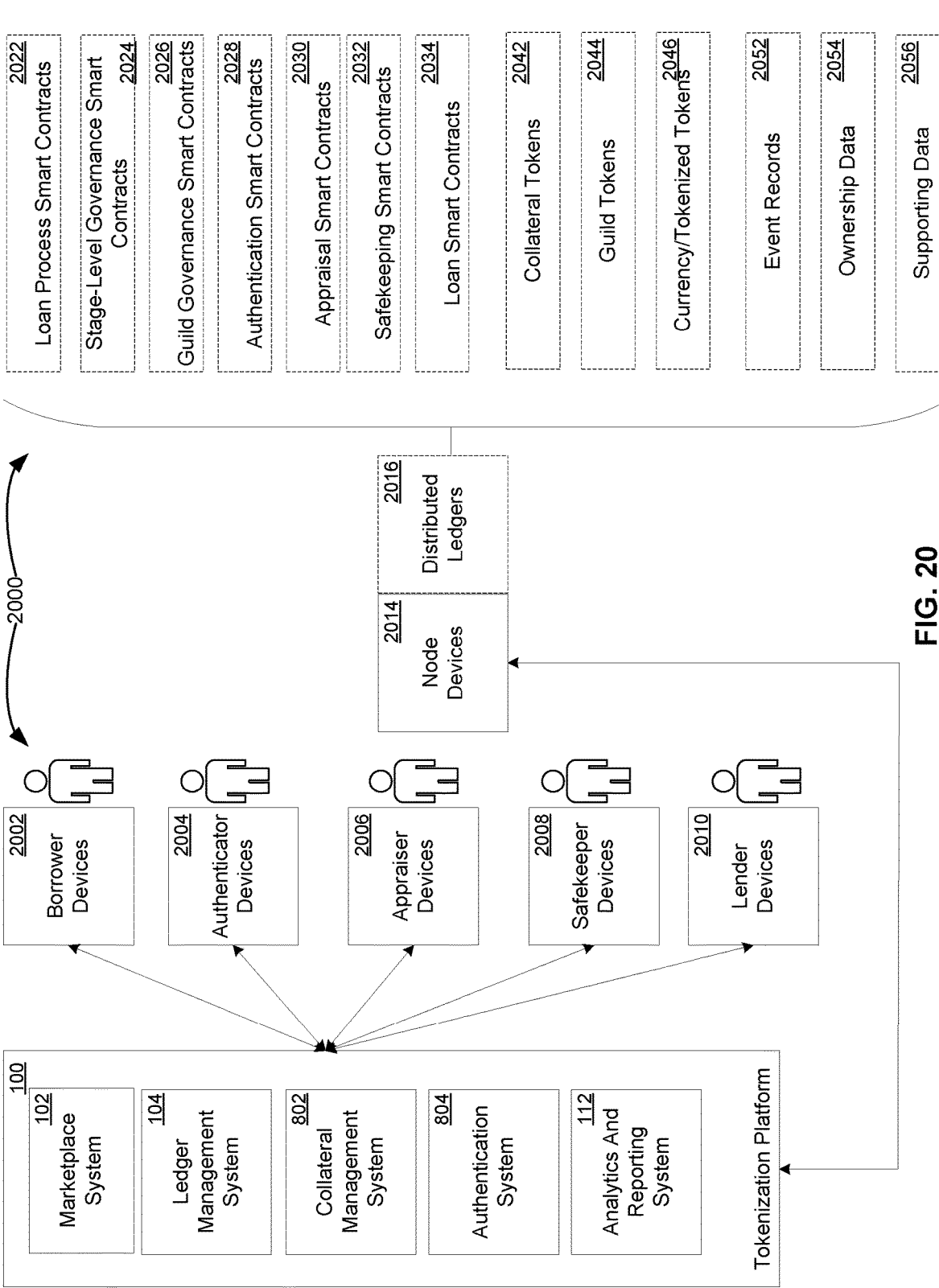
FIG. 20 is a schematic illustrating an example ecosystem of a decentralized lending system according to some embodiments of the present disclosure.

FIG. 20 illustrates an example ecosystem 2000 for facilitating securitized decentralized loan processes (also referred to as a "decentralized loan process", "securitized loan process", or "loan process"). A securitized decentralized loan process may refer to a process that is distributed amongst a series of participants (e.g., vis-à-vis computing systems 100, 2014 and devices 2002, 2004, 2006, 2008, 2010) and a set of smart contracts hosted on the set of distributed ledgers 2016, such that a borrower can collateralize one or more physical items in a trustless or substantially trustless manner and a lender is empowered to loan money to the borrower in a trustless or substantially trustless manner (e.g., without having to personally authenticate, appraise, safekeep, and/or liquidate the collateral item). In particular, the disclosed ecosystem and the systems and methods that support it provide mechanisms that allow a borrower to digitally collateralize a physical item into a digital collateral token 2042, such that the digital collateral token 2042 can be used to secure a loan from a lender using smart contracts. In embodiments, the stages of a decentralized loan process may include one or more of: a request stage where a borrower requests to being a loan process; an authentication stage where a collateral item is authenticated by one or more authenticators; an appraisal stage where the collateral item is appraised by one or more appraisers; a safekeeping stage where the collateral item is deposited with a safekeeper until an instance of the loan process ends; a virtualization stage where a VIRL corresponding to the collateral item is generated; a tokenization stage where the VIRL is tokenized into a collateral token 2042; a loan request stage where a borrower may request a loan and/or negotiate the terms of the loan with one or more potential lenders that ends with the borrower and lender agreeing to the terms of the deal and the locking of the collateral token into an escrow account until the loan process is completed; a loan repayment stage where the loan is repaid by the borrower or defaulted on; and a post-loan stage where the collateral token 2042 is transferred back to the borrower if the loan is successfully repaid or liquidated to a buyer if the borrower has defaulted, the collateral token is redeemed for the collateral item from the safekeeper, and/or any post-loan analytics are performed.

In some example embodiments, a tokenization platform 100 supports securitized decentralized loan processes. In these example embodiments, a marketplace system 102, a ledger management system 104, a collateral management system 802, an authentication system 804, and an analytics and reporting system 112 may be configured to interface with a set of user devices (e.g., borrower devices 2002, authenticator devices 2004, appraiser devices 2006, safekeeper devices 2008, and/or lender devices 2010) in facilitating the decentralized loan processes vis-à-vis a set of distributed ledgers 2016 hosted by a set of node devices 2014. In embodiments, the securitized decentralized loan ecosystem 2000 includes a number of different participants that participate in different stages of a securitization decentralized loan process. In some embodiments, the participants in the loan may include borrowers that seek to obtain a loan using physical collateral items, authenticators that authenticate the physical collateral items, appraisers that appraise the physical collateral items, safekeepers that safely store the physical collateral items, lenders that lend currency to the borrowers, as well as other suitable participants that support a distributed ledger ecosystem (e.g., "miners" and/or distributed ledger node devices 2014). As will be discussed, some types of participants may be organized into guilds, which are groups of entities (e.g., individuals and/or businesses) that have subject-matter expertise that pertains to a particular stage, such as authentication, appraisal, and safekeeping. It is appreciated that the participants in the securitized decentralized ecosystem 2000 may interact with one another and with the distributed ledger(s) 2106 via various computing devices, such as laptop computers, desktop computers, tablets, video game consoles, server computers, and/or the like. For purposes of explanation, a borrower participates in the ecosystem 2000 via a borrower device 2002, an authenticator participates in the ecosystem 2000 via an authenticator device 2004, an appraiser participates in the ecosystem 2000 via an appraiser device 2006, a safekeeper participates in the ecosystem 2000 via a safekeeper device 2008, a lender participates in the ecosystem 2000 via a lender device 2010, and the like.

In embodiments, a securitized decentralized loan process may be at least partially implemented using a set of distributed ledgers 2016 hosted by a network of node devices 2014, where the node devices 2014 execute smart contracts instances that are created in connection with a securitized loan process, including one or more smart contracts that manage the authentication, appraisal, and/or securitization of one or more collateral items. In some embodiments, one or more stages in the decentralized loan process are managed by a respective set of smart contracts. In general, a smart contract may include computer executable code that, when executed, executes conditional logic that triggers one or more actions. Smart contracts may receive data from one or more data sources, whereby the conditional logic analyzes the data to determine if certain conditions are met, and if so, triggers one or more respective actions. Examples of smart contracts are discussed throughout the disclosure, including examples of conditional logic and triggering actions. In embodiments, the smart contracts may be defined in accordance with one or more protocols, such as the Ethereum protocol, the WAX protocol, and the like. Smart contracts may be embodied as computer-executable code and may be written in any suitable programming languages, such as Solidity, Golang, Java™, JavaScript™, C++, or the like. Various examples of smart contracts that may be used in connection with various embodiments of the securitized decentralized are discussed throughout the disclosure. In example embodiments of FIG. 20, a distributed ledger 2016 may store and the node devices 2014 may execute instances of: loan process smart contracts 2022, stage-level governance smart contracts 2024, guild governance smart contracts 2026, authentication smart contracts 2028, appraisal smart contracts 2030, safekeeping smart contracts 2032, loan smart contracts 2034, and/or other suitable smart contracts. The different types of smart contracts are discussed throughout the disclosure.

In embodiments, the distributed ledgers 2016 may store tokens that are used in connection with a decentralized loan process, including, but not limited to, collateral tokens 2042 that are generated in connection with the decentralized loan process and held as collateral to secure a loan, guild tokens 2044 that are owned and/or used by guild members (which can be used by guild members to vote, as discussed below) that perform a certain task in connection with a decentralized loan process, currency/tokenized tokens 2046 that are utilized in connection with the decentralized loan process (e.g., for lending, for repayment, for rewarding, for staking, or the like), and other suitable tokens. In embodiments, a collateral token 2042 may be a digital token that wraps one or more virtual representations of a physical item (VIRLs) of one or more respective collateral items that are used to securitize a loan in a decentralized loan process. In embodiments, the VIRL corresponds to a physical item and may include descriptions of the item, photographs of the item, videos of the item, and the like. Virtual representations (VIRLs) of physical items are discussed throughout the disclosure. In embodiments, a collateral token 2042 may include a smart contract wrapper, such that when an owner of the collateral token (as determined from an ownership record of the collateral token after a loan has been repaid and/or after a liquidation event) redeems the token (as discussed above), the smart contract associated with the collateral token 2042 may provide a notification to the safekeeper of a collateral item represented by the collateral token 2042 to provide the collateral item. Once the safekeeper confirms that the holder of the collateral token 2042 has taken possession of the collateral item, the smart contract of the collateral token 2042 may burn the redeemed collateral token 2042, as described above. Currency tokens may refer to digital tokens that are used as currency. Examples of currency tokens may include Bitcoin tokens, Ethereum tokens, Ripple tokens, Wax tokens, and the like. In some embodiments, a tokenized token refers to a digital token that "wraps" an amount of currency (e.g., a currency token and/or fiat currency). When a tokenized token is created, an amount of currency is held escrow and the tokenized token represents an ownership right to the escrowed amount of currency, such that when the tokenized token is redeemed by a verified owner of the tokenized token, the owner may take possession of the escrowed amount of currency. As currency tokens and tokenized tokens are both representative of currency, use of the term "currency/tokenized" tokens may refer to either currency tokens, tokenized tokens, or a combination of both currency tokens and tokenized tokens.

In embodiments, the distributed ledgers 2016 may store additional data, such as event records 2052, ownership data 2054, and/or supporting data 2056. Event records 2052 may include records that memorialize any events that occur in connection with a decentralized loan process. Event records 2052 may include records of events such as, but not limited to: a request by a borrower to being a loan process, an authentication task being assigned, an authentication task being completed, an appraisal task being assigned, an appraisal task being completed, a safekeeping task being assigned, a safekeeping task being completed, a loan being requested by a borrower, a loan being accepted by a lender, a locking of a collateral token of a borrower that is locked in escrow in response to a loan agreement being entered into by the borrower, a payment being made by the borrower to the lender, a payment being missed by the borrower, the transfer of a loan contract to a secondary lender from a current lender, a loan being determined to be in default by a borrower, a liquidation event occurring, a loan being fully repaid by the borrower; rewards being awarded to participants in a decentralized process, an item being deemed fake after a liquidation event, an item failing to reach an appraised value during a liquidation event, and the like. In embodiments, an event record may be generated by any suitable computing device within the ecosystem 2000, such as the tokenization platform 100, borrower devices 2002, authenticator devices 2004, appraiser devices 2006, safekeeper devices 2008, lender devices 2010, node devices 2014 (e.g., by smart contracts executed by the node devices 2014), or other suitable devices. In embodiments, an event record 2052 may be hashed using a hashing function to obtain a hash value. The event record 2052 may be written into a data block and stored in a distributed ledger, where the data block may include the hash value. In this way, the data within the event record 2052 cannot be changed without changing the hash value of the event record 2052, thereby making the event record 2052 immutable. Once a block containing an event record 2052 is stored on a distributed ledger, the event record 2052 may be referenced using an address of the block with respect to the distributed ledger 2016.

In embodiments, supporting data 2056 may be documentation and data that is provided in support of a task performed or other events that occur in connection with decentralized loan processes and/or the participants of the decentralized loan processes. As will be discussed, supporting data 2056 may include authentication reports and supporting photographs, videos, scans or the like; appraisal reports and supporting photographs, videos, scans or the like; safekeeping reports and supporting photographs, videos, scans or the like; loan negotiation records that indicate negotiation events during negotiation of a loan contract; disbursement records that correspond to disbursement events by a lender to the borrower; repayment records that indicate payment events by the lender; default records that indicate default events; and/or other suitable data.

In embodiments, ownership data 2054 may include data that associates a token (e.g., collateral tokens 2042, currency/tokenized tokens 2046, and/or guild tokens 2044) to an account. In embodiments, ownership data 2054 may be stored in data blocks, where a data block may include a link between a token address and an account address. For example, if Bob owns 10 currency tokens (e.g., bit coins), the ownership data 2054 of each token may be stored on a distributed ledger and may link the respective tokens to an account associated with Bob. If Bob uses one of those tokens 2046 to purchase an item from Alice, the ownership data 2054 of the token can be updated to link the token 2046 used to purchase the item to an account of Alice. When ownership changes to a new account, a new block may be amended to the distributed ledger 2016 that links the token with the new account. In embodiments, tokens (e.g., collateral tokens 2042 and/or currency/tokenized tokens 2046) may be locked during the course of a loan process. As used herein, "locking" a token may refer to storing the token in an escrow account (e.g., on a distributed ledger that stores escrowed tokens), whereby a locked token cannot be transferred from the escrow account unless a smart contract associated with the token determines that the token has been unlocked. In embodiments, a collateral token may be "locked," for example, upon a borrower and lender agreeing to loan terms. In some embodiments, a certain amount of currency/tokenized tokens 2046 belonging to participants (e.g., authenticators, appraisers, and/or safekeepers) may be locked when the participants perform certain tasks in relation to securing a loan (e.g., authentication tasks, appraisal tasks, and safekeeping tasks) to provide an incentive to the participants to participate in the loan process in good faith (e.g., err on the side of not authenticating a collateral item, not overvalue collateral items to increase rewards for appraising, and to store collateral items property). When a token is "locked," ownership data 2054 that links the token to an escrow account that is managed by a trusted third party (e.g., the tokenization platform 100) may be added to the distributed ledger. Once locked in the escrow account, the token cannot be redeemed or transferred unless it is unlocked. Once an event that triggers a change in ownership of a token (e.g., repayment of at least a portion of the loan) occurs, the ownership data 2054 of the token may be updated in the distributed ledger 2016 storing the ownership data 2054 to reflect that the token is owned by the rightful owner (e.g., the borrower, a participant, a buyer of the token, or the like), thereby unlocking the token. In some embodiments, when a collateral token 2054 is locked, the owner of the physical item may be precluded from using the virtual representation of the item in a virtual environment. For example, if the owner of a physical item that is tied to a video game via a VIRL (e.g., the owner of a shoes also owns a VIRL of the shoes that when used in the video game give the owner special features in the video game, such as running faster or jumping higher) collateralizes the physical item using the techniques described herein and locks the resultant collateral token 2042 in an escrow account, the locking of the collateral token will result in the user being precluded from using the VIRL of the physical item in the video game. In embodiments, an external virtual environment, such as a marketplace, a video game, a social media platform or the like may be configured to query a distributed ledger to obtain the ownership data 2054 of a VIRL. If the VIRL is wrapped in a collateral token 2042 that is held in escrow, the virtual environment may determine that the corresponding collateral token is held in escrow and may preclude a user from using the VIRL in the virtual environment until the ownership data 2054 of the VIRL indicates that the user owns the VIRL.

It is noted that in addition distributed ledgers 2016, event records 2052, ownership data 2054, and supporting data 2056 and other suitable data that supports the decentralized loan processes may be stored in non-distributed datastores, filesystems, databases, and the like. For example, in embodiments, the tokenization platform 100 may maintain data stores that store event records 2052, ownership data 2054, and supporting data 2056 and other suitable data that supports the decentralized loan processes.

In embodiments, certain groups of participants (e.g., authenticators, appraisers, safekeepers, and the like) in the decentralized loan process may form or be organized into guilds based on a common expertise in an area in accordance with a set of governances that are defined to facilitate a securitized decentralized loan process. In general, guild formation, membership, and operations thereof, as well as the transactions (and other events) performed during a loan process and mechanisms for facilitating a loan process adhere to a set of governances. Governances may refer to respective sets of rules and/or regulations to which one or more aspects of the loan process and the participants adhere. In embodiments, governance may be defined in a set of files and/or documents (e.g., governance documents) that are stored on a distributed ledger and/or a centralized computing system (e.g., the tokenization platform). In some embodiments, governance may be enforced by the use of smart contracts and/or software applications that are executed by a centralized computing system (e.g., the tokenization platform 100). In embodiments, the set of governances may include a system-level governance that applies to the entire loan process (e.g., all transactions and participants that participate in the loan process), stage-level governances that apply to participants that participate in a particular stage (or set of stages) of the loan process and the transactions that are performed during the particular stage (or set of stages), guild-level governances that apply to respective guilds that participate in a respective stage and/or the transactions in which the guild members participate, and/or sub-guild governances that apply to respective sub-guilds formed from respective guilds and the transactions in which the sub-guild members participate. In embodiments, the set of governances are hierarchical, whereby the system-level governance takes precedent over stage-level governances that correspond to respective stages of the loan process, a stage-level governance of a respective stage takes precedent over guild-level governances of respective guilds that participate in the respective stage, and a guild-level governance of a respective guild takes precedent over sub-guild governances of sub-guilds formed from within the respective guild. Put another way, a sub-guild governance of a sub-guild can expand on or further refine, but not contradict, the rules and regulations put forth in the guild-level governance of the guild from which the sub-guild was formed; a guild-level governance can expand on or further refine, but not contradict, the rules and regulations put forth in the stage-level governance of the stage in which the guild participates, and a stage-level governance can expand on or further refine, but not contradict, the rules and regulations put forth in the system-level governance. It is appreciated that none of the different types of governances are required and certain stages and guilds may adhere to a higher-level of governance (e.g., the system-level governance or a stage-level governance) without departing from the scope of the disclosure.

As discussed, the term "guild" may refer to a set of entities (e.g., individuals or companies) that perform a defined type of specialized task (e.g., authentication, appraisal, and/or safekeeping of specific types of collateral items) that may be domain specific (e.g., authentication of watches, appraisal of sneakers, safekeeping of valuable and/or perishable items), whereby members of the guild adhere to a set of governances. For purposes of explanation, guild members are described as individuals, but it is appreciated that organizations may be comprised of individuals that have the same areas of expertise and therefore may be included in guilds. In some embodiments, a guild must adhere to the system-level governance, a stage-level governance corresponding to the stage in which the guild participates, and/or a guild-level governance of the guild to which the guild member belongs. The stage-level governance may define the rules and regulations that pertain to all participants that can participate in a stage (e.g., authentication stage, appraisal stage, safekeeping stage, lending stage, and the like). For example, an authentication stage-level governance may apply to any authenticators that perform authentication tasks in connection in a decentralized loan process, an appraisal stage governance may apply to any appraisers that perform appraisal tasks in connection with a decentralized loan process, a safekeeping stage governance may apply to any safekeepers that perform safekeeping tasks in connection with a decentralized loan process, a lending stage governance may apply to any lenders that lend money with a decentralized loan process, and the like. Guild-level governances may define rules and regulations to members of a particular guild that participate in a particular stage. For example, a watch authentication guild governance may only pertain to members of a watch authentication guild, a handbag authentication guild governance may only pertain to members of a handbag authentication guild, a jewelry authentication guild governance may only pertain to members of a jewelry authentication guild, a watch appraisal guild governance may only pertain to members of a watch appraisal guild, a handbag appraisal guild governance may only pertain to members of a handbag appraisal guild, a sneaker appraisal guild governance may only pertain to members of a sneakers appraisal guild, and the like. In embodiments, a stage-level guild governance may define one or more of: the manner by which guilds can be created, the manner by which guild members are added to a guild; the manner by a guild member is removed from the guild, the manner by which guild members vote on amending the governance, workflows, smart contracts, and/or documents that are implicated by certain tasks that are performed by a respective guild (e.g., appraisals, authentications, safekeeping, and the like); voting mechanics; and the like. As discussed, the sets of governances may be hierarchical in nature, such that lower-level governances are required to adhere and/or not contradict higher level governances. For instance, the authentication stage-level governance may define a set of rules and regulations that applies to all authenticators and a guild-level governance may define a set of rules, recommendations, and/or regulation that applies to a respective guild (e.g., a watch authentication guild or a jewelry authentication guild) within the broader group of authenticators (e.g., all authenticators). In this example, the guild-level governance may be required to adhere and not contradict to the stage-level governance, but may refine rules and/or regulations in the stage-level governance as well as add new rules and/or regulations that were not defined in the stage-level governance. For instance, an example authentication stage-level governance may require that authenticators temporarily stake at least certain amount of funds (e.g., half of a loan amount) for each authentication task performed by a guild member. In this example, a guild-level governance of an authentication guild (e.g., watch authentication guild) must require its guild members at least stake the amount of funds defined in the authentication stage-level governance in connection with authentication tasks performed by guild members, but the guild-level governance may require a greater amount (e.g., the entire loan amount) than the amount defined in the authentication stage-level governance. In another example, an appraisal stage-level governance may require that appraisers provide documentary support for an appraisal and a guild-level appraisers governance that pertains to a specific guild of appraisers may further refine what documentary support is to be provided in support of an appraisal performed by a guild member. Additional examples of governance rules, recommendations, and/or regulations are provided throughout the disclosure.

In some embodiments, membership to a guild is at least in part decided by existing guild members in accordance with the stage-level and/or guild-level governance of the guild. For example, in example embodiments, the stage-level governance and/or a guild-level governance of a guild may provide that a guild member may nominate an individual not in the guild to be added to the guild and the members of the guild may vote to admit or deny the entity to the guild and may further include the mechanics on how to nominate, vote on, and admit a new member to the guild. Thus, in order to add a new member to the guild, the existing guild members must conduct the nomination and voting process in accordance with the controlling governances. In some embodiments, voting may be managed using a guild governance smart contract 2026. A guild governance smart contract 2026 may refer to a smart contract that is configured to manage administrative tasks of a guild, such as voting on amending a guild-level governance and/or stage-level governance (if the guild governance smart contract 2026 pertains to the broadest guild), voting on adding new members to a guild, voting on removing members from a guild, issuing guild tokens 2044 to guild members, and/or the like. In some of these embodiments, a guild governance smart contract 2026 that is used to vote in new members into a guild may include conditional logic that receives a nomination of a potential guild member and determines whether certain conditions are met (e.g., does the nominator have a high enough rating to nominate, has the nominator been a guild member long enough to nominate, does the nominator have a minimum number of guild tokens 2044 or other analogous status indicators to nominate a new guild member, was the proper protocol used, and/or the like). In response to verifying that the nomination is valid, the guild governance smart contract 2026 may execute an action that solicits votes from the current guild members and to tally the votes. Once a member is voted on, the guild governance smart contract 2026 may be configured to determine whether the nominee has received enough votes to be admitted to the guild. If so, the nominee is added to the guild. If not, the nominee is denied admittance to the guild. In doing so, the guild governance smart contract 2026 may create one or more event records 2052 identifying the results of the vote and/or whether a new member was added to the guild. In embodiments, the event records 2052 may be written to a distributed ledger 2016. The guild governance contract 2026 may perform additional actions, such as granting the new member guild tokens 2044, creating a profile for the new guild member, adding the new guild member to a roster from which guild members are selected to perform tasks, and/or the like. Guild members may be added to a guild in other manners without departing from the scope of the disclosure.

In embodiments, an authentication guild may include a set of individuals or organizations that have domain specific expertise authenticating a particular type (or types) of item(s). For example, a watch authentication guild may be comprised of individuals that have expertise authenticating watches, a shoe authentication guild may be comprised of individuals that have expertise authenticating shoes, a handbag authentication guild may be comprised of individuals that have expertise authenticating handbags, an art authentication guild may be comprised of individuals that have expertise authenticating works of art, a sports memorabilia guild may be comprised of individuals that have expertise authenticating sports memorabilia, a toy authentication guild may be comprised of individuals that have expertise authenticating collectible toys, a jewelry authentication guild may be comprised of individuals that have expertise authenticating jewelry, a clothing authentication guild may be comprised of individuals that have expertise authenticating designer clothing, an instrument authentication guild may be comprised of individuals that have expertise authenticating musical instruments, a record authentication guild may be comprised of individuals that have expertise authenticating rare or collectible records, a wine authentication guild may be comprised of individuals that have expertise authenticating bottles of wine, a whiskey authentication guild may be comprised of individuals that have expertise authenticating bottles of whiskey, an automobile authentication guild may be comprised of individuals that have expertise authenticating limited edition automobiles, and any other suitable authentication guild.

In embodiments, an appraisal guild may include a set of individuals or organizations that have domain specific expertise appraising a particular type (or types) of item(s). For example, a watch appraisal guild may be comprised of individuals that have expertise appraising watches, a shoes appraisal guild may be comprised of individuals that have expertise appraising shoes, a handbag appraisal guild may be comprised of individuals that have expertise appraising handbags, an art appraisal guild may be comprised of individuals that have expertise appraising works of art, a sports memorabilia appraisal guild may be comprised of individuals that have expertise appraising sports memorabilia, a toy appraisal guild may be comprised of individuals that have expertise appraising collectible toys, a jewelry appraisal guild may be comprised of individuals that have expertise appraising jewelry, a clothing appraisal guild may be comprised of individuals that have expertise appraising designer clothing, an instrument appraisal guild may be comprised of individuals that have expertise appraising musical instruments and equipment, a record appraisal guild may be comprised of individuals that have expertise appraising rare or collectible records, a wine appraisal guild may be comprised of individuals that have expertise appraising bottles of wine, a whiskey appraisal guild may be comprised of individuals that have expertise appraising bottles of whiskey, an automobile appraisal guild may be comprised of individuals that have expertise appraising limited edition automobiles, and any other suitable appraisal guild.

Within some guilds there may be different classes of items that are much more popular than others and/or may require additional expertise. For example, within the watch authentication guild, there may be a large number of authentication requests to authenticate Rolex® watches some guilds, both because of the number of such watches on the market and the number of counterfeit watches that are meant to pose as Rolex® watches. Thus, in some embodiments, some stage-level governances and/or guild-level governances may provide a mechanism by which one or more sub-guilds can be formed, where a sub-guild of a guild is comprised of individuals of the guild that have expertise in authenticating a particular subdomain of the guild's area of expertise. For example, within the watch guild, there may be respective sub-guilds that specialize in authenticating different brands of watches, such as Rolex® watches, Omega® watches, Hamilton® watches, and the like. In another example, the shoe authentication guild, there may be respective sub-guilds that specialize in authenticating different types of shoes, such as sneakers, high-tops, skateboarding shoes, heels, dress shoes or the like, and/or sub-guilds that specialize in authenticating different brands of shoes, such as Nike® shoes, Jordan® shoes, Adidas® shoes, Gucci® shoes, Louboutin® shoes, or the like. In another example, within the art authentication guild, there may be respective sub-guilds that specialize in authenticating works of art in different mediums, such as paintings, oil paintings, sculptures, lithographs, concert posters, swords, vases, pottery, and the like; different styles of art, such as impressionist paintings, abstract paintings, post-modern art, pop art, graffiti, Japanese swords, Chinese vases, Faberge eggs, or the like; and/or art by different artists. As can be appreciated, different guilds may be broken down into sub-guilds in different manners. Furthermore, because a sub-guild exists for a subdomain of the guild, does not mean that all items must fall within a sub-guild. For example, if the watch authentication guild includes a Rolex sub-guild but no other sub-guilds, a Rolex® watch may be authenticated by one or more authenticators in the Rolex® sub-guild, but an Omega® watch may be authenticated by one or more authenticators within the broader watch authentication guild, including members of the Rolex sub-guild.

In embodiments, the ability to form a sub-guild from within a respective guild may be defined in the respective guild's guild-level governance and/or stage level governance. In some of these embodiments, formation of new sub-guilds from a respective guild may be managed and enforced using a guild governance smart contract 2026 corresponding to the respective guild. In some embodiments, a guild governance smart contract 2026 may define the mechanics by which a sub-guild can be requested (e.g., automatically or by a set of guild members) and created. For example, a guild governance smart contract 2026 that is used by a particular authentication guild (e.g., watch authentication guild) may include conditional logic that defines a minimum number and/or minimum percentage of guild members (e.g., watch authenticators) that are required to request/approve the creation a new sub-guild (e.g., a Rolex sub-guild). In this example, the guild-level governance of the particular authentication guild may require that at least ten guild members and/or that at least 50% of the guild members voting power (where voting power may be determined using a voting token scheme where members with more guild tokens 2044 have more voting power or a "one-member-one-vote" scheme where every member has one equally weighted vote) agree to the creation of a sub-guild. Additionally or alternatively, the guild governance smart contract 2026 may include conditional logic that requires a minimum number or minimum percentage of verified successful authentication events (or other tasks if another stage) performed by the guild members involving a particular subclass of items to authorize the creation of a new sub-guild. For example, the guild governance smart contract 2026 of a shoe authentication guild may require proof of at least one thousand successful authentication events and at least 5% of the total authentication events to involve a particular class of shoes, and the shoe authentication guild has collectively performed 10,000 successful authentication events involving a pair of shoes, and over 1000 of those authentication events have involved Nike® sneakers, the shoe guild may vote to create a Nike® sub-guild (or a "sneaker" sub-guild). In this example, the shoe authentication guild's guild governance smart contract may require analytics to prove the over 1000 successful authentication events (which may include successful identification of knock-off sneakers and/or successful authentication of authentic Nike® sneakers). In embodiments, the analytics to prove that the guild has reached the requisite number of successful authentications may be obtained based on an analysis of a distributed ledger that stores authentication records. Furthermore, the shoe authentication guild-level governance may then require the guild members to vote on the creation of the new Nike® sub-guild, where the voting scheme is defined in the shoe guild-level governance and/or the authentication stage-level governance. Assuming all of the conditions to create a new sub-guild within the shoe guild are met, a guild governance smart contract may trigger a "create new sub-guild" action. In embodiments, the create new sub-guild action may include the creation of a new governance that corresponds to the sub-guild that defines the rules for the particular sub-guild, including rules for membership into the sub-guild, compensation and commissions for the sub-guild, mechanics for verifying items that are classified in the sub-guild, how the sub-guilds secures the authentication event, authentication forms used by the sub-group, and the like. It is noted that in embodiments, the sub-guild governance of the sub-guild may initially inherit one or more aspects of the broader guild governance (some of which are changeable by the sub-guild and some of which may not be changed by the sub-guild). In embodiments, the "create new sub-guild" action may include issuing a notification of the new sub-guild to the tokenization platform 100, such that the platform 100 may update the assignment of authentication tasks involving items that are classified under the expertise of the new sub-guild to the new sub-guild.

Figure 21:
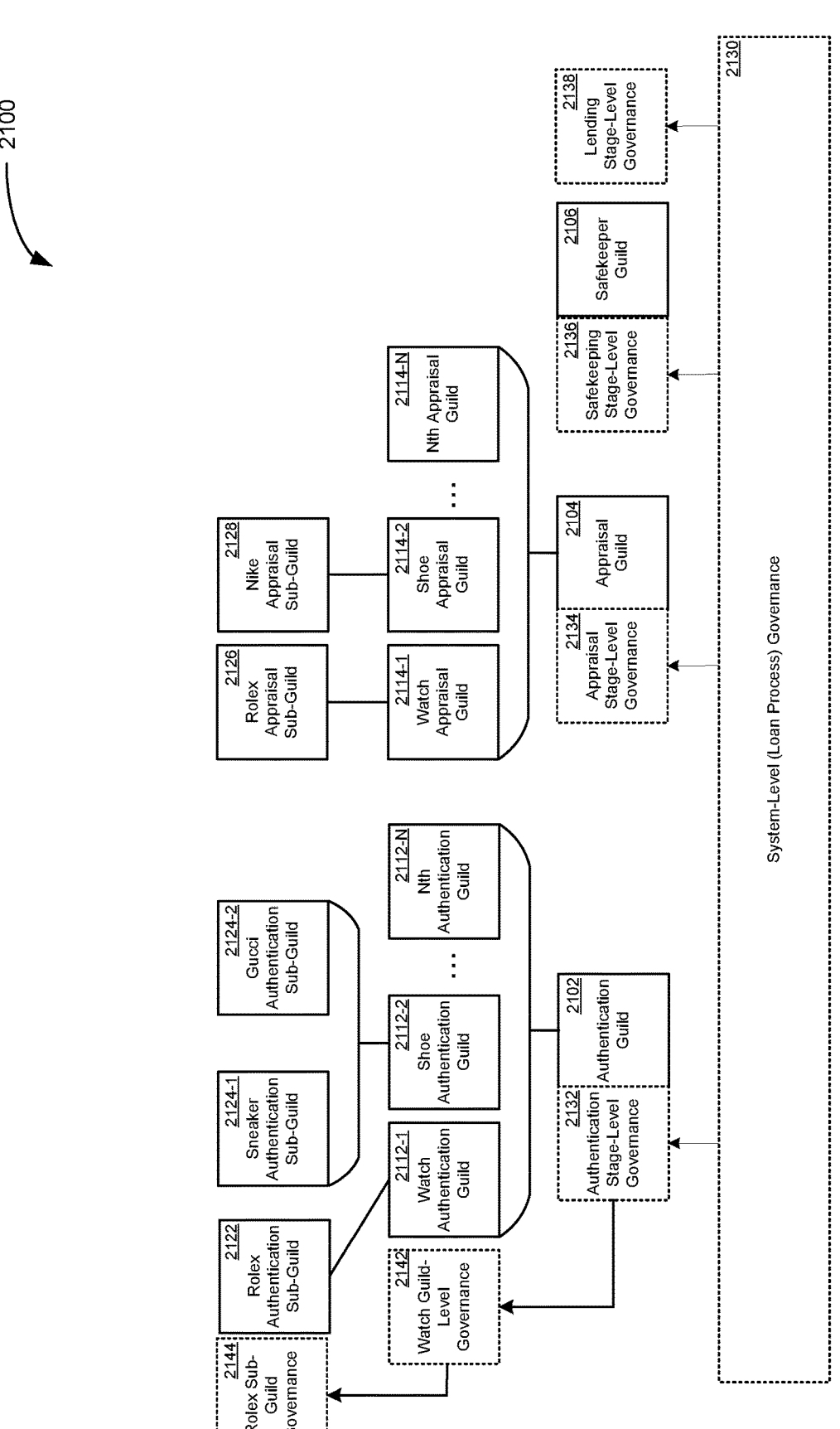
FIG. 21 is a schematic illustrating an example of guilds, sub-guilds, and various types of governances that govern various stages of a decentralized loan process according to some embodiments of the present disclosure.

FIG. 21 illustrates an example of guilds within a decentralized loan ecosystem 2000 and the different types of governances that may govern the guild members and/or different aspects of the loan system. In the illustrated example, the stage-level guilds may include an authentication guild 2102 comprised of authenticators that perform authentication tasks, an appraisal guild 2104 comprised of appraisers that perform appraisal tasks, and a safekeeper guild 2106 comprised of safekeepers that perform safekeeping tasks. It is appreciated that additional or alternative types of participants may form guilds in different examples. For example, lenders may form a lenders guild (not shown). As discussed, within the authentication guilds, there may be guilds that include members having certain authentication specialties or that are located in certain regions. In the illustrated example, within the authentication guild, there may be a watch authentication guild 2112-1, a shoe authentication guild 2112-2, and/or any other suitable authentication guilds (e.g., Nth authentication guild 2112-N). Within some of the authentication guilds, authentication sub-guilds may be formed. For example, within the watch guild 2112-1, a Rolex sub-guild may be formed, where the members of the Rolex sub-guild 2122 may be watch guild members that have a special expertise in authenticating Rolex® watches. In this way, members of the Rolex sub-guild 2112-1 will be assigned authentication tasks pertaining to Rolex® watches (and potentially of other types of watches), while watch guild 2112-1 members that are not in the sub-guild 2122 cannot authenticate Rolex® watches but can authenticate any other type of watch (assuming no other watch sub-guilds exist). Similarly, within the shoe authentication guild 2112-2, a sneaker authentication sub-guild 2124-1 and a Gucci authentication sub-guild 2124-1 have formed by members of the shoe authentication guild 2112-2. In this example, members of the sneaker authentication sub-guild 2124-1 can authenticate any type of sneakers, but shoe authenticators that are not in the sneaker authentication sub-guild 2124-1 cannot authenticate sneakers. Similarly, members of the Gucci authentication sub-guild 2124-2 can authenticate Gucci® shoes, but shoe authenticators that are not in the Gucci authentication sub-guild 2124-2 cannot authenticate Gucci® shoes.

Within the appraisal guild 2104, there may be guilds that are directed to members having certain appraisal specialties or that are located in certain regions. In the illustrated example, within the appraisal guild 2104 there may be a watch appraisal guild 2114-1, a shoe appraisal guild 2114-2, and/or any other suitable appraisal guilds (e.g., Nth appraisal guild 2114-3). In the illustrated example, a Rolex appraisal sub-guild 2126 has been formed from the watch appraisal guild 2114-1 and a Nike appraisal guild 2128 has been formed from the shoe appraisal guild 2114-2. As can be appreciated, the sub-guilds that are formed from within the various guilds do not need to be congruent with sub-guilds that are formed from guilds that participate in different stages. For example, while Rolex authenticators and Rolex appraisers formed respective sub-guilds 2122, 2126, there is no counterpart Nike authentication sub-guild and no counterpart sneaker appraisal sub-guild or Gucci appraisal sub-guild formed. The manner by which sub-guilds are formed may be defined in the stage-level governance and/or the guild governance of the guild from which a sub-guild is to be formed.

In this example, there are no guilds formed out of the safekeeper guild 2106. While this is the case in the current example, in some scenarios there may be guilds that include safekeepers having certain safekeeping specialties or that are located in certain regions. In the illustrated example, there are no guilds within the safekeeper guild, but safekeepers may organize according to region (e.g., states, cities, or the like), the ability to store certain types of items (e.g., vehicles, perishables, and/or the like), or other suitable common features.

In embodiments, the overall ecosystem 2100 (including the overall loan process workflow) may be governed by a system-level governance 2130. In this example, one or more stages may be governed by a stage-level governance that pertains to the participants in the stage and/or the workflows performed in connection with the stage. For example, an authentication stage-level governance 2132 pertains to all authenticators 2102 and the authentication stage, the appraisal stage-level governance 2134 pertains to all appraisers 2104 and the appraisal stage, the safekeeping stage-level governance 2136 pertains to all safekeepers 2106 and the safekeeping stage, the lending stage-level governance 2138 pertains to lenders (not shown) and the loan negotiation and repayment stages, and the like. As discussed, the stage-level governances 2132, 2134, 2136, 2138 can refine the system-level governance 2130 and may add rules and regulations that do not contradict the system-level governance 2130. Similarly, a watch guild-level governance pertains 2142 to the watch authentication guild 2112-1, but does not pertain to the other authentication guilds 2112-2 . . . 2112-N. The watch guild-level governance 2142 may include rules that further refine the system-level governance 2130 and/or add rules and regulations to the authentication stage-level governance 2132. In the example, a Rolex sub-guild governance 2144 may be created by the members of the Rolex authentication sub-guild 2122. The Rolex sub-guild governance 2144 defines additional rules and regulations that apply to members of the Rolex sub-guild 2122 when performing authentication of Rolex® watches, but that do not apply to other members of the watch authentication guild 2112-1. It is noted that the sub-guilds do not need a sub-guild governance and may use the guild-level governance of the guild from which the sub-guild was formed. More detailed discussion of guilds and governances are described below.

Referring back to FIG. 20, governances may define rules and regulations pertaining to different aspects of a securitized decentralized loan process. In embodiments, a system-level governance defines rules and regulations pertaining to the entire loan process. Examples of system-level governance include loan process workflow definitions (e.g., which stages must be performed and in what order); allowed types of collateral items; rules for guild formation and membership (e.g., can guilds be formed, can guilds change rules, how can guilds change rules, and/or the like); rules for managing a loan process workflow between stages (e.g., can an authenticator that authenticated a collateral item appraise the same collateral item and/or safekeep the collateral item, when the loan process can progress to the next stage, and the like); rules that require guild members to stake currency (e.g., cryptocurrency and/or fiat currency wrapped in a tokenized token) in relation to authentication tasks, appraisal tasks, and/or safekeeping tasks involving a collateral item; rules for performing tasks (e.g., the type of supporting documentation required to show consensus); rules for changing the governance (e.g., who can vote to change governance, how votes to change governances are conducted, and the like); rules for rewarding participants (e.g., any requirements and/or restrictions relating to amounts or percentages of payments that can be made in performing a specific task, regulatory requirements for different jurisdictions); and/or other suitable rules and regulations.

In embodiments, a system-level governance may include references to one or more respective loan process smart contracts 2022 that are stored on the distributed ledger 2016. A loan process smart contract 2022 may enforce one or more aspects of the system-level governance for instances of the decentralized loan process, including, for example, initiating each stage of the loan process when a previous stage is completed in accordance with a loan process workflow defined in the system-level governance. In embodiments, a loan process smart contract 2022 includes conditional logic that, once instantiated, listens (e.g., using an event listener thread) for a notification from a stage-level smart contract that indicates that the stage was successfully completed. In response to a stage being completed, the loan process smart contract 2022 may then initiate a next stage in the loan workflow process. For instance, an example loan process workflow may be defined as including a request stage where the borrower requests to collateralize one or more items, followed by an authentication stage where one or more authenticators authenticate the one or more items, followed by an appraisal stage where the authenticated items are appraised, followed by a safekeeping stage where the appraised items are stored in escrow with a trusted safekeeper, a tokenization stage where the ledger management system 104 (or another suitable component) generates VIRLs of the one or more escrowed items, generates a collateral token by tokenizing the VIRLs of the escrowed items, and locks the collateral token (e.g., in an escrow account on a distributed ledger 2016), a lending stage where a loan is negotiated and accepted by the borrower and a lender, a repayment stage where the loan is repaid by the borrower, and a post-loan stage where the collateral token is unlocked and returned to the borrower or liquidated if the borrower defaults on the loan. In facilitating this example loan process workflow, the loan process smart contract 2022 may be configured with conditional logic that determines whether a current stage has been successfully completed and if so to initiate a next stage in the loan process workflow. In embodiments, initiating a next stage of the loan process workflow may include instantiating an instance of a stage-level smart contract (e.g., an authentication smart contract 2028, an appraisal smart contract 2030, a safekeeping smart contract 2032, or a loan smart contract 2034), whereby the instantiated instance of the stage-level smart contract performs a stage-specific workflow and issues a notification that is received by the loan process workflow when the stage-specific workflow is completed successfully or unsuccessfully. In embodiments, a loan process smart contract 2022 may perform one or more tasks that are described as being performed by other types of smart contracts. For example, loan process smart contracts 2022 may be configured to facilitate loan negotiations and loan signing, monitoring repayment of the loan, determining default events, triggering liquidation events, awarding participants with rewards, and/or the like.

The system-level process governance may include additional rules and requirements, examples of which are provided throughout the disclosure. For example, the system-level process governance may include rules that preclude a single entity serving as an authenticator and appraiser, that require authenticators, appraisers, and/or safekeepers to stake at least a percentage of the loan value (e.g., to prevent manipulation of the system), and/or other rules that pertain to a decentralizing the loan process, reducing the likelihood of fraud, promoting trust, maximizing value for the participants, minting tokens, and/or the like. In embodiments, at least a portion of the system-level process governance is implemented by a loan process smart contract 2022. In embodiments, the loan process governance smart contract may include conditional logic that determines whether each respective stage was successfully completed, and if so, triggers the next action in the loan process.

In embodiments, a stage-level governance defines rules and regulations pertaining to a respective stage in the loan process, such that each stage of a loan process may be executed in accordance with one or more respective stage-level governances. It is appreciated that in some embodiments, a stage-level governance may apply to two stages. For example, the authentication stage may comport to a stage-level authentication governance that defines rules for any authentication tasks performed in connection with a decentralized loan process, the appraisal stage may comport a stage-level appraisal governance that defines rules for any appraisal tasks performed in connection with the decentralized loan process, the safekeeping stage may comport a stage-level safekeeping governance that defines rules for any safekeeping tasks performed in connection with the decentralized loan process, a VIRL stage-level governance that defines rules for generating a VIRL of a collateral item, a tokenization stage-level governance that defines rules for generation a token of a VIRL of a collateral item (in some embodiments, the VIRL stage and the tokenization stage may be treated as a single stage), a loan governance that defines rules for requesting and negotiating a loan, and/or any other suitable stage-level governances.

In embodiments, a stage-level governance may further refine rules set forth in the system-level governance and/or may include additional rules that pertain to the stage. For example, a stage-level governance may further refine rules and/or regulations from the system level governance, such as further refinements of adding and/or removing guild members; further refinements on how guild members stake currency in relation to a guild-specific task (e.g., authentication task, appraisal task, or safekeeping task); further refinements on what types of evidence are needed to support an authentication task; or the like. For example, the system-level governance may state that new members must be voted into any guild and may be removed by at least a 60% majority but may not define any other specifics. In this example, the authentication stage-level governance rules may define a first voting scheme for voting in and removing members from authentication guilds, while the appraisal stage-level governance may define a second scheme for voting in and removing members from the appraisal guilds. For example, the authenticators may have a one-member-one-vote voting scheme where a new member may be added to the guild with a simple majority vote and removed with a 60% majority vote, where the appraisers may have a token-based vote, where each guild member has a certain amount of guild tokens 2044, whereby each guild member's voting power is proportionate to the amount of guild tokens 2044 the guild member owns. In the second scheme, more senior or active members have more voting power than less senior or less active guild members. In embodiments, the stage-level governance may further define the types of documentation and supporting data required by the guilds in that stage. In this example, the authentication stage-level governance may further refine this rule to require that an authenticator fill out an authentication report and provide photographic evidence to support the report. Similarly, the appraisal stage-level governance may further refine this rule to require that an appraiser file an appraisal report that indicates an appraised value and provide documentary evidence of past sales of similar items to support the appraised value. In this example, the safekeepers stage-level governance may further refine this rule to require that the safekeeper provide photograph evidence of the item in safe storage and fill out a safekeeping report that indicates any damage that was visible when the item was deposited by the owner (e.g., the borrower) and a verification by the owner of the item of said visible damage. Furthermore, the appraisal stage-level governance may further define that an appraisal report include a liquidation value of a collateral item in addition to the appraised value of the collateral item, where the liquidation value indicates a low-end price that the collateral item would be expected to be sold for (e.g., in a short-notice liquidation event or at a set price sale to achieve a quick liquidation sale).

As mentioned, a stage-level governance may also define new rules and regulations, to the extent those new rules and regulations do not contradict or otherwise vitiate the system-level governance. For example, assuming no such rules are defined in the system-level governance, a stage-level governance may define rules on how a stage-specific task is performed. For example, with respect to the authentication stage, the authentication stage-level governance may require a primary authenticator to make a determination on the authenticity of a collateral item and at least one other authenticator (acting as a "secondary authenticator") to validate the primary authenticator's determination on the authenticity of the item. In this example, the stage-level governance may further define that the primary authenticator gets a certain percentage (e.g., 60% or 70%) of the authentication fees/rewards and the remaining amount is split amongst the one or more secondary authenticators. Furthermore, in this example, the authentication stage-level governance may refine the system-level requirement for authenticators to stake currency tokens by defining an allocation of risk to the primary authenticator and the other secondary authenticators (e.g., primary authenticator stakes 60% or 70% of the loan amount (assuming a loan is agreed to) and the secondary authenticators evenly split the remaining portion of the loan amount. In another example, the appraisal stage-level governance may define the mechanics and workflows of an appraisal. For example, the governance may define the manner by which appraisal tasks are assigned to appraisers and that any appraisal must be validated by one or more additional appraisers. In this example, the appraisal stage-level governance may further refine the manner by which primary and secondary appraisers are rewarded and/or the amount of currency the primary and secondary appraisers must stake to secure their appraisals. In another example, the safekeepers stage-level governance may define additional rules for safekeeping of certain types of collateral items. For example, if items require temperature-controlled storage, the safekeeping stage-level governance may define a rule that requires that a safekeeper provide proof of such temperature-controlled storage. In another example, if the collateral item is a vehicle, the safekeeping stage-level governance may define a rule that requires that a safekeeper provide evidence of the mileage of the vehicle on the day it was first received and on the day it is repossessed by the rightful owner (e.g., the borrower or buyer via liquidation). The stage-level governances may include additional or alternative refinements of system levels rules and regulations and/or additional or alternative definitions of rules and/or requirements that were not indicated in the system level governance.

In embodiments, some stage-level governances may include form templates that are used in connection with the stage or references thereto (e.g., an address where the form templates may be obtained). In some example embodiments, the authentication stage-level governance may include a reference to an authentication form template that may be used by authenticators when performing an authentication task. The form template may include a set of fields that are to be filled out by an authenticator that is tasked with authenticating a collateral item, such that the authenticator completes the form and submits the form to the authentication system 804, the authenticator smart contract 2028, and/or a loan process smart contract 2022. In filling out the form, the authenticator can provide an opinion as to the authenticity of an item and may provide an analysis that supports the opinion. The form may include instructions to provide supporting evidence, such as photographs, serial numbers, videos, or the like. In some example embodiments, the appraisal stage-level governance may include a reference to an appraisal form template that may be used by appraisers when performing an appraiser task. Assuming that authentication is performed before appraisal, the appraiser can trust that the item is authentic but may require inspection of either the item itself or photographs and/or video of the item to provide a proper assessment. The appraiser form may include a set of fields that are to be filled out by an appraiser that is tasked with appraising the collateral item, such that the appraiser completes the form and submits the completed form to the authentication system 804 and/or to an appraisal smart contract). In filling out the form, the appraiser can provide an appraised value and may provide an analysis that supports the appraised value. The form may include instructions to provide supporting evidence, such as evidence of past sales of similar items, bluebook values, auction data, or the like. In some example embodiments, the safekeeping stage-level governance may include a reference to a safekeeping form template that may be used by safekeepers when performing a safekeeping task. In some embodiments, the form may require the appraiser to provide a liquidation value of the collateral item in addition to the appraised value. The liquidation value may be a low-end valuation of the collateral item, such as if the collateral item needs to be quickly liquidated. The liquidation value in combination to the appraised value may provide a potential lender an opportunity to assess the risk associated with lending the money given the collateral item's appraised value and liquidation value. The form may include a set of fields that are to be filled out by a safekeeper that is tasked with safekeeping the collateral item, such that the authenticator completes the form and submits it (e.g., to the collateral management system 802 and/or to a safekeeping smart contract). In filling out the form, the safekeeper can provide a condition of the collateral item when it was received and verify that the collateral item is being stored at a physical location that has adequate precautions to secure the collateral item. The form may include instructions to provide supporting evidence, such as photographs of the collateral item (including any visible damage). It is appreciated that the form templates are provided for example and additional or alternative form templates may be used during the various stages of a decentralized loan process. Furthermore, some guilds may further refine a form template for a particular type of collateral item. In these scenarios, the guild-refined form templates may be used in connection with a respective task in lieu of the form templates defined in the stage-level governance. It is noted that other stage-level governances may include other form templates. Furthermore, it is appreciated that some guild-level governances and/or sub-guild-level governances may include or reference form templates that are to be used by members of the guild or sub-guild in lieu of form templates defined in the stage-level governance or if the stage-level governance does not include or reference a broader form template.

In some embodiments, the stage-level governances may include references to one or more smart contracts that are used in connection with stage-level tasks and/or managing guilds that participate in the stage. These smart contracts may include stage-level governance smart contracts 2024 corresponding to the managing the participants of respective stages that enforce the stage-level governance of the respective stage as well as any relevant rules and regulations defined in the system level governance. In embodiments, stage-level governance smart contracts 2024 may be configured to enforce the mechanics of a particular stage. For example, the stage-level governance of a particular stage may require that changes to the governance be voted on by all participants in the stage and may use a stage-level governance smart contract 2024 to enforce the voting process. In this example, the authenticators (across all guilds) may wish to change the authentication stage governance to require an authentication fee that is paid by a borrower to an authenticator (in addition to the reward paid to the authenticator when a loan process is successfully completed) so that an authenticator may still get paid when an item is determined to be fake or if the borrower decides not to enter into a loan agreement (which would prevent the authenticator from being paid out a reward for participating in a loan transaction). The stage-level governance 2024 may require that the authenticators have a supermajority (e.g., ⅔ majority) vote to amend the stage-level governance and must further receive approval from a decision maker affiliated with a central authority to make such amendments. In this example, a stage-level governance smart contract 2024 may include a listening thread that receives votes from authenticators and determines whether a super majority voted to amend the authentication stage-level governance. If so, the smart contract may perform an action to amend the authentication stage-level governance and may generate a block indicating the results of the vote that is written to a corresponding distributed ledger 2014. While this example was described with respect to the authentication stage and for voting, stage-level governance smart contracts 2024 may be configured to enforce other aspects of the various stage-level governances.

Furthermore, in example embodiments, stage-level governances may include references to respective smart contracts that are used to manage stage-level events and transactions. For example, the authentication stage-level governance may include a reference to an authentication smart contract 2028 that is used to facilitate authentication tasks performed in connection with a loan process; the appraisal stage-level governance may include a reference to an appraisal smart contract 2030 that is used to facilitate appraisal tasks performed in connection with a loan process; the safekeeping stage-level governance may include a reference to an safekeeping smart contract 2032 that is used to facilitate appraisal tasks performed in connection with a loan process safekeeping tasks performed in connection a loan process; a lending stage level governance may include a reference to loan smart contract 2034 that is used to manage the loan agreement and loan repayment stage; and the like. In some embodiments, the loan workflow may include a pre-loan liquidation stage (discussed below) that is governed by a pre-loan liquidation stage-level governance. In these embodiments, the pre-loan liquidation stage-level governance may include a reference to a pre-loan liquidation smart contract, which is discussed in greater detail below.

In example embodiments, the authentication stage-level governance may include a reference (e.g., an address) of an authentication smart contract 2028 that may be used for authentication tasks. The reference may define an address that can be used to retrieve an authentication smart contract 2028 (e.g., from a distributed ledger 2016). In these embodiments, a loan process smart contract 2022, an authenticator device 2004, and/or the tokenization platform 100 may instantiate an instance of the authentication smart contract 2028 in response to an authenticator being assigned a new authentication task and/or the authenticator accepting the new authentication task via an authenticator device 2004. Once instantiated, the instance of the authentication smart contract 2028 may be written to a distributed ledger 2016, where the authentication smart contract instance executes to manage the authentication task. In embodiments, an authentication smart contract 2028 may be configured to receive input from an authenticator device 2004, a borrower device 2002, and/or the collateral management system 804 and may include conditional logic that determines whether all the required steps were performed in connection with an authentication task based on the received input.

Figure 22:
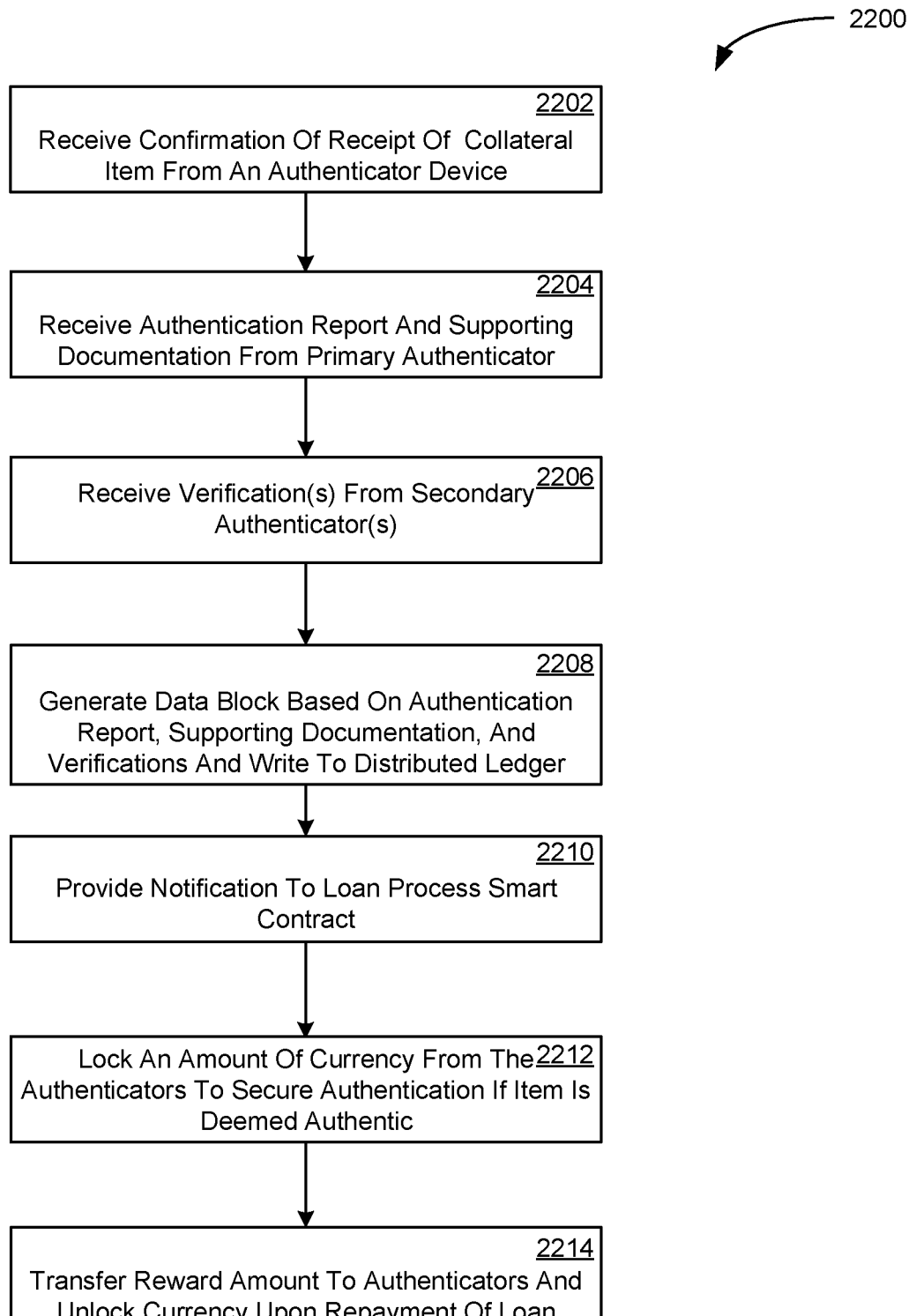
FIG. 22 is a flow chart illustrating an example set of operations of a method for performing an authentication workflow according to some embodiments of the present disclosure.

FIG. 22 illustrates a set of operations of an example method 2200 that may be executed to perform an authentication workflow. The method 2200 may be executed by a smart contract, such as an authentication smart contract 2028 or a loan process smart contract 2022. For purposes of explanation, the method 2200 is described as being performed by the authentication smart contact.

At 2202, an instance of an authentication smart contract 2028 may receive confirmation of recipient of collateral item from an authenticator device. In some scenarios, the collateral item is physically sent to a primary authenticator to perform a task. In such a scenario, the primary authenticator may confirm receipt of the collateral item using the authenticator device 2004. In these embodiments, the authenticator can provide images of the collateral item and may note any damage that is visible to the item. Alternatively, the primary authenticator may be sent a VIRL of the collateral item. In these embodiments, the VIRL may include ultra-high-resolution images of the collateral item and/or other media that may aid the authenticator in performing the authentication task.

At 2204, the authentication smart contract instance may receive an authentication report and supporting documentation from the primary authenticator. In these embodiments, a primary authenticator may be required to generate an authentication report in accordance with the authentication stage-level governance and/or the guild level governance of the authentication guild to which the authenticator belongs. In some embodiments, the primary authenticator may use a form template that is included in the stage authentication stage-level governance and/or the guild level governance to generate the report. In the report may indicate the primary authenticator's conclusion (e.g., whether the item is authentic or fake) and reasons for the conclusion. The supporting documentation may include photographs, serial numbers, test results, or like to support the authenticator's conclusion. Once the authenticator provides the authentication report, the report and supporting documentation may be provided to one or more secondary authenticators (if required by the stage-level governance).

At 2206, the authentication smart contract instance receives verification from one or more secondary authenticators. In some embodiments, the authentication smart contract 2028 may include conditional logic that requests the opinions of secondary authenticators in response to receiving the primary authenticator's report. In some embodiments, the smart contract instance (or the primary authenticator) may provide the primary authenticator's report and supporting evidence to the secondary authenticators (after they are assigned to the task) and may listen for responses from the secondary authenticators. Once received, the authentication smart contract 2028 may determine whether a requisite number of secondary authenticators provided a supporting opinion and, if so, the authentication smart contract instance executes logic to determine whether the secondary authenticators verified the primary authenticator's opinion as to the authenticity of the collateral item.

At 2208, a data block based on the authentication report, the supporting documentation, and the secondary authenticator's opinions is generated and the data block may be written to a distributed ledger 2016. In some embodiments, the authentication smart contract may generate the data block and write the data block to the distributed ledger. Alternatively, the authentication smart contract may transmit the authentication report, the supporting documentation, and the secondary authenticator's opinions to the ledger management system 202 (or another suitable system), which in turn may generate the data block and write the data block to the distributed ledger.

At 2210, the authentication smart contract instance may provide notification to a loan process smart contract 2022 indicating the results of the authentication task. In particular, the authentication smart contract may provide a notification to the loan process smart contract 2022 indicating whether the item was deemed authentic by the primary authenticator and the secondary authenticator(s). If so, the authentication smart contract instance may continue to proceed through the authentication workflow until the authenticator(s) that participated in the authentication process are rewarded (e.g., from the repayment funds and/or the proceeds of a liquidation event). If not, the authentication smart contract instance may end the authentication task.

At 2212, the authentication smart contract instance may lock an amount of currency from the authenticators to secure the authentication in case the item is deemed inauthentic. In some embodiments, the authentication smart contract instance may enforce a requirement set forth in the authentication stage-level governance and/or guild-level governance of the authenticator to lock a certain amount of currency (e.g., currency/tokenized tokens) when the authenticator(s) deem the item authentic so as to provide a greater amount of security to a lender. In this way, authenticators will have less incentive to authenticate items that might be fake. In embodiments, the amount that is locked may be equal to or a percentage of the loan amount, the total repayment amount, the appraised value, or another suitable value, where the amount to be locked is defined in accordance with the appraisal-stage governance. In some embodiments, the locked currency tokens are returned to the authenticators during the course of repayment, such that the amount of locked currency from the authenticators that does not exceed the remaining balance of the loan as the locked currency provides a contingency should an authenticated item later be discovered to be fake.

At 2214, the authentication smart contract instance may transfer a reward amount to the authenticators that participated in the authentication task upon repayment of the loan. Once the loan process is complete (e.g., after repayment of the loan and collateral item is returned to borrower; after a liquidation event with a prescribed amount of time after the sale for the buyer of the collateral time to inspect the collateral item; and/or if the buyer decides to not engage in a loan and wishes to retake possession of the collateral item) may issue a reward to the primary authenticator and any secondary authenticators that participated in the authentication task. For example, the authenticators may be rewarded with a percentage of the loan or repayment amount, a predefined fee, and/or the like. Once the loan process is complete, the instance of the authentication smart contract may be deconstructed.

The example of FIG. 22 is provided as an example authentication workflow. Other authentication workflows may be executed in connection with authentication tasks. Furthermore, within respective authentication guilds, the members of the respective authentication guilds can refine the authentication workflows and/or authentication smart contracts to improve the authentication of certain tasks, provided such refinements are in accordance with the authentication stage-level governance.

Referring back to FIG. 20, an appraisal stage-level governance may include a reference (e.g., an address) of an appraisal smart contract 2030 that may be used for appraisal tasks. The reference may define an address that can be used to retrieve an appraisal smart contract 2030 (e.g., from a distributed ledger 2016). In these embodiments, a loan process smart contract 2022, an appraiser device 2006, and/or the tokenization platform 100 may instantiate an instance of the appraisal smart contract 2030 in response to an appraiser being assigned a new appraisal task and/or the appraiser accepting the new appraisal task via an appraiser device 2006. Once instantiated, the instance of the appraiser smart contract 2030 may be written to a distributed ledger 2016, where the appraisal smart contract instance executes to manage the appraisal task. In embodiments, an appraisal smart contract 2030 may be configured to receive input from an appraiser device 2006, a borrower device 2002, and/or the tokenization platform 100 and may include conditional logic that determines whether all the required steps were performed in connection with an appraisal task based on the received input.

FIG. 23 illustrates an example set of operations of a method 2300 that may be executed to perform an appraisal workflow. The method 2300 may be executed by a smart contract, such as an appraisal smart contract 2030 or a loan process smart contract 2022. For purposes of explanation, the method 2300 is described as being performed by the appraisal smart contact.

At 2302, an instance of an appraisal smart contract 2030 may receive confirmation of recipient of collateral item from an appraiser device 2006. In some scenarios, the collateral item is physically sent to a primary appraiser to perform a task. In such a scenario, the primary appraiser may confirm receipt of the collateral item using the appraiser device 2006. In these embodiments, the appraiser can provide images of the collateral item and may note any damage that is visible to the item. Alternatively, the primary appraiser may be sent a VIRL of the collateral item. In these embodiments, the VIRL may include ultra-high-resolution images of the collateral item and/or other media that may aid the authenticator in performing the appraisal task. In some embodiments, the appraiser may receive additional information, such as a confirmation that a set of authenticators authenticated the collateral item.

At 2304, the appraisal smart contract instance may receive an appraisal report and supporting documentation from an appraiser device 2006 of the primary appraiser. In these embodiments, a primary appraiser may be required to generate an appraisal report in accordance with the appraisal stage-level governance and/or the guild level governance of the appraisal guild to which the appraiser belongs. In some embodiments, the primary appraiser may use a form template that is included in the appraisal stage-level governance and/or the guild level governance of the appraiser's appraisal guild to generate the report. In the report may indicate an appraised value determined by the appraiser and documentation that support the appraised value. The supporting documentation may include links to bluebook values of similar items, screenshots of sales of similar items, historical data relating to sales of similar items, and/or other suitable information to support the appraiser's appraised value. Once the appraiser provides the appraisal report, the report and supporting documentation may be provided to one or more secondary appraiser(s) (if required by the appraisal stage-level governance). In some embodiments the appraisal stage-level governance or a guild-level governance of the appraiser may require the appraiser to submit a liquidation value in the appraisal report in addition to the appraised value.

At 2306, the appraisal smart contract instance receives verification from one or more secondary appraisers. In some embodiments, the appraisal smart contract 2030 may include conditional logic that requests the opinions of a secondary appraiser in response to receiving the primary appraiser's report. In some embodiments, the appraisal smart contract 2030 (or the primary appraiser) may provide the primary appraiser appraiser's report and supporting evidence to the secondary appraisers (after they are assigned to the task) and may listen for responses from the secondary appraisers. Once received, the appraisal smart contract 2030 may determine whether a requisite number of secondary appraisers confirmed the primary appraiser's valuation.

At 2308, a data block based on the appraisal report, the supporting documentation, and the secondary appraiser's opinions is generated and the data block may be written to a distributed ledger 2016. In some embodiments, the appraisal smart contract may generate the data block and write the data block to the distributed ledger 206. Alternatively, the appraisal smart contract may transmit the appraisal report, the supporting documentation, and the secondary appraisers' opinions to the ledger management system 202 (or another suitable system), which in turn may generate the data block and write the data block to the distributed ledger 2016. In some embodiments, the data block may further include the liquidation value of the collateral item as determined by the appraiser.

At 2310, the appraisal smart contract may provide notification to a loan process smart contract 2022 indicating the results of the appraisal task. In particular, the appraisal smart contract may provide a notification to the loan process smart contract 2022 indicating the appraised value. Assuming the borrower agrees to a loan agreement, the appraisal smart contract may continue to proceed through the appraisal workflow until the appraiser(s) that participated in the appraisal process are rewarded (e.g., from the repayment funds and/or the proceeds of a liquidation event). If the borrower does not form a loan contract and decides to end the loan process, the appraisal smart contract may end the appraisal task.

At 2312, the appraisal smart contract may lock an amount of currency from the appraisers to secure the appraisal in case the item is not liquidated at or more than the appraised value provided by the appraiser. In some embodiments, the appraisal smart contract 2030 may enforce a requirement set forth in the appraisal stage-level governance and/or guild-level governance of the appraiser's guild to lock a certain amount of currency (e.g., currency/tokenized tokens) when the appraiser(s) provide an appraised value so as to provide a greater amount of security to a lender. In this way, the appraiser will have less incentive to appraise items at higher prices to improve the chances that a loan agreement will be entered into. In embodiments, the amount that is locked may be equal to or a percentage of the loan amount, the total repayment amount, the appraised value, or another suitable value, where the amount to be locked is defined in accordance with the appraisal-stage governance. In some embodiments, the locked currency tokens are returned to the appraisers during the course of repayment, such that the amount of locked currency from the appraisers does not exceed the remaining balance of the loan as the locked currency provides a contingency should an appraised item be sold at a liquidation event at a value that is less than the appraised value.

At 2314, the appraisal smart contract may transfer a reward amount to the appraisers that participated in the appraisal task upon repayment of the loan. Once the loan process is complete (e.g., after repayment of the loan and collateral item is returned to borrower or after a liquidation event) may issue a reward to the primary appraiser and any secondary appraisers that participated in the appraisal task. For example, the appraisers may be rewarded with a percentage of the loan or repayment amount, a predefined fee, and/or the like. Once the loan process is complete, the instance of the appraisal smart contract may be deconstructed.

The example of FIG. 23 is provided as an example appraisal workflow. Other appraisal workflows may be executed in connection with appraisal tasks. Furthermore, within respective appraisal guilds, the members of the respective appraisal guilds can refine the appraisal workflows and/or appraisal smart contracts to improve the appraisal of certain tasks, provided such refinements are in accordance with the appraisal stage-level governance.

Referring back to FIG. 20, a safekeeping stage-level governance may include a reference (e.g., an address) of a safekeeping smart contract 2032 that may be used for appraisal tasks. The reference may define an address that can be used to retrieve a safekeeping smart contract 2032 (e.g., from a distributed ledger 2016). In these embodiments, a loan process smart contract 2022, an appraiser device 2006, and/or the tokenization platform 100 may instantiate an instance of the safekeeping smart contract 2030 in response to a safekeeper being assigned a new appraisal task and/or the safekeeper accepting the new safekeeping task via a safekeeping device 2008. Once instantiated, the instance of the appraiser smart contract 2030 may be written to a distributed ledger 2016, where the safekeeping smart contract instance executes to manage the safekeeping task. In embodiments, a safekeeping smart contract 2032 may be configured to receive input from a safekeeper device 2008, a borrower device 2002, and/or the tokenization platform 100 and may include conditional logic that determines whether all the required steps were performed in connection with a safekeeping task based on the received input.

FIG. 24 illustrates an example set of operations of a method 2400 that may be executed to perform a safekeeping workflow. The method 2400 may be executed by a smart contract, such as a safekeeping smart contract 2032 or a loan process smart contract 2022. For purposes of explanation, the method 2400 is described as being performed by an instance of a safekeeping smart contact.

At 2402, an instance of a safekeeping smart contract 2032 may receive confirmation of recipient of collateral item from a safekeeper device 2008. In some scenarios, the collateral item is sent to a safekeeper for safekeeping during the pendency of a loan. Alternatively, the item may be deposited with the safekeeper by another party, such as the borrower. In either scenario, the safekeeper may confirm receipt of the collateral item using the appraiser device 2006. In these embodiments, the safekeeper can document the collateral item upon receipt, such as by taking images of the collateral item and noting any damage that is visible to the item.

At 2404, the safekeeping smart contract instance may receive a safekeeping report and supporting documentation from a safekeeper device 2008 of the safekeeper. In these embodiments, a safekeeper may be required to generate a safekeeping report in accordance with the safekeeping stage-level governance and/or the guild level governance of a safekeeper guild to which the safekeeper belongs (to the extent such guild exists). In some embodiments, the safekeeper may use a form template that is included in the safekeeper stage-level governance and/or the guild level governance of the safekeeper guild to generate the report. In the report, the safekeeper may indicate that the item was received, a condition in which it was received, any damage that is visible to the collateral item, where the item is being stored, whether the item is in secured storage, and/or other relevant information. In embodiments, the safekeeper may provide supporting documentation, such as images of the collateral item, including any documentation of noticeable damage, images of the item in storage, and the like. Once the safekeeper provides the safekeeping report, the safekeeper report and supporting documentation may be written to a distributed ledger 2016.

At 2406, a data block based on the safekeeping report and the supporting documentation, and the secondary appraiser's opinions is generated and the data block may be written to a distributed ledger 2016. In some embodiments, the safekeeping smart contract may generate the data block and write the data block to the distributed ledger 206. Alternatively, the safekeeping smart contract may transmit the safekeeping report, the supporting documentation, and the secondary appraisers' opinions to the ledger management system 202 (or another suitable system), which in turn may generate the data block and write the data block to the distributed ledger 2016.

At 2408, the safekeeping smart contract instance may lock an amount of currency from the safekeeper to mitigate the risk associated with property loss or damage during safekeeping. In some embodiments, the safekeeping smart contract 2030 may enforce a requirement set forth in the safekeeping stage-level governance and/or a guild-level governance to lock a certain amount of currency (e.g., currency/tokenized tokens) when an item is safekept so as to provide a greater amount of security to a lender. In embodiments, the amount that is locked may be equal to or a percentage of the loan amount, the total repayment amount, the appraised value, or another suitable value, where the amount to be locked is defined in accordance with the safekeeping-stage governance. In some embodiments, the locked currency tokens are returned to the safekeeper during the course of repayment, such that the amount of locked currency from the safekeeper does not exceed the remaining balance of the loan as the locked currency provides a contingency should a stored collateral item be damaged or lost. At 2410, the safekeeping smart contract instance may provide notification to a loan process smart contract 2022 indicating that the collateral item has been secured and that event records 2052 relating to the safekeeping task have been written to the distributed ledger 2016.

At 2412, the safekeeping smart contract instance may facilitate the transfer of possession of the collateral item to the owner of the collateral token 2042 corresponding to the collateral item upon a redemption event. In embodiments, the redemption of a collateral token 2042 may be performed in accordance with a collateral redemption workflow, which may be executed off-chain (e.g., by a computing system of a trusted-third party, such as the tokenization platform 100) and/or on-chain (e.g., by instances of one or more smart contracts). In embodiments, the collateral redemption work-flow may include, but is not limited to, the following operations: receiving a request to redeem a collateral item indicated by a collateral token 2042 from a user device; verifying the user that is attempting to redeem the collateral token 2042 is the rightful owner of the collateral token 2042 based on ownership data 2052 stored on a distributed ledger 2016; identifying a safekeeper of the collateral item indicated by the collateral token 2042 from the distributed ledger 2016 and/or the loan process smart contract 2022; transmitting a redemption notification to a safekeeper device 2008 of the identified safekeeper that the rightful owner has redeemed the collateral token 2042; receiving a confirmation notification from the safekeeper device 2008 of the identified safekeeper indicating that the rightful owner of the collateral token has taken ownership of the collateral item; and burning the collateral token 2042 in response to receiving the notification from the safekeeper (as described above). In embodiments, the redemption workflow may include additional or alternative steps, such as receiving feedback from the redeeming owner of the collateral item indicating that the collateral item has been returned in satisfactory condition and/or updating a distributed ledger 2016 to indicate the occurrence and content of such feedback events (which may be used to update analytics and/or a rating of the safekeeper).

At 2414, the safekeeping smart contract may transfer a reward amount to the safekeeper upon repayment of the loan and/or redemption of the collateral item. For example, the safekeeper may be rewarded with a percentage of the loan or the repayment amount, a predefined fee, and/or the like. Once the loan process is complete, the instance of the safekeeping smart contract may be deconstructed.

The example of FIG. 24 is provided as an example safekeeping workflow. Other safekeeping workflows may be executed in connection with safekeeping tasks. Furthermore, within a safekeeper guild, the members of the respective guild can refine the safekeeping workflows and/or safekeeper smart contracts to improve the safekeeping of certain items, provided such refinements are in accordance with the safekeeping stage-level governance.

Referring back to FIG. 20, a lending stage-level governance may include a reference (e.g., an address) of a loan smart contract 2034 that may be used to monitor repayment of a loan. The reference may define an address that can be used to retrieve a loan smart contract 2034 (e.g., from a distributed ledger 2016). In these embodiments, a loan process smart contract 2022, a borrower device 2002, a lender device 2010 and/or the tokenization platform 100 may instantiate an instance of the loan smart contract 2034 in response to a loan agreement being reached. In embodiments, the negotiation of a loan is performed by the borrower and lender off-chain (e.g., via the tokenization platform 100). In these embodiments, the loan smart contract instance may be instantiated in response to the parties' agreement to the terms of a loan agreement. Once instantiated, the loan smart contract instance may be written to a distributed ledger 2016, where the loan smart contract instance executes to manage the loan repayment stage. In embodiments, a loan smart contract 2034 may be configured to receive input from a borrower device 2002, a lender device 2010, and/or the tokenization platform 100.

FIG. 25 illustrates an example set of operations of a method 2500 that may be executed to perform a loan repayment workflow. The method 2500 may be executed by a smart contract, such as a loan smart contract 2034 or a loan process smart contract 2022. For purposes of explanation, the method 2500 is described as being performed by an instance of a loan smart contact. In the depicted example, the loan smart contract 2034 may instantiated upon the borrower and lender agreeing to a loan agreement off-chain. In some embodiments, however, the loan contract 2032 may be configured to facilitate the negotiation of the loan as well.

At 2502, an instance of a loan smart contract 2034 may receive the loan agreement terms and may establish a repayment schedule in accordance with the loan agreement terms. In some scenarios, the loan smart contract 2034 may receive the loan agreement terms from a computing system (e.g., the tokenization platform) that facilitated the negotiation of the loan agreement. The loan agreement terms may include a loan amount, a loan term, a loan repayment amount, an interest rate, late fee penalties, default condition definitions, and the like. In embodiments, the loan smart contract instance may determine the repayment schedule based on the repayment amount and the loan term. The loan smart contract instance may determine the repayment schedule such that the payments are equally distributed over the loan term. The loan smart contract instance may determine the repayment schedule in any other suitable manner.

At 2504, the loan smart contract instance locks the collateral token in an escrow account and facilitates the transfer of funds from an account of the lender to the borrower. In embodiments, once the loan agreement is in place, the loan smart contract instance may lock the collateral token in an escrow account for the duration of the loan repayment period. Once the collateral token is locked, thereby preventing the borrower from redeeming the collateral token, the loan smart contract instance may facilitate the transfer of funds equal to the loan amount from an account of the lender to an account of the buyer. In some embodiments, the loan smart contract instance may transfer the funds by updating the ownership data 2054 of a set of currency/tokenized tokens 2044 owned by the lender to reflect an account of the borrower.

At 2506, the loan smart contract instance listens for payment event notifications. In embodiments, the loan smart contract 2034 may be configured with an event listener that listens for payment event notifications. In some embodiments, the payment event notifications may be received from a borrower device 2002, a lender device 2004, or a trusted third-party computing system that is facilitating repayment of the loan (e.g., the tokenization platform 100). In embodiments, a payment event notification may indicate an amount paid and a date and/or time at which the payment was received.

At 2508, the loan smart contract instance may determine whether a scheduled payment was received. If the payment was not received, the loan smart contract instance may determine whether the loan is in a default condition pursuant to the loan agreement. A loan may be in a default condition if a borrower misses one or more payments, such that the loan agreement may define how many payments may be missed before the loan enters a default condition. If the loan is not in a default condition, the loan smart contract instance may apply any penalties and/or fees to the principal balance and may continue to listen for a payment event notification.

If the loan is in a default condition, the loan smart contract instance may initiate a liquidation of the collateral item, as shown at 2512. In some embodiments, the loan smart contract instance may provide a liquidation request to a marketplace (e.g., marketplace system 102) that indicates the collateral token 2042 and/or the VIRL wrapped therein. The liquidation request may include additional data, such as an appraised amount, appraisal records, authentication records, safekeeping records, and/or a remaining balance on the loan repayment amount. In response, the marketplace may conduct a liquidation sale. In embodiments, the liquidation sale may be a fixed price sale (e.g., set at the appraised value) or an auction (e.g., starting at the remaining balance of the loan repayment amount). Once the item is liquidated and the buyer has paid for the collateral item, the loan smart contract instance may receive a liquidation notification that indicates that the item was liquidated. In response, the loan smart contract instance may initiate the transfer of the collateral token 2042 that was used to secure the defaulted-upon loan from the escrow account in which it was held to an account of the buyer of the collateral item. Once the ownership data 2054 of the collateral token is updated to indicate that the collateral token 2042 is owned by the buyer, the buyer may then redeem the collateral token 2042 (e.g., as described throughout the disclosure). In embodiments, the remaining balance of the loan is paid to the lender from proceeds of the sale as well as the rewards to the participants of the loan process (e.g., authenticators, appraisers, and/or safekeepers). At 2514, the loan smart contract instance may generate a data block indicating a default event and may write the data block to the distributed ledger, thereby creating a record of the default event.

If at 2508 the payment was received, the loan smart contract instance may determine whether the loan is paid in full, as shown at 2516. If the loan is not paid in full, the loan smart contract instance may determine the remaining balance on the loan repayment amount. In some embodiments, the loan smart contract instance may unlock currency/ tokenized tokens 2044 of guild members that staked the tokens in connection with performance of their respective authentication, appraisal, and safekeeping tasks. In embodiments, the loan smart contract instance may unlock an amount of tokens that is proportionate to the payment received, as shown at 2518. In these embodiments, the remaining locked tokens of any guild member does not exceed the remaining balance on the loan repayment amount.

If at 2516, the loan smart contract instance determines that the loan is paid in full, the loan smart contract instance may generate a data block indicating a repayment event and may write the data block to the distributed ledger, as shown at 1520. In this way, the loan smart contract instance creates a record of the repayment event indicating that the loan has been paid in full. Once the loan is repaid in full, the loan smart contract instance may issue a repayment notification to the loan process smart contract instance governing the loan and/or to the tokenization platform 100, such that the notification initiates the awarding of rewards to the participants of the loan process (e.g., authenticators, appraisers, and/or safekeepers).

At 2522, the loan smart contract instance may unlock the collateral token 2042 from the escrow account and may reinstate ownership to the borrower. In embodiments, the loan smart contract instance may update the ownership data 2054 of the collateral token 2042 to reflect that the borrower is once again the owner of the collateral token. Once the loan process is complete, the instance of the safekeeping smart contract may be deconstructed.

The example of FIG. 25 is provided as an example loan repayment workflow. Other loan repayment workflows may be executed in connection with lending and loan repayment without departing from the scope of the disclosure.

Referring back to FIG. 20, in some embodiments, different variations of a decentralized loan process may include a pre-loan liquidation event. A pre-loan liquidation event may be a conditional liquidation sale that is conducted before the loan is negotiated. It is noted that the sale may be a set-price sale where the price is set ahead of the sale or an auction sale where the collateral item is auctioned. In some embodiments, an example loan process workflow may include a request stage, followed by an authentication stage, a safe keeping stage, and a tokenization stage (in any suitable order), followed by a pre-loan liquidation stage, which is then followed by the lending stages and repayment stage. In these example embodiments, once the collateral items is authenticated, escrowed and tokenized, an auction or a set-price sale is conducted for the collateral item (e.g., via the marketplace system 102), whereby the buyer of the collateral item obtains an ownership option that is triggered upon the borrower's default (or if the borrower decides to forego the loan and relinquish ownership rights to the item). In this way, the borrower and lender know the true value of the collateral item before a loan is negotiated, which determines how much can be borrowed by the borrower and removes the need for an appraiser. Furthermore, in some embodiments, the contingent buyer may be required to escrow an amount of currency/tokenized tokens 2046 equal to the amount of the purchased item (or a portion thereof) and/or prove that he or she has enough funds to cover the sale (e.g., by providing an address of the buyer's account or providing banking information). In exchange, the contingent buyer may be rewarded with a portion of the repayment amount should the borrower successfully repay the loan, where the reward amount may be a flat fee, a percentage of the sale price, or an interest-based reward.

In example embodiments, the rules and regulations surrounding a pre-loan liquidation stage are defined in a pre-loan liquidation stage-level governance. In these embodiments, the pre-loan liquidation stage-level governance may refine and/or define rules such as: an amount of currency the contingent buyer must deposit to secure the contingent sale; an amount of monetary reward the contingent buyer is provided if the loan is successfully repaid; the allowed mechanics of a pre-loan liquidation event (e.g., auctions, set-price sales, or the like); and other suitable rules and regulations.

In some embodiments, the pre-loan liquidation stage-level governance may include a reference (e.g., an address) of a pre-loan liquidation smart contract (not shown) that may be used in facilitating pre-loan liquidation events. The reference may define an address that can be used to retrieve a pre-loan liquidation smart contract (e.g., from a distributed ledger 2016). In these embodiments, a loan process smart contract 2022 and/or the tokenization platform 100 may instantiate an instance of the pre-loan liquidation smart contract in response to the loan process progressing to the pre-loan liquidation stage. In embodiments, a pre-loan liquidation smart contract may be configured to receive input from a borrower device 2002, a contingent buyer device, a loan process smart contract 2022, loan process smart contract 2028, and/or the tokenization platform 100 (e.g., the marketplace system 102). Once instantiated, the instance of the pre-loan liquidation smart contract may be written to a distributed ledger 2016, where the pre-loan liquidation smart contract instance executes a pre-loan liquidation workflow that may include a pre-loan liquidation sale stage, a transaction verification stage, and a contingency resolution stage. In example embodiments, the pre-loan liquidation smart contract may initiate the sale of a collateral item during the pre-loan liquidation sale stage, initiating a pre-loan liquidation event based on a collateral token corresponding to the collateral item. Assuming that the collateral item is sold (pursuant to a contingency), the pre-loan liquidation smart contract may execute the transaction verification stage, where the borrower is provided an opportunity to a) reject the sale price and end the loan process; b) agree to the sell the collateral item to the contingent buyer at the sale price and end the loan process; or c) proceed with the loan process at the given sale price. During the contingency resolution stage, the pre-loan liquidation smart contract instance may receive notifications relating to the state of a subsequent loan, such that if the loan is repaid in full, the pre-loan liquidation smart contract may initiate the transfer the collateral token 2042 from the escrow account to the borrower and reward the contingency buyer with the defined reward amount. Conversely, if the seller defaults, the pre-loan liquidation smart contract may transfer the collateral token 2042 from the escrow account to the buyer and may transfer the agreed upon purchase price to the lender and the participants (e.g., authenticator and safekeeper), such that any remaining balance is returned to the borrower.

Figure 26:
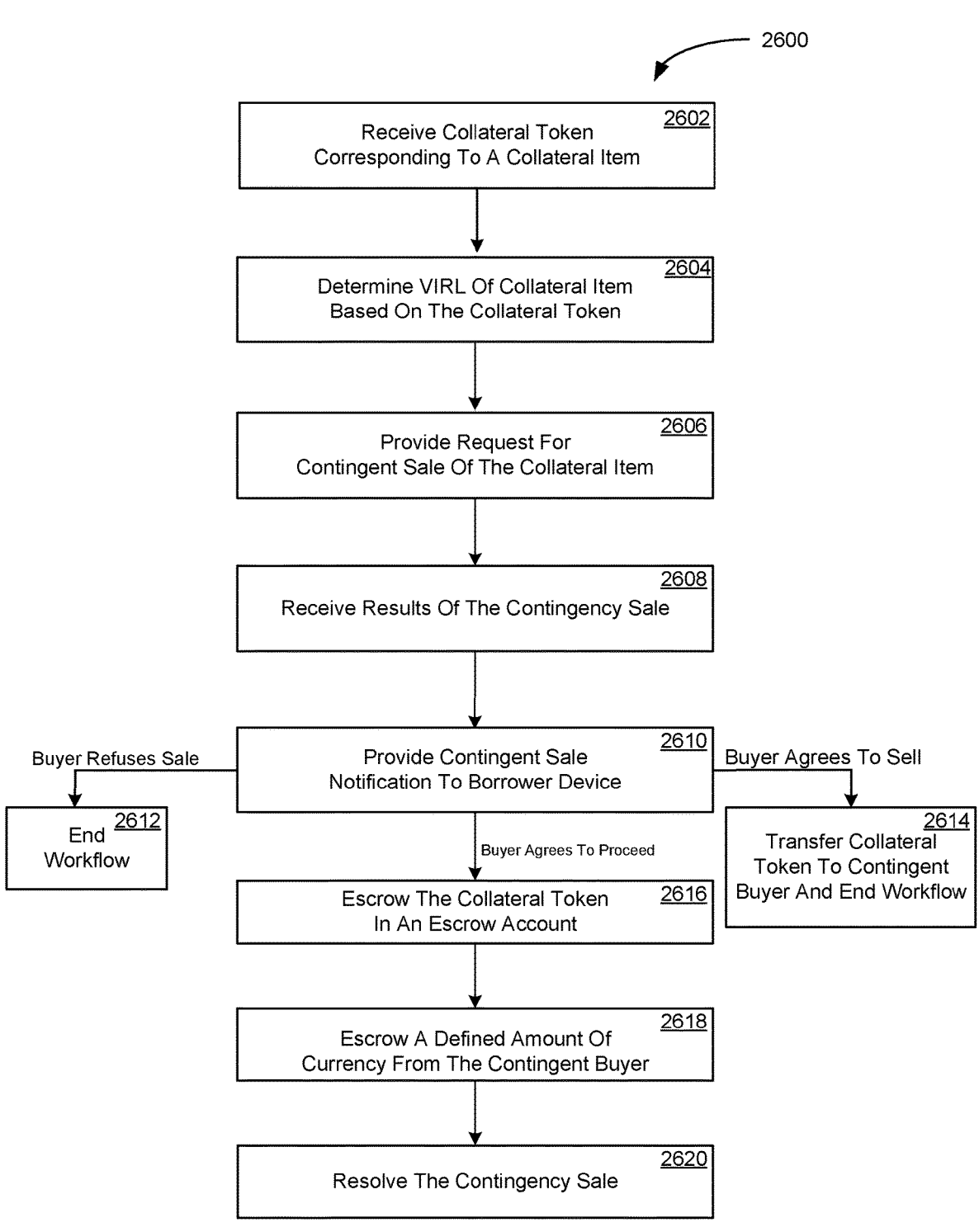
FIG. 26 is a flow chart illustrating an example set of operations of a method for performing a pre-loan liquidation workflow according to some embodiments of the present disclosure.

FIG. 26 illustrates an example set of operations of a method 2600 for performing a pre-loan liquidation workflow according to some embodiments of the present disclosure. The method 2600 may be executed by a smart contract, such as a pre-loan liquidation smart contract or a loan process smart contract 2022. For purposes of explanation, the method 2600 is described as being performed by an instance of a pre-loan liquidation smart contract.

At 2602, the pre-loan liquidation smart contract instance receives a collateral token 2052 (or an indicator thereof, such as a block address of the collateral token). At 2604, the pre-loan liquidation smart contract instance determines the VIRL corresponding to the collateral token 2052. In some embodiments, the pre-loan liquidation smart contract instance may determine a VIRL identifier of the VIRL from the collateral token 2042 and/or from the distributed ledger 2016. In the latter scenario, the pre-loan liquidation smart contract instance may read the data block that contains the collateral token 2042 from the distributed ledger 2016 that stores the token 2042 and may obtain the VIRL identifier therefrom.

At 2606, the pre-loan liquidation smart contract instance may provide a request for a contingent sale of the collateral item to a marketplace (e.g., marketplace system 102). In embodiments, the request may include the VIRL (or an indicator thereof, such as a VIRL ID or the like) and/or other documentation describing and/or showing the collateral item. In embodiments, the contingent sale request may include other suitable information, such as a contingent sale type (e.g., auction or set price sale), a location of the collateral item, a sought price for the collateral item (if a set price sale), a minimum price for the collateral item (if an auction), a length of the contingency (e.g., the amount of time that the borrower needs to secure and repay the loan), a reward offer (e.g., a predefine reward amount or a percentage of the purchase price, desired loan amount, or repayment amount), and/or the like. In response the marketplace can facilitate the contingent sale, which may result in the collateral item being sold (e.g., a contingent buyer buys the collateral item at a set price or wins an auction) with a set of contingencies or no sale.

At 2608, the pre-loan liquidation smart contract may receive the results of the contingent sale from the marketplace. Once the contingent sale is completed, the marketplace can send a sale notification to the liquidation smart contract instance indicating the results of the pre-loan liquidation event. In embodiments, the results of the pre-loan liquidation event indicate whether the item was sold, and if sold, a price at which the item was sold (minus any fees taken by the marketplace for hosting the sale).

At 2610, the pre-loan liquidation smart contract may provide a contingent sale notification to a borrower device 2002 of the borrower (assuming a pre-loan sale of the collateral item occurred). In response to receiving the contingent sale notification, the borrower has an option to agree to the contingent sale to advance the loan process, refuse the contingent sale (e.g., if the sale was an auction and the agreed upon liquidation price was too low to secure a loan), or to complete the contingent sale (e.g., if the sale was an auction and the price was high enough to convince the buyer to sell the collateral item rather than seek a loan using the collateral item). If the borrower refuses the sale, the retains possession of the collateral token 2042, as shown at 2612. If the borrower agrees to complete the contingent sale, the pre-loan liquidation smart contract may initiate the transfer the collateral token 2042 to the contingent buyer and the transfer of the proceeds of the sale to the buyer (e.g., a purchase amount in currency/tokenized tokens or fiat currency minus any fees taken by the marketplace), as shown at 2614. In the event that the borrower agrees to the contingent sale, the pre-loan liquidation smart contract may lock the collateral item in an escrow account, as shown at 2616.

At 2618, the pre-loan liquidation smart contract instance may escrow a defined amount of currency from the contingent buyer based on the contingent sale amount. During the transaction verification stage, the pre-loan liquidation smart contract may be configured to ensure that the contingent buyer can pay the sale price, should the loan go into default. In some embodiments, the pre-loan liquidation smart contract may require the contingent buyer to escrow currency/tokenized tokens 2046 equal to the full sale amount or a portion of the full sale amount (e.g., 50%), which may be achieved by locking the defined amount of currency/tokenized tokens 2046 from an account of the contingent buyer in an escrow account. Alternatively, the contingent buyer may provide evidentiary documents (e.g., bank statements, tax statements, or the like) to prove a liquidity threshold is met, thereby providing confidence that the contingent buyer can afford to complete the sale, should the borrower default. In these embodiments, the pre-loan liquidation smart contract instance may write the evidentiary documents to a distributed ledger 2016.

At 2620, the pre-loan liquidation smart contract instance may resolve the contingency sale. Once the borrower agrees to the terms and the buyer confirms that they can pay the sale price, the pre-loan liquidation smart contract instance may execute a contingency resolution stage. During the contingency resolution stage, the pre-loan liquidation smart contract instance may monitor the loan process to verify that the borrower was able to secure the loan. If the borrower is unable to secure a loan and decides to end the loan process, the pre-loan liquidation smart contract may initiate a refund of any escrowed funds (and potentially a reward fee) to the conditional buyer and may initiate the transfer of the collateral token 2042 from the escrow account to the account of the borrower. Assuming the borrower does enter into a loan agreement, the pre-loan liquidation smart contract may monitor the repayment of the loan. In some embodiments, the pre-loan liquidation smart contract may receive a default notification if the borrower is deemed to have defaulted on repaying the loan pursuant to the terms of the loan agreement (e.g., from the loan process smart contract 2022 or a loan smart contract 2034 governing the loan). In response, the pre-loan liquidation smart contract may provide a notification to the contingent buyer to pay any remaining balance on the collateral item (assuming the entire amount was not put in escrow by the buyer). Upon verifying that the contingent buyer has paid the full balance of the price or if the buyer had escrowed the entire sale price at the time of the contingent sale, the pre-loan liquidation smart contract may issue a notification that the sale amount has been secured (e.g., to the loan process smart contract instance 2022 and/or the loan smart contract 2034) and may initiate the transfer of the collateral token 2052 to the contingent buyer. It is noted that the repayment of the funds to the lender and/or issuing of rewards to the safekeeper and authenticator(s) from the proceeds of the contingent sale may be handled via a different workflow. In some embodiments, the pre-loan liquidation smart contract may receive a notification of a repayment event when the borrower successfully repays the entire repayment amount of the loan (the loan amount and any interest and fees). Upon receiving the repayment notification, the pre-loan liquidation smart contract instance may initiate the transfer of any staked funds back to the contingent buyer and may initiate a transfer of a reward (e.g., currency/tokenized tokens 2046) to an account of the contingent buyer as a reward for the buyer staking the funds to help secure the loan vis-à-vis by participating in the contingency sale. In embodiments, the reward amount may be paid by the lender and/or may have been held in escrow from the payments made by the borrower to the lender during the repayment stage of the loan. The pre-loan liquidation workflow may include additional or alternative stages without departing from the scope of the disclosure.

The example of FIG. 26 is provided as an example pre-loan liquidation workflow. Other pre-loan liquidation workflows may be executed in connection with pre-loan liquidation events.

Referring back to FIG. 20, according to some embodiments of the present disclosure, the smart contracts associated with respective stages of a decentralized loan process may include various types of guild-level smart contracts (or sub-guild-level smart contracts) that are configured to ensure that guild members that perform a specific task adhere to the stage-level governance as well as guild-level governance set by a specific guild. For example, the smart contracts associated with the decentralized loan process may include guild-level authentication smart contracts that are configured to, inter alia, ensure that an instance of the authentication process conforms to an authentication workflow as defined by a particular authentication guild-level governance (e.g., watch authentication guild-level governance).

In embodiments, one or more components of the tokenization platform 100 supports the securitized, decentralized loan processes. In some embodiments, the tokenization platform 100 may receive requests from borrowers (or other parties) to initiate an instance of a loan process. In example embodiments, the collateral management system 804 may present a GUI to a user (e.g., a borrower), whereby the user can request initiation of a new loan process via the GUI. For example, the user may provide a location or general area, a type of the collateral item (e.g., a watch, a pair of sneakers, a car, a whiskey collection, jewelry, or the like), and an approximate loan amount that the borrower wishes to secure. In some embodiments, the collateral management system 804 may receive the request and may instruct the ledger management system 104 (or another suitable system) to instantiate a new loan process smart contract 2022. In embodiments, the loan process smart contract 2022 manages a loan process workflow by progressing the loan process through various stages of a decentralized loan process. Alternatively, the collateral management system 2022 may manage the loan process workflow as the loan process progresses through the stages of the decentralized loan process. As discussed, a loan process workflow may define a set of stages that are performed in connection with an instance of a decentralized loan process, where the stages are performed in a predefined order. Different variations of decentralized loan processes may implement different loan process workflows. An example of a series of stages of a loan process workflow may be: a request stage where a user requests a new loan process, followed by an authentication stage where the borrower provides the collateral item to be authenticated by one or more authenticators, followed by an appraisal stage (if the item is deemed authentic) where the item is appraised by one or more appraisers, followed by a safekeeping stage where the collateral item is stored in escrow by a safekeeper, followed by a tokenization stage where a VIRL representing the collateral item is generated and the VIRL is tokenized, followed by a lending stage where the borrower negotiates the loan with one or more lenders, a repayment stage where the lender pays back the loan or defaults on the loan, and a post-loan stage where the collateral item may be liquidated if the seller defaulted on at least a portion of the repayment amount, where rewards are issued to various participants of the loan process, and/or analytics are updated based on the results of the loan process. The foregoing loan process workflow is an example loan process workflow and other loan process workflows are disclosed and within the scope of the disclosure. It is noted that different loan process workflows may achieve different efficiencies and may be better suited for different types of collateral and/or sizes of loans. The example loan process workflow discussed above is meant to minimize the number of stages that are performed if an item is deemed fake by an authenticator. Other workflows may achieve different efficiencies, such as lessening the number of times a collateral item needs to be transferred between participants, mitigating the need to transfer the collateral item between parties, maximizing the amount of a loan, and/or other desirable efficiencies.

In some embodiments, the collateral management system 804 may select a particular loan process workflow from a set of loan process workflows upon receiving a request from a user. In some of these embodiments, the collateral management system 804 may select a particular loan process workflow from a set of different loan process workflows based on the location of the borrower, the type of collateral, and/or the amount that the borrower wishes to secure in a loan. For example, if the collateral item is large and/or difficult or expensive to transport (e.g., a vehicle, a large wine or whiskey collection, a rare painting, or a crystal chandelier) between different participants, the collateral management system 804 may select a loan process workflow that begins with a safekeeping stage (after the request stage) followed by a tokenization stage, such that the safekeeper may take photographs, videos, and/or other supporting data that are used to generate a VIRL that may be provided to an authenticator and appraiser, rather than shipping the collateral item between locations. In another example, if the item is the type of item that is often counterfeited (e.g., a watch, handbag, or sneakers), the collateral management system 804 may select a loan process where authentication occurs before appraisal and/or safekeeping, such that the authenticator(s) may determine whether the item is fake before moving forward with any other stages. It is noted that some variations of loan process workflows may include additional or alternative stages. For instance, in some embodiments, a loan process workflow may include a pre-loan liquidation stage where a pre-loan liquidation event is conducted, as is discussed in the disclosure.

In embodiments, the collateral management system 802 and the authentication system 804 may operate in conjunction with the ledger management system 104 to instantiate or initiate the instantiation of a series of smart contract instances that are used to manage decentralized loan process in general (e.g., loan process smart contracts 2022) and/or the respective stages of the decentralized loan process, such as item authentication (e.g., authentication smart contracts 2028), item appraisal (e.g., appraisal smart contracts 2030), contingency liquidation events (e.g., liquidation smart contracts), item safekeeping (e.g., safekeeping smart contracts 2032), and/or loan generation/repayment (e.g., loan smart contracts 2034). In some embodiments, the collateral management system 802 may instantiate a loan process smart contract 2022, and the loan process smart contract 2022 may in turn instantiate smart contracts that manage one or more stages of the loan process as the loan process smart contract 2022 determines certain defined conditions have been met and the loan process progresses through the loan process workflow.

In some embodiments, the authentication system 804 may be configured to assign tasks to different participants as the loan process advances to different stages. In embodiments, the authentication system 804 may be configured to assign tasks to participants during a loan process. In particular, the authentication system 804 may be configured to assign authentication tasks to authenticators, appraisal tasks to appraisers, and/or safekeeping tasks to safekeepers. In embodiments, the authentication system 804 may select authenticators, appraisers, and safekeepers based on the contents of the request. For instance, in embodiments where authenticators and appraisers are organized into guilds that specialize in authenticating or appraising specific types of items, the authentication system 804 may determine a respective authentication guild or appraisal guild based on the type of item being authenticated and appraised. For instance, if a watch is being authenticated and appraised, the authentication system 804 may identify the watch authentication guild and the watch appraisal guild as the relevant guilds. From the identified guilds, the authentication system 804 may select a respective guild member from the identified guilds to perform the authentication task and the appraisal task. To the extent that safekeepers have specialized and/or regional guilds, as opposed to a single guild comprised of all eligible safekeepers, the authentication system 804 may select a certain safekeeper guild based on type of guild (e.g., automobile safekeepers, safekeepers of perishable items, or the like) and/or based on a proximity of a particular guild to the collateral (e.g., Nevada-based safekeeper guild is selected when the collateral item is located in or near Nevada). Once a guild is identified to perform a task (assuming a guild needs to be identified before a task is assigned to a guild member), the authentication system 804 may assign one or more members of the guild to perform the task.

In embodiments, the authentication system 804 can implement a number of different approaches for identifying a guild member to perform a task. In example embodiments, the authentication system 804 may use a first-in-first-out queue where guild members are assigned to respective tasks in an order determined by the queue. In example embodiments, the authentication system 804 may use a round-robin selection scheme to select a participant. In embodiments, the authentication system 804 randomly assigns the authentication and appraisal tasks to a guild member. In example embodiments, the authentication system 804 may use a weighted selection process where guild members are assigned to respective tasks based on a set of selection criteria, such as respective bandwidths of the participants that can perform the task (e.g., guild members), a brand or subspecies of the collateral item, the ratings of the respective participants, the respective proximities of the respective participants to the collateral item, respective amounts of time since a most recent task was assigned to each respective participant, the number of successful tasks performed by each respective participant, the number of unsuccessful tasks performed by each respective participant, a percentage of successful or unsuccessful tasks performed by each respective participant, and/or the like. In embodiments, the authentication system 804 may employ a bidding system where guild members can bid on a task and the guild member is selected based on the bid (and/or other selection criteria). In embodiments, the bids may indicate be a price for which the guild member will perform the task. In these embodiments, the authentication system 804 may select the guild member based on the bid amount and/or selection criteria (e.g., using a selection model that takes in bid amount as well as any other suitable selection criteria as factors) or the borrower may select the authenticator (e.g., the borrower may be presented with the bid amounts as respective fees the borrower would have to pay to a respective bidder and may also be shown their location and ratings and the borrower selects the bid that makes the most sense to him or her). Alternatively the bids may indicate the price the guild member is willing to pay to obtain the respective task. In these embodiments, the authentication system 804 may be configured to select the guild member based on the highest bid. In the scenarios where primary and secondary participants perform a task (e.g., primary and secondary authenticators and primary/secondary appraisers), available participants can provide a bid to be the primary participant and/or a bid to be the secondary participant, such that the primary participants and the one or more secondary participants are selected based on the respective bids and a winner of the right to perform the primary task cannot be the winner of the right to perform the secondary task. The authentication system 804 may employ any other suitable techniques to select a guild member to perform authentication or appraisal tasks. Once the authentication system 804 has a task to an individual, the authentication system 804 may provide a notification to the selected individual and/or the instance of the loan process smart contract 2022 governing the loan process at issue.

For purposes of explanation, the authentication system 804 is described as assigning tasks to participants, but other suitable components of the tokenization platform 100 may assign tasks to participants. Alternatively, task assignments can be handled "on-chain", such that one or more smart contracts may be configured to assign tasks to participants. For example, an instance of a loan process smart contract 2022 may be configured to assign tasks to participants during the execution of an instance of a loan process. Additionally or alternatively, instances of stage-level smart contracts may be configured to assign tasks to participants upon being instantiated during the course of the loan process. In the latter implementations, the stage-level smart contracts may use a combination of selection criteria and/or selection schemes to assign tasks. For instance, a stage-level smart contract (e.g., an authentication smart contract 2028, an appraisal smart contract 2030, and/or a safekeeping smart contract 2032) or a guild-level smart contract (if a guild has a guild-level smart contract) can be configured to assign a respective tasks to one or more participants randomly, in accordance with a queue, via a bidding process, in a round-robin manner, and/or according to a set of selection criteria. Examples of selection criteria may include the respective bandwidths of the participants that can perform the task (e.g., guild members), the ratings of the respective participants, the respective proximities of the respective participants to the collateral item, respective amounts of time since a most recent task was assigned to each respective participant, the number of successful tasks performed by each respective participant, the number of unsuccessful tasks performed by each respective participant, a percentage of successful or unsuccessful tasks performed by each respective participant, and/or the like.

In some embodiments, the marketplace system 202 (e.g., item management system 202 (FIG. 2)) is configured to generate virtual representations (VIRLs) of collateral items and the ledger management system 104 (e.g., the token generation system 302) may be configured to tokenize one or more VIRLs into a collateral token. It is appreciated that if a borrower wishes to collateralize more than one item to secure a single loan, the item management system 202 may generate a set of VIRLs that respectively correspond to the different collateral items, while the ledger management system 102 may individually tokenize the VIRLs into respective collateral tokens 2042 or may tokenize the set of VIRLs in a single collateral token 2042 that wraps the set of VIRLs. Example methods and systems for generating VIRLs and tokens are discussed in greater detail with respect to FIGS. 1-4 and elsewhere throughout the disclosure. Initially, the ledger management system 104 may assign the ownership of the collateral token 2042 to the borrower by writing ownership data 2054 to the collateral token 2042 to a distributed ledger 2019 and/or depositing the collateral token 2042 into an account of the borrower. Even after the borrower has provided the corresponding collateral item to a safekeeper, the borrower may maintain ownership rights to the collateral token 2042. Upon the borrower and one or more lenders agreeing to a loan and executing the loan, the collateral token 2042 may be "locked" by transferring the collateral token 2042 to an escrow account and updating the ownership data 2054 of the collateral token 2042 to indicate that the collateral token 2042 is currently held in escrow. Once a loan has been repaid (e.g., by the borrower or from the proceeds of a post-default liquidation event), a collateral token is unlocked by transferring the collateral token 2042 to an account either the borrower (if the loan was fully repaid) or the buyer of the collateral token 2042 (if the collateral item was liquidated). In unlocking a collateral token, the ledger management system 104 or a smart contract (e.g., an instance of a smart loan process smart contract 2022 or loan smart contract 3034) may facilitate the transfer of the collateral token 2042 to the rightful owner post-repayment by updating the ownership data 2054 corresponding to the collateral token 2042 in a distributed ledger 2054 with a data block that indicates an account of the owner of the collateral token 2042.

In some embodiments, the collateral management system 802 (or any other suitable component of the tokenization platform) facilitates the negotiation of a loan agreement between a borrower and lender. The collateral management system 802 may be configured to facilitate the negotiation of loan agreements in any suitable manner. In some embodiments, the collateral management system 802 may provide a GUI to a borrower that allows the borrower to request a loan. Assuming that the collateral item has been authenticated and appraised (or bought on a contingency), the collateral management system 802 may allow the user to request a loan amount that does not exceed the appraised value and to request an amount of time to pay back the loan. In some of these embodiments, the collateral management system 802 may generate a loan request that is presented to potential lenders via a GUI, whereby the loan request indicates the sought amount, the length of the loan, and information relating to the collateral item provided by the borrower. The information relating to the collateral item may include the VIRL of the collateral item (which may include images, descriptions, videos, and other suitable information), authentication reports, appraisal reports, safekeeping reports, verification that the authentication, appraisal, and safekeepers have secured their respective tasks (as described above), and/or the like. In embodiments, the collateral management system 802 may suggest a loan repayment amount and/or an interest rate (e.g., based on current market conditions) for the loan. Alternatively, a potential lender may provide an interest rate or a total repayment amount that the borrower would have to pay back via the GUI. Additionally, the potential lender may counter one or more of the loan terms, such as the loan amount and/or the repayment period. The loan offer may then be communicated to a borrower via a GUI, where the borrower may view the loan offer via a borrower device 2002. In response, the borrower may accept the loan offer, reject the loan offer, or provide a counteroffer. The parties may iterate in the manner until an agreement is reached or one or both parties reject the loan offer. Upon a loan being reached, the parties may execute the loan agreement and the collateral management system 802 may provide a notification to the loan process smart contract indicating that a loan agreement has been agreed to by the borrower and a lender may provide the details of the loan agreement to the smart contract (e.g., in a .JSON file). In response, the loan process smart contract 2022 (or the collateral management system 802) may instantiate a loan smart contract instance that executes a loan repayment workflow, in the manner described above. It is appreciated that in some embodiments, the loan negotiation may be handled on-chain, such that a smart contract instance (e.g., the instance of the loan process smart contract 2022 or an instance of a loan smart contract) facilitates the negotiation of the loan agreement in the manner described above. Once a loan is negotiated, the collateral token 2042 may be locked in an escrow account and repayment of the loan may be handled by the loan smart contract instance. If the loan is repaid in full, the collateral token 2042 may be unlocked and returned to the borrower, whereby the ownership data 2052 of the token 2042 is updated to reflect that the borrower is the owner of the collateral token 2052 and the borrower may redeem the token 2052 to retake possession of the collateral item. If the borrower does not successfully repay the loan in accordance with the terms of the loan agreement, the loan contract instance may deem the loan in default.

In some embodiments, the default of the loan may trigger a liquidation stage, where the collateral token 2042 is liquidated to cover the remaining balance of the loan. In embodiments, a liquidation stage may be automatically triggered when a borrower defaults on a loan in accordance with a loan agreement. In embodiments, a smart contract instance (e.g., an instance of a loan process smart contract 2022 or an instance of a loan smart contract 2036) may receive payment event notifications indicating payments made by the borrower towards repayment of the loan. Each time a payment is due, the smart contract instance may determine whether a payment was received. If a schedule payment is missed, the smart contract instance may determine if the borrower is in a default condition. A default condition may not necessarily be the missing of a single payment but may be defined in the loan agreement as missing a number of consecutive payments or being behind on a certain amount of payments relative to the loan repayment amount. If the borrower is in a default condition, the smart contract instance may trigger a liquidation event. In some embodiments, the smart contract may issue a liquidation request to a marketplace (e.g., marketplace system 102) that indicates the collateral token 2042 and/or the VIRL wrapped therein. The liquidation request may include additional data, such as an appraised amount, appraisal records, authentication records, safekeeping records, and/or a remaining balance on the loan repayment amount. In response, the marketplace may conduct a liquidation sale. In embodiments, the liquidation sale may be a fixed price sale (e.g., set at the appraised value) or an auction (e.g., starting at the remaining balance of the loan repayment amount). Once the item is liquidated, the smart contract instance may receive a liquidation notification that indicates that the item was liquidated. In response, the smart contract instance may initiate the transfer of the collateral token 2042 that was used to secure the defaulted upon loan from the escrow account in which it was held to an account of the buyer of the collateral item. Once the ownership data 2054 of the collateral token is updated to indicate that the collateral token 2042 is owned by the buyer, the buyer may then redeem the collateral token 2042 (e.g., as described throughout the disclosure).

Upon taking ownership of a collateral token 2042, an owner of the collateral token 2042 can redeem the token (e.g., using a GUI that provides a mechanism to initiate redemption of a token). Redemption of a collateral token may be handled off-chain by a trusted third party, such as by the redemption system 404 of the tokenization platform 100 and/or on-chain by an instance of a smart contract corresponding to the completed loan transaction, such as the instance of the loan process smart contract 2022 that managed the loan transaction and/or the instance of the safekeeping smart contract 2032 that was created when the collateral item was deposited with the safekeeper of the collateral item to ensure that a collateral item is returned to the rightful owner in a trustless manner, such that the safekeeper can be confident that they are returning the collateral item to the rightful owner.

In embodiments, the redemption of a collateral token 2042 may be performed in accordance with a collateral redemption workflow, which may be executed off-chain (e.g., by a computing system of a trusted-third party) or on-chain (e.g., by instances of one or more smart contracts). In embodiments, the collateral redemption workflow may include, but is not limited to, the following operations: receiving a request to redeem a collateral item indicated by a collateral token 2042 from a user device; verifying the user that is attempting to redeem the collateral token 2042 is the rightful owner of the collateral token 2042 based on ownership data 2052 stored on a distributed ledger 2016; identifying a safekeeper of the collateral item indicated by the collateral token 2042 from the distributed ledger 2016 and/or the loan process smart contract 2022; transmitting a redemption notification to a safekeeper device 2008 of the identified safekeeper that the rightful owner has redeemed the collateral token 2042; receiving a confirmation notification from the safekeeper device 2008 of the identified safekeeper indicating that the rightful owner of the collateral token has taken ownership of the collateral item; and burning the collateral token 2042 in response to receiving the notification from the safekeeper (as described above). In embodiments, the redemption workflow may include additional or alternative steps, such as receiving feedback from the redeeming owner of the collateral item indicating that the collateral item has been returned in satisfactory condition and/or updating a distributed ledger 2016 to indicate the occurrence and content of such feedback events (which may be used to update analytics and/or a rating of the safekeeper).

In embodiments, the tokenization platform 100 is configured to performs analytics on various stages of performed loan processes. In some of these embodiments, the analytics and reporting system 112 may be configured to obtain event records 2052 and/or supporting data 2056 from the set of distributed ledgers 2016 to determine outcomes related to the loan process, including negative outcomes such as false positive authentications (e.g., when an item is deemed authentic but later proven to be fake), false negative authentications (e.g., when an item is deemed fake but later proven to be authentic), overvalued appraisals, undervalued appraisals, damaged or lost collateral items during safekeeping, loan defaults, or the like. For example, the analytics and reporting system 112 may be configured to determine authentication-related statistics, such as the percentage of false positive authentications were issued by each guild and/or guild members. In this example, the analytics and reporting system 112 may read any event records 2052 associated with liquidated items that were deemed authentic by a guild or guild member and later reported to be fake by the purchaser (which may be referred to as "false positives") against the total number of authentications that were performed by a guild or guild member. In another example, the analytics and reporting system 112 may identify instances where authentication tasks resulted in undervalued or overvalued appraised values. In this example, analytics and reporting system 112 may determine a number of event records 2052 associated with liquidated items that were sold below (overvalued by a certain percentage from the liquidation value) or above (undervalued by a certain percentage from the liquidation value) the appraised value provided by the appraiser in relation to the number of all appraisals and/or successful appraisals (e.g., within a certain percentage of the liquidation value). These types of statistical insights may then be used to identify common features of tasks that result in negative outcomes (e.g., false positive cases, false negative cases, undervaluation cases, overvaluation cases, and/or lost or damaged collateral cases) that are not shared with successful cases and in some instances may adjust the stage-level governance to mitigate those features.

In another example, the analytics and reporting system 112 may determine turnover time by task performers (e.g., authenticators and/or appraisers). In this example, the analytics and reporting system 112 may obtain various event records 2052 associated with certain portions of loan processes, such as event records 2052 that indicate when tasks were assigned to particular participants with a loan process and event records 2052 that indicate when those participants finished the task. The analytics and reporting system 112 may then determine a time to complete each instance of the task and may determine various analytical insights such as average turnover time for individual guild members, average turnaround times for a particular task for an entire guild or sub-guild, average turnaround times across all stage participants, average turnaround times for particular types of collateral items or subspecies of collateral items, and the like. These insights may be used to set time constraints on tasks in future governances, such that the participants reward may be lessened if the time constraints are not met.

In embodiments, the analytics and reporting system 112 may be configured to provide ratings to different participants in the loan process ecosystem 2000, such as borrowers, authenticators, appraisers, safekeepers, and/or lenders. In embodiments, the analytics and reporting system 112 may determine negative and positive outcomes associated with the various different participants, such as successful repayments v. default events by borrowers, false negatives/false positives v. successful authentications by authenticators, under-valuations and/or overvaluations by appraisers v. successful appraisals by appraisers, instances of damaged or lost collateral items v. successful safekeeping tasks by safekeepers, and the like. The analytics and reporting system 112 may collect additional or alternative data relating to participants, such as feedback of other participants. The analytics and reporting system 112 may then apply a scoring function to the outcome and other feedback data related to participants to assign scores to the participants. These scores may be relevant when assigning tasks, awarding guild tokens, rewarding participants, and/or the like.

In embodiments, the analytics and reporting system 112 may obtain data from the distributed ledgers. In some of these embodiments, a node device 2014 may be configured as a "history node" that monitors all data blocks being written to the distributed ledgers 2016. The history node device may process and index each block as it is being written to the ledger 2016 and may provide this information to the analytics and reporting system 112. The analytics and reporting system 112 may then perform its analytics on the data collected by the history node. The analytics and reporting system 112 may collect data from the distributed ledger 2016 in other suitable manners without departing from the scope of the disclosure.

Figure 27:
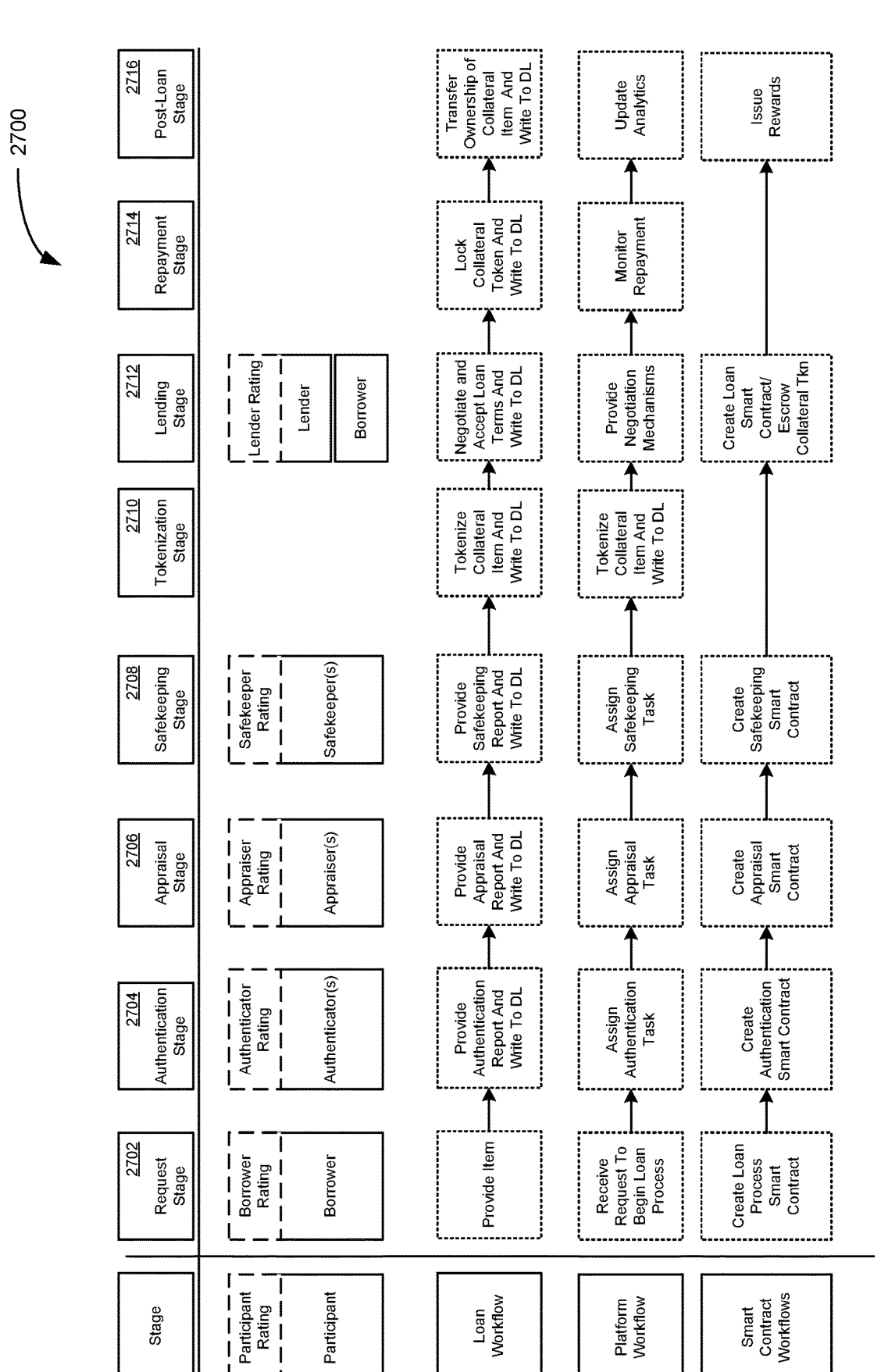
FIG. 27 is a diagram illustrating a set of stages of a loan process workflow according to some embodiments of the present disclosure.

FIG. 27 illustrates an example of loan process workflow 2700 according to some embodiments of the present disclosure. In the example of FIG. 27, the loan process workflow may be performed for collateral items that are easily counterfeited, such as watches, jewelry, handbags, sneakers, or the like. In the example of FIG. 27, the loan process workflow 2700 may include: a request stage 2702 where the borrower requests to begin a loan process; followed by an authentication stage 2704 where one or more authenticators authenticate the one or more items; followed by an appraisal stage 2706 where the authenticated items are appraised; followed by a safekeeping stage 2708 where the appraised items are stored in escrow with a trusted safekeeper; followed by a tokenization stage 2710 where the ledger management system 104 (or another suitable component) generates VIRLs of the one or more escrowed items and generates a collateral token by tokenizing the VIRLs of the escrowed items; followed by a lending stage 2712 where a loan is negotiated and accepted by the borrower and a lender; followed by a repayment stage 2714 where the loan is repaid by the borrower; and followed by a post-loan stage 2716 where the collateral token is unlocked and returned to the borrower or liquidated if the borrower defaults on the loan and any rewards are issued to the participants of the loan process.

During the request stage 2702, a borrower may request to begin a new loan process that includes collateralizing an item owned by the borrower. In embodiments, the borrower may request the loan via a borrower device 2002 that interfaces with the tokenization platform 100. In these embodiments, the tokenization platform 100 (or another suitable system) may provide a GUI where the borrower may provide information such as a collateral item to be collateralized, a location of the collateral item, a loan amount sought, and/or a proposed loan term. In response to the borrower request, the tokenization platform 100 may instantiate a loan process smart contract instance. In embodiments, the loan process smart contract instance may determine a type of the collateral item (e.g., from the request provided by the borrower) and may request an authenticator (and potentially secondary authenticators) to authenticate the collateral item, thereby progressing the loan process to the authentication stage 2704.

During the authentication stage 2704, the loan process smart contract instance may instantiate an instance of an authentication smart contract 2028. In embodiments, the tokenization platform 100 may assign an authentication task to a primary authenticator (and potentially secondary authenticators) from an authentication guild that specializes in authenticating items such as the collateral item, as described above. In embodiments, the primary authenticator may confirm receipt of the item to be authenticated via an authenticator device 2004. In embodiments, the authenticator may generate an authentication report indicating a determination to the authenticity of the collateral item, as well as any supporting documentation. In embodiments, the authentication report and supporting evidence may be provided to one or more secondary authenticators, who in turn may validate the authentication report and may provide additional supporting documentation. In embodiments, the authentication report and any supporting documentation may be written to a distributed ledger 2016. In some embodiments, the authenticators that participated in the authentication task may be required to stake an amount of currency/tokenized tokens as a safeguard in case the item is liquidated and later deemed fake. In example embodiments, the loan process smart contract 2022 may include a listening thread that listens for an authentication notification issued by the instantiated authentication smart contract 2028 indicating whether the item was authentic or deemed fake by the authenticator(s), where the notification from the authentication smart contract 2028 may include the opinion of the authenticators (e.g., fake or authentic), a hash value of the authentication report and any other supporting evidence, and/or a block address to the authentication report and the supporting evidence. If the loan process smart contract instance determines that the item was deemed authentic, the loan process smart contract instance may advance the loan process to an appraisal stage 2706.

During the appraisal stage 2706, the loan process smart contract instance may request one or more appraisers to appraise the authenticated item and may instantiate an instance of an appraisal smart contract 2030. In embodiments, the tokenization platform 100 may identify one or more appraisers to perform the task based on the type of collateral item, as discussed above. In embodiments, a primary appraiser may receive the collateral item (e.g., via mail or other shipping) and/or may receive a VIRL of the collateral item. Knowing that the item was deemed authentic by the authenticators, the appraiser may determine an appraised value of the collateral item and may generate an appraisal report that indicates the appraised value and any supporting documentation to support the appraised value. In some embodiments, one or more secondary appraisers may validate the appraisal report and may provide supporting documentation for their respective validations. In embodiments, the appraisal report and any supporting documentation may be written to a distributed ledger 2016. In some embodiments, the appraisers that participated in the appraisal task may be required to stake an amount of currency/tokenized tokens equal or proportionate to the appraised value of the collateral item as a safeguard in case the item is liquidated at a price that is significantly less than the remaining balance on the repayment amount and/or the appraised value. In embodiments, the appraisal smart contract 2030 may send a notification to the loan process smart contract 2022 indicating that an appraisal workflow was successfully completed, where the notification may include an appraised value, a hash value of the appraisal report and any other supporting evidence, and/or a block address to the appraisal report and the supporting evidence. Upon determining that the appraisal stage is complete, the loan process smart contract 2022 may advance the loan process to the safekeeping stage 2708.

During the safekeeping stage 2708, the loan process smart contract instance may request a safekeeper to safekeep the appraised item and may instantiate an instance of a safekeeping smart contract 2032, which executes a safekeeping workflow. In embodiments, the tokenization platform 100 may assign a safekeeper to the safekeeping task, for example, based on the type of collateral item and/or the safekeeper's proximity to the collateral item. Once the safekeeper has confirmed receipt of the item, the safekeeper may generate a safekeeping report that indicates that the item is stored and notes any damage to the collateral item at the time it was received and inspected, as well as any supporting documentation that supports the safekeeping report. In embodiments, the safekeeping report and any supporting documentation may be written to a distributed ledger 2016. In some embodiments, the safekeeper may be required to stake an amount of currency/tokenized tokens equal or proportionate to the appraised value of the collateral item as a safeguard in case the item is lost or damaged during safekeeping (or may provide proof of insurance). In embodiments, the safekeeping smart contract instance may then provide a notification to the loan process smart contract instance indicating that the item has been safely stored in escrow, where the notification may include a hash value of the safekeeping report and any other supporting evidence and/or a block address to the safekeeping report and the supporting evidence. In response to the notification, the loan process smart contract may advance the loan process to a tokenization stage 2710.

During the tokenization stage 2710, the tokenization platform 100 (or another suitable component) may generate tokenize the collateral item. In embodiments, the tokenization platform 100 may generate a VIRL of the collateral item based on data that describes and/or depicts the collateral item, such as descriptions, images, videos, 2D scans, and/or 3D scans of the collateral item. In embodiments, the borrower, the safekeeper, and/or the authenticator may provide the data used to generate the VIRL. In embodiments, the tokenization platform 100 generates a collateral token of the item based on the VIRL of the collateral item. Once an item is tokenized, the tokenization platform 100 may write the token to the distributed ledger 2016 and may initially assign the ownership rights to the collateral token to the borrower (until a loan agreement is reached). Once the collateral item has been tokenized, the tokenization platform 100 may provide a notification to the loan process smart contract 2022 indicating the tokenization event and/or an address of the collateral token. Upon receiving notification of tokenization event, the loan process smart contract 2022 may advance the loan process to a lending stage 2712.

During the lending stage 2712, the borrower may request a loan and/or may negotiate a loan with one or more lenders. Upon receiving confirmation that the lender and borrower have agreed to loan terms, the loan process smart contract 2022 may instantiate a loan smart contract 2034 in accordance with the agreed upon terms of the loan. In some embodiments, the tokenization platform 100 may provide a GUI to a borrower that allows the borrower to request a loan from one or more potential lenders and/or negotiate a loan agreement with the one or more lenders. It is appreciated that in some embodiments, the loan negotiation may be handled on-chain rather than via a centralized service, such as the tokenization platform 100. In embodiments, the borrower may request a loan amount that does not exceed the appraised value and a proposed loan term that indicates an amount of time to pay back the loan. In some of these embodiments, the tokenization platform 100 may generate a loan request that is presented to potential lenders via a GUI, whereby the loan request indicates the sought amount, the length of the loan, and information relating to the collateral item provided by the borrower (e.g., a VIRL of the collateral item, authentication reports, appraisal reports, safekeeping reports, verification that the authentication, appraisal, and safekeepers have secured their respective tasks (as described above), and/or the like). In embodiments, the tokenization system 100 may suggest a loan repayment amount and/or an interest rate (e.g., based on current market conditions) for the loan. Alternatively, a potential lender may provide an interest rate or a total repayment amount that the borrower would have to pay back via the GUI. Additionally, the potential lender may counter one or more of the requested loan terms, such as the loan amount and/or the repayment period. The loan offer may then be communicated to a borrower via a GUI, where the borrower may view the loan offer via a borrower device 2002. In response, the borrower may accept the loan offer, reject the loan offer, or provide a counteroffer. The parties may iterate in the manner until an agreement is reached or one or both parties reject the loan offer. Upon a loan being reached, the parties may execute the loan agreement and the tokenization platform 100 may provide a notification to the loan process smart contract instance indicating that a loan agreement has been agreed to by the borrower and a lender. In embodiments, the notification may include the details of the loan agreement including the terms of the loan agreement. In response, the loan process smart contract instance may instantiate a loan smart contract instance that executes a loan repayment workflow. Once a loan agreement is executed, the loan smart contract may lock the collateral token in an escrow account and may facilitate the transfer of the funds from an account of the lender to an account of the borrower. In embodiments, the loan agreement, records of any offers/counteroffers, and records relating to the escrowing of the collateral token and the transfer funds to the borrower may be written to a distributed ledger 2016. Once the loan process smart contract instance receives notification that the collateral token has been locked and the funds have been transferred, the loan process smart contract instance may advance the loan process to the repayment stage 2714.

During the repayment stage 2714, the loan smart contract instance may monitor the borrowers payment history to ensure that payments are made by the borrower to the lender (or an account that distributes payments to the lender) in accordance with a loan schedule and that the loan is not in a default condition. During the loan repayment stage, the borrower may remit payments. Each time a payment is made, the loan process smart contract instance may receive a payment notification indicating that a payment has been made and an amount of the payment. The loan smart contract instance may then determine whether the loan has been repaid in full. If the loan has not been paid in full, the loan smart contract instance may adjust the loan repayment amount and may perform additional operations, such as returning some of the staked funds from the authenticators, appraisers, and/or safekeepers to reflect the new loan repayment amount. If the loan smart contract instance determines that the loan repayment amount has been paid in full, the loan smart contract instance may send a repayment notification to the loan process smart contract instance indicating that the loan has been paid in full and may advance the loan process to the post-loan stage 2716. In embodiments, the repayment notification may include hash values of payment event records indicating that payments were made and the amount of the payments and/or addresses of the payment records on the distributed ledger 2016. Conversely, if the loan smart contract instance determines that the borrower defaulted, the loan smart contract instance may trigger a liquidation event and/or send a default notification to the loan process smart contract indicating that the loan is in default in accordance with the terms of the loan. In embodiments the default notification may include hash values of a default event record indicating which payments were missed and the remaining balance on the loan and/or addresses of the default event record on the distributed ledger 2016. In response to receiving a default notification, the loan smart contract instance may initiate a liquation event and may advance the loan process to the post-loan stage 2716.

During the post-loan stage 2716, the collateral token is either returned to the owner if the loan has been fully paid or a liquidation event is conducted. In response to receiving a repayment notification that the loan has been repaid in full, the loan smart contract instance may initiate the transfer of the collateral token from the escrow account to an account of the borrower, who may then redeem the collateral token to obtain possession of the collateral item. Once the loan has been successfully repaid, the loan process smart contract instance may initiate the awarding of rewards to accounts of the authenticator, appraiser, and safekeeper (e.g., from the funds that were paid back to the lender) in accordance with the terms set forth in the authentication smart contract, the appraisal smart contract, and the safekeeping contract.

In initiating a liquidation event, the loan smart contract instance may send an address of the collateral token to an appropriate marketplace (e.g., marketplace system 102), which may liquidate the collateral item (e.g., in an auction). During the liquidation event, a buyer may purchase the collateral token, which results in the ownership data 2054 of the collateral token being assigned to the buyer, who may then redeem the collateral token to obtain possession of the collateral item. Once liquidated, the loan process smart contract instance may distribute the remainder of the outstanding balance to the lender (or a secondary lender if the loan was sold to a secondary lender) from the proceeds of the liquidation event. After the liquidation event, the loan process smart contract instance may initiate the awarding of rewards to accounts of the authenticators, appraisers, and safekeeper from the proceeds of the liquidation event in accordance with the terms set forth in the authentication smart contract, the appraisal smart contract, and the safekeeping contract. To the extent any balance remains, the remainder may be credited to the account of the borrower.

Once the loan process is complete, the loan process smart contract instance may notify the tokenization platform 100 that the loan process has been completed, and the tokenization platform 100 may run an analytics processes based on the completed loan process. In some embodiments, the results of the loan process may be used to update the ratings of one or more of the authenticators, the appraisers, the safekeeper, the lender, and/or the borrower.

It is appreciated that the foregoing is an example of a decentralized loan process workflow 2700 and that alternative workflows may be executed. Furthermore, the decentralized loan process workflow 2700 may include additional or alternative steps that were not explicitly discussed.

FIG. 28 illustrates an example of loan process workflow 2800 according to some embodiments of the present disclosure. In the example of FIG. 28, the loan process workflow 2800 may be performed for collateral items that are not easily shipped and/or are very large, such as vehicles, works of art, delicate objects (e.g., vases or chandeliers), wine or whiskey collections, and the like. In the workflow 2800 of FIG. 28, the collateral item is deposited with a safekeeper, who in turn can generate the VIRL that is tokenized into a collateral token. The VIRL of the collateral item may then be provided to the authenticators and appraisers without having to transport the physical collateral item between parties. In the example of FIG. 28, the loan process workflow 2800 may include a request stage 2802 where the borrower requests to begin a loan process; followed by a safekeeping stage 2804 where possession of the collateral item is taken by the safekeeper; followed by a tokenization stage 2806 where the safekeeper may provide the requisite documentation to generate a VIRL of the collateral item is tokenized into a collateral token; followed by an authentication stage 2808 where one or more authenticators authenticate the one or more items; followed by an appraisal stage 2810 where the authenticated items are appraised; followed by a lending stage 2812 where a loan is negotiated and accepted by the borrower and a lender; followed by a repayment stage 2814 where the loan is repaid by the borrower; and followed by a post-loan stage 2816 where the collateral token is unlocked and returned to the borrower or liquidated if the borrower defaults on the loan and any rewards are issued to the participants of the loan process.

During the request stage 2802, a borrower may request to begin a new loan process that includes collateralizing an item owned by the borrower. In embodiments, the borrower may request the loan via a borrower device 2002 that interfaces with the tokenization platform 100. In these embodiments, the tokenization platform 100 (or another suitable system) may provide a GUI where the borrower may provide information such as a collateral item to be collateralized, a location of the collateral item, a loan amount sought, and/or a proposed loan term. In response to the borrower request, the tokenization platform 100 may instantiate a loan process smart contract instance. In embodiments, the loan process smart contract instance may determine a type of the collateral item (e.g., from the request provided by the borrower) and may request a safekeeper to safekeep the collateral item in escrow during the loan process, thereby progressing the loan process to the safekeeping stage 2804.

During the safekeeping stage 2804, the loan process smart contract instance may request a safekeeper to safekeep the collateral item and may instantiate an instance of a safekeeping smart contract 2032, which executes a safekeeping workflow. In embodiments, the tokenization platform 100 may assign a safekeeper to the safekeeping task, for example, based on the type of collateral item and/or the safekeeper's proximity to the collateral item. Once the safekeeper has confirmed receipt of the item, the safekeeper may generate a safekeeping report that indicates that the item is stored and notes any damage to the collateral item at the time it was received and inspected, as well as any supporting documentation that supports the safekeeping report. In embodiments, the safekeeping report and any supporting documentation may be written to a distributed ledger 2016. In some embodiments, the safekeeper may be required to stake an amount of currency/tokenized tokens equal or proportionate to an approximate value of the collateral item as a safeguard in case the item is lost or damaged during safekeeping (or may provide proof of insurance). In embodiments, the safekeeping smart contract instance may then provide a notification to the loan process smart contract instance indicating that the item has been safely stored in escrow, where the notification may include a hash value of the safekeeping report and any other supporting evidence and/or a block address to the safekeeping report and the supporting evidence. In response to the notification, the loan process smart contract may advance the loan process to a tokenization stage 2806.

During the tokenization stage 2806, the tokenization platform 100 (or another suitable component) may generate tokenize the collateral item. In embodiments, the tokenization platform 100 may generate a VIRL of the collateral item based on data that describes and/or depicts the collateral item, such as descriptions, images, videos, 2D scans, and/or 3D scans of the collateral item. In embodiments, the borrower or the safekeeper may provide the data used to generate the VIRL. In embodiments, the tokenization platform 100 generates a collateral token of the item based on the VIRL of the collateral item. Once an item is tokenized, the tokenization platform 100 may write the token to the distributed ledger 2016 and may initially assign the ownership rights to the collateral token to the borrower (until a loan agreement is reached). Once the collateral item has been tokenized, the tokenization platform 100 may provide a notification to the loan process smart contract 2022 indicating the tokenization event and/or an address of the collateral token. Upon receiving notification of tokenization event, the loan process smart contract 2022 may advance the loan process to an authentication stage 2808.

During the authentication stage 2808, the loan process smart contract instance may instantiate an instance of an authentication smart contract 2028. In embodiments, the tokenization platform 100 may assign an authentication task to a primary authenticator (and potentially secondary authenticators) from an authentication guild that specializes in authenticating items such as the collateral item, as described above. In embodiments, the primary authenticator may be sent the VIRL of the item to be authenticated and the authenticator may generate an authentication report indicating a determination to the authenticity of the collateral item, as well as any supporting documentation. In embodiments, the authentication report and supporting evidence may be provided to one or more secondary authenticators, who in turn may validate the authentication report and may provide additional supporting documentation. In embodiments, the authentication report and any supporting documentation may be written to a distributed ledger 2016. In some embodiments, the authenticators that participated in the authentication task may be required to stake an amount of currency/tokenized tokens as a safeguard in case the item is liquidated and later deemed fake. In example embodiments, the loan process smart contract 2022 may include a listening thread that listen for an authentication notification issued by the instantiated authentication smart contract 2028 indicating whether the item was authentic or deemed fake by the authenticator(s), where the authentication notification from the authentication smart contract 2028 may include the opinion of the authenticators (e.g., fake or authentic), a hash value of the authentication report and any other supporting evidence, and/or a block address to the authentication report and the supporting documentation. If the loan process smart contract instance determines that the item was deemed authentic, the loan process smart contract instance may advance the loan process to an appraisal stage 2810.

During the appraisal stage 2810, the loan process smart contract instance may request one or more appraisers to appraise the authenticated item and may instantiate an instance of an appraisal smart contract 2030. In embodiments, the tokenization platform 100 may identify one or more appraisers to perform the task based on the type of collateral item, as discussed above. In embodiments, a primary appraiser may be sent the VIRL of the collateral item. Knowing that the item was deemed authentic, the appraiser may determine an appraised value of the collateral item and may generate an appraisal report that indicates the appraised value and any supporting documentation to support the appraised value. In some embodiments, one or more secondary appraisers may validate the appraisal report and may provide supporting documentation for their respective validations. In embodiments, the appraisal report and any supporting documentation may be written to a distributed ledger 2016. In some embodiments, the appraisers that participated in the appraisal task may be required to stake an amount of currency/tokenized tokens equal or proportionate to the appraised value of the collateral item as a safeguard in case the item is liquidated at a price that is significantly less than the remaining balance on the repayment amount and/or the appraised value. In embodiments, the appraisal smart contract 2030 may send a notification to the loan process smart contract 2022 indicating that an appraisal workflow was successfully completed, where the notification may include an appraised value, a hash value of the appraisal report and any other supporting evidence, and/or a block address to the appraisal report and the supporting evidence. Upon determining that the appraisal stage is complete, the loan process smart contract 2022 may advance the loan process to the lending stage 2812.

During the lending stage 2812, the borrower may request a loan and/or may negotiate a loan with one or more lenders. Upon receiving confirmation that the lender and borrower have agreed to loan terms, the loan process smart contract 2022 may instantiate a loan smart contract 2034 in accordance with the agreed upon terms of the loan. In some embodiments, the tokenization platform 100 may provide a GUI to a borrower that allows the borrower to request a loan from one or more potential lenders and/or negotiate a loan agreement with the one or more lenders. It is appreciated that in some embodiments, the loan negotiation may be handled on-chain rather than via a centralized service, such as the tokenization platform 100. In embodiments, the borrower may request a loan amount that does not exceed the appraised value and a proposed loan term that indicates an amount of time to pay back the loan. In some of these embodiments, the tokenization platform 100 may generate a loan request that is presented to potential lenders via a GUI, whereby the loan request indicates the sought amount, the length of the loan, and information relating to the collateral item provided by the borrower (e.g., a VIRL of the collateral item, authentication reports, appraisal reports, safekeeping reports, verification that the authentication, appraisal, and safekeepers have secured their respective tasks (as described above), and/or the like. In embodiments, the tokenization system 100 may suggest a loan repayment amount and/or an interest rate (e.g., based on current market conditions) for the loan. Alternatively, a potential lender may provide an interest rate or a total repayment amount that the borrower would have to pay back via the GUI. Additionally, the potential lender may counter one or more of the requested loan terms, such as the loan amount and/or the repayment period. The loan offer may then be communicated to a borrower via a GUI, where the borrower may view the loan offer via a borrower device 2002. In response, the borrower may accept the loan offer, reject the loan offer, or provide a counteroffer. The parties may iterate in the manner until an agreement is reached or one or both parties reject the loan offer. Upon a loan being reached, the parties may execute the loan agreement and the tokenization platform 100 may provide a notification to the loan process smart contract instance indicating that a loan agreement has been agreed to by the borrower and a lender. In embodiments, the notification may include the details of the loan agreement including the terms of the loan agreement. In response, the loan process smart contract instance may instantiate a loan smart contract instance that executes a loan repayment workflow. Once a loan agreement is executed, the loan smart contract may lock the collateral token in an escrow account and may facilitate the transfer of the funds from an account of the lender to an account of the borrower. In embodiments, the loan agreement, records of any offers/counteroffers, and records relating to the escrowing of the collateral token and the transfer funds to the borrower may be written to a distributed ledger 2016. Once the loan process smart contract instance receives notification that the collateral token has been locked and the funds have been transferred, the loan process smart contract instance may advance the loan process to the repayment stage 2814.

During the repayment stage 2814, the loan smart contract instance may monitor the borrowers payment history to ensure that payments are made by the borrower to the lender (or an account that distributes payments to the lender) in accordance with a loan schedule and that the loan is not in a default condition. During the loan repayment stage, the borrower may remit payments. Each time a payment is made, the loan process smart contract instance may receive a payment notification indicating that a payment has been made and an amount of the payment. The loan smart contract instance may then determine whether the loan has been repaid in full. If the loan has not been paid in full, the loan smart contract instance may adjust the loan repayment amount and may perform additional operations, such as returning some of the staked funds from the authenticators, appraisers, and/or safekeepers to reflect the new loan repayment amount. If the loan smart contract instance determines that the loan repayment amount has been paid in full, the loan smart contract instance may send a repayment notification to the loan process smart contract instance indicating that the loan has been paid in full and may advance the loan process to the post-loan stage 2816. In embodiments, the repayment notification may include hash values of payment event records indicating that payments were made and the amount of the payments and/or addresses of the payment records on the distributed ledger 2016. Conversely, if the loan smart contract instance determines that the borrower defaulted, the loan smart contract may instance may trigger a liquidation event and/or send a default notification to the loan process smart contract indicating that the loan is in default in accordance with the terms of the loan. In embodiments the default notification may include hash values of a default event record indicating which payments were missed and the remaining balance on the loan and/or addresses of the default event record on the distributed ledger 2016. In response to receiving a default notification, the loan smart contract instance may initiate a liquation event and may advance the loan process to the post-loan stage 2816.

During the post-loan stage 2816, the collateral token is either returned to the owner if the loan has been fully paid or a liquidation event is conducted. In response to receiving a repayment notification that the loan has been repaid in full, the loan smart contract instance may initiate the transfer of the collateral token from the escrow account to an account of the borrower, who may then redeem the collateral token to obtain possession of the collateral item. Once the loan has been successfully repaid, the loan process smart contract instance may initiate the awarding of rewards to accounts of the authenticator, appraiser, and safekeeper (e.g., from the funds that were paid back to the lender) in accordance with the terms set forth in the authentication smart contract, the appraisal smart contract, and the safekeeping contract.

In initiating a liquidation event, the loan smart contract instance may send an address of the collateral token to an appropriate marketplace (e.g., marketplace system 102), which may liquidate the collateral item (e.g., in an auction). During the liquidation event, a buyer may purchase the collateral token, which results in the ownership data 2054 of the collateral token being assigned to the buyer, who may then redeem the collateral token to obtain possession of the collateral item. Once liquidated, the loan process smart contract instance may distribute the remainder of the outstanding balance to the lender (or a secondary lender if the loan was sold to a secondary lender) from the proceeds of the liquidation event. After the liquidation event, the loan process smart contract instance may initiate the awarding of rewards to accounts of the authenticators, appraisers, and safekeeper from the proceeds of the liquidation event in accordance with the terms set forth in the authentication smart contract, the appraisal smart contract, and the safekeeping contract. To the extent any balance remains, the remainder may be credited to the account of the borrower.

Once the loan process is complete, the loan process smart contract instance may notify the tokenization platform 100 that the loan process has been completed, and the tokenization platform 100 may run an analytics processes based on the completed loan process. In some embodiments, the results of the loan process may be used to update the ratings of one or more of the authenticators, the appraisers, the safekeeper, the lender, and/or the borrower.

It is appreciated that the foregoing is an example of a decentralized loan process workflow 2800 and that alternative workflows may be executed. Furthermore, the decentralized loan process workflow 2800 may include additional or alternative steps that were not explicitly discussed.

FIG. 29 illustrates an example of loan process workflow 2900 according to some embodiments of the present disclosure. In the example of FIG. 29, the loan process workflow 2900 may be performed when a borrower is likely overvaluing the collateral item. For example, the borrower may wish to secure a loan amount that is equal to $10,000 and wants to secure the loan with a pair of designer sneakers. In this situation, the loan process workflow 2900 of FIG. 29 may be executed, with the appraisal stage being performed before the authentication stage and safekeeping stage. In this way, if the appraised value is much less than the desired loan amount, the borrower may elect to forego the loan process without having to pay an authentication fee and/or a safekeeping fee. In the example of FIG. 29, the loan process workflow 2900 may include: a request stage 2902 where the borrower requests to begin a loan process; followed by an appraisal stage 2904 where one or more appraisers appraise the one or more items; followed by an authentication stage 2906 where the appraised items are authenticated; followed by a safekeeping stage 2908 where the authenticated items are stored in escrow with a trusted safekeeper; followed by a tokenization stage 2910 where the ledger management system 104 (or another suitable component) generates VIRLs of the one or more escrowed items, generates a collateral token by tokenizing the VIRLs of the escrowed items; followed by a lending stage 2912 where a loan is negotiated and accepted by the borrower and a lender; followed by a repayment stage 2914 where the loan is repaid by the borrower; and followed by a post-loan stage 2916 where the collateral token is unlocked and returned to the borrower or liquidated if the borrower defaults on the loan and any rewards are issued to the participants of the loan process.

During the request stage 2902, a borrower may request to begin a new loan process that includes collateralizing an item owned by the borrower. In embodiments, the borrower may request the loan via a borrower device 2002 that interfaces with the tokenization platform 100. In these embodiments, the tokenization platform 100 (or another suitable system) may provide a GUI where the borrower may provide information such as a collateral item to be collateralized, a location of the collateral item, a loan amount sought, and/or a proposed loan term. In response to the borrower request, the tokenization platform 100 may instantiate a loan process smart contract instance. In embodiments, the loan process smart contract instance may determine a type of the collateral item (e.g., from the request provided by the borrower) and may request an appraiser (and potentially secondary appraisers) to appraise the collateral item, thereby progressing the loan process to the appraisal stage 2904.

During the appraisal stage 2904, the loan process smart contract instance may instantiate an instance of an appraisal smart contract 2030 and may request one or more appraisers to appraise the authenticated. In embodiments, the tokenization platform 100 may identify one or more appraisers to perform the task based on the type of collateral item, the location of the item, and/or the like, as was discussed above. In embodiments, a primary appraiser may receive the collateral item (e.g., via mail or other shipping) and may determine an appraised value of the collateral item. In this workflow 2900, the appraiser does not have the benefit of knowing that the item was deemed authentic by the authenticators. Nevertheless, the appraiser may assume that the item will be deemed authentic by the authenticators. In embodiments, the primary appraiser may generate an appraisal report that indicates the determined appraised value and any supporting documentation to support the appraised value. In some embodiments, one or more secondary appraisers may validate the appraisal report and may provide supporting documentation for their respective validations. In embodiments, the appraisal report and any supporting documentation may be written to a distributed ledger 2016. In some embodiments, the appraisers that participated in the appraisal task may be required to stake an amount of currency/tokenized tokens equal or proportionate to the appraised value of the collateral item as a safeguard in case the item is liquidated at a price that is significantly less than the remaining balance on the repayment amount and/or the appraised value. In embodiments, the appraisal smart contract 2030 may send a notification to the loan process smart contract 2022 indicating that an appraisal workflow was successfully completed, where the notification may include an appraised value, a hash value of the appraisal report and any other supporting evidence, and/or a block address to the appraisal report and the supporting evidence. In some scenarios, the appraised value will be much less than the requested loan amount, in which case, the borrower may opt to end the loan process. Assuming the borrower decides to continue the loan process given the appraised value, the loan process smart contract 2022 may advance the loan process to the appraisal stage 2906.

During the authentication stage 2906, the loan process smart contract instance may instantiate an instance of an authentication smart contract 2028. In embodiments, the tokenization platform 100 may assign an authentication task to a primary authenticator (and potentially secondary authenticators) from an authentication guild that specializes in authenticating items such as the collateral item, as described above. In embodiments, either the collateral item is physically sent to the primary authenticator (e.g., from the appraiser) or a VIRL of the collateral item is digitally sent to authenticator. In embodiments, the primary authenticator may confirm receipt of the collateral item to be authenticated (or a VIRL thereof) via an authenticator device 2004. In embodiments, the authenticator may generate an authentication report indicating a determination to the authenticity of the collateral item, as well as any supporting documentation. In embodiments, the authentication report and supporting evidence may be provided to one or more secondary authenticators, who in turn may validate the authentication report and may provide additional supporting documentation. In embodiments, the authentication report and any supporting documentation may be written to a distributed ledger 2016. In some embodiments, the authenticators that participated in the authentication task may be required to stake an amount of currency/tokenized tokens as a safeguard in case the item is liquidated and later deemed fake. In example embodiments, the loan process smart contract 2022 may include a listening thread that listen for an authentication notification issued by the instantiated authentication smart contract 2028 indicating whether the item was authentic or deemed fake by the authenticator(s), where the notification from the authentication smart contract 2028 may include the opinion of the authenticators (e.g., fake or authentic), a hash value of the authentication report and any other supporting evidence, and/or a block address to the authentication report and the supporting evidence. If the loan process smart contract instance determines that the item was deemed authentic, the loan process smart contract instance may advance the loan process to a safekeeping stage 2908.

During the safekeeping stage 2908, the loan process smart contract instance may request a safekeeper to safekeep the collateral item and may instantiate an instance of a safekeeping smart contract 2032, which executes a safekeeping workflow. In embodiments, the tokenization platform 100 may assign a safekeeper to the safekeeping task, for example, based on the type of collateral item and/or the safekeeper's proximity to the collateral item. Once the safekeeper has confirmed receipt of the item, the safekeeper may generate a safekeeping report that indicates that the item is stored and notes any damage to the collateral item at the time it was received and inspected, as well as any supporting documentation that supports the safekeeping report. In embodiments, the safekeeping report and any supporting documentation may be written to a distributed ledger 2016. In some embodiments, the safekeeper may be required to stake an amount of currency/tokenized tokens equal or proportionate to the appraised value of the collateral item as a safeguard in case the item is lost or damaged during safekeeping (or may provide proof of insurance). In embodiments, the safekeeping smart contract instance may then provide a notification to the loan process smart contract instance indicating that the item has been safely stored in escrow, where the notification may include a hash value of the safekeeping report and any other supporting evidence and/or a block address to the safekeeping report and the supporting evidence. In response to the notification, the loan process smart contract may advance the loan process to a tokenization stage 2910.

During the tokenization stage 2910, the tokenization platform 100 (or another suitable component) may generate tokenize the collateral item. In embodiments, the tokenization platform 100 may generate a VIRL of the collateral item based on data that describes and/or depicts the collateral item, such as descriptions, images, videos, 2D scans, and/or 3D scans of the collateral item. In embodiments, the borrower, the safekeeper, and/or the authenticator may provide the data used to generate the VIRL. In embodiments, the tokenization platform 100 generates a collateral token of the item based on the VIRL of the collateral item. Once an item is tokenized, the tokenization platform 100 may write the token to the distributed ledger 2016 and may initially assign the ownership rights to the collateral token to the borrower (until a loan agreement is reached). Once the collateral item has been tokenized, the tokenization platform 100 may provide a notification to the loan process smart contract 2022 indicating the tokenization event and/or an address of the collateral token. Upon receiving notification of tokenization event, the loan process smart contract 2022 may advance the loan process to a lending stage 2912.

During the lending stage 2912, the borrower may request a loan and/or may negotiate a loan with one or more lenders. Upon receiving confirmation that the lender and borrower have agreed to loan terms, the loan process smart contract 2022 may instantiate a loan smart contract 2034 in accordance with the agreed upon terms of the loan. In some embodiments, the tokenization platform 100 may provide a GUI to a borrower that allows the borrower to request a loan from one or more potential lenders and/or negotiate a loan agreement with the one or more lenders. It is appreciated that in some embodiments, the loan negotiation may be handled on-chain rather than via a centralized service, such as the tokenization platform 100. In embodiments, the borrower may request a loan amount that does not exceed the appraised value and a proposed loan term that indicates an amount of time to pay back the loan. In some of these embodiments, the tokenization platform 100 may generate a loan request that is presented to potential lenders via a GUI, whereby the loan request indicates the sought amount, and length of the loan, and information relating to the collateral item provided by the borrower (e.g., a VIRL of the collateral item, authentication reports, appraisal reports, safekeeping reports, verification that the authentication, appraisal, and safekeepers have secured their respective tasks (as described above), and/or the like). In embodiments, the tokenization system 100 may suggest a loan repayment amount and/or an interest rate (e.g., based on current market conditions) for the loan. Alternatively, a potential lender may provide an interest rate or a total repayment amount that the borrower would have to pay back via the GUI. Additionally, the potential lender may counter one or more of the requested loan terms, such as the loan amount and/or the repayment period. The loan offer may then be communicated to a borrower via a GUI, where the borrower may view the loan offer via a borrower device 2002. In response, the borrower may accept the loan offer, reject the loan offer, or provide a counteroffer. The parties may iterate in the manner until an agreement is reached or one or both parties reject the loan offer. Upon a loan being reached, the parties may execute the loan agreement and the tokenization platform 100 may provide a notification to the loan process smart contract instance indicating that a loan agreement has been agreed to by the borrower and a lender. In embodiments, the notification may include the details of the loan agreement including the terms of the loan agreement. In response, the loan process smart contract instance may instantiate a loan smart contract instance that executes a loan repayment workflow. Once a loan agreement is executed, the loan smart contract may lock the collateral token in an escrow account and may facilitate the transfer of the funds from an account of the lender to an account of the borrower. In embodiments, the loan agreement, records of any offers/counteroffers, and records relating to the escrowing of the collateral token and the transfer funds to the borrower may be written to a distributed ledger 2016. Once the loan process smart contract instance receives notification that the collateral token has been locked and the funds have been transferred, the loan process smart contract instance may advance the loan process to the repayment stage 2914.

During the repayment stage 2914, the loan smart contract instance may monitor the borrowers payment history to ensure that payments are made by the borrower to the lender (or an account that distributes payments to the lender) in accordance with a loan schedule and that the loan is not in a default condition. During the loan repayment stage, the borrower may remit payments. Each time a payment is made, the loan process smart contract instance may receive a payment notification indicating that a payment has been made and an amount of the payment. The loan smart contract instance may then determine whether the loan has been repaid in full. If the loan has not been paid in full, the loan smart contract instance may adjust the loan repayment amount and may perform additional operations, such as returning some of the staked funds from the authenticators, appraisers, and/or safekeepers to reflect the new loan repayment amount. If the loan smart contract instance determines that the loan repayment amount has been paid in full, the loan smart contract instance may send a repayment notification to the loan process smart contract instance indicating that the loan has been paid in full and may advance the loan process to the post-loan stage 2916. In embodiments, the repayment notification may include hash values of payment event records indicating that payments were made and the amount of the payments and/or addresses of the payment records on the distributed ledger 2016. Conversely, if the loan smart contract instance determines that the borrower defaulted, the loan smart contract may instance may trigger a liquidation event and/or send a default notification to the loan process smart contract indicating that the loan is in default in accordance with the terms of the loan. In embodiments the default notification may include hash values of a default event record indicating which payments were missed and the remaining balance on the loan and/or addresses of the default event record on the distributed ledger 2016. In response to receiving a default notification, the loan smart contract instance may initiate a liquation event and may advance the loan process to the post-loan stage 2916.

During the post-loan stage 2916, the collateral token is either returned to the owner if the loan has been fully paid or a liquidation event is conducted. In response to receiving a repayment notification that the loan has been repaid in full, the loan smart contract instance may initiate the transfer of the collateral token from the escrow account to an account of the borrower, who may then redeem the collateral token to obtain possession of the collateral item. Once the loan has been successfully repaid, the loan process smart contract instance may initiate the awarding of rewards to accounts of the authenticator, appraiser, and safekeeper (e.g., from the funds that were paid back to the lender) in accordance with the terms set forth in the authentication smart contract, the appraisal smart contract, and the safekeeping contract.

In initiating a liquidation event, the loan smart contract instance may send an address of the collateral token to an appropriate marketplace (e.g., marketplace system 102), which may liquidate the collateral item (e.g., in an auction). During the liquidation event, a buyer may purchase the collateral token, which results in the ownership data 2054 of the collateral token being assigned to the buyer, who may then redeem the collateral token to obtain possession of the collateral item. Once liquidated, the loan process smart contract instance may distribute the remainder of the outstanding balance to the lender (or a secondary lender if the loan was sold to a secondary lender) from the proceeds of the liquidation event. After the liquidation event, the loan process smart contract instance may initiate the awarding of rewards to accounts of the authenticators, appraisers, and safekeeper from the proceeds of the liquidation event in accordance with the terms set forth in the authentication smart contract, the appraisal smart contract, and the safekeeping contract. To the extent any balance remains, the remainder may be credited to the account of the borrower.

Once the loan process is complete, the loan process smart contract instance may notify the tokenization platform 100 that the loan process has been completed, and the tokenization platform 100 may run an analytics processes based on the completed loan process. In some embodiments, the results of the loan process may be used to update the ratings of one or more of the authenticators, the appraisers, the safekeeper, the lender, and/or the borrower.

It is appreciated that the foregoing is an example of a decentralized loan process workflow 2900 and that alternative workflows may be executed. Furthermore, the decentralized loan process workflow 2900 may include additional or alternative steps that were not explicitly discussed.

Figure 30:
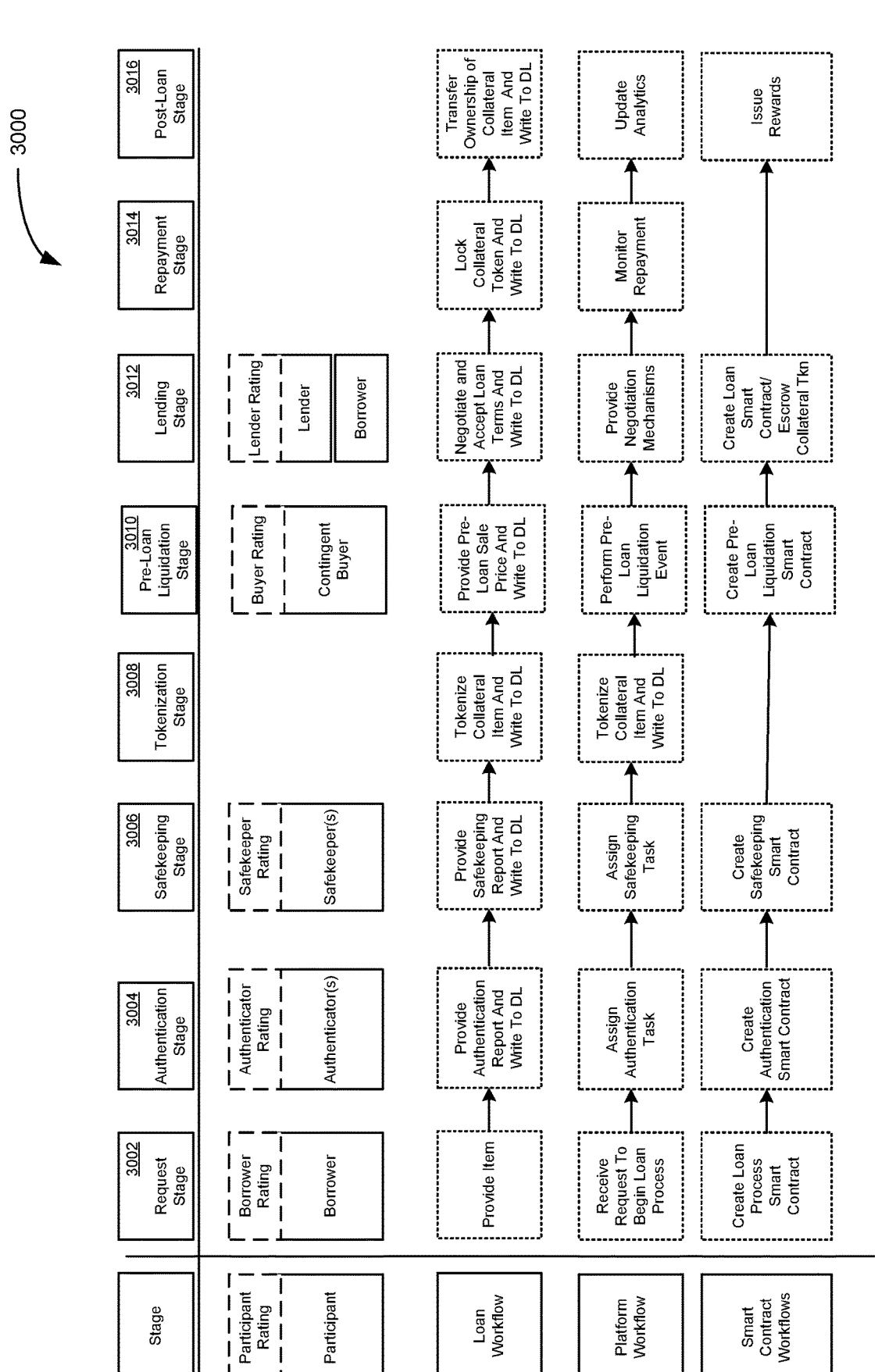
FIG. 30 is a diagram illustrating a set of stages of a loan process workflow according to some embodiments of the present disclosure.

FIG. 30 illustrates an example of loan process workflow 3000 according to some embodiments of the present disclosure. In the example loan process workflow 3000 a pre-loan liquidation event is conducted before the loan terms are agreed to. During an example pre-loan liquidation stage, a marketplace (e.g., a marketplace hosted by or in communication with the marketplace system 102 of the tokenization platform 100) may sell a collateral item to a contingent buyer at a set price or auction off the collateral item to the contingent buyer prior to the negotiation and/or execution of a loan involving the collateral item with a set of contingencies. In embodiments, the set of contingencies may include a possession contingency and a reward contingency. In embodiments, a possession contingency conditions the contingent buyer's possession rights to the collateral item upon a confirmed default event with respect to a loan agreement entered into by the borrower that is secured by the collateral item. Put another way, the contingent buyer would only be able to take possession of the collateral item (e.g., by redeeming a corresponding collateral item) if the borrower was able to secure a loan using the collateral item as collateral and the borrower later defaulted on that loan. In embodiments, a reward contingency may condition the awarding of a reward (e.g., an amount of currency/tokenized tokens or fiat currency) to the contingent buyer (e.g., by depositing the reward into an electronic account thereof) if the borrower successfully repays the loan. In this way, the contingent buyer is incentivized to purchase collateral items on a contingency, as he or she will be rewarded if the loan is successfully repaid. Put another way, the contingent buyer may be provided a monetary reward in exchange for agreeing to set a liquidation price of a collateral item before a loan is entered into by the current owner of the collateral item (i.e., the borrower). It is noted that in some embodiments, a borrower may agree to sell the collateral item to the contingent buyer and forego the opportunity to seek out a loan after the pre-loan liquidation stage. The pre-loan liquidation stage may be performed in place of an appraisal stage or may be requested after the appraisal stage (e.g., by a borrower and/or lender if one or more both of the parties do not agree to the appraised value of the collateral item).

In the example of FIG. 30, the loan process workflow 3000 may include: a request stage 3002 where the borrower requests to begin a loan process; followed by an authentication stage 3004 where one or more authenticators authenticate a collateral item; followed by a safekeeping stage 3006 where the authenticated item is stored in escrow with a trusted safekeeper; followed by a tokenization stage 3010 where a VIRL corresponding to the collateral item is generated and tokenized into a collateral token; followed by a pre-loan liquidation stage 3006 where the authenticated items are conditionally sold via a marketplace to set a liquidation value of the collateral item before the loan terms are negotiated; followed by a lending stage 3012 where a loan is negotiated and accepted by the borrower and a lender; followed by a repayment stage 3014 where the loan is repaid by the borrower; and followed by a post-loan stage 3016 where the collateral token is unlocked and returned to the borrower or liquidated if the borrower defaults on the loan and any rewards are issued to the participants of the loan process.

During the request stage 3002, a borrower may request to begin a new loan process that includes collateralizing an item owned by the borrower. In embodiments, the borrower may request the loan via a borrower device 2002 that interfaces with the tokenization platform 100. In these embodiments, the tokenization platform 100 (or another suitable system) may provide a GUI where the borrower may provide information such as a collateral item to be collateralized, a location of the collateral item, a loan amount sought, and/or a proposed loan term. In response to the borrower request, the tokenization platform 100 may instantiate a loan process smart contract instance. In embodiments, the loan process smart contract instance may determine a type of the collateral item (e.g., from the request provided by the borrower) and may request an authenticator (and potentially secondary authenticators) to authenticate the collateral item, thereby progressing the loan process to the authentication stage 3004.

During the authentication stage 3004, the loan process smart contract instance may instantiate an instance of an authentication smart contract 2028. In embodiments, the tokenization platform 100 may assign an authentication task to a primary authenticator (and potentially secondary authenticators) from an authentication guild that specializes in authenticating items such as the collateral item, as described above. In embodiments, the primary authenticator may confirm receipt of the item to be authenticated via an authenticator device 2004. In embodiments, the authenticator may generate an authentication report indicating a determination to the authenticity of the collateral item, as well as any supporting documentation. In embodiments, the authentication report and supporting evidence may be provided to one or more secondary authenticators, who in turn may validate the authentication report and may provide additional supporting documentation. In embodiments, the authentication report and any supporting documentation may be written to a distributed ledger 2016. In some embodiments, the authenticators that participated in the authentication task may be required to stake an amount of currency/tokenized tokens as a safeguard in case the item is liquidated and later deemed fake. In example embodiments, the loan process smart contract 2022 may include a listening thread that listens for an authentication notification issued by the instantiated authentication smart contract 2028 indicating whether the item was authentic or deemed fake by the authenticator(s), where the notification from the authentication smart contract 2028 may include the opinion of the authenticators (e.g., fake or authentic), a hash value of the authentication report and any other supporting evidence, and/or a block address to the authentication report and the supporting evidence. If the loan process smart contract instance determines that the item was deemed authentic, the loan process smart contract instance may advance the loan process to a safekeeping stage 3006.

During the safekeeping stage 3006, the loan process smart contract instance may request a safekeeper to safekeep the collateral item and may instantiate an instance of a safekeeping smart contract 2032, which executes a safekeeping workflow. In embodiments, the tokenization platform 100 may assign a safekeeper to the safekeeping task, for example, based on the type of collateral item and/or the safekeeper's proximity to the collateral item. Once the safekeeper has confirmed receipt of the item, the safekeeper may generate a safekeeping report that indicates that the item is stored and notes any damage to the collateral item at the time it was received and inspected, as well as any supporting documentation that supports the safekeeping report. In embodiments, the safekeeping report and any supporting documentation may be written to a distributed ledger 2016. In some embodiments, the safekeeper may be required to stake an amount of currency/tokenized tokens equal or proportionate to an approximate value of the collateral item as a safeguard in case the item is lost or damaged during safekeeping (or may provide proof of insurance). In embodiments, the safekeeping smart contract instance may then provide a notification to the loan process smart contract instance indicating that the item has been safely stored in escrow, where the notification may include a hash value of the safekeeping report and any other supporting evidence and/or a block address to the safekeeping report and the supporting evidence. In response to the notification, the loan process smart contract may advance the loan process to a tokenization stage 3008.

During the tokenization stage 3008, the tokenization platform 100 (or another suitable component) may generate tokenize the collateral item. In embodiments, the tokenization platform 100 may generate a VIRL of the collateral item based on data that describes and/or depicts the collateral item, such as descriptions, images, videos, 2D scans, and/or 3D scans of the collateral item. In embodiments, the borrower, the safekeeper, and/or the authenticator may provide the data used to generate the VIRL. In embodiments, the tokenization platform 100 generates a collateral token of the item based on the VIRL of the collateral item. Once an item is tokenized, the tokenization platform 100 may write the token to the distributed ledger 2016 and may initially assign the ownership rights to the collateral token to the borrower (until a loan agreement is reached). Once the collateral item has been tokenized, the tokenization platform 100 may provide a notification to the loan process smart contract 2022 indicating the tokenization event and/or an address of the collateral token. Upon receiving notification of tokenization event, the loan process smart contract 2022 may advance the loan process to a pre-loan liquidation stage 3010.

During the pre-loan liquidation stage 3010, the loan process smart contract instance may instantiate an instance of a pre-loan liquidation smart contract. In embodiments, the pre-loan liquidation smart contract instance may provide a pre-loan liquidation request to a marketplace (e.g., marketplace system 102). In embodiments, the request may include the VIRL (or an indicator thereof, such as a VIRL ID or the like) and/or other documentation describing and/or showing the collateral item. In embodiments, the contingent sale request may include other suitable information, such as a contingent sale type (e.g., auction or set price sale), a location of the collateral item, a sought price for the collateral item (if a set price sale), a minimum price for the collateral item (if an auction), a length of the contingency (e.g., the amount of time that the borrower needs to secure and repay the loan), a reward offer (e.g., a predefine reward amount or a percentage of the purchase price, desired loan amount, or repayment amount), and/or the like. In response the marketplace can facilitate a contingent sale, which may result in the collateral item being sold (e.g., a contingent buyer buys the collateral item at a set price or wins an auction) with a set of contingencies or no sale. In embodiments, the pre-loan liquidation smart contract may receive the results of the contingent sale from the marketplace. Once the contingent sale is completed, the marketplace can send a sale notification to the liquidation smart contract instance indicating the results of the pre-loan liquidation event. In embodiments, the results of the pre-loan liquidation event indicate whether the item was sold, and if sold, a price at which the item was sold (minus any fees taken by the marketplace for hosting the sale). At this juncture, the pre-loan liquidation smart contract may provide a contingent sale notification to a borrower device 2002 of the borrower (assuming a pre-loan sale of the collateral item occurred) and the borrower may a) agree to the contingent sale to advance the loan process, b) refuse the contingent sale and end the loan process (e.g., if the sale was an auction and the agreed upon liquidation price was too low to secure a loan), or c) decide to complete the contingent sale and end the loan process. If the borrower agrees to complete the contingent sale, the pre-loan liquidation smart contract may initiate the transfer of the collateral token 2042 to the contingent buyer and the transfer of the proceeds of the sale to the buyer (e.g., a purchase amount in currency/tokenized tokens or fiat currency) minus any fees taken by the marketplace. In the event that the borrower agrees to the contingent sale, the pre-loan liquidation smart contract instance may lock the collateral item in an escrow account. Additionally, the pre-loan liquidation smart contract instance may escrow the proceeds of the sale from the contingent buyer (or a portion thereof) in an escrow account to ensure that the contingent buyer can pay the sale price should the loan go into default. The pre-loan liquidation smart contract instance may write a pre-loan liquidation event record to the distributed ledger and may issue a notification to the loan process smart contract instance that indicates that the conditional sale was completed and a pre-loan liquidation price of the collateral item. In response, the loan process smart contract instance may advance the loan process to a lending stage 3012.

During the lending stage 3012, the borrower may request a loan and/or may negotiate a loan with one or more lenders. Upon receiving confirmation that the lender and borrower have agreed to loan terms, the loan process smart contract 2022 may instantiate a loan smart contract 2034 in accordance with the agreed upon terms of the loan. In some embodiments, the tokenization platform 100 may provide a GUI to a borrower that allows the borrower to request a loan from one or more potential lenders and/or negotiate a loan agreement with the one or more lenders. It is appreciated that in some embodiments, the loan negotiation may be handled on-chain rather than via a centralized service, such as the tokenization platform 100. In embodiments, the borrower may request a loan amount that does not exceed the pre-loan liquidation sale value and a proposed loan term that indicates an amount of time to pay back the loan. In some of these embodiments, the tokenization platform 100 may generate a loan request that is presented to potential lenders via a GUI, whereby the loan request indicates the sought amount, the length of the loan, and information relating to the collateral item provided by the borrower (e.g., a VIRL of the collateral item, authentication reports, pre-sale liquidation reports, safekeeping reports, verification that the authentication, appraisal, and safekeepers have secured their respective tasks (as described above), and/or the like). In embodiments, the tokenization system 100 may suggest a loan repayment amount and/or an interest rate (e.g., based on current market conditions) for the loan. Alternatively, a potential lender may provide an interest rate or a total repayment amount that the borrower would have to pay back via the GUI. Additionally, the potential lender may counter one or more of the requested loan terms, such as the loan amount and/or the repayment period. The loan offer may then be communicated to a borrower via a GUI, where the borrower may view the loan offer via a borrower device 2002. In response, the borrower may accept the loan offer, reject the loan offer, or provide a counteroffer. The parties may iterate in the manner until an agreement is reached or one or both parties reject the loan offer. Upon a loan being reached, the parties may execute the loan agreement and the tokenization platform 100 may provide a notification to the loan process smart contract instance indicating that a loan agreement has been agreed to by the borrower and a lender. In embodiments, the notification may include the details of the loan agreement including the terms of the loan agreement. In response, the loan process smart contract instance may instantiate a loan smart contract instance that executes a loan repayment workflow. Once a loan agreement is executed, the loan smart contract may lock the collateral token in an escrow account and may facilitate the transfer of the funds from an account of the lender to an account of the borrower. In embodiments, the loan agreement, records of any offers/counteroffers, and records relating to the escrowing of the collateral token and the transfer funds to the borrower may be written to a distributed ledger 2016. Once the loan process smart contract instance receives notification that the collateral token has been locked and the funds have been transferred, the loan process smart contract instance may advance the loan process to the repayment stage 3014.

During the repayment stage 3014, the loan smart contract instance may monitor the borrowers payment history to ensure that payments are made by the borrower to the lender (or an account that distributes payments to the lender) in accordance with a loan schedule and that the loan is not in a default condition. During the loan repayment stage, the borrower may remit payments. Each time a payment is made, the loan process smart contract instance may receive a payment notification indicating that a payment has been made and an amount of the payment. The loan smart contract instance may then determine whether the loan has been repaid in full. If the loan has not been paid in full, the loan smart contract instance may adjust the loan repayment amount and may perform additional operations, such as returning some of the staked funds from the authenticators and/or safekeeper to reflect the new loan repayment amount. If the loan smart contract instance determines that the loan repayment amount has been paid in full, the loan smart contract instance may send a repayment notification to the loan process smart contract instance indicating that the loan has been paid in full and may advance the loan process to the post-loan stage 2716. In embodiments, the repayment notification may include hash values of payment event records indicating that payments were made and the amount of the payments and/or addresses of the payment records on the distributed ledger 2016. Conversely, if the loan smart contract instance determines that the borrower defaulted, the loan smart contract may transmit a default notification to the loan process smart contract indicating that the loan is in default in accordance with the terms of the loan. In embodiments the default notification may include hash values of a default event record indicating which payments were missed and the remaining balance on the loan and/or addresses of the default event record on the distributed ledger 2016. In response to receiving a default notification, the loan smart contract instance may provide a default notification to the loan process smart contract instance and/or the pre-loan liquidation event smart contract to initiate the transfer of the collateral token 2042 to the contingent buyer. Upon a default condition being determined, the loan process may advance to the post-loan stage 3016.

During the post-loan stage 3016, the collateral token 2042 is either returned to the owner if the loan has been fully paid or the collateral token 2042 is transferred to the contingent buyer pursuant to the possession contingency. In response to receiving a repayment notification that the loan has been repaid in full, the loan smart contract instance may initiate the transfer of the collateral token from the escrow account to an account of the borrower, who may then redeem the collateral token to obtain possession of the collateral item. Once the loan has been successfully repaid, the loan process smart contract instance may initiate the awarding of rewards to accounts of the authenticator, contingent buyer pursuant to the reward contingency, and safekeeper (e.g., from the funds that were paid back to the lender) in accordance with the terms set forth in the authentication smart contract, the pre-loan liquidation smart contract, and the safekeeping contract.

In the case of a default condition, the loan contract instance may provide a default notification to the loan process smart contract and the pre-loan liquidation smart contract. In response to receiving the default condition, the pre-loan liquidation smart contract may unlock the funds that were escrowed from the contingent buyer during the pre-loan liquidation event. The loan process smart contract instance may distribute the outstanding balance on the loan repayment amount to the lender (or a secondary lender if the loan was sold to a secondary lender) from the proceeds of the pre-loan liquidation event (e.g., the unlocked funds from the contingent buyer as well as any remaining balance owed by the contingent buyer). Upon confirming that the contingent buyer has no outstanding balance form the pre-liquidation sale, the pre-loan liquidation smart contract instance may unlock the collateral token 2042 from escrow and may transfer the collateral token 2042 to an account of the contingent buyer, who may then redeem the collateral token to take possession of the collateral item. Additionally, the loan process smart contract instance may initiate the awarding of rewards to accounts of the authenticators and safekeeper from the proceeds of the pre-loan liquidation event in accordance with the terms set forth in the authentication smart contract and the safekeeping contract. To the extent any balance remains, the remainder may be credited to the account of the borrower.

Once the loan process is complete, the loan process smart contract instance may notify the tokenization platform 100 that the loan process has been completed, and the tokenization platform 100 may run an analytics processes based on the completed loan process. In some embodiments, the results of the loan process may be used to update the ratings of one or more of the authenticators, the safekeeper, the contingent buyer, the lender, and/or the borrower.

It is appreciated that the foregoing is an example of a decentralized loan process workflow 3000 and that alternative workflows may be executed. Furthermore, the decentralized loan process workflow 3000 may include additional or alternative steps that were not explicitly discussed. It is noted that order of some of the stages of the loan process workflow 3000 may varied to achieve certain efficiencies. For example, if the collateral item is difficult to ship and/or is perishable, the safekeeping stage and tokenization stage may be performed prior to the authentication stage.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like, including a central processing unit (CPU), a general processing unit (GPU), a logic board, a chip (e.g., a graphics chip, a video processing chip, a data compression chip, or the like), a chipset, a controller, a system-on-chip (e.g., an RF system on chip, an AI system on chip, a video processing system on chip, or others), an integrated circuit, an application specific integrated circuit (ASIC), a field programmable gate array (FPGA), an approximate computing processor, a quantum computing processor, a parallel computing processor, a neural network processor, or other type of processor. The processor may be or may include a signal processor, digital processor, data processor, embedded processor, microprocessor or any variant such as a co-processor (math co-processor, graphic co-processor, communication co-processor, video co-processor, AI co-processor, and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, network-attached storage, server-based storage, and the like.

A processor may include one or more cores that may enhance speed and performance of a multiprocessor. In embodiments, the process may be a dual core processor, quad core processors, other chip-level multiprocessor and the like that combine two or more independent cores (sometimes called a die).

The methods and systems described herein may be deployed in part or in whole through a machine that executes computer software on a server, client, firewall, gateway, hub, router, switch, infrastructure-as-a-service, platform-as-a-service, or other such computer and/or networking hardware or system. The software may be associated with a server that may include a file server, print server, domain server, internet server, intranet server, cloud server, infrastructure-as-a-service server, platform-as-a-service server, web server, and other variants such as secondary server, host server, distributed server, failover server, backup server, server farm, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for the execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network with multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, 5G, LTE, EVDO, mesh, or other network types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic book readers, music players and the like. These devices may include, apart from other components, a storage medium such as flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, network-attached storage, network storage, NVME-accessible storage, PCIE connected storage, distributed storage, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable code using a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices, artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions. Computer software may employ virtualization, virtual machines, containers, dock facilities, portainers, and other capabilities.

Thus, in one aspect, methods described above and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "with," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. The term "set" may include a set with a single member. No language in the specification should be construed as indicating any non-claimed element as essential to the practice of the disclosure.

While the foregoing written description enables one skilled to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference as if fully set forth herein.

What is claimed is:

1. A method comprising:

receiving, by one or more processing devices, a request to initiate a loan process from a user device, the request indicating a collateral item of a borrower, the collateral item comprising a unique collectible item; and executing, by the one or more processing devices, a loan process smart contract instance that includes computer-readable instructions that are configured to manage a loan process in accordance with a loan process workflow, wherein the loan process smart contract instance is configured to execute the loan process workflow that includes:

initiating tokenization of the collateral item, wherein tokenization of the collateral item includes:

generating a virtual representation of the collateral item, wherein the virtual representation includes a description of the collateral item and one or more media contents that respectively depict at least a portion of the collateral item, wherein the one or media contents comprise a photograph, a video, an image, or an audio clip;

generating a collateral token corresponding to the collateral item, wherein the collateral token is a non-fungible digital token that is stored on a distributed ledger and is redeemable by an owner of the collateral token for the collateral item, and wherein generating the collateral token comprises generating a unique token identifier that uniquely identifies the collateral token;

cryptographically linking the collateral token to the virtual representation of the collateral item, wherein cryptographically linking the collateral token to the virtual representation comprises digitally signing the unique token identifier using a private key/public key pair; and assigning the collateral token to a first user account of the borrower on the distributed ledger by a writing a block to the distributed ledger to update ownership data of the collateral token to reflect a public key corresponding to the first user account;

initiating a pre-liquidation sale of the collateral item via a digital marketplace, wherein the pre-liquidation sale of the collateral item results in a buyer conditionally buying the collateral item for a conditional sale price such that the buyer is granted the collateral item should the borrower default on one or more loans that are secured by the collateral item, wherein at least a portion of the conditional sale price of the collateral item is used to secure at least a portion of the one or more loans that are secured by the collateral item;

updating the virtual representation of the collateral item to indicate the conditional sale price of the collateral item;

receiving a loan agreement notification indicating a set of loan term parameters of a loan agreement that were agreed to by a lender and the borrower, wherein the loan term parameters include a loan amount that the lender will receive, a set of repayment parameters, and a set of unlocking events, wherein the set of unlocking events include a loan repayment event that defines a first set of electronically verifiable conditions that must be met to determine that the loan has been fully repaid and a loan default event that defines a second set of electronically verifiable conditions that must be met to determine that the borrower has defaulted on the loan;

locking the collateral token in an escrow account on the distributed ledger until an unlocking event of the set of unlocking events is detected, whereby the collateral token is prevented from being redeemed or assigned to another account while the collateral token remains locked in the escrow account, wherein locking the collateral token comprises assigning the collateral token to the escrow account by a writing a block to the distributed ledger to update ownership data of the collateral token to reflect a public key corresponding to the escrow account on the distributed ledger; and instantiating a loan smart contract instance that includes computer-readable instructions that are configured to manage repayment of the loan based on the set of loan term parameters;

monitoring, by the one or more processing devices executing the loan smart contract instance, the distributed ledger to determine a repayment status of the loan in accordance with the loan term parameters to detect an occurrence of any of the set of unlocking events;

in response to detecting an occurrence of the loan repayment event, (i) transmitting, by the one or more processing devices executing the loan smart contract instance, a loan payoff notification to the loan process smart contract instance, (ii) unlocking, by the one or more processing devices, the collateral token, whereby the collateral token is permitted to be redeemed by the borrower or assigned to another account by the borrower, and (iii) transmitting, by the one or more processing devices, a repayment notification to the borrower and the conditional buyer indicative of the loan repayment event and the unlocking;

in response to detecting an occurrence of the loan default event, (i) transmitting, by the one or more processing devices executing the loan smart contract instance, a loan default notification to the loan process smart contract instance, (ii) unlocking, by the one or more processing devices, the collateral token and assigning the collateral token to a second user account of the conditional buyer, and (iii) transmitting, by the one or more processing devices, a sales execution notification to each of the borrower and the conditional buyer indicative of the loan default event and the assigning.

2. The method of claim 1, wherein the buyer is granted the collateral item by assigning the collateral token to a user account of the buyer on the distributed ledger.

3. The method of claim 1, wherein to secure at least a portion of the one or more loans that are secured by the collateral item includes transferring the at least a portion of the conditional sale price to an escrow account associated with the loan.

4. The method of claim 1, wherein initiating the pre-liquidation sale of the collateral item includes instantiating an instance of a pre-loan liquidation smart contract.

5. The method of claim 4, wherein the pre-loan liquidation smart contract instance locks the collateral token in the escrow account.

6. The method of claim 4, wherein the pre-loan liquidation smart contract instance transfers proceeds of the pre-liquidation sale to a second escrow account associated with the escrow account.

7. The method of claim 4, wherein the pre-loan liquidation smart contract instance records a pre-loan liquidation event record to the distributed ledger and issues a notification to the loan process smart contract instance of completion of the pre-liquidation sale including a pre-loan liquidation price of the collateral item.

8. The method of claim 4, wherein the pre-loan liquidation smart contract instance provides a pre-loan liquidation request to the digital marketplace, wherein the request includes at least one of the virtual representation or an indicator thereof and other documentation representative of the collateral item.

9. The method of claim 8, wherein the pre-loan liquidation request includes one or more of a contingent sale type, a location of the collateral item, a sought price for the collateral item, a minimum auction price for the collateral item, a length of escrow, a reward offer of one or more of a predefine reward amount, a percentage of a purchase price, a percentage of a desired loan amount, or a percentage of a repayment amount.

10. The method of claim 4, wherein the pre-loan liquidation smart contract instance facilitates negotiation of the set of loan terms by enabling exchange of offers and counteroffers of loan terms between the borrower and the lender via a user interface presented to the borrower.

11. The method of claim 4, wherein the pre-loan liquidation smart contract instance provides a contingent sale notification via a user interface to the borrower, wherein the user interface enables the borrower to select among a set of borrower actions selected from a list consisting of advancing the loan process by agreeing to the contingent sale, ending the loan process by refusing the contingent sale, and ending the loan process by completing the contingent sale.

12. The method of claim 1, wherein to manage the loan process in accordance with the loan process workflow includes receiving electronic payment event notifications indicating payment events by the borrower to the lender and monitoring a status of the loan based on the loan payment notifications.

13. The method of claim 12, wherein to manage the loan process in accordance with the loan process workflow includes executing an event listening thread that listens for the payment event notifications indicating payment events corresponding to the loan.

14. The method of claim 1, wherein conditionally buying the collateral item for the conditional sale price includes accepting a set of contingencies the occurrence of which result in the collateral item not being granted to the buyer.

15. The method of claim 1, further including the loan process workflow including providing a contingent sale notification that includes the conditional sale price to a borrower device.

16. The method of claim 1, wherein initiating the pre-liquidation sale of the collateral item via the digital marketplace includes providing information relating to the collateral item in the digital marketplace, wherein the information relating to the collateral item includes one or more of the virtual representation of the collateral item, collateral item authentication reports, collateral item safekeeping reports, verification that at least one of an authenticator, an appraiser, and a safekeeper have been secured to perform their respective tasks.

17. The method of claim 1 wherein the pre-loan liquidation smart contract instance instantiates an appraisal smart contract instance that includes computer readable instructions that are configured to facilitate an appraisal task that is performed by one or more appraisers to appraise the collateral item and to issue an appraisal notification upon confirming an appraisal report indicating an appraised value determined by the one or more appraisers.

18. The method of claim 4 wherein the pre-loan liquidation smart contract instance instantiates an authentication smart contract instance that includes computer readable instructions that are configured to manage an authentication task that is performed by one or more authenticators to authenticate the collateral item and to issue an authentication notification upon confirming receipt of an authentication report generated by the one or more authenticators.

19. The method of claim 4 wherein the pre-loan liquidation smart contract instance instantiates a safekeeper smart contract instance that includes computer readable instructions that are configured to manage a safekeeping task of the collateral item by a safekeeper and to issue a safekeeping notification upon confirming receipt of a safekeeper report from the safekeeper of the safekeeping of the collateral item.

20. The method of claim 1, wherein the loan process smart contract instance is executed at by a set of node devices that store the distributed ledger.

* * * * *